(12) United States Patent
Liao et al.

(10) Patent No.: US 11,544,767 B2
(45) Date of Patent: Jan. 3, 2023

(54) RECOMMENDATION SYSTEM WITH IMPLICIT FEEDBACK

(71) Applicant: SAS Institute Inc., Cary, NC (US)

(72) Inventors: Xuejun Liao, Cary, NC (US); Patrick Nathan Koch, Morrisville, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/715,214

(22) Filed: Apr. 7, 2022

(65) Prior Publication Data

US 2022/0237685 A1 Jul. 28, 2022

Related U.S. Application Data

(63) Continuation-in-part of application No. 17/386,853, filed on Jul. 28, 2021, now Pat. No. 11,379,743.

(60) Provisional application No. 63/280,019, filed on Nov. 16, 2021, provisional application No. 63/121,751, filed on Dec. 4, 2020, provisional application No. 63/108,640, filed on Nov. 2, 2020.

(51) Int. Cl.
  *G06Q 30/06* (2012.01)
  *G06F 17/16* (2006.01)
  *G06Q 30/02* (2012.01)

(52) U.S. Cl.
  CPC ......... *G06Q 30/0631* (2013.01); *G06F 17/16* (2013.01); *G06Q 30/0201* (2013.01)

(58) Field of Classification Search
  None
  See application file for complete search history.

(56) References Cited

U.S. PATENT DOCUMENTS 10,795,900 B1  10/2020  Satuluri et al.
11,100,426 B1 *  8/2021  Mishra .............. G06Q 30/0202
(Continued)

FOREIGN PATENT DOCUMENTS

EP         3147803 A1 *  3/2017  ......... G06F 16/9038

OTHER PUBLICATIONS

Lu et al., "Content-Based Collaborative Filtering for News Topic Recommendation," Proceedings of the Twenty-Ninth AAAI Conference on Artificial Intelligence, 2015, pp. 217-223.
(Continued)

*Primary Examiner* — Alexey Shmatov
*Assistant Examiner* — Beatriz Ramirez Bravo
(74) *Attorney, Agent, or Firm* — Bell & Manning, LLC

(57) ABSTRACT

A computing device determines a recommendation. A confidence matrix is computed using a predefined weight value. (A) A first parameter matrix is updated using the confidence matrix, a predefined response matrix, a first step-size parameter value, and a first direction matrix. The predefined response matrix includes a predefined response value by each user to each item and at least one matrix value for which a user has not provided a response to an item. (B) A second parameter matrix is updated using the confidence matrix, the predefined response matrix, a second step-size parameter value, and a second direction matrix. (C) An objective function value is updated based on the first and second parameter matrices. (D) The first and second parameter matrices are trained by repeating (A) through (C). The first and second parameter matrices output for use in predicting a recommended item for a requesting user.

30 Claims, 67 Drawing Sheets

(56) References Cited

U.S. PATENT DOCUMENTS

| | | | | |
|---|---|---|---|---|
| 2013/0124449 | A1* | 5/2013 | Pinckney | G06N 20/00 |
| | | | | 706/52 |
| 2017/0132509 | A1* | 5/2017 | Li | G06N 3/0427 |
| 2018/0330192 | A1* | 11/2018 | Atasu | G06K 9/6226 |
| 2020/0125745 | A1* | 4/2020 | Chen | G06Q 30/0627 |
| 2022/0138605 | A1 | 5/2022 | Liao et al. | |

OTHER PUBLICATIONS

Hastie et al., Matrix Completion and Low-Rank SVD via Fast Alternating Least Squares, Journal of Machine Learning Research 16 (2015) 3367-3402.

Robert M. Bell and Yehuda Koren, "Scalable Collaborative Filtering with Jointly Derived Neighborhood Interpolation Weights," Seventh IEEE International Conference on Data Mining, 2007, pp. 43-52.

Basilico et al., "Unifying Collaborative and Content-Based Filtering," Proceedings of the 21$^{st}$ International Conference on Machine Learning, 2004, 8 pages.

Hu, Yifan, Yehuda Koren, and Chris Volinsky. "Collaborative filtering for implicit feedback datasets." *2008 Eighth IEEE international conference on data mining.* IEEE, 2008.

Xuejun Liao, et al. 2021. Efficient Collaborative Filtering via Data Augmentation and Step-Size Optimization. In Proceedings of the 27th ACM SIGKDD Conference on Knowledge Discovery & Data Mining. Association for Computing Machinery, 1006-1016.

\* cited by examiner

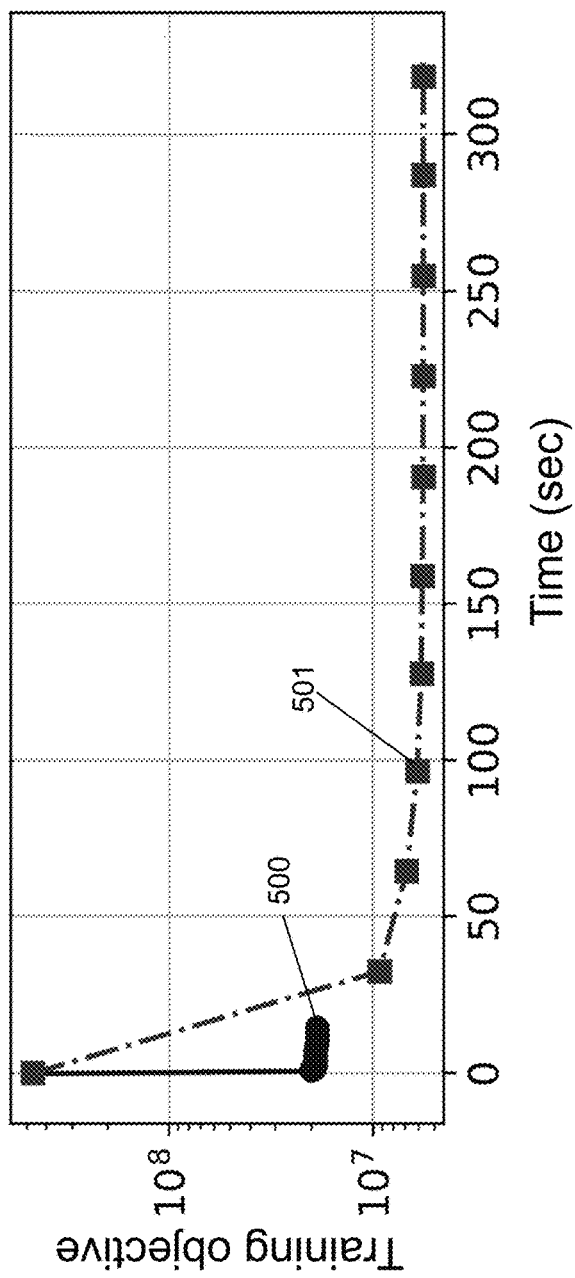
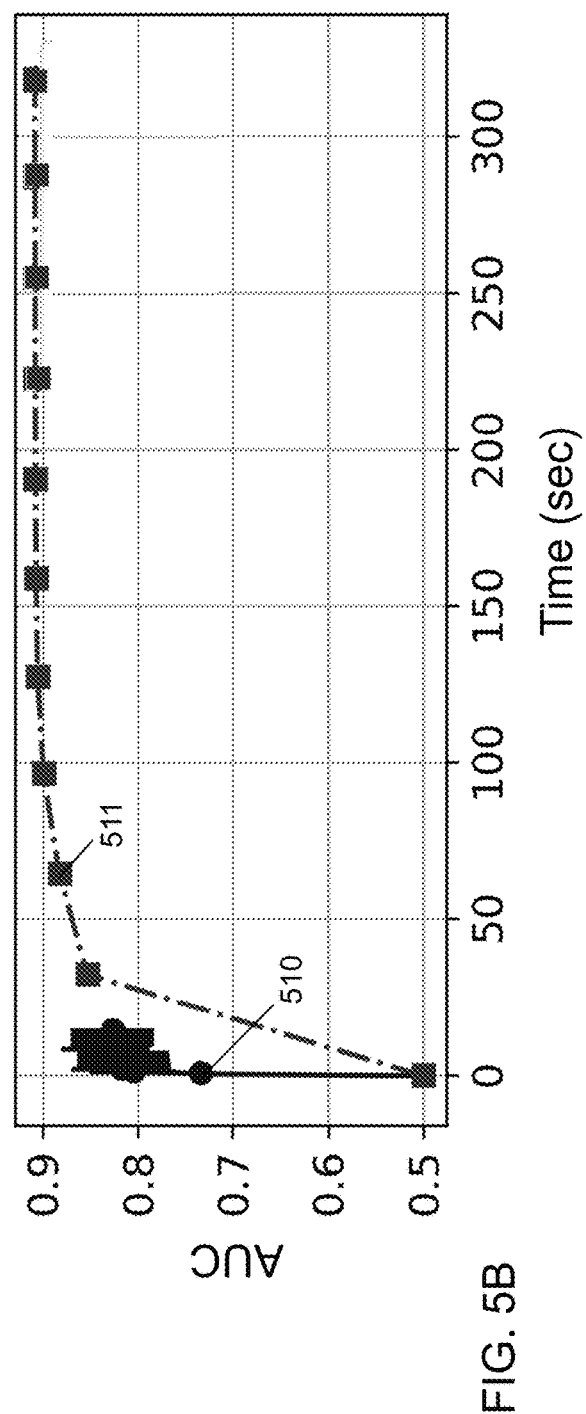
FIG. 5A
FIG. 5B

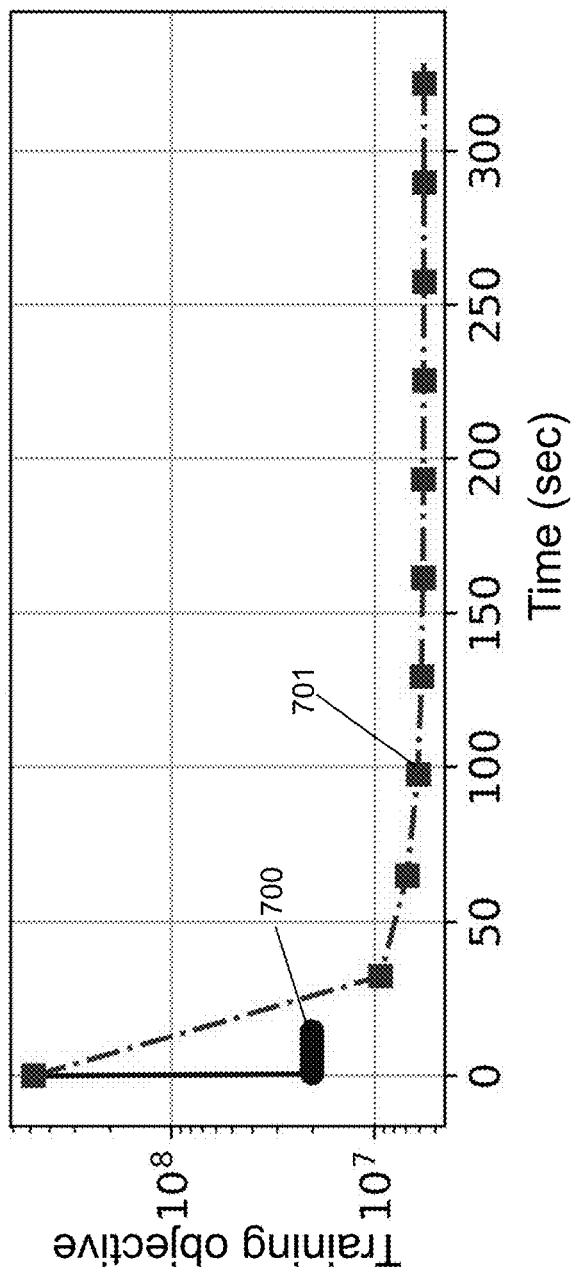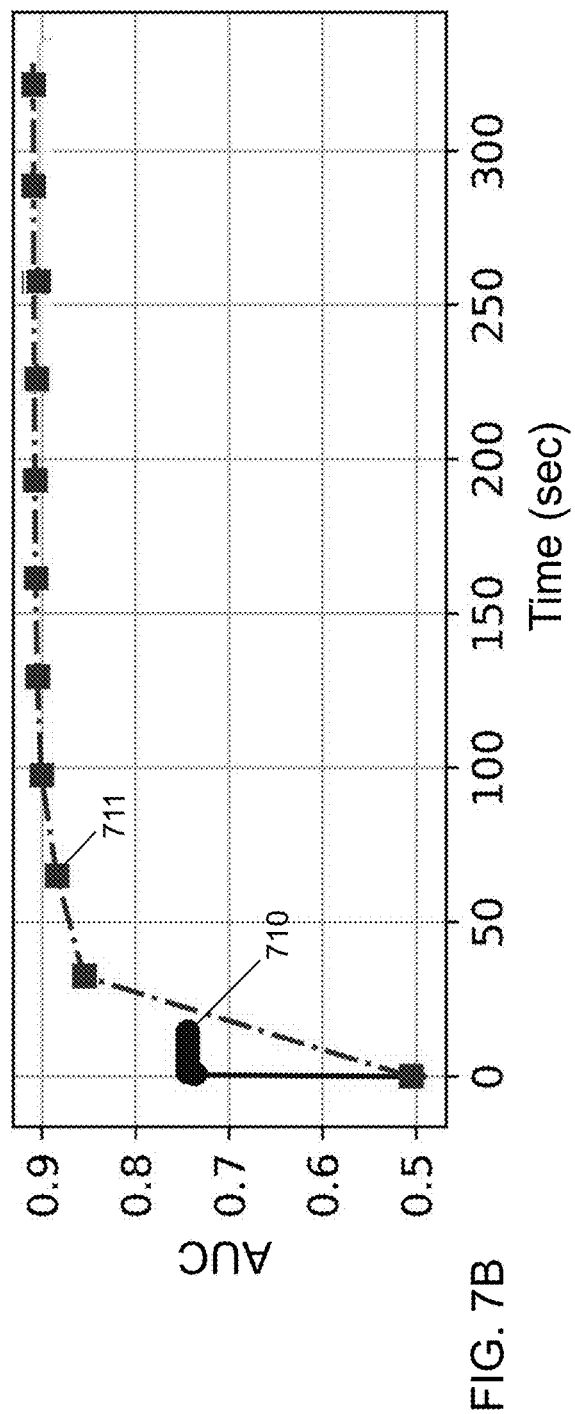
FIG. 7A
FIG. 7B

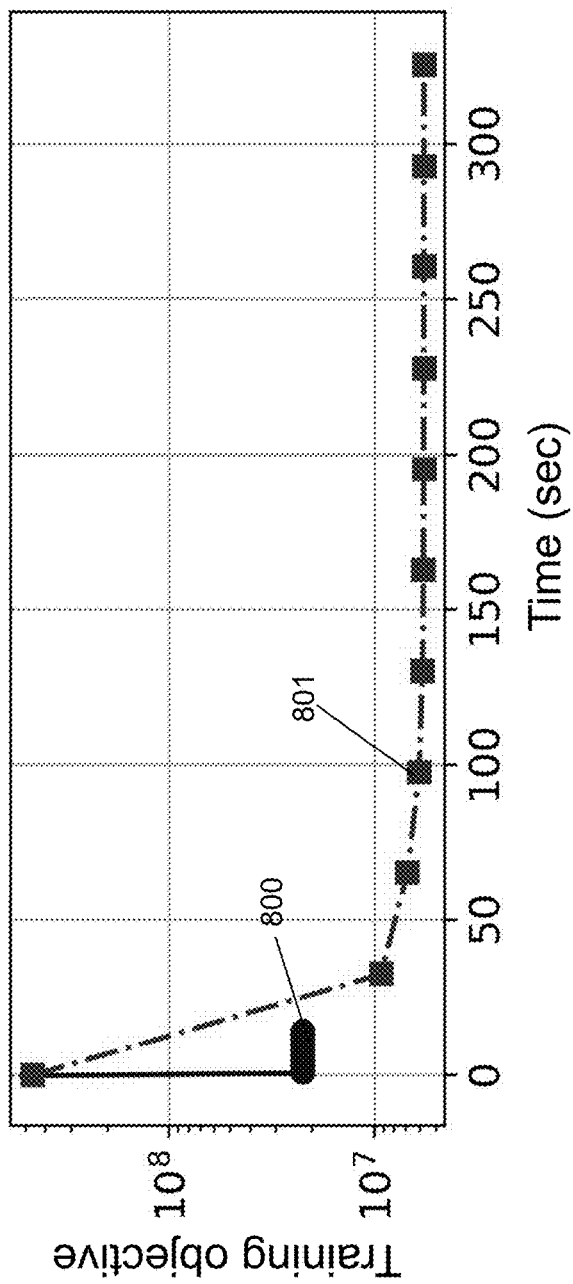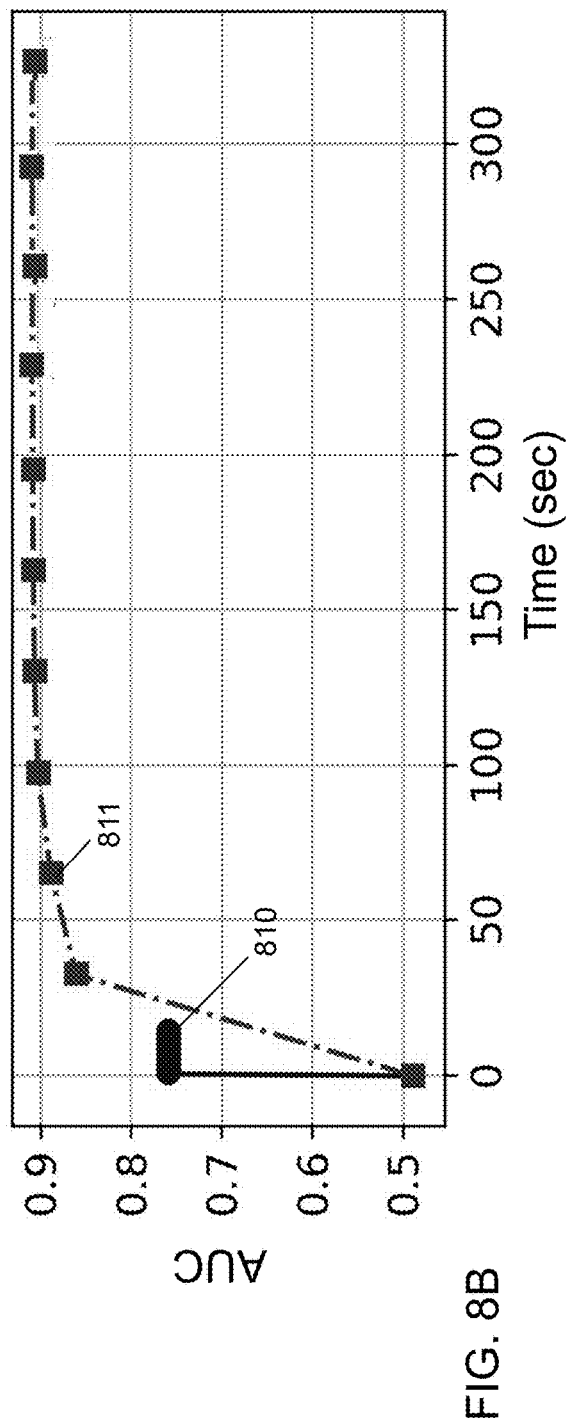
FIG. 8A
FIG. 8B

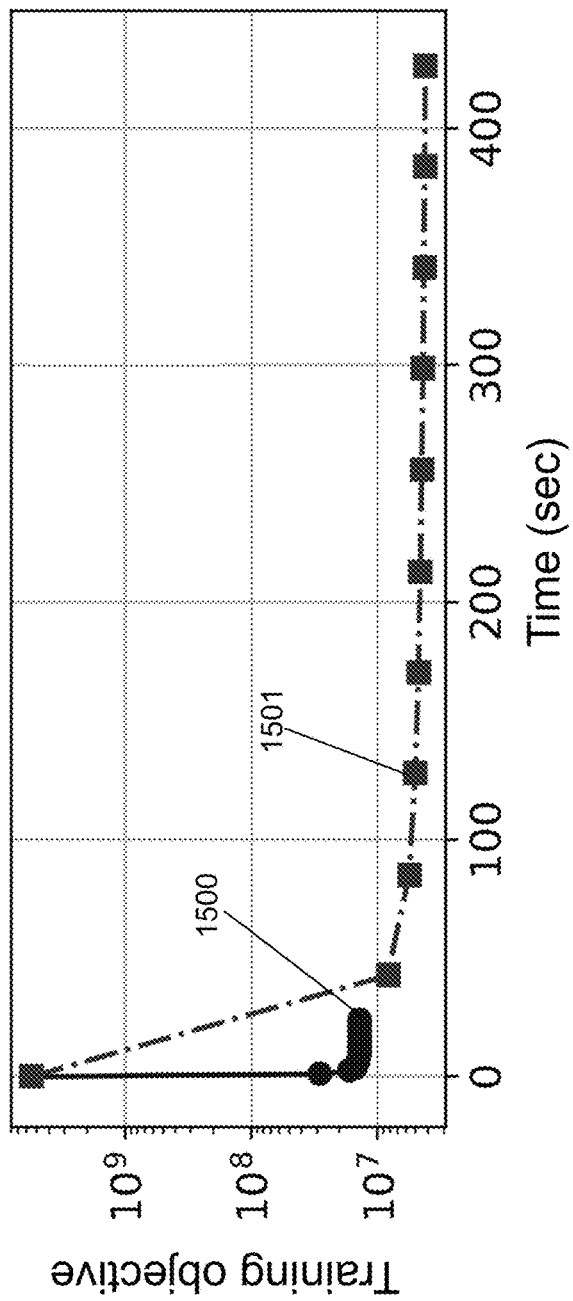
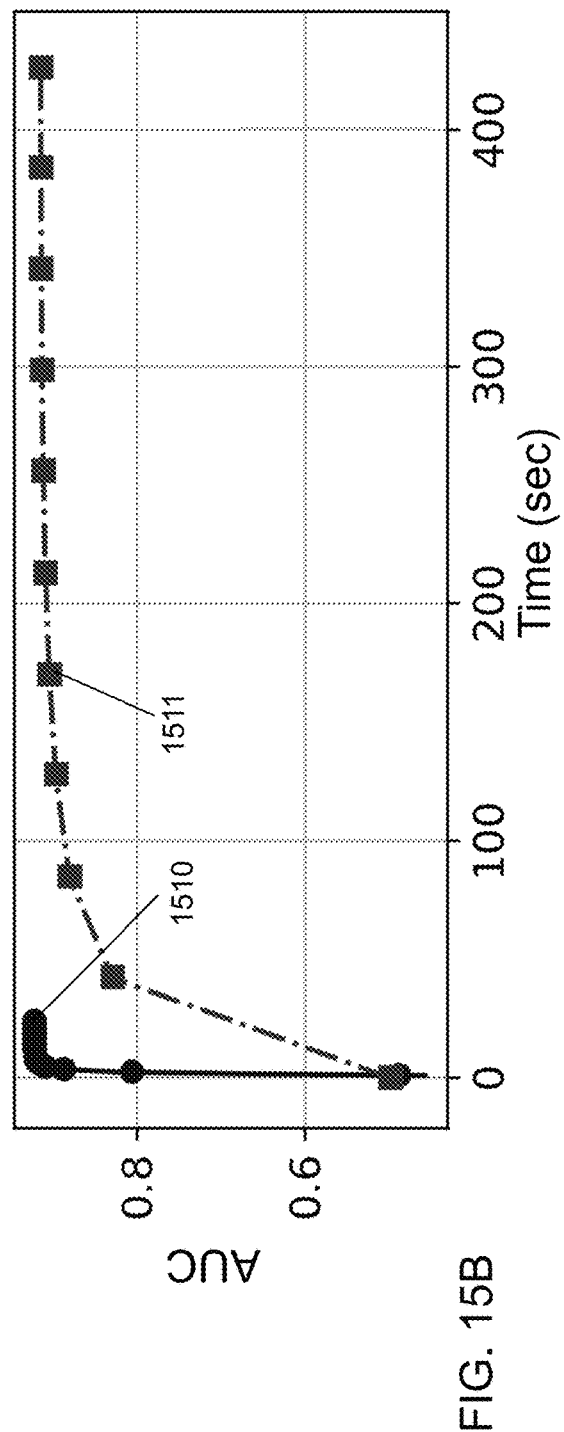
FIG. 15A
FIG. 15B

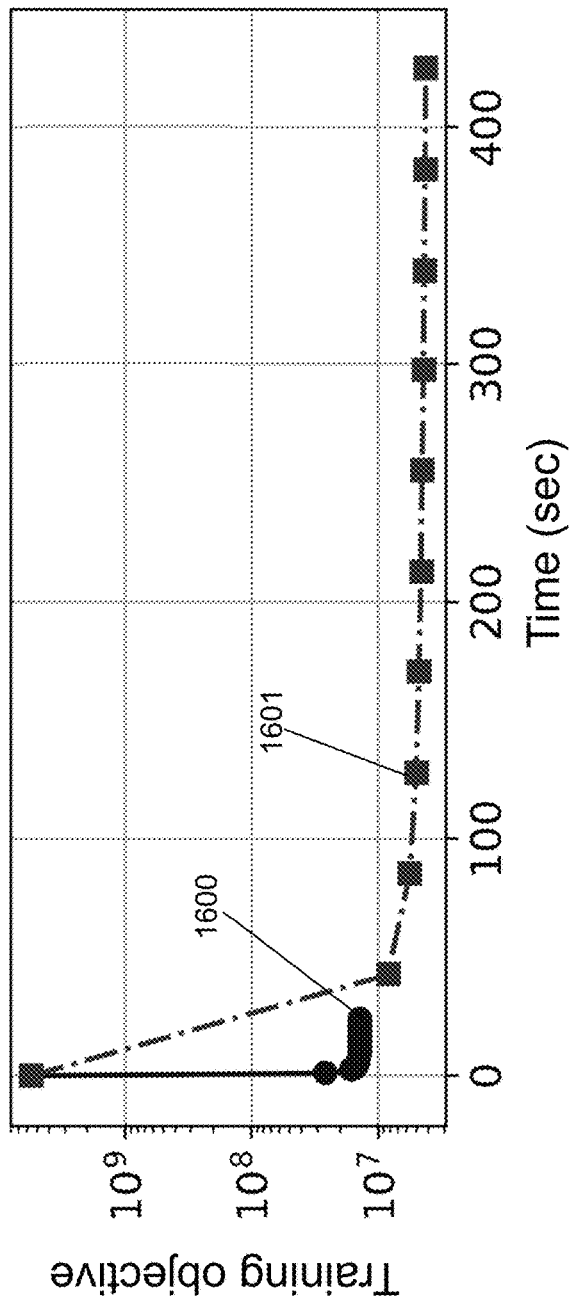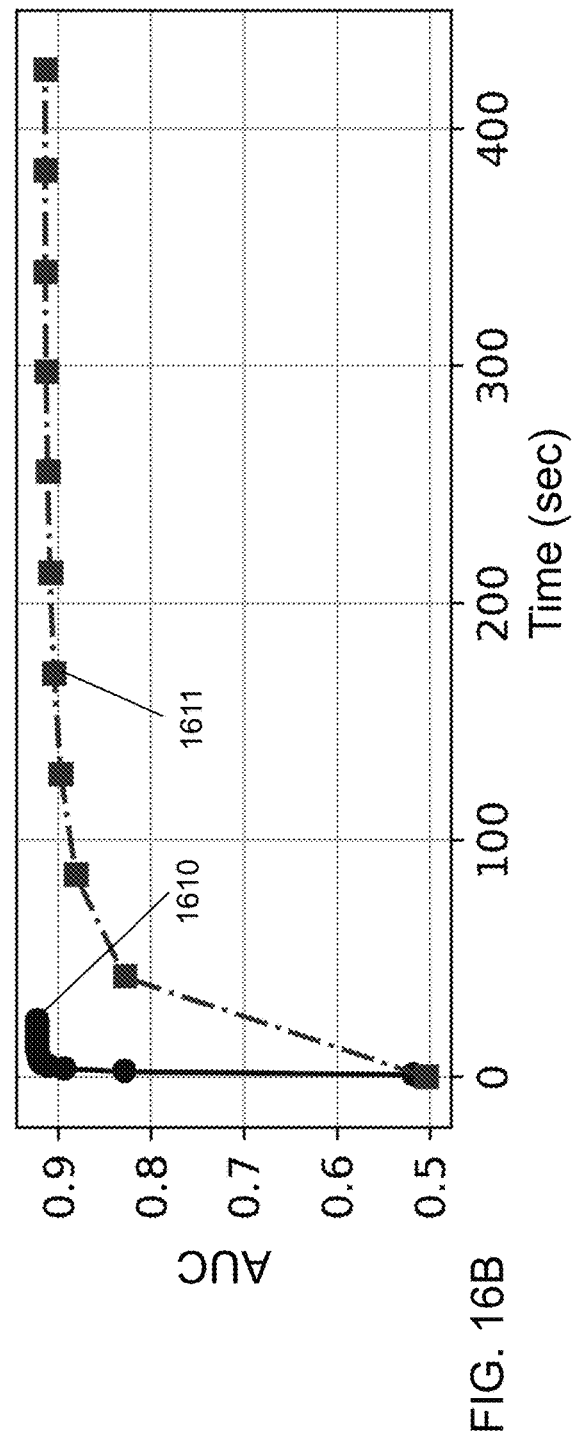
FIG. 16A
FIG. 16B

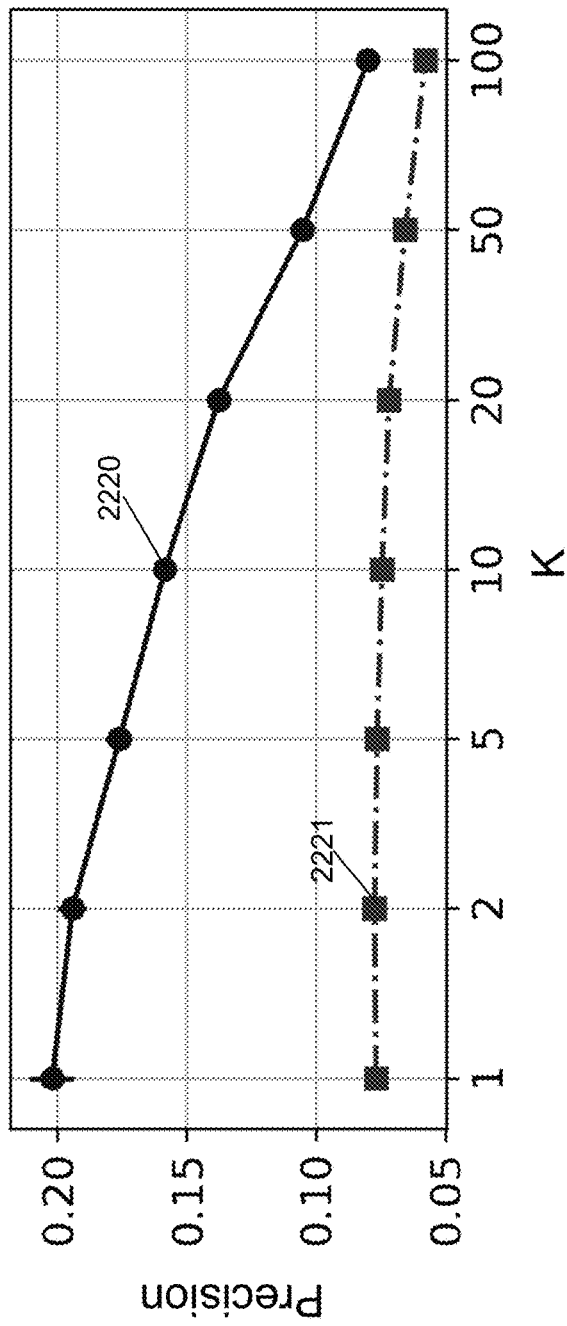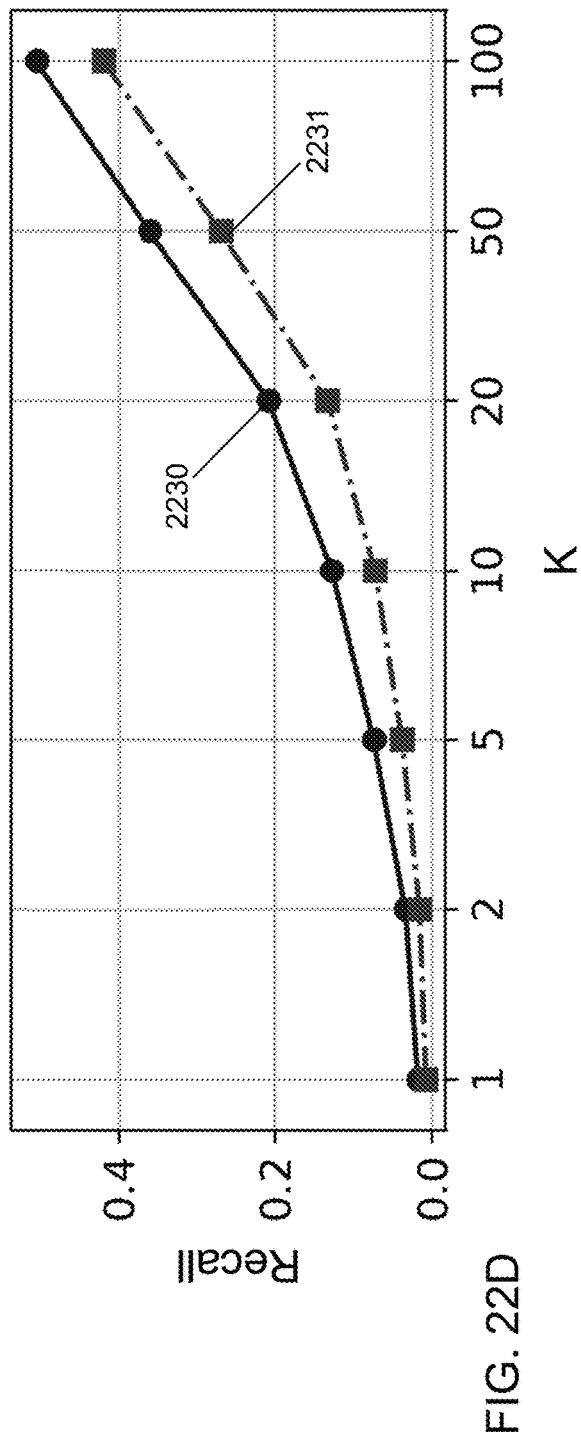

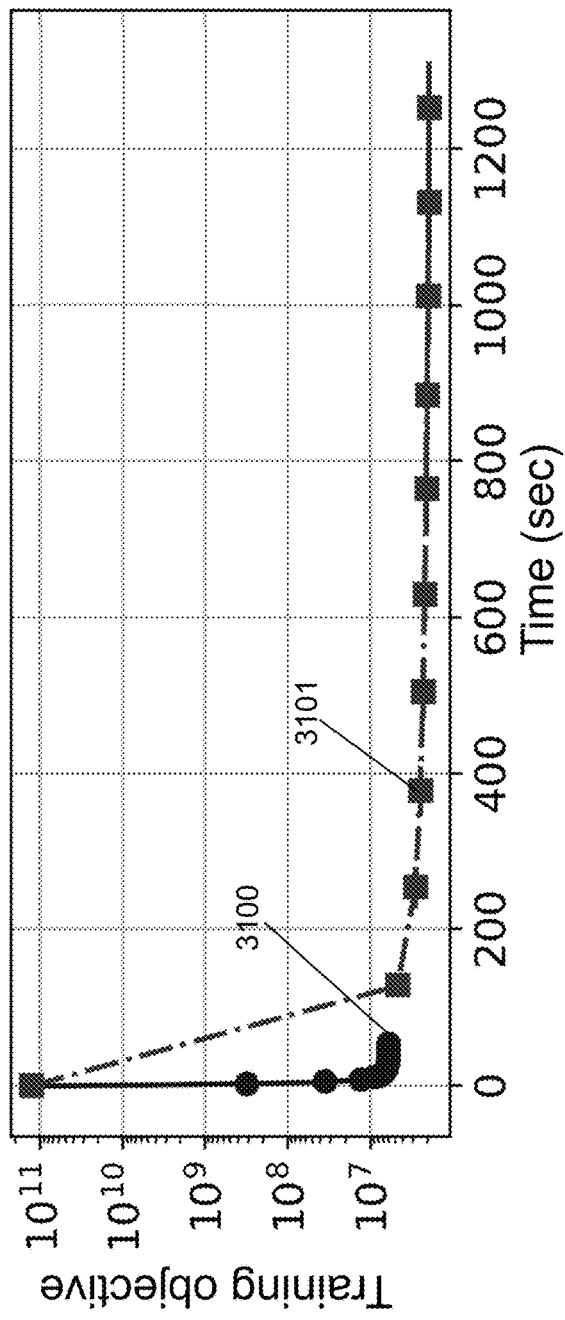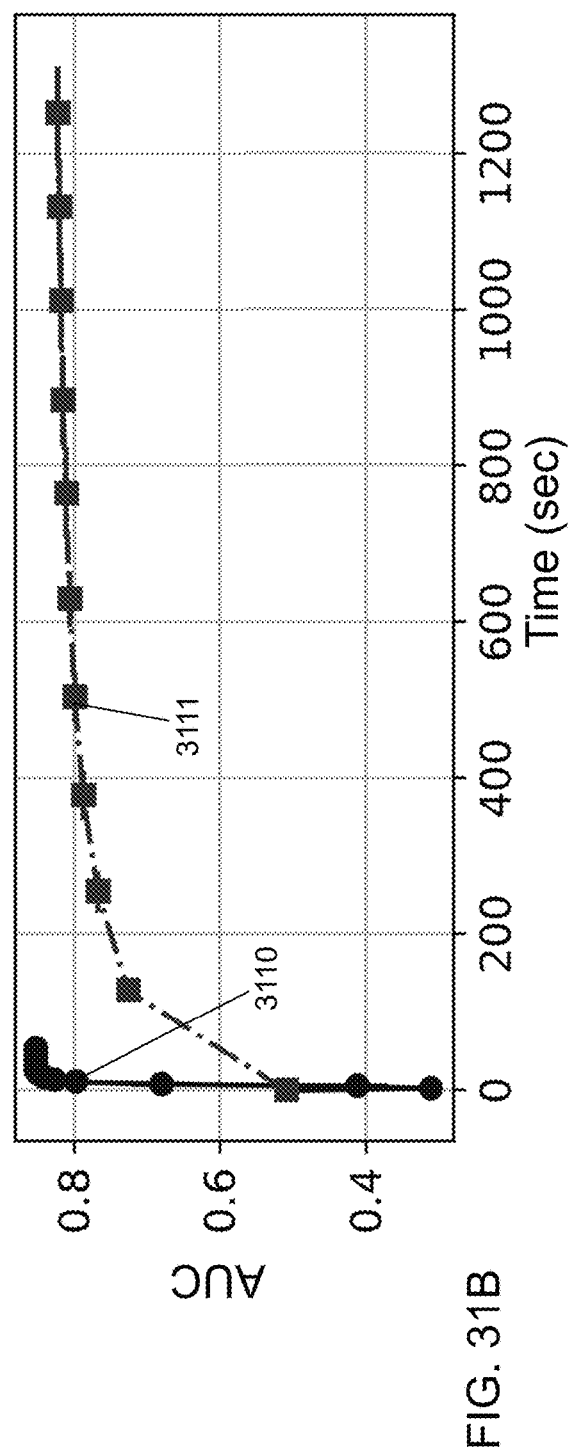
FIG. 31A
FIG. 31B

RECOMMENDATION SYSTEM WITH IMPLICIT FEEDBACK

CROSS-REFERENCE TO RELATED APPLICATIONS

The present application claims the benefit of and priority under 35 U.S.C. § 119(e) to U.S. Provisional Patent Application No. 63/280,019 filed on Nov. 16, 2021, the entire contents of which are hereby incorporated by reference. The present application is also a continuation-in-part of U.S. patent application Ser. No. 17/386,853 that was filed Jul. 28, 2021, the entire contents of which are hereby incorporated by reference. U.S. patent application Ser. No. 17/386,853 claims the benefit of and priority under 35 U.S.C. § 119(e) to U.S. Provisional Patent Application No. 63/121,751 filed on Dec. 4, 2020, and to U.S. Provisional Patent Application No. 63/108,640 filed on Nov. 2, 2020, the entire contents of which are hereby incorporated by reference.

BACKGROUND

As a popular approach to collaborative filtering, matrix factorization (MF) models an underlying response matrix as a product of two factor matrices, one for users and one for items. The MF model can be trained based on implicit feedback using an alternating weighted least squares (AWLS) method. The MF model updates the two factor matrices alternately, keeping one fixed while updating the other. An AWLS method is described by Yifan Hu, Yehuda Koren, and Chris Volinsky in their paper titled Collaborative Filtering for Implicit Feedback Datasets and published in the Proceedings from the IEEE International Conference on Data Mining (ICDM 08) by the IEEE CS Press on pages 263-272 in 2008 (the Hu paper). Although the AWLS method improves the learning objective aggressively in each iteration, the AWLS method suffers from high computational cost due to the necessity of inverting a separate matrix for each user and item.

SUMMARY

In an example embodiment, a non-transitory computer-readable medium is provided having stored thereon computer-readable instructions that, when executed by a computing device, cause the computing device to determine a recommendation. A confidence matrix is computed using a predefined weight value defined for each user of a plurality of users and each item of a plurality of items. (A) A first parameter matrix is updated using the computed confidence matrix, a predefined response matrix, a first step-size parameter value that is greater than one, and a first direction matrix. The first parameter matrix includes a row dimension equal to a number of users of the plurality of users. The predefined response matrix includes a predefined response value by each user of the plurality of users to each item of the plurality of items. The predefined response matrix includes at least one matrix value for which a user of the plurality of users has not provided a response to an item of the plurality of items. (B) A second parameter matrix is updated using the computed confidence matrix, the predefined response matrix, a second step-size parameter value that is greater than zero, and a second direction matrix. The second parameter matrix includes a column dimension equal to a number of items of the plurality of items. (C) An objective function value is updated based on the updated first parameter matrix and the updated second parameter matrix. (D) The first parameter matrix and the second parameter matrix are trained by repeating (A) through (C) until the updated first parameter matrix and the updated second parameter matrix satisfy a convergence test. The trained first parameter matrix and the trained second parameter matrix are output for use in predicting a recommended item of the plurality of items for a requesting user of the plurality of users.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to determine a recommendation.

In an example embodiment, a method of determining a recommendation is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 5A shows a training objective function value comparison with a dataset, $|F_2|=5$, and $\lambda=0.1$ in accordance with an illustrative embodiment.

FIG. 5B shows an AUC value comparison with the dataset, $|F_2|=5$, and $\lambda=0.1$ in accordance with an illustrative embodiment.

FIG. 7A shows a training objective function value comparison with a dataset, $|F_2|=5$, and $\lambda=10$ in accordance with an illustrative embodiment.

FIG. 7B shows an AUC value comparison with the dataset, $|F_2|=5$, and $\lambda=10$ in accordance with an illustrative embodiment.

FIG. 8A shows a training objective function value comparison with a dataset, $|F_2|=5$, and $\lambda=100$ in accordance with an illustrative embodiment.

FIG. 8B shows an AUC value comparison with the dataset, $|F_2|=5$, and $\lambda=100$ in accordance with an illustrative embodiment.

FIG. 15A shows a training objective function value comparison with a dataset, $|F_2|=20$, and $\lambda=0.1$ in accordance with an illustrative embodiment.

FIG. 15B shows an AUC value comparison with the dataset, $|F_2|=20$, and $\lambda=0.1$ in accordance with an illustrative embodiment.

FIG. 16A shows a training objective function value comparison with a dataset, $|F_2|=20$, and $\lambda=1$ in accordance with an illustrative embodiment.

FIG. 16B shows an AUC value comparison with the dataset, $|F_2|=20$, and $\lambda=1$ in accordance with an illustrative embodiment.

FIG. 22C shows a precision value comparison with the dataset, $|F_2|=30$, and $\lambda=10$ in accordance with an illustrative embodiment.

FIG. 22D shows a recall value comparison with the dataset, $|F_2|=30$, and $\lambda=10$ in accordance with an illustrative embodiment.

FIG. 31A shows a training objective function value comparison with a dataset, $|F_2|=100$, and $\lambda=1$ in accordance with an illustrative embodiment.

FIG. 31B shows an AUC value comparison with the dataset, $|F_2|=100$, and $\lambda=1$ in accordance with an illustrative embodiment.

FIG. 32D shows a recall value comparison with the dataset, $|F_2|=100$, and $\lambda=10$ in accordance with an illustrative embodiment.

FIG. 33A shows a training objective function value comparison with a dataset, $|F_2|=100$, and $\lambda=100$ in accordance with an illustrative embodiment.

FIG. 33B shows an AUC value comparison with the dataset, $|F_2|=100$, and $\lambda=100$ in accordance with an illustrative embodiment.

FIG. 33C shows a precision value comparison with the dataset, $|F_2|=100$, and $\lambda=100$ in accordance with an illustrative embodiment.

FIG. 33D shows a recall value comparison with the dataset, $|F_2|=100$, and $\lambda=100$ in accordance with an illustrative embodiment.

FIG. 34 depicts a block diagram of a recommendation system in accordance with an illustrative embodiment.

FIG. 35 depicts a block diagram of a user device of the recommendation system of FIG. 34 in accordance with an illustrative embodiment.

FIG. 36 depicts a flow diagram of examples of operations performed by a selection application of the user device of FIG. 35 in accordance with an illustrative embodiment.

FIG. 37 shows a relative performance between using the recommendation application of FIG. 2 referred to as DTOS and an existing recommendation application referred to as AWLS.

DETAILED DESCRIPTION

Figure 1:
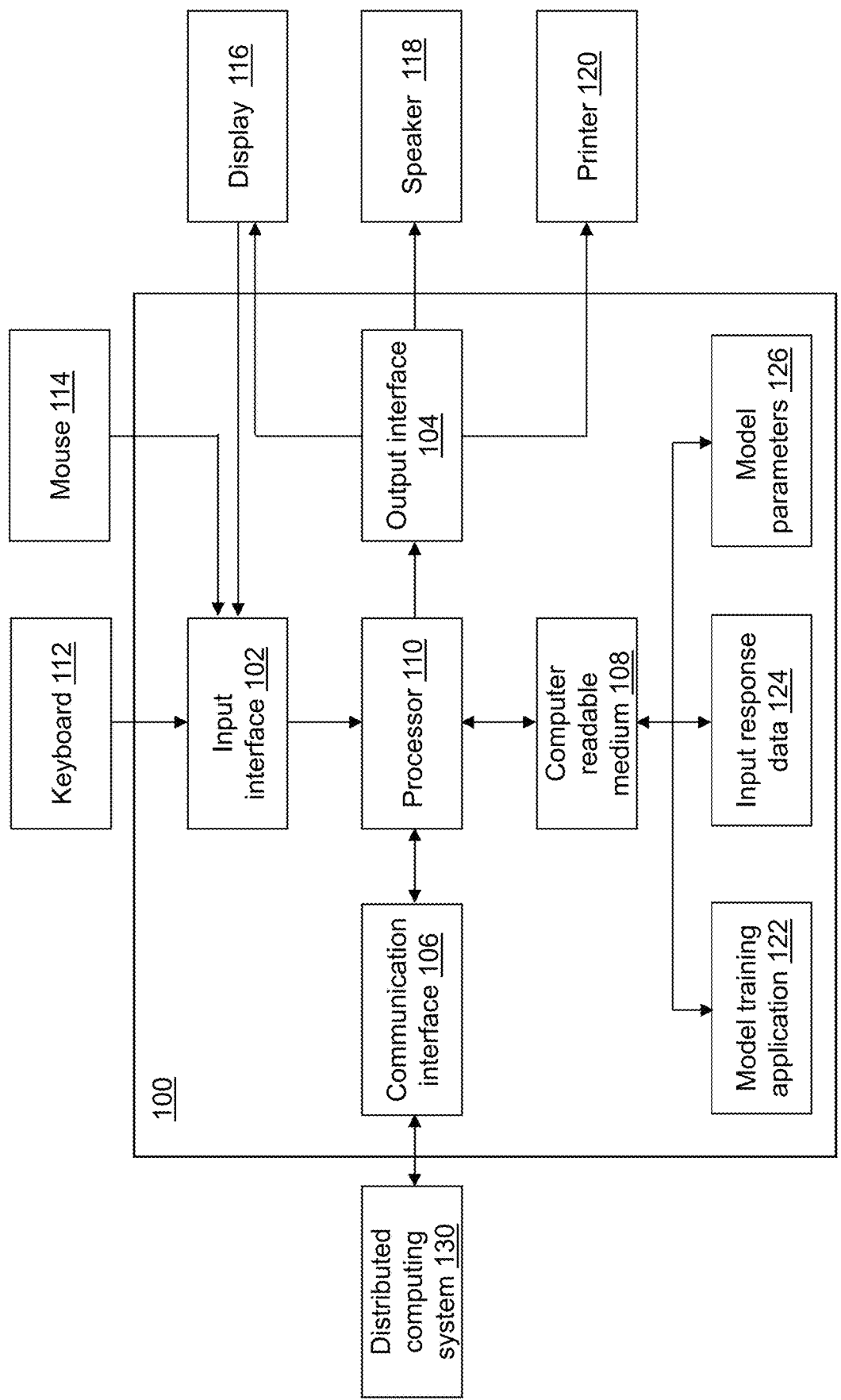
FIG. 1 depicts a block diagram of a recommendation device in accordance with an illustrative embodiment.

Recommendation systems are a technology used ubiquitously in web services including online retailers, video streaming providers, and music streaming providers. From the perspective of users, a recommendation system provides a personalized recommendation by helping users find items of interest such as consumer content such as movies, music, books, etc., consumer products, friends, jobs, etc. From the perspective of items, a recommendation system provides a targeted item by identifying potential users that would be interested in the particular item. The information about users, about items, and about the user's response or feedback to items constitute the data used to achieve the goal of recommendation systems.

The information about users, items, and the users' response to items (aka feedback) constitute the data that are used to achieve the goal of recommendation systems. Among the three types of data, the responses carry essential information about the users' preferences for items. Predicting and ranking a user's preferences on new or future items forms the very basis of making recommendations to the user. The user responses can be provided in various ways, which generally fall into two categories: explicit responses and implicit responses. An explicit response is usually a numeral response on a 1 to 5 scale or a binary feedback such as like/dislike. An implicit response, on the other hand, is the execution of a certain action, such as "purchasing a product" on an online retailer, "watching a movie" on a video streaming service, or "listening to a song" on a music streaming service.

An implicit response, like a binary explicit response, can be represented by a binary variable. Despite their common binary nature, however, the two types of responses have a fundamental distinction: a user could rate an item as "like" or "dislike"; in contrast, a user can buy (or watch, listen to, etc.) a product (or movie, song, etc.), but will generally provide no response when such an action is not executed. In other words, an explicit binary response has both positive and negative samples, but an implicit response generally has only positive samples.

Recommendation systems employing users' responses alone, without requiring the information of users or items, are based on a technique known as collaborative filtering. For m users and n items, the responses can be arranged into an m×n matrix R with $R_{ui}$ representing the response of a user u to an item i. Typically, each user responds to only a fraction of the items and each item receives responses from only a fraction of the users making R an incomplete matrix with only a fraction of entries observed and typically many missing matrix values. In this matrix formulation, the goal of recommendation systems, specifically collaborative filtering, becomes predicting the missing entries of R to locate the interesting items or, conversely, the potential users. A missing matrix value indicates that no response has been received from a respective user relative to a respective item. The formulation has particularly motivated a solution to collaborative filtering based on matrix completion, for both real-valued matrices and binary matrices, where in either case theoretical results have been established for successful matrix reconstruction under certain conditions.

A fundamental assumption for matrix completion is that the matrix in question is of low rank. A difficult method to fulfill the assumption is matrix factorization (MF), which models the user-item responses as a product of two factor matrices, R=XY, where rows of X and columns of Y embed users and items, respectively, into a Euclidean space. R is a response matrix. $R_{ui}$ indicates an entry of the respective matrix with row index u and column index i. X and Y are factor matrices of size m×k and k×n, respectively, with k<<min (m, n) enforcing the low-rank condition.

With matrix factorization, user u is represented by the row vector $X_{u:}$, item i is represented by the column vector $Y_{:i}$, and the response of u to i is explicitly or implicitly represented by the inner product $X_{u:}Y_{:i}$, where ":" indicates a universal set. $X_{u:}$ indicates a $u^{th}$ row of the respective matrix, and $Y_{:i}$ indicates an $i^{th}$ column of the respective matrix. The rows of X can be considered a feature representation of the users and the columns of Y as a feature representation of the items. As they are not observed, but rather are inferred from observed user's responses, these vectors are commonly referred to as latent features or factors. Moreover, the latent features of all users and all items may be inferred simultaneously, making it possible to incorporate the benefit of multitask learning (MTL). By the principle of MTL, the feature vector of each user is not only influenced by its own response history, but also by the response histories of other users, with the extent of influence dictated by a similarity between the users. For this reason, a user may discover new interesting items from the response histories of their peers who share similar interests, with the similarity identified from all users' response histories using learning algorithms. The MF model can be trained on implicit feedback using the AWLS method though ALWS suffers from a high computation cost as discussed previously.

A recommendation application 122 overcomes the drawbacks of AWLS. Recommendation application 122 considers that factor matrices may include fixed columns or rows allowing bias terms and/or linear models to be incorporated into the machine learning model. Some columns of X and/or some rows of Y are predefined and fixed. In addition to offering the convenience of updating bias terms along with the latent factors, the model can be used to incorporate engineered features (as opposed to inferred features) of users or items into collaborative filtering.

Recommendation application 122 converts weights of the squared errors into translations of the target variables, which allows construction of an auxiliary problem whose solution requires a single matrix inversion for all users or items. The solution of the auxiliary problem is used to construct a set of solutions for the original problem, with the solutions parameterized by a step size that is optimized. By optimizing the step-size, recommendation application 122 obtains a solution that is guaranteed to yield an improvement of the learning objective in any given iteration, at a computational cost lower than that of AWLS. With the optimal step size, one iteration of the original problem is solved with only two matrix inversions for all users and items. The per iteration computational cost of recommendation application 122 has a lower-order dependency on k than that of AWLS. Experimental results are described herein to demonstrate the benefits of recommendation application 122 over AWLS in terms of generalization performance and computation time. Recommendation application 122 can be used to train and use recommender models, including collaborative filtering, content-based filtering, content-based collaborative filtering, etc.

Referring to FIG. 1, a block diagram of recommendation device 100 is shown in accordance with an illustrative embodiment. Recommendation device 100 may include an input interface 102, an output interface 104, a communication interface 106, a non-transitory computer-readable medium 108, a processor 110, recommendation application 122, input response data 124, and model parameters 126. Fewer, different, and/or additional components may be incorporated into recommendation device 100.

Input interface 102 provides an interface for receiving information from the user or another device for entry into recommendation device 100 as understood by those skilled in the art. Input interface 102 may interface with various input technologies including, but not limited to, a keyboard 112, a mouse 114, a display 116, a track ball, a keypad, one or more buttons, etc. to allow the user to enter information into recommendation device 100 or to make selections presented in a user interface displayed on display 116.

The same interface may support both input interface 102 and output interface 104. For example, display 116 comprising a touch screen provides a mechanism for user input and for presentation of output to the user. Recommendation device 100 may have one or more input interfaces that use the same or a different input interface technology. The input interface technology further may be accessible by recommendation device 100 through communication interface 106.

Output interface 104 provides an interface for outputting information for review by a user of recommendation device 100 and/or for use by another application or device. For example, output interface 104 may interface with various output technologies including, but not limited to, display 116, a speaker 118, a printer 120, etc. Recommendation device 100 may have one or more output interfaces that use the same or a different output interface technology. The output interface technology further may be accessible by recommendation device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Recommendation device 100 may have one or more communication interfaces that use the same or a different communication interface technology. For example, recommendation device 100 may support communication using an Ethernet port, a Bluetooth antenna, a telephone jack, a USB port, etc. Data and/or messages may be transferred between recommendation device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Recommendation device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Recommendation device 100 also may have one or more drives that support the loading of a memory media such as a CD, DVD, an external hard drive, etc. One or more external hard drives further may be connected to recommendation device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Recommendation device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Recommendation application 122 performs operations associated with defining model parameters 126 from data stored in input response data 124. Model parameters 126 may be used to provide a recommendation to one or more users regarding one or more items or to provide a recommendation to an entity such as a business offering the one or more items regarding one or more users. Some or all of the operations described herein may be embodied in recommendation application 122. The operations may be implemented using hardware, firmware, software, or any combination of these methods.

Referring to the example embodiment of FIG. 1, recommendation application 122 is implemented in software (comprised of computer-readable and/or computer-executable instructions) stored in computer-readable medium 108 and accessible by processor 110 for execution of the instructions that embody the operations of recommendation application 122. Recommendation application 122 may be written using one or more programming languages, assembly languages, scripting languages, etc. Recommendation application 122 may be integrated with other analytic tools. As an example, recommendation application 122 may be part of an integrated data analytics software application and/or software architecture such as that offered by SAS Institute Inc. of Cary, N.C., USA. Merely for illustration, recommendation application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, and SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Recommendation application 122 may be implemented as a Web application. For example, recommendation application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input response data 124 may include response data captured for a plurality of users and a plurality of items as a function of time. For example, the response data may be a response provided by a user with regard to an item of the plurality of items. The data stored in input response data 124 may be captured at different time points periodically, intermittently, when a response is generated, etc. One or more columns of input response data 124 may include a time and/or date value.

The data stored in input response data 124 may be received directly or indirectly from a user device such as user device 3500 (shown referring to FIG. 29) and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input response data 124 may be generated as part of the Internet of Things (IoT), where things (e.g., machines, devices, phones, sensors) can be connected to networks and the data from these things collected and processed within the things and/or external to the things before being stored in input response data 124.

Input response data 124 may be stored on computer-readable medium 108 or on one or more computer-readable media of distributed computing system 130 and accessed by recommendation device 100 using communication interface 106, input interface 102, and/or output interface 104. Input response data 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input response data 124 may be stored using various data structures as known to those skilled in the art including one or more files of a file system, a relational database, one or more tables of a system of tables, a structured query language database, etc. on recommendation device 100 or on distributed computing system 130. Recommendation device 100 may coordinate access to input response data 124 that is distributed across distributed computing system 130 that may include one or more computing devices. For example, input response data 124 may be stored in a cube distributed across a grid of computers as understood by a person of skill in the art. As another example, input response data 124 may be stored in a multi-node Hadoop® cluster. For instance, Apache™ Hadoop® is an open-source software framework for distributed computing supported by the Apache Software Foundation. As another example, input response data 124 may be stored in a cloud of computers and accessed using cloud computing technologies, as understood by a person of skill in the art. The SAS® LASR™ Analytic Server may be used as an analytic platform to enable multiple users to concurrently access data stored in input response data 124. The SAS Viya open, cloud-ready, in-memory architecture also may be used as an analytic platform to enable multiple users to concurrently access data stored in input response data 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2:
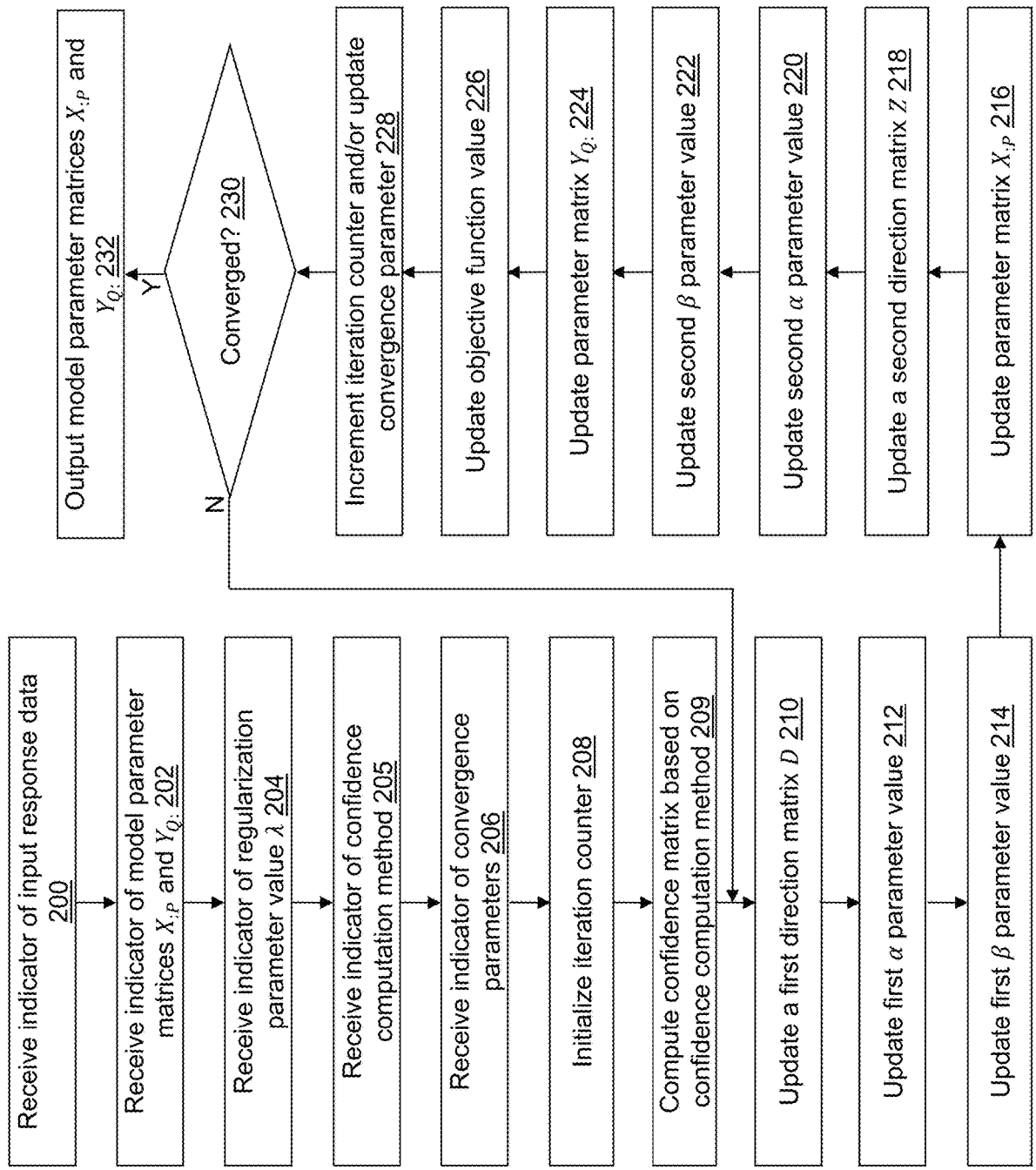
FIG. 2 depicts a flow diagram of examples of operations performed by a recommendation application of the recommendation device of FIG. 1 in accordance with an illustrative embodiment.

Referring to FIG. 2, example operations associated with recommendation application 122 are described. Additional, fewer, or different operations may be performed depending on the embodiment of recommendation application 122. The order of presentation of the operations of FIG. 2 is not intended to be limiting. Some of the operations may not be performed in some embodiments. Although some of the operational flows are presented in sequence, the various operations may be performed in various repetitions and/or in other orders than those that are illustrated. For example, a user may execute recommendation application 122, which causes presentation of a first user interface window, which may include a plurality of menus and selectors such as drop-down menus, buttons, text boxes, hyperlinks, etc. associated with recommendation application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by recommendation application 122. The operations of recommendation application 122 further may be performed in parallel using a plurality of threads and/or a plurality of worker computing devices.

In an operation 200, a first indicator may be received that indicates input response data 124. For example, the first indicator indicates a location and a name of input response data 124. As an example, the first indicator may be received by recommendation application 122 after selection from a user interface window or after entry by a user into a user interface window. In an alternative embodiment, input response data 124 may not be selectable. For example, a most recently created dataset may be used automatically. Input response data 124 is read to define R that is an m×n matrix with $R_{ui}$ representing a response between a user u and an item i, where m is a number of the plurality of users, and n is a number of the plurality of items.

In an operation 202, a second indicator may be received that indicates initial parameter matrices $X_{:P}$ and $Y_{Q:}$. As an example, the second indicator may be received by recommendation application 122 after selection from a user interface window or after entry by a user into a user interface window. In an alternative embodiment, the second indicator may not be received. For example, a default value may be stored, for example, in computer-readable medium 108 and used automatically. In another alternative embodiment, the parameter matrices $X_{:P}$ and $Y_{Q:}$ may not be selectable. Instead, fixed, predefined matrices may be used.

Figure 3:
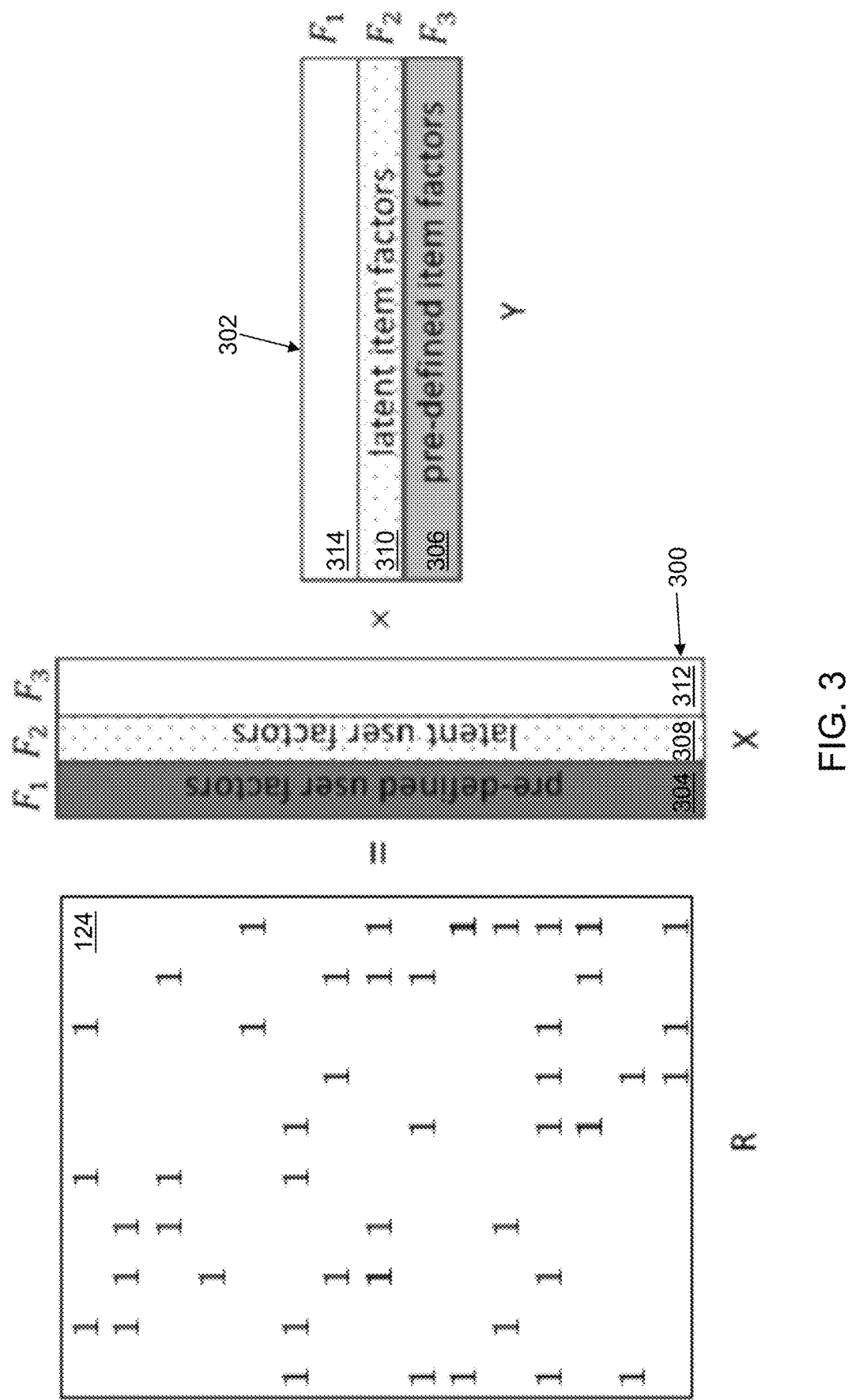
FIG. 3 depicts a sub-model structure for determining recommendations based on content-based and/or collaborative filtering in accordance with an illustrative embodiment.

Referring to FIG. 3, a general form of MF may be defined using R=XY, where R indicates input response data 124, X indicates a user matrix 300, and Y indicates an items matrix 302. A "*" included in the graphic of input response data 124 indicates an observed response entry where the remaining entries are missing. User matrix 300 can be defined as $X=[X_{:F_1}, X_{:F_2}, X_{:F_3}]$, and items matrix 302 can be defined as $Y=[Y_{F_1:}, Y_{F_2:}, Y_{F_3:}]$, where $F_1$, $F_2$ and $F_3$ form a partition $F_1 \cup F_2 \cup F_3 = \{1, 2, \ldots, |F_1|+|F_2|+|F_3|\}$ meaning $F_1$, $F_2$ and $F_3$ are mutually exclusive, where $|F_1|$ indicates a cardinality of a respective set such as $F_1$. $X_{:F_1}, X_{:F_2}, X_{:F_3}$ are submatrices of X obtained by extracting the rows indexed by the elements of $F_1$, $F_2$ and $F_3$, respectively, and $Y_{F_1:}, Y_{F_2:}, Y_{F_3:}$ are submatrices of Y obtained by extracting the rows indexed by the elements of $F_1$, $F_2$ and $F_3$, where $F_1$, $F_2$ and $F_3$ are sets of integers. The partition results in a three-term representation of R defined using $$R = X_{:F_1}Y_{F_1:} + X_{:F_2}Y_{F_2:} + X_{:F_3}Y_{F_3:}.$$

Without loss of generality, it is assumed that $k_1 < k_2 < k_3$ for any $k_1 \in F_1$, $k_2 \in F_2$, and $k_3 \in F_3$. This can be satisfied by shuffling the columns of X and the rows of Y appropriately. Each term is a sub-model. The first term $X_{:F_1}Y_{F_1:}$ is a linear regression model, with $X_{:F_1}$ the predefined user factors 304, and $Y_{F_1:}$ the associated item regression parameters 314 for the predefined user factors 304. The second term $X_{:F_2}Y_{F_2:}$ is a standard MF model, with $X_{:F_2}$ the latent user factors 308 of the users and $Y_{F_2:}$ the latent item factors 310 of the items. The third term $X_{:F_3}Y_{F_3:}$ is a linear regression model, with $Y_{F_3:}$ the predefined item factors 306 and $X_{:F_3}$ the associated user regression parameters 312 for the predefined item factors 306.

$X_{:F_1}$ and/or $Y_{F_3:}$ are predefined and fixed resulting in a model with partially defined factors. Bias terms and/or linear models may be incorporated into the MF model and their definition adjusted during training. $R = XY = X_{:F_1}Y_{F_1:} +$ $X_{:F_2}Y_{F_2:}+X_{:F_3}Y_{F_3:}$ can be learned in the same way MF is learned, except for additional notations used to designate adjustable factors versus nonadjustable factors $X_{:F_1}$ and $Y_{F_3:}$. Use of $R=XY=X_{:F_1}Y_{F_1:}+X_{:F_2}Y_{F_2:}+X_{:F_3}Y_{F_3:}$, referred to as MF-PDF, has the practical advantage of updating bias terms along with the latent factors and can be used to incorporate engineered features (as opposed to inferred features) of users or items into collaborative filtering.

When $|F_1|=F_31=0$, the model is a standard MF model. In an illustrative embodiment, $|F_1|=F_31=1$ with $X_{:F_1}$ a column vector of all one's and $Y_{F_3:}$ a row vector of all ones. In this special case, the regression parameters $X_{:F_3}$ become the biases of the users and $Y_{F_1:}$ the biases of the items. In alternative embodiments, $X_{:F_1}$ and $Y_{F_3:}$ can be used to hold engineered features of users and items, respectively.

Although MF-PDF retains the basic structure of MF, MF-PDF has an important difference from the standard MF model: the two matrices X and Y are only partially adjustable and the adjustable part of X is not perfectly aligned with that of Y. More specifically, $X_{:P}$ can be defined as the adjustable part of X while $Y_{Q:}$ can be defined as the adjustable part of Y, where $P=F_2 \cup F_3$ and $Q=F_1 \cup F_2$. $P \neq Q$ unless $|F_1|=|F_3|=0$. Assuming, $|F_1|$ or $|F_3|\neq 0$, $X_{:P}$ and $Y_{Q:}$ constitute the parameters of MF-PDF that are to be estimated. $F_1$ and $F_3$ store the indices for a linear model on user or item features. $F_2$ stores indices for latent factors in X and Y.

Like $F_1$, $F_2$ and $F_3$, P and Q are sets of integers. For notation, $R_{u:}$ indicates a $u^{th}$ row of R, $R_{:i}$ indicates an $i^{th}$ column of R, $X_{:F_1}$ is a sub-matrix of X obtained by extracting the columns indexed by the elements of $F_1$, $Y_{F_2:}$ is a sub-matrix of Y obtained by extracting the rows indexed by the elements of $F_2$, $X_{uP}$ indicates a $u^{th}$ row of $X_{:P}$, and $Y_{Pi}$ indicates an $i^{th}$ column of $Y_{P:}$.

An implicit response $R_{ui}$ can either be labeled as "1" or unlabeled. The label "0" is generally not observable as user u is typically silent when not issuing a positive signal. Therefore, collaborative filtering with implicit feedback is a PU-learning problem (learning with positive and unlabeled samples). To process unlabeled samples, the unlabeled samples can be treated as negative, but deemphasized using an appropriate weighting strategy as described in the Hu paper. Specifically, for any (u, i), $R_{ui} \in \{0,1\}$ is treated as a binary variable, with $R_{ui}=1$ indicating that user u has issued a positive response to item i, and $R_{ui}=0$ indicating that the user u has not responded to the item i and may not be interested in the item i.

Each sample is assigned a weight $W_{ui}=1+\gamma C_{ui}$, where $\gamma>0$ is a normalizing constant and $C_{ui}$ measures the confidence about, or the importance of, $R_{ui}$, with $C_{ui}=0$ when $R_{ui}=0$, and $C_{ui}>0$ for $R_{ui}=1$. Because $\gamma$ can be absorbed into $C_{ui}$, $\gamma=1$ for simplicity. To construct the weights $W_{ui}$, the negative samples are uniformly deemphasized to reflect the fact that silent responses only indicate potential negativity rather than definite negativity. On the other hand, a positive sample $R_{ui}$ can also be associated with a small confidence if its positivity is uncertain. For example, user u may have purchased item i as a gift meaning the positivity of $R_{ui}$ may need to be discounted.

As described in the Hu paper, the PU-learning objective, as applied to the MF-PDF model is given by $g(X_{:P}, Y_{Q:}) = \Sigma_{u,i} W_{ui}(R_{ui} - X_{u:} Y_{:i})^2 + \lambda(\|X_{:P}\|^2 + \|Y_{Q:}\|^2)$, where $\|X_{:P}\|$ indicates a Frobenius norm of a respective matrix such as $X_{:P}$, and $\lambda$ indicates a regularization parameter that controls a trade-off between the weighted-error term, $W_{ui}(R_{ui} - X_{u:} Y_{:i})^2$, and the $L_2$ regularization terms, $\|X_{:P}\|^2 + \|Y_{Q:}\|^2$.

Referring again to FIG. 2, in an operation 204, a third indicator of a regularization parameter value $\lambda$ may be received. As an example, the third indicator may be received by recommendation application 122 after selection from a user interface window or after entry by a user into a user interface window. In an alternative embodiment, the third indicator may not be received. For example, a default value may be stored, for example, in computer-readable medium 108 and used automatically. In another alternative embodiment, the value of the regularization parameter value $\lambda$ may not be selectable. Instead, a fixed, predefined value may be used. For illustration, a default value of the regularization parameter value $\lambda$ may be $\lambda=0.01$ though other values may be used subject to $0<\lambda<\infty$.

In an operation 205, a fourth indicator of a confidence computation method may be received. As an example, a confidence computation method may be selected from "Popularity", "Time", "Quantity", etc. In an alternative embodiment, the fourth indicator may not be received. For example, a default confidence computation method may be used automatically and/or may not be selectable. Instead, a predefined confidence computation method may be used. For illustration, a default confidence computation method may be "Popularity" if one is not indicated using the fourth indicator. Of course, the confidence computation method may be labeled or selected in a variety of different manners by the user as understood by a person of skill in the art. For illustration, using the "Popularity" method, the weights are computed based on user popularity and item popularity, i.e., $W_{ui}=1+\xi_u+\zeta_i$, where $\xi_u=|\{i: R_{ui}=1, (u, i) \in \text{training dataset}\}|$ or a number of items with $R_{ui}=1$, and $\zeta_i=|\{u: R_{ui}=1, (u, i) \in \text{training dataset}\}|$ or a number of users with $R_{ui}=1$. For illustration, using the "Time" method, the weights are computed based on an amount of time that user u spent watching or listening to an item i, i.e., $W_{ui}=\rho C_{ui}$, where $\rho$ is a normalizing constant with $\rho>0$, and $C_{ui}$ is the amount of time that user u spent watching or listening to item i, $C_{ui} \geq 0$. For illustration, using the "Quantity" method, the weights are computed based on a number of times that user u purchased an item i in a single transaction or during a predefined period of time, i.e., $W_{ui}=1+C_{ui}$, where $C_{ui}$ is the number of times that user u purchased an item i in a single transaction or during a predefined period of time.

In an operation 206, a fifth indicator of one or more convergence parameter values may be received. For illustration, the one or more convergence parameter values may include one or more of a maximum number of iterations $T_x$, a first convergence threshold value $c_{T1}$, and a second convergence threshold value $c_{T2}$. The first convergence threshold value $c_{T1}$ may indicate a threshold value for an objective function, and second convergence threshold value $c_{T2}$ may indicate a threshold value for a change in a value of the objective function. In an alternative embodiment, the fourth indicator may not be received. For example, default value(s) may be stored, for example, in computer-readable medium 108 and used automatically. In another alternative embodiment, the value(s) of the maximum number of iterations $T_x$, the first convergence threshold value $c_{T1}$, and/or the second convergence threshold value $c_{T2}$ may not be selectable. Instead, a fixed, predefined value(s) may be used. For illustration, a default value for the maximum number of iterations $T_x$ may be $T_x=100$ though other values may be used. For illustration, a default value for the first convergence threshold value $c_{T1}$ may be $c_{T1}=0.1$ though other values may be used. For illustration, a default value for the second convergence threshold value $c_{T2}$ may be $c_{T2}=0.01$ though other values may be used.

In an operation 208, an iteration counter t is initialized, for example, using t=0, when the maximum number of iterations $T_x$ is used as part of a convergence test.

In an operation 209, a confidence matrix $\Delta_{ui}$ and a confidence squared matrix $\Delta_{ui}^2$ are computed, for example, using $\Delta_{ui}=\sqrt{W_{ui}}-1$, and $\Delta_{ui}^2$, respectively, where $W_{ui}$ is computed using the confidence computation method indicated in operation 205. Based on this, the objective function is modified as $g(X_{:P}, Y_{Q:})=\Sigma_{u,i}[(\Delta_{ui}+1)(R_{ui}-X_{u:}Y_{:i})]^2+\lambda(\|X_{:P}\|^2+\|Y_{Q:}\|^2)$ to convert the weights on squared errors into translations of the target variables. The objective function is minimized by updating $X_{:P}$ with $Y_{Q:}$ and then updating $Y_{Q:}$ with $X_{:P}$ fixed.

In an operation 210, a first direction matrix D is updated using $D=([\Delta_{ui}\circ(R-XY)+R]Y_{P:}^T-XYY_{:P}^T-\lambda X_{:P})(\lambda I+Y_{P:}Y_{P:}^T)^{-1}$, where $\circ$ indicates a Hadamard or element-wise product of two matrices, $X=[X_{:\bar{P}}, X_{:P}]$, $Y=[Y_{Q:}, Y_{\bar{Q}:}]$, $\bar{P}$ indicates a complement of the respective matrix such as P, I is an identity matrix having dimension ($|F_2|+|F_3|$) by ($|F_2|+|F_3|$), T indicates a transpose, and the first direction matrix D has dimension m by ($|F_2|+|F_3|$). $X_{:\bar{P}}$ holds the predefined user factors such as a column of m ones, and $Y_{\bar{Q}:}$ holds the predefined item factors such as a row of n ones.

In an operation 212, a first $\alpha$ parameter value $\alpha_1$ is updated using $\alpha_0=\|DY_{P:}\|^2+\lambda\|D\|^2$ and $\alpha_1=\alpha_0+\Sigma_{\Delta_{ui}\neq 0}(\Delta_{ui}D_{u:}Y_{Pi})(\Delta_{ui}+1)(R_{ui}-X_{u:}Y_{:i})$, where $\|DY_{P:}\|^2+\lambda\|D\|^2=tr(D^TDY_{P:}Y_{P:}^T)+\lambda tr(D^TD)$, and tr indicates a trace.

In an operation 214, a first $\beta$ parameter value $\beta_1$ is updated using $\beta_1=\alpha_0+\Sigma_{\Delta_{ui}\neq 0}(\Delta_{ui}^2+2\Delta_{ui})(D_{u:}Y_{Pi})^2$.

In an operation 216, the parameter matrix $X_{:P}$ is updated using $X_{:P}=X_{:P}+\eta_1 D$, where $\eta_1$ is a first step-size parameter value computed using $$\eta_1 = \frac{\alpha_1}{\beta_1} \geq 1.$$

In an operation 218, a second direction matrix Z is updated using $Z=(\lambda I+X_{:Q}^T X_{:Q})^{-1}[X_{:Q}^T[\Delta_{ui}\circ(R-XY)+R]-X_{:Q}^T XY-\lambda Y_{Q:}]$, where the second direction matrix Z has dimension ($|F_1|+|F_2|$) by n.

In an operation 220, a second $\alpha$ parameter value $\alpha$ is updated using $\alpha_0=\|X_{:Q}Z\|^2+\lambda\|Z\|^2$ and $\alpha_2=\alpha_0+\Sigma_{\Delta_{ui}\neq 0}(\Delta_{ui}X_{u:Q}Z_{:i})(\Delta_{ui}+1)(R_{ui}-X_{u:}Y_{:i})$, where $\|X_{:Q}Z\|^2+\lambda\|Z\|^2=tr(X_{:Q}^T X_{:Q}ZZ^T)+\lambda tr(ZZ^T)$.

In an operation 222, a second $\beta$ parameter value $\beta_2$ is updated using $\beta_2=\alpha_0+\Sigma_{\Delta_{ui}\neq 0}(\Delta_{ui}^2+2\Delta_{ui})(X_{u:Q}Z_{:i})^2$.

In an operation 224, the parameter matrix $Y_{Q:}$ is updated using $Y_{Q:}=Y_{Q:}+\eta_2 Z$, where $\eta_2$ is a second step-size parameter value computed using $$\eta_2 = \frac{\alpha_2}{\beta_2} \geq 1.$$

In an operation 226, an objective function value g is updated using $g=\|(\Delta_{ui}+J)\circ(R-XY)^2+\lambda(\|X_{:P}\|^2+\|Y_{Q:}\|^2)$, where J indicates an m×n matrix of all ones.

In an operation 228, the iteration counter t is incremented, for example, using t=t+1 when the maximum number of iterations $T_x$ is used as part of the convergence test. When the second convergence threshold value $c_{T2}$ is used as part of the convergence test, a second convergence parameter is computed using $c_2=g-g'$, where g' is the objective function value from a previous iteration of 226.

In an operation 230, a determination is made concerning whether the parameter matrices $X_{:P}$ and $Y_{Q:}$ have converged. When the parameter matrices $X_{:P}$ and $Y_{Q:}$ have converged, processing continues in an operation 232. When the parameter matrices $X_{:P}$ and $Y_{Q:}$ have not converged, processing continues in operation 210. For illustration, the parameter matrices $X_{:P}$ and $Y_{Q:}$ have converged when $t>T_x$, and/or when $g<c_{T1}$, and/or when $c_2<c_{T2}$ depending on which of the one or more convergence parameters is selected for use in operation 206.

In operation 232, the parameter matrices $X_{:P}$ and $Y_{Q:}$ are output. For example, the parameter matrices $X_{:P}$ and $Y_{Q:}$ may be output to model parameters 126. The predefined user factors 304, $X_{:F_1}$, the predefined item factors 306, $Y_{F_3:}$, the associated user regression parameters 312 for the predefined item factors 306, $X_{:F_3}$, and the associated item regression parameters 314 for the predefined user factors 304, $Y_{F_1:}$, further may be output. In addition, or in the alternative, a predicted response matrix $XY=X_{:F_1}Y_{F_1:}+X_{:P}Y_{P:}=X_{:F_3}Y_{F_3:}+X_{:Q}Y_{Q:}$ further may be output.

The MovieLens-1M dataset was used to perform a comparative study between recommendation application 122, also referred to herein as DTOS, and AWLS in terms of the speed of learning convergence and the generalization performance. Both algorithms were implemented in Python and executed on the same machine in all of the experiments. The second dataset included 1,000,209 responses of n=3706 movies from m=6040 users resulting in R being a 6040×3706 matrix. The experimental setup described in a paper by Wang et al., titled *RippleNet: Propagating User Preferences on the Knowledge Graph for Recommender Systems* published In Proceedings of the 27th ACM International Conference on Information and Knowledge Management pages 417-426 in 2018 (*RippleNet*) was used to make the results comparable.

The explicit responses in the original dataset were transformed into implicit responses using the following steps: (i) each explicit response (numerical response on the scale of 1 to 5) was converted into a positive response $R_{ui}=1$ if $R_{ui} \geq 4$; (ii) all remaining explicit responses were discarded; (iii) for each user, a subset of the negative responses equal in size to the positive ones was drawn from an unlabeled set and labelled as $R_{ui}=0$ to create an implicit feedback dataset with perfectly-balanced positive and negative samples per user. The implicit feedback dataset was randomly split into training, test and validation datasets, with the ratio 60%, 20%, and 20%, respectively.

The negative responses in the training dataset were not used by either algorithm because the PU-learning objective uses all of the unlabeled entries in R as negative responses, assigning them small weights to counteract their dominance in quantity over positive responses. However, the negative responses in the test and validation datasets were needed as certain performance metrics such as area under ROC curve (AUC) require true negatives.

In addition to AUC, precision and recall were computed as performance measures. For each user u, the precision and recall were computed by ranking the full list of items contained in the training dataset (regardless of users), only excluding the items that u had responded to.

The PU-learning objective has two major hyperparameters: $F_2$ and $\Lambda$ assuming that $|F_1|=|F_3|=1$. Because $|P|=|Q|=|F_2|+1$ in this case, $F_2$ heavily influences the computational time of DTOS and AWLS. Because DTOS and AWLS optimize the same objective function, a fair comparison of them requires the same hyperparameter values. For this reason, the hyperparameters were not tuned and the validation dataset was not used. Instead, $|F_2|=5, 10, 20, 30, 50$, and $100$ and $\lambda=0.01, 0.1, 1, 10$, and $100$ were each evaluated in combination.

In all of the experiments, the weights were computed based on user popularity and item popularity, i.e., $W_{ui}=1+\xi_u+\zeta_i$, where $\xi_u=|\{i: R_{ui}=1, (u, i) \in \text{training dataset}\}|$ and $\zeta_i=|\{u: R_{ui}=1, (u, i) \in \text{training dataset}\}|$. For each combination of $|F_2|$ and $\lambda$, five independent experiments using DTOS and ALWS were performed on the original MovieLens-1M dataset. In each experiment, the following steps were performed: (a) convert the original dataset into an implicit feedback dataset using the three steps (i), (ii), and (iii) above; (b) split the converted dataset into training, test, and validation datasets with the ratio 60%, 20%, and 20%, respectively; (c) run DTOS for 101 iterations and AWLS for 11 iterations on the training dataset, with the models in iterations 0 through 10 recorded for AWLS and the models in iterations {0, 5, 10, 15, 20, 25, 30, 40, 50, 70, 100} recorded for DTOS; (d) score each recorded model to obtain the AUC as a function of the respective training iteration; and (e) score the model from the last iteration to obtain the precision and recall for K={1, 2, 5, 10, 20, 50, 100}. The models at iteration zero were the initial models and were common for the two methods.

Figure 4A:
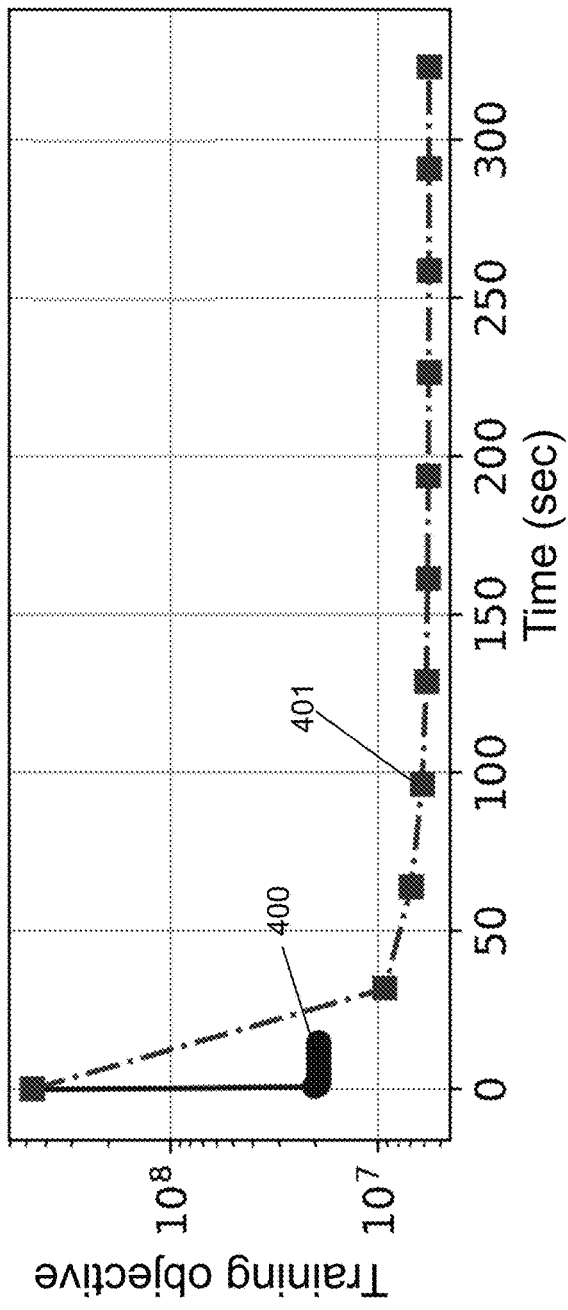
FIG. 4A shows a training objective function value comparison with a dataset, $|F_2|=5$, and $\lambda=0.01$ in accordance with an illustrative embodiment.
Figure 4B:
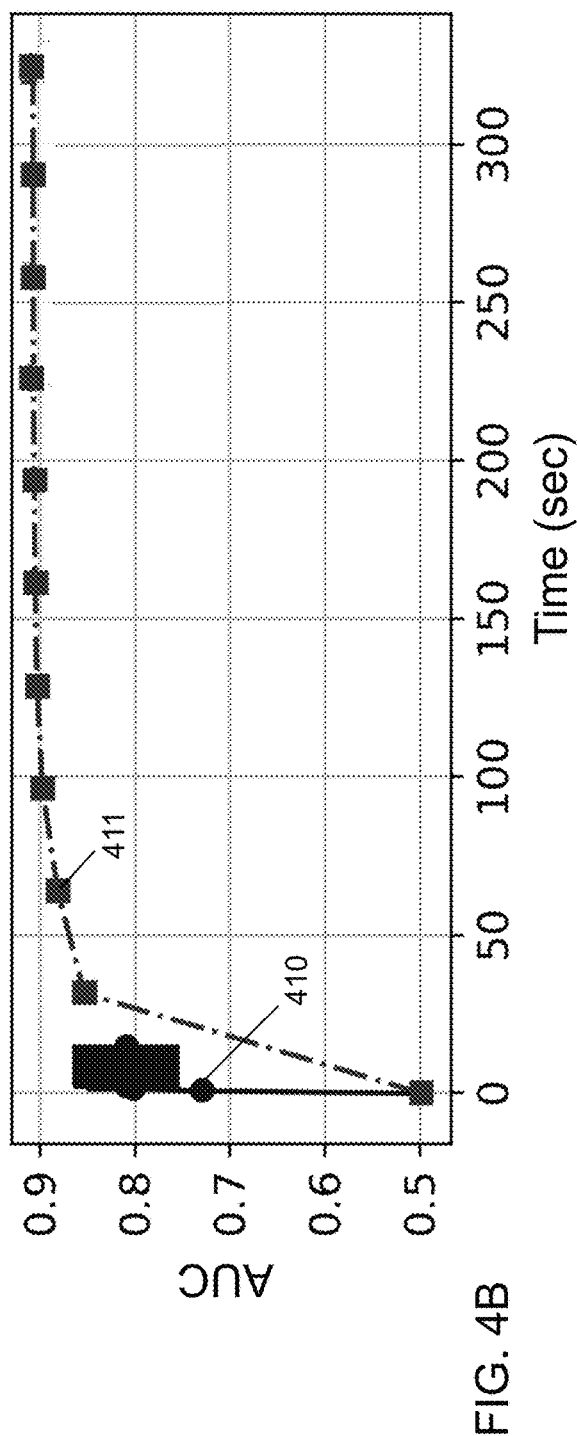
FIG. 4B shows an area under ROC curve (AUC) value comparison with the dataset, $|F_2|=5$, and $\lambda=0.01$ in accordance with an illustrative embodiment.

The results are summarized in FIGS. 4A through 33D, where each curve shows the mean values across the five runs. Referring to FIG. 4A, a comparison of a training objective function as a function of time is shown for $|F_2|=5$, and $\lambda=0.01$. A first curve 400 was generated using recommendation application 122, and a second curve 401 was generated using AWLS. Referring to FIG. 4B, an AUC value as a function of time is shown for $|F_2|=5$, and $\lambda=0.01$. A third curve 410 was generated using recommendation application 122, and a fourth curve 411 was generated using AWLS. In terms of computation time, 100 iterations of DTOS were complete before the first iteration of AWLS. In fact, for all of the combinations $|F_2|=5, 10, 20, 30, 50$, and $100$ and $\lambda=0.01, 0.1, 1, 10$, and $100$, 100 iterations of DTOS were complete before the first iteration of AWLS.

Figure 4C:
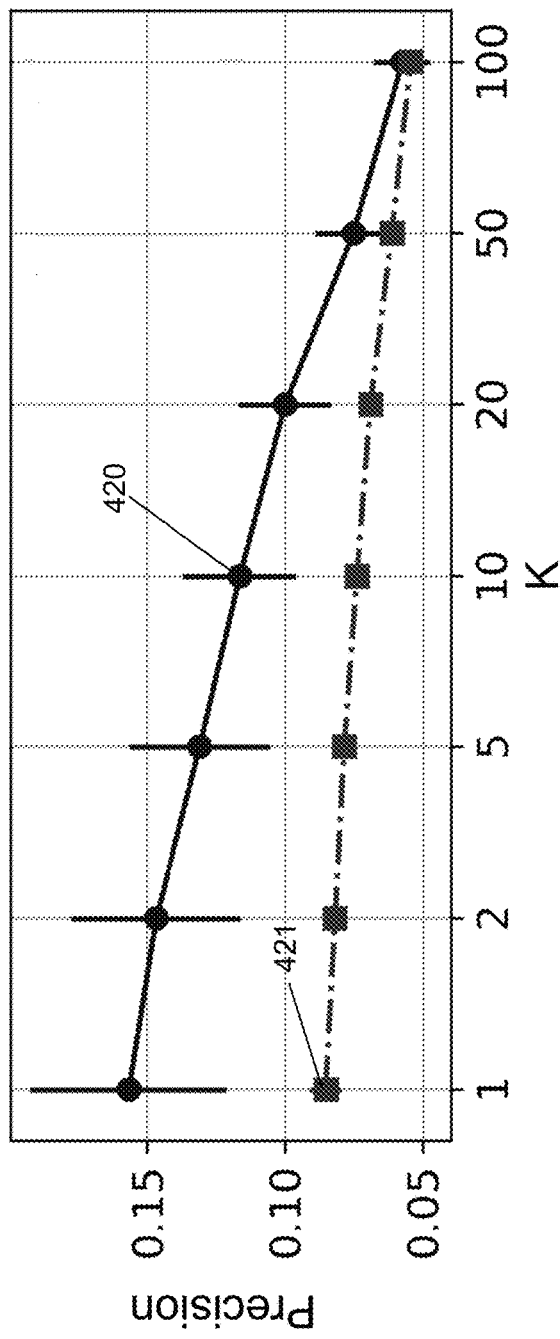
FIG. 4C shows a precision value comparison with the dataset, $|F_2|=5$, and $\lambda=0.01$ in accordance with an illustrative embodiment.
Figure 4D:
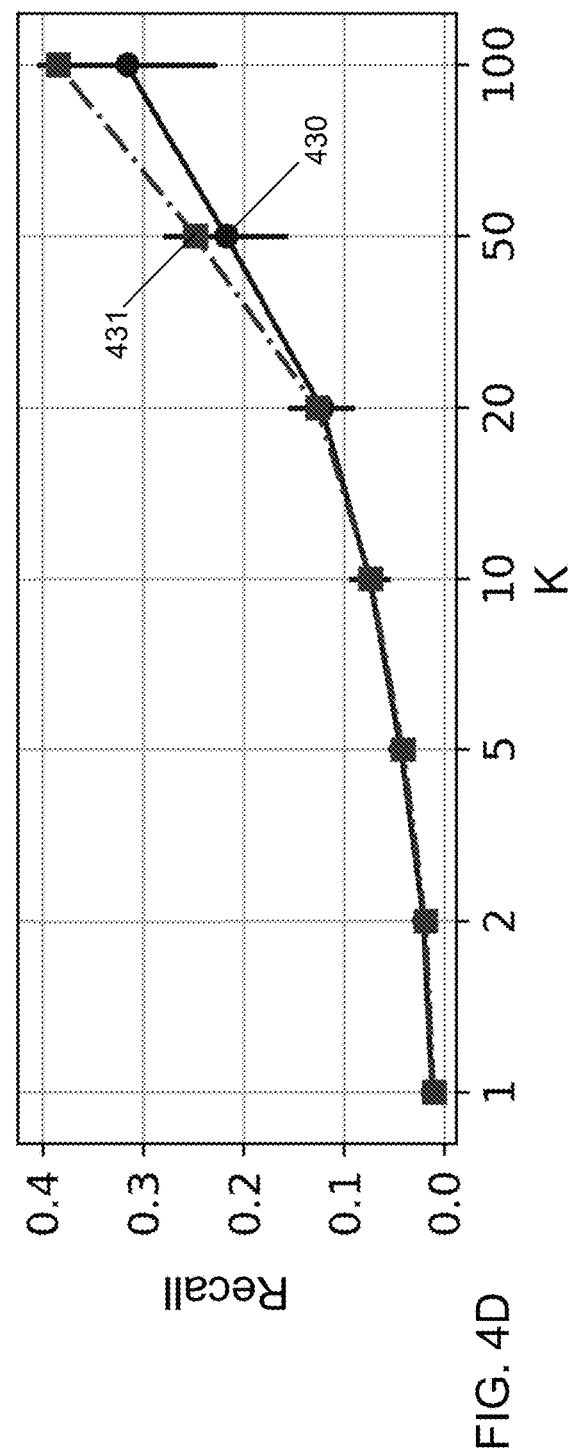
FIG. 4D shows a recall value comparison with the dataset, $|F_2|=5$, and $\lambda=0.01$ in accordance with an illustrative embodiment.

Referring to FIG. 4C, a precision value as a function of time is shown for $|F_2|=5$, and $\lambda=0.01$. A fifth curve 420 was generated using recommendation application 122, and a sixth curve 421 was generated using AWLS. Referring to FIG. 4D, a recall value as a function of time is shown for $|F_2|=5$, and $\lambda=0.01$. A seventh curve 430 was generated using recommendation application 122, and an eighth curve 431 was generated using AWLS.

Figure 5C:
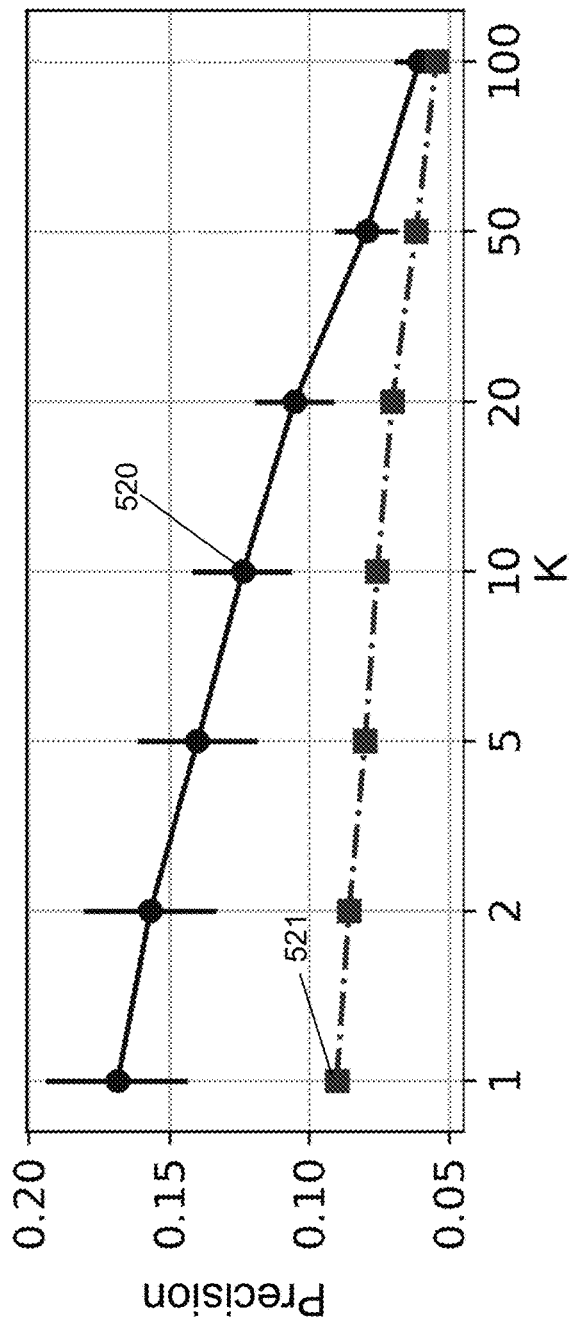
FIG. 5C shows a precision value comparison with the dataset, $|F_2|=5$, and $\lambda=0.1$ in accordance with an illustrative embodiment.
Figure 5D:
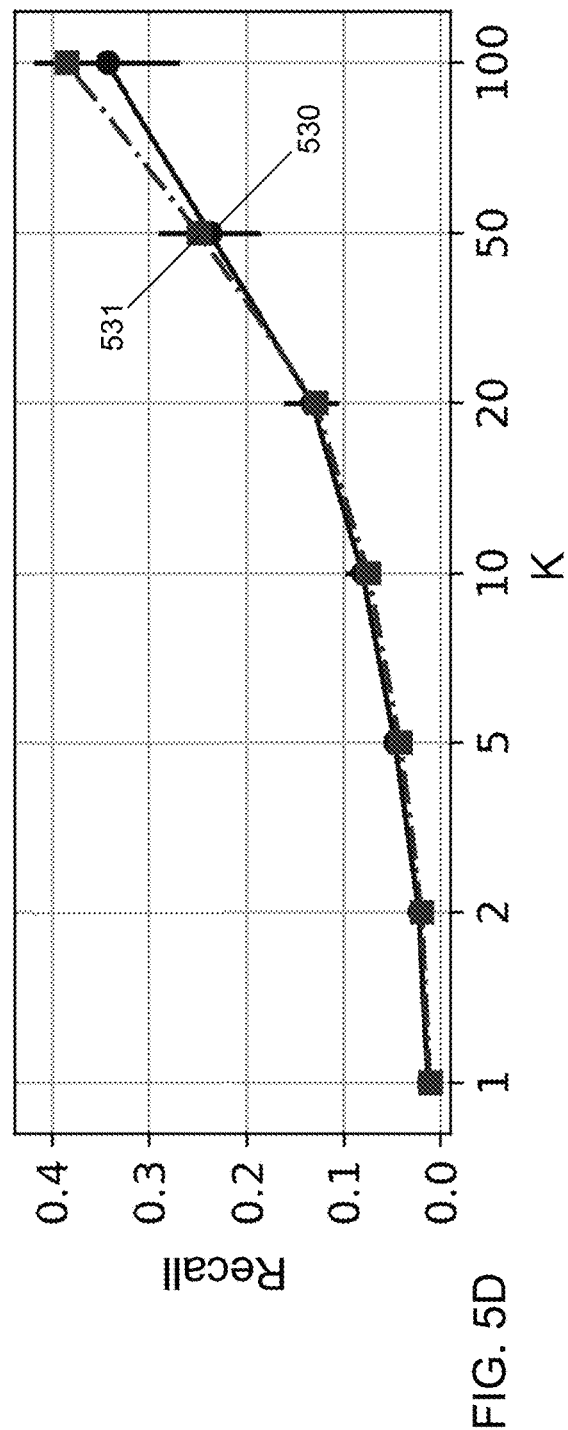
FIG. 5D shows a recall value comparison with the dataset, $|F_2|=5$, and $\lambda=0.1$ in accordance with an illustrative embodiment.

Referring to FIG. 5A, a comparison of a training objective function as a function of time is shown for $|F_2|=5$, and $\lambda=0.1$. A first curve 500 was generated using recommendation application 122, and a second curve 501 was generated using AWLS. Referring to FIG. 5B, an AUC value as a function of time is shown for $|F_2|=5$, and $\lambda=0.1$. A third curve 510 was generated using recommendation application 122, and a fourth curve 511 was generated using AWLS. Referring to FIG. 5C, a precision value as a function of time is shown for $|F_2|=5$, and $\lambda=0.1$. A fifth curve 520 was generated using recommendation application 122, and a sixth curve 521 was generated using AWLS. Referring to FIG. 5D, a recall value as a function of time is shown for $|F_2|=5$, and $\lambda=0.1$. A seventh curve 530 was generated using recommendation application 122, and an eighth curve 531 was generated using AWLS.

Figure 6A:
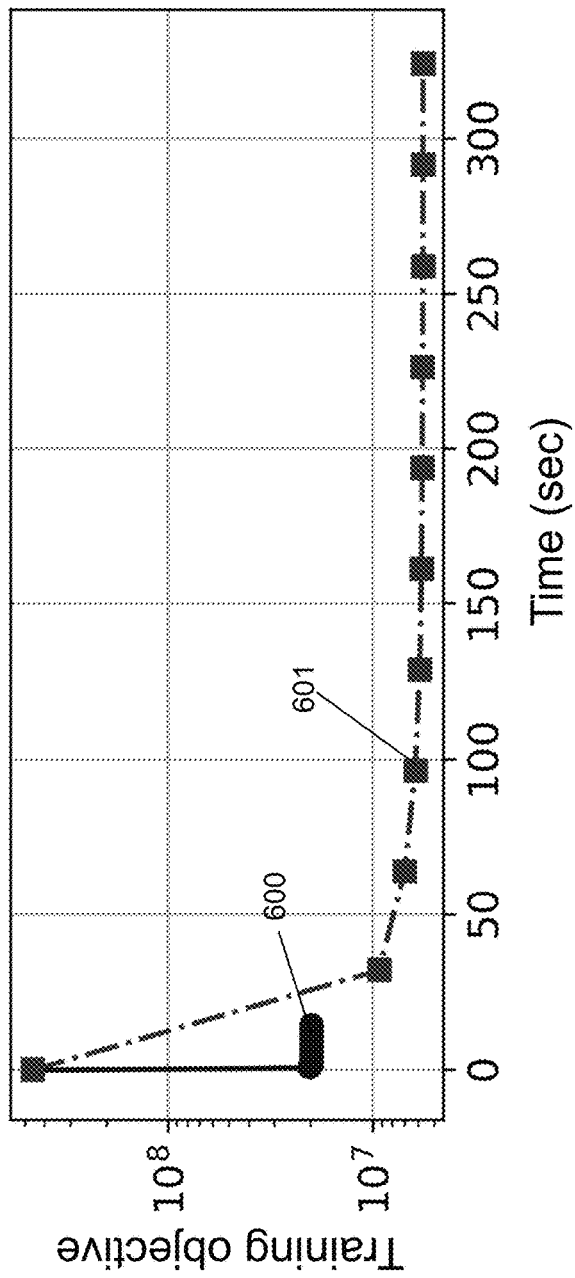
FIG. 6A shows a training objective function value comparison with a dataset, $|F_2|=5$, and $\lambda=1$ in accordance with an illustrative embodiment.
Figure 6B:
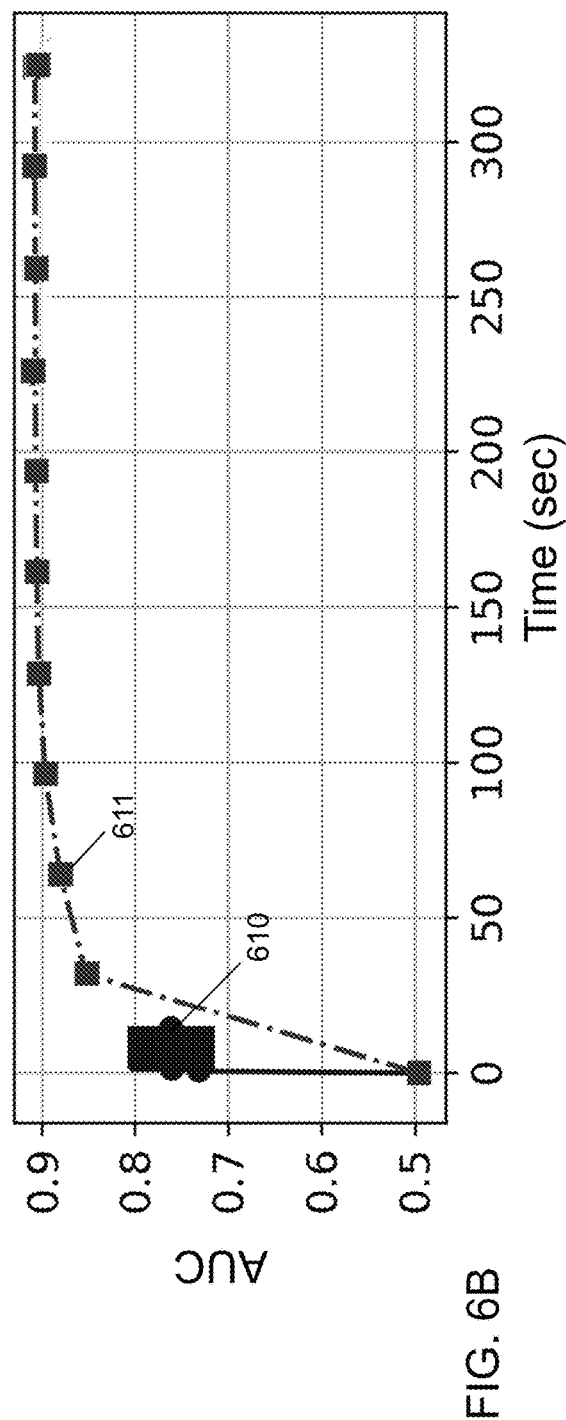
FIG. 6B shows an AUC value comparison with the dataset, $|F_2|=5$, and $\lambda=1$ in accordance with an illustrative embodiment.
Figure 6C:
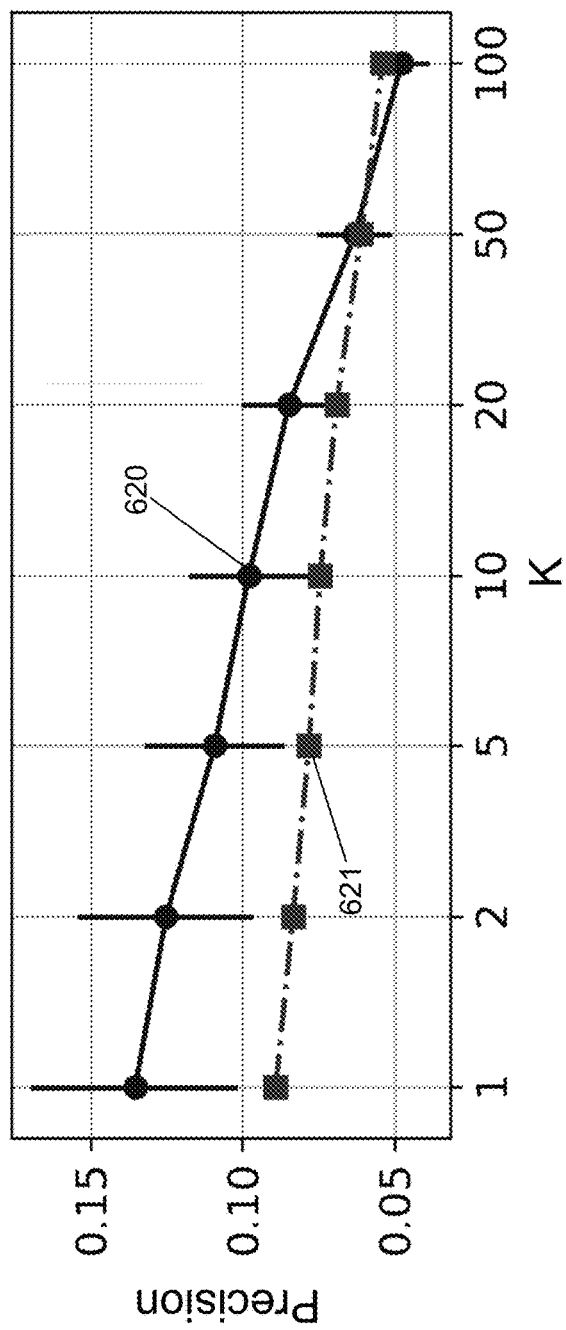
FIG. 6C shows a precision value comparison with the dataset, $|F_2|=5$, and $\lambda=1$ in accordance with an illustrative embodiment.
Figure 6D:
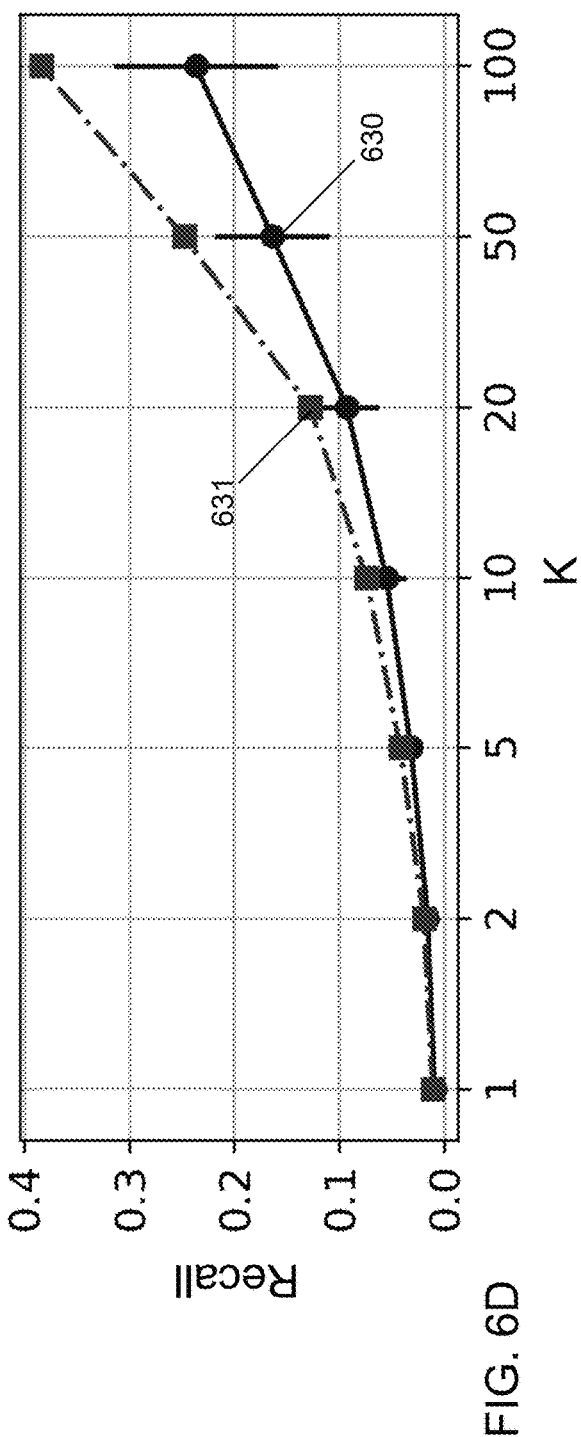
FIG. 6D shows a recall value comparison with the dataset, $|F_2|=5$, and $\lambda=1$ in accordance with an illustrative embodiment.

Referring to FIG. 6A, a comparison of a training objective function as a function of time is shown for $|F_2|=5$, and $\lambda=1$. A first curve 600 was generated using recommendation application 122, and a second curve 601 was generated using AWLS. Referring to FIG. 6B, an AUC value as a function of time is shown for $|F_2|=5$, and $\lambda=1$. A third curve 610 was generated using recommendation application 122, and a fourth curve 611 was generated using AWLS. Referring to FIG. 6C, a precision value as a function of time is shown for $|F_2|=5$, and $\lambda=1$. A fifth curve 620 was generated using recommendation application 122, and a sixth curve 621 was generated using AWLS. Referring to FIG. 6D, a recall value as a function of time is shown for $|F_2|=5$, and $\lambda=1$. A seventh curve 630 was generated using recommendation application 122, and an eighth curve 631 was generated using AWLS.

Figure 7C:
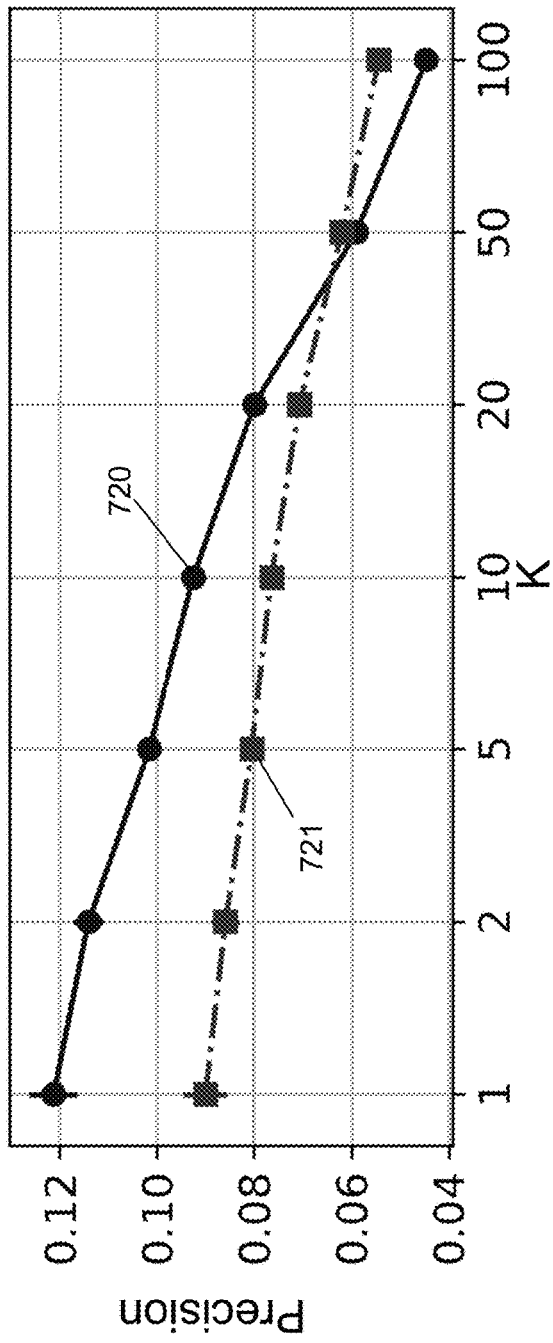
FIG. 7C shows a precision value comparison with the dataset, $|F_2|=5$, and $\lambda=10$ in accordance with an illustrative embodiment.
Figure 7D:
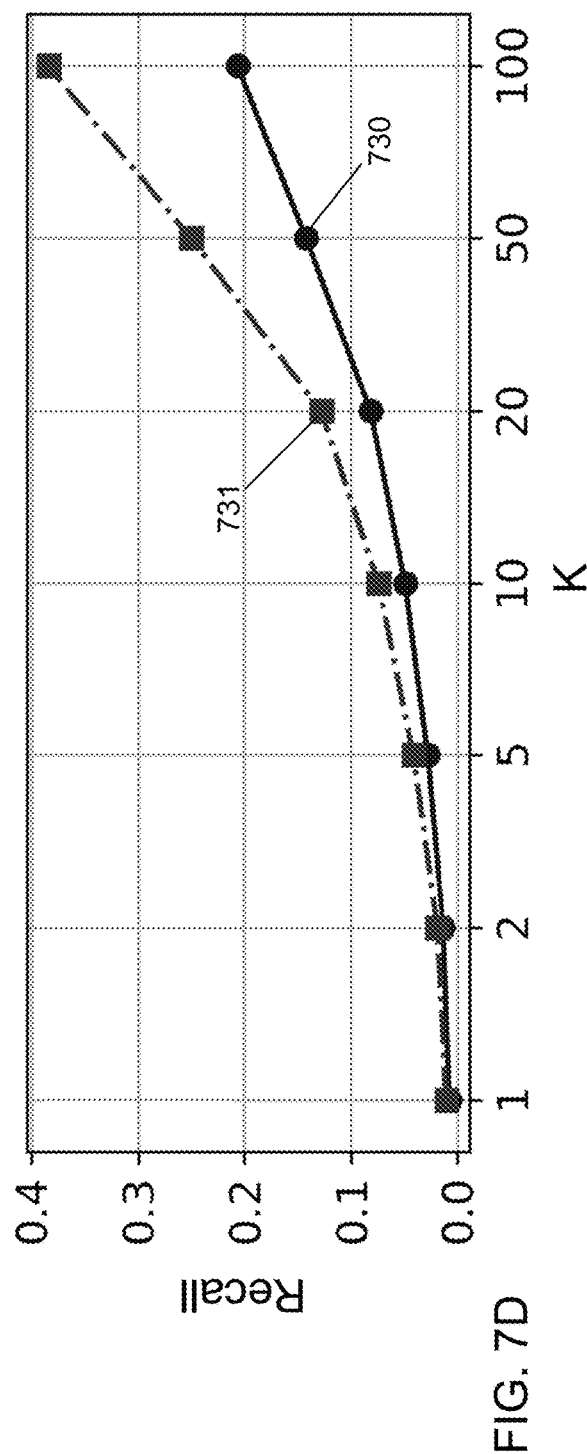
FIG. 7D shows a recall value comparison with the dataset, $|F_2|=5$, and $\lambda=10$ in accordance with an illustrative embodiment.

Referring to FIG. 7A, a comparison of a training objective function as a function of time is shown for $|F_2|=5$, and $\lambda=10$. A first curve 700 was generated using recommendation application 122, and a second curve 701 was generated using AWLS. Referring to FIG. 7B, an AUC value as a function of time is shown for $|F_2|=5$, and $\lambda=10$. A third curve 710 was generated using recommendation application 122, and a fourth curve 711 was generated using AWLS. Referring to FIG. 7C, a precision value as a function of time is shown for $|F_2|=5$, and $\lambda=10$. A fifth curve 720 was generated using recommendation application 122, and a sixth curve 721 was generated using AWLS. Referring to FIG. 7D, a recall value as a function of time is shown for $|F_2|=5$, and $\lambda=10$. A seventh curve 730 was generated using recommendation application 122, and an eighth curve 731 was generated using AWLS.

Figure 8C:
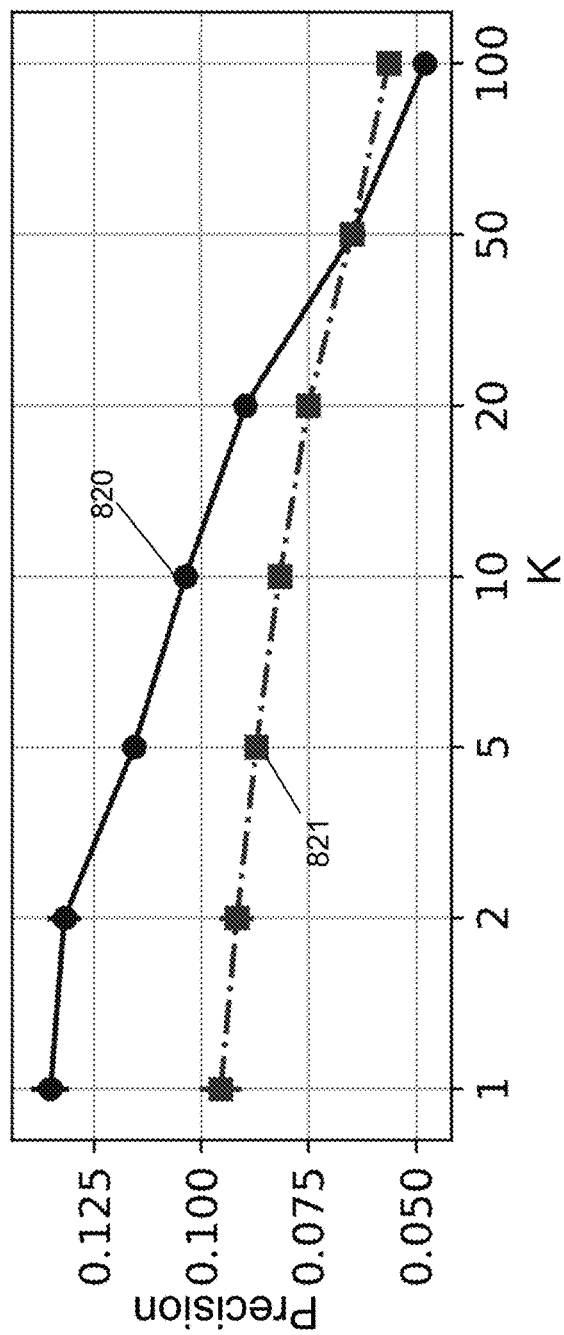
FIG. 8C shows a precision value comparison with the dataset, $|F_2|=5$, and $\lambda=100$ in accordance with an illustrative embodiment.
Figure 8D:
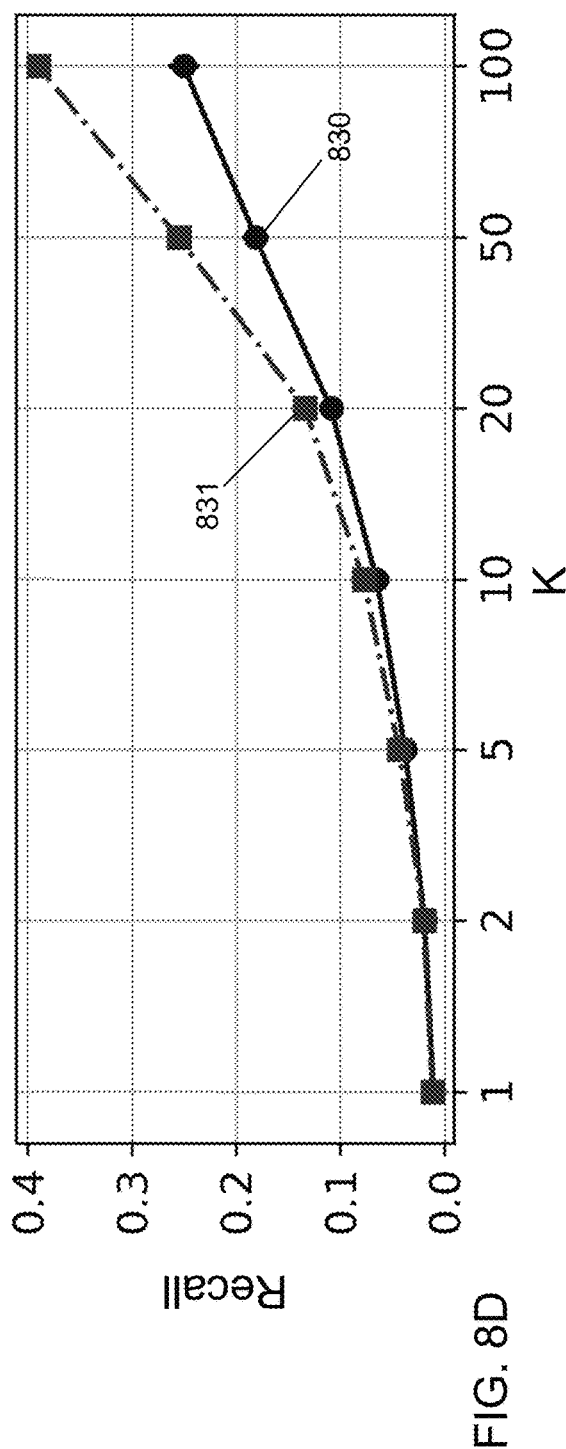
FIG. 8D shows a recall value comparison with the dataset, $|F_2|=5$, and $\lambda=100$ in accordance with an illustrative embodiment.

Referring to FIG. 8A, a comparison of a training objective function as a function of time is shown for $|F_2|=5$, and $\lambda=100$. A first curve 800 was generated using recommendation application 122, and a second curve 801 was generated using AWLS. Referring to FIG. 8B, an AUC value as a function of time is shown for $|F_2|=5$, and $\lambda=100$. A third curve 810 was generated using recommendation application 122, and a fourth curve 811 was generated using AWLS. Referring to FIG. 8C, a precision value as a function of time is shown for $|F_2|=5$, and $\lambda=100$. A fifth curve 820 was generated using recommendation application 122, and a sixth curve 821 was generated using AWLS. Referring to FIG. 8D, a recall value as a function of time is shown for $|F_2|=5$, and $\lambda=100$. A seventh curve 830 was generated using recommendation application 122, and an eighth curve 831 was generated using AWLS.

Figure 9A:
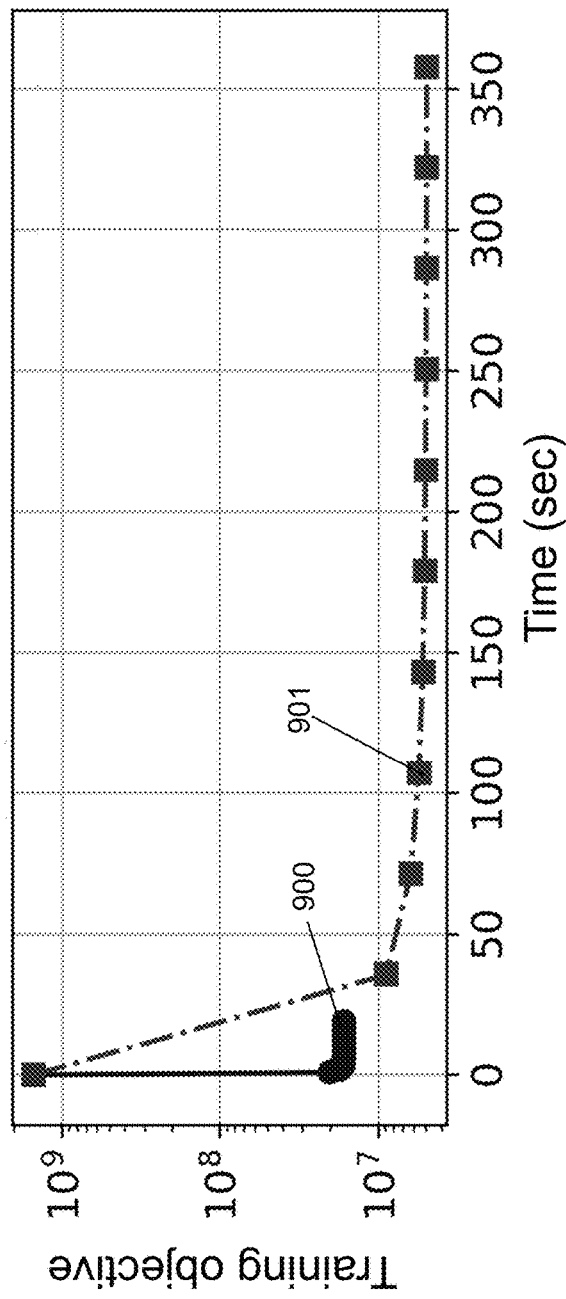
FIG. 9A shows a training objective function value comparison with a dataset, $|F_2|=10$, and $\lambda=0.01$ in accordance with an illustrative embodiment.
Figure 9B:
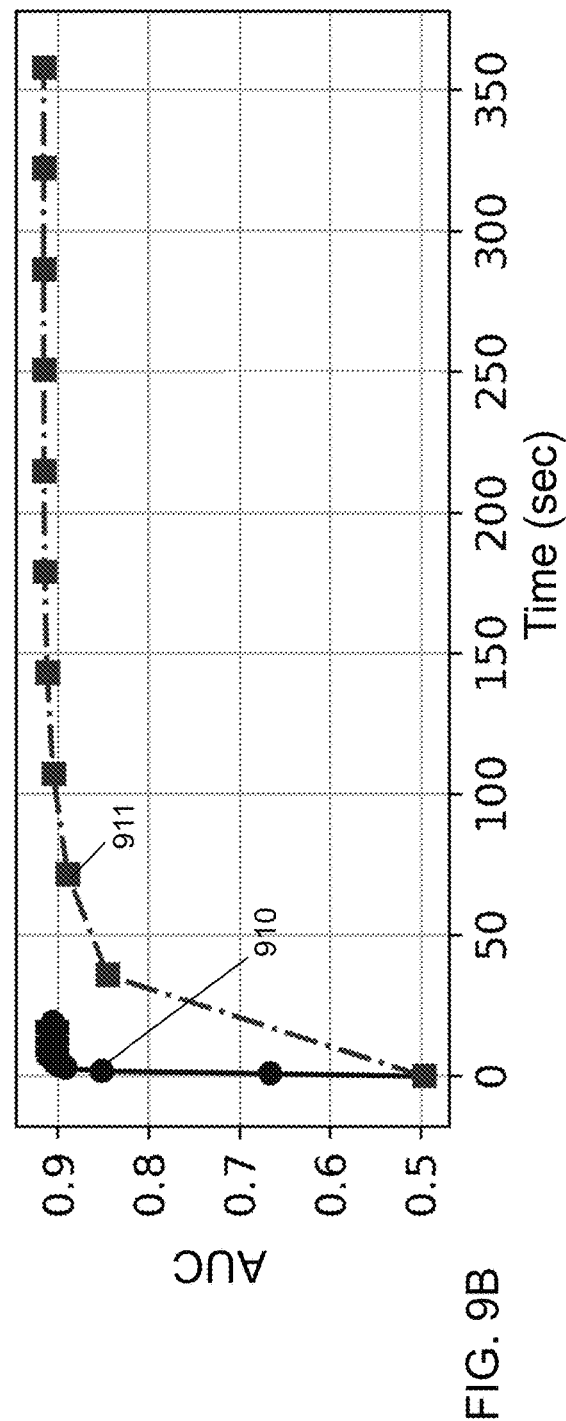
FIG. 9B shows an AUC value comparison with the dataset, $|F_2|=10$, and $\lambda=0.01$ in accordance with an illustrative embodiment.
Figure 9C:
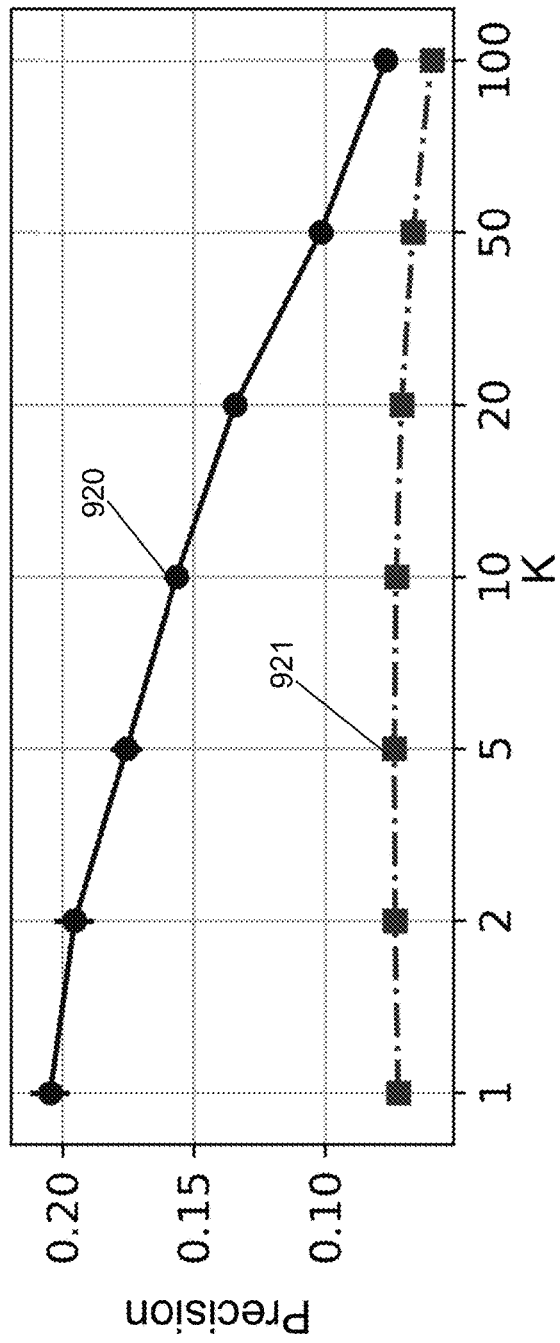
FIG. 9C shows a precision value comparison with the dataset, $|F_2|=10$, and $\lambda=0.01$ in accordance with an illustrative embodiment.
Figure 9D:
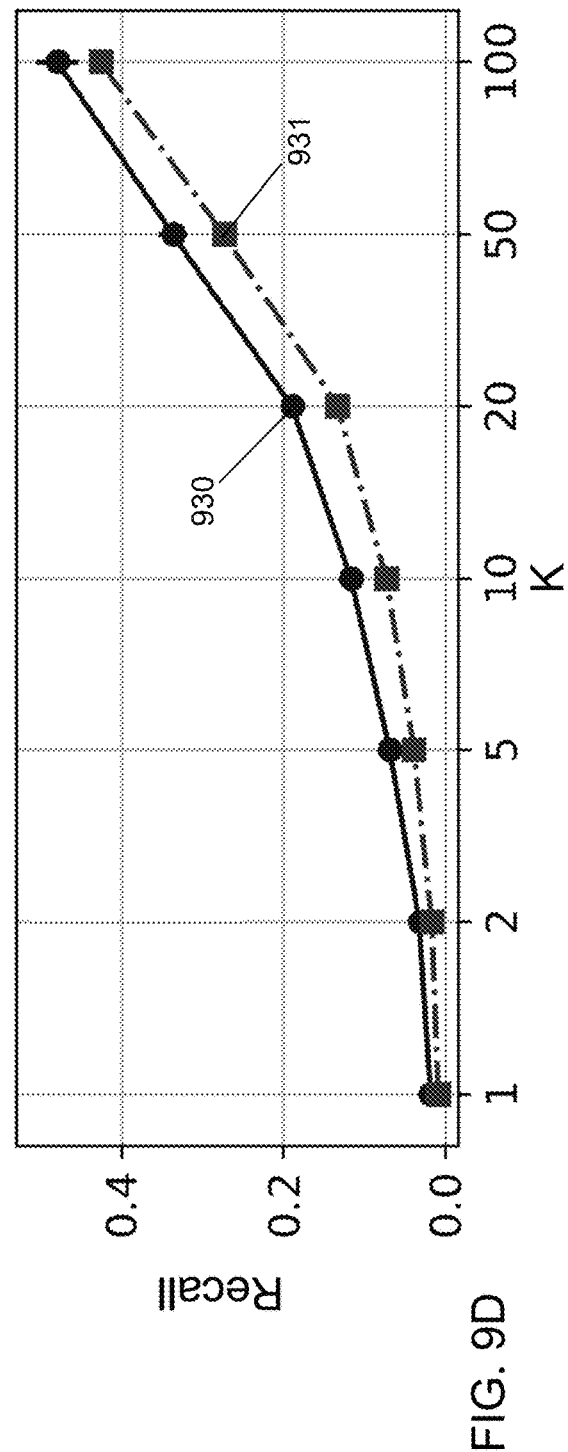
FIG. 9D shows a recall value comparison with the dataset, $|F_2|=10$, and $\lambda=0.01$ in accordance with an illustrative embodiment.

Referring to FIG. 9A, a comparison of a training objective function as a function of time is shown for $|F_2|=10$, and $\lambda=0.01$. A first curve 900 was generated using recommendation application 122, and a second curve 901 was generated using AWLS. Referring to FIG. 9B, an AUC value as a function of time is shown for $|F_2|=10$, and $\lambda=0.01$. A third curve 910 was generated using recommendation application 122, and a fourth curve 911 was generated using AWLS. Referring to FIG. 9C, a precision value as a function of time is shown for $|F_2|=10$, and $\lambda=0.01$. A fifth curve 920 was generated using recommendation application 122, and a sixth curve 921 was generated using AWLS. Referring to FIG. 9D, a recall value as a function of time is shown for $|F_2|=10$, and $\lambda=0.01$. A seventh curve 930 was generated using recommendation application 122, and an eighth curve 931 was generated using AWLS.

Figure 10A:
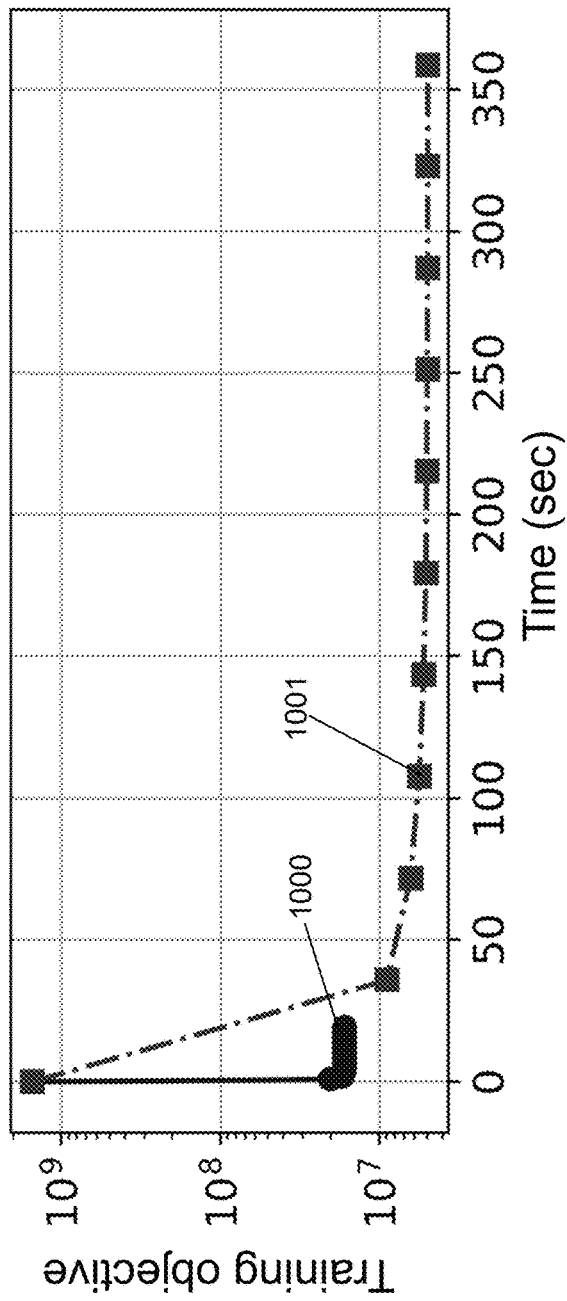
FIG. 10A shows a training objective function value comparison with a dataset, $|F_2|=10$, and $\lambda=0.1$ in accordance with an illustrative embodiment.
Figure 10B:
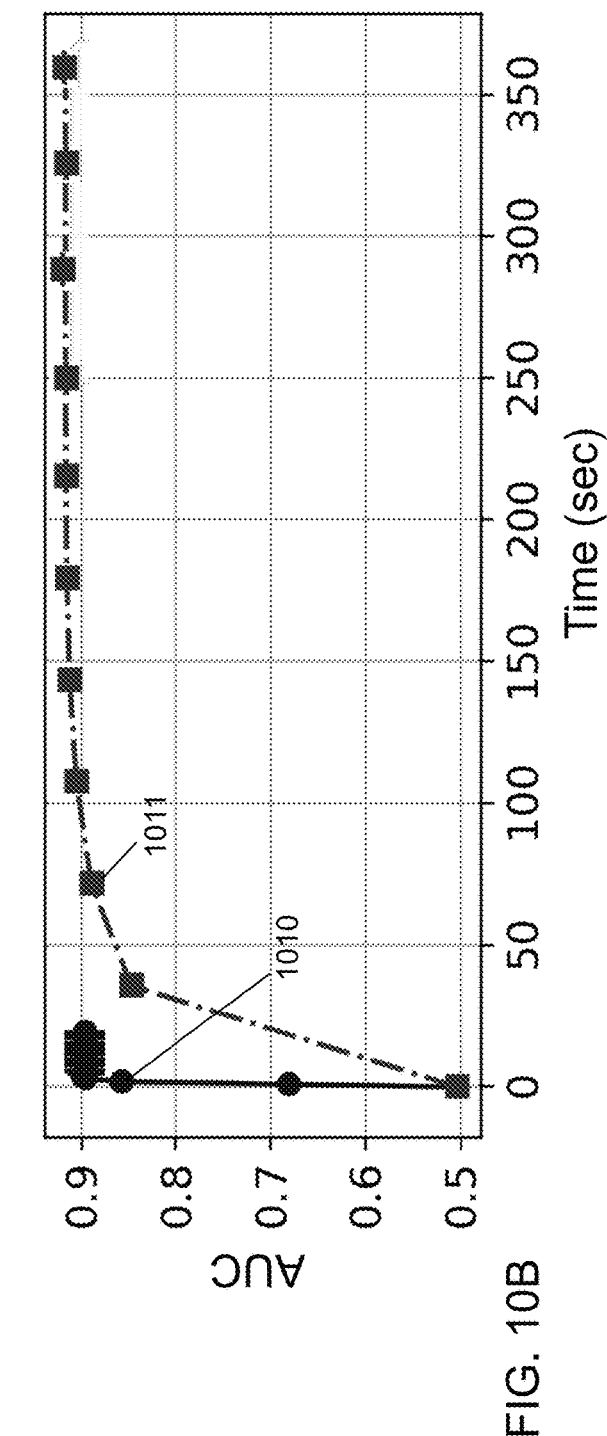
FIG. 10B shows an AUC value comparison with the dataset, $|F_2|=10$, and $\lambda=0.1$ in accordance with an illustrative embodiment.
Figure 10C:
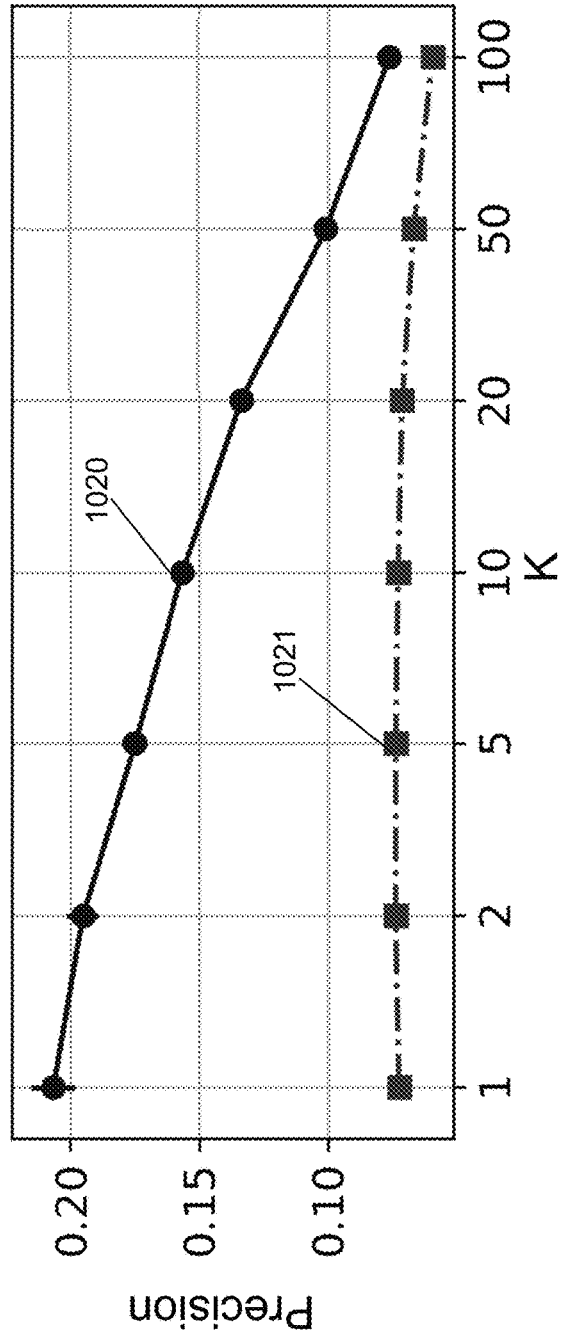
FIG. 10C shows a precision value comparison with the dataset, $|F_2|=10$, and $\lambda=0.1$ in accordance with an illustrative embodiment.
Figure 10D:
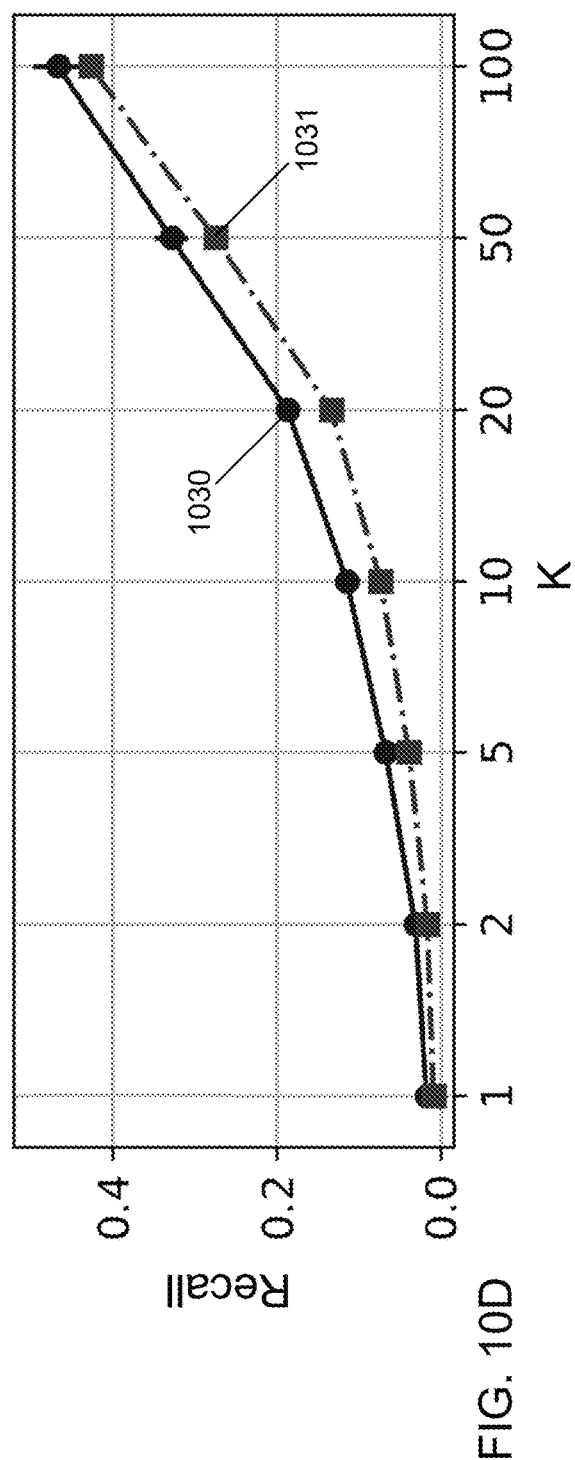
FIG. 10D shows a recall value comparison with the dataset, $|F_2|=10$, and $\lambda=0.1$ in accordance with an illustrative embodiment.

Referring to FIG. 10A, a comparison of a training objective function as a function of time is shown for $|F_2|=10$, and $\lambda=0.1$. A first curve 1000 was generated using recommendation application 122, and a second curve 1001 was generated using AWLS. Referring to FIG. 10B, an AUC value as a function of time is shown for $|F_2|=10$, and $\lambda=0.1$. A third curve 1010 was generated using recommendation application 122, and a fourth curve 1011 was generated using AWLS. Referring to FIG. 10C, a precision value as a function of time is shown for $|F_2|=10$, and $\lambda=0.1$. A fifth curve 1020 was generated using recommendation application 122, and a sixth curve 1021 was generated using AWLS. Referring to FIG. 10D, a recall value as a function of time is shown for $|F_2|=10$, and $\lambda=0.1$. A seventh curve 1030 was generated using recommendation application 122, and an eighth curve 1031 was generated using AWLS.

Figure 11A:
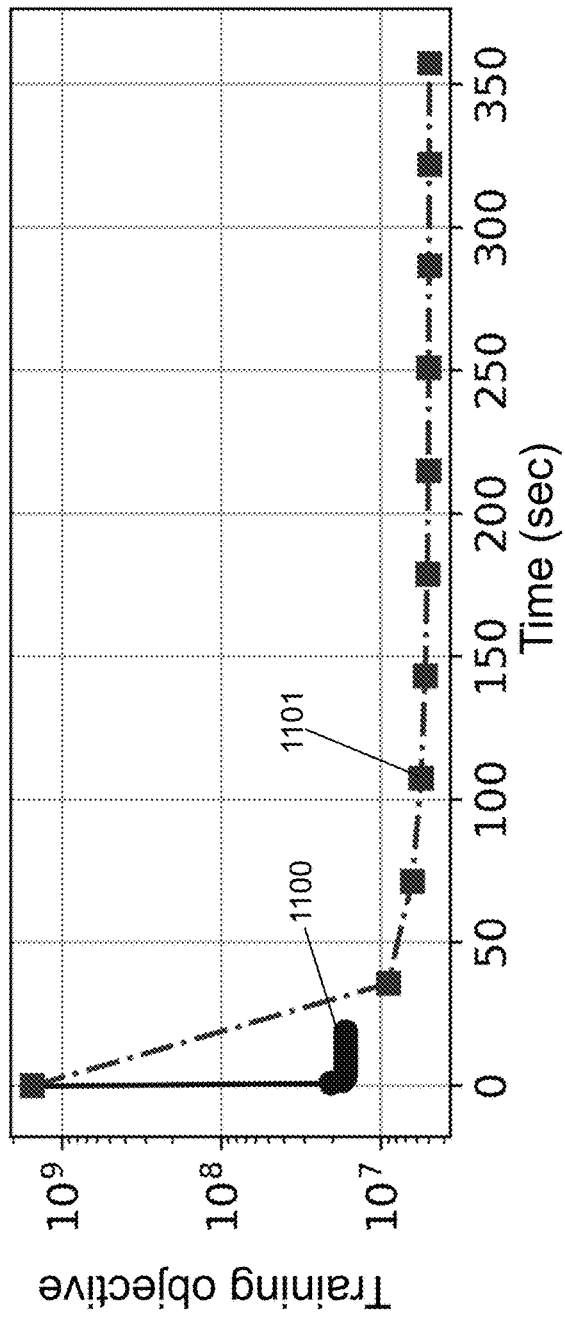
FIG. 11A shows a training objective function value comparison with a dataset, $|F_2|=10$, and $\lambda=1$ in accordance with an illustrative embodiment.
Figure 11B:
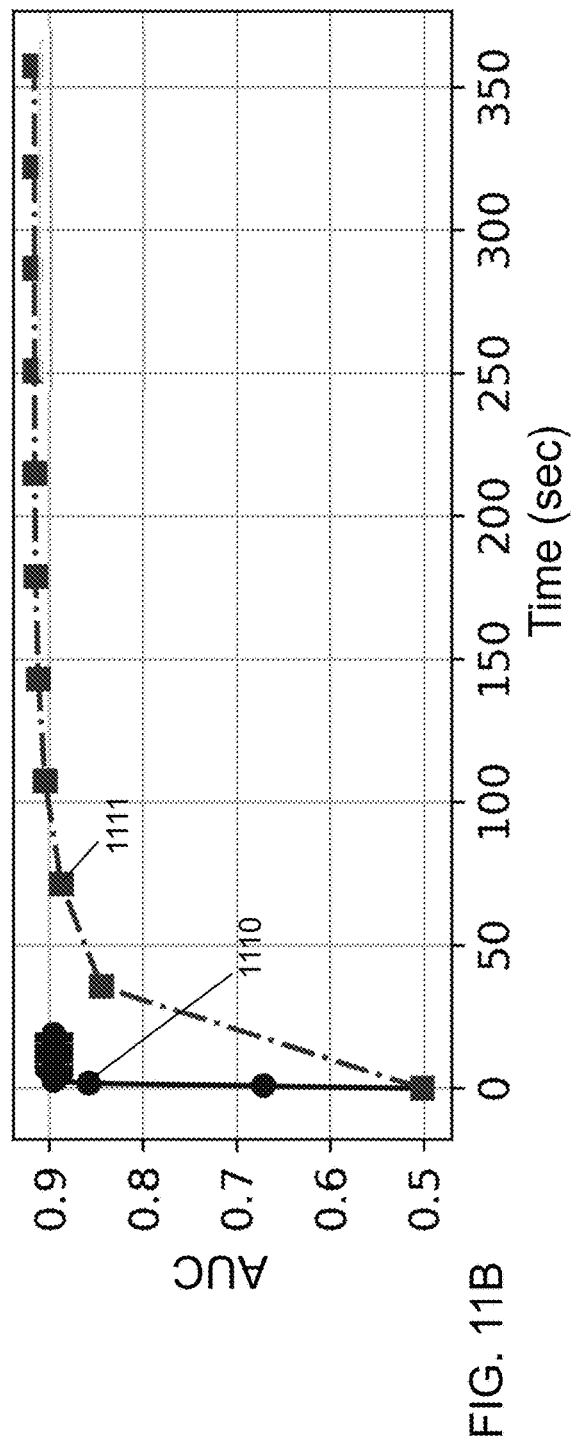
FIG. 11B shows an AUC value comparison with the dataset, $|F_2|=10$, and $\lambda=1$ in accordance with an illustrative embodiment.
Figure 11C:
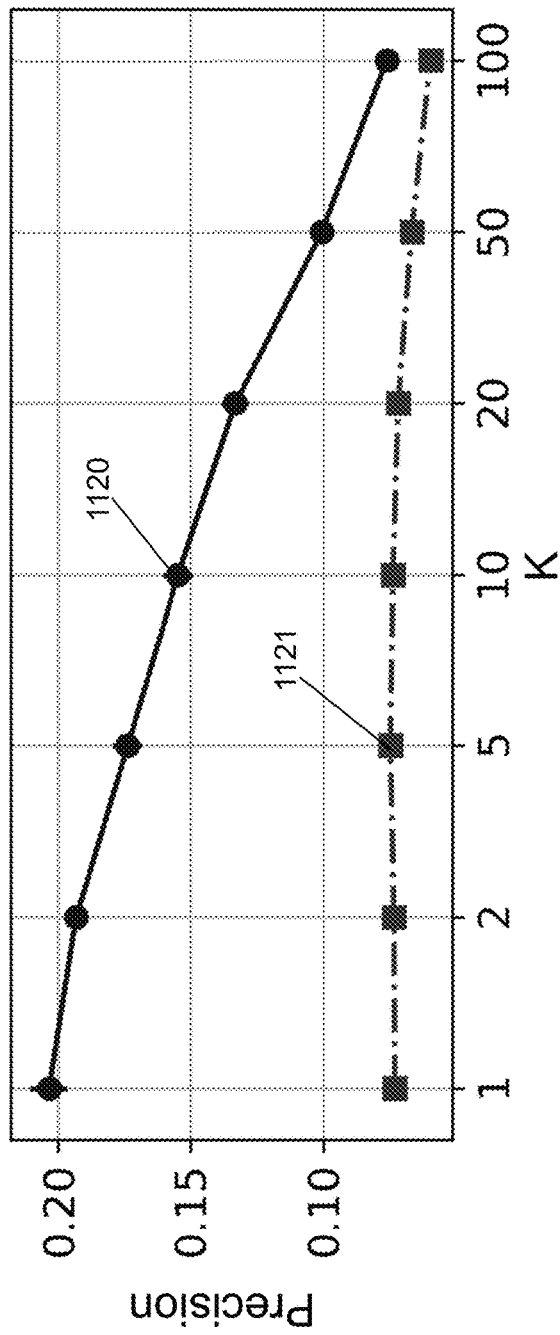
FIG. 11C shows a precision value comparison with the dataset, $|F_2|=10$, and $\lambda=1$ in accordance with an illustrative embodiment.
Figure 11D:
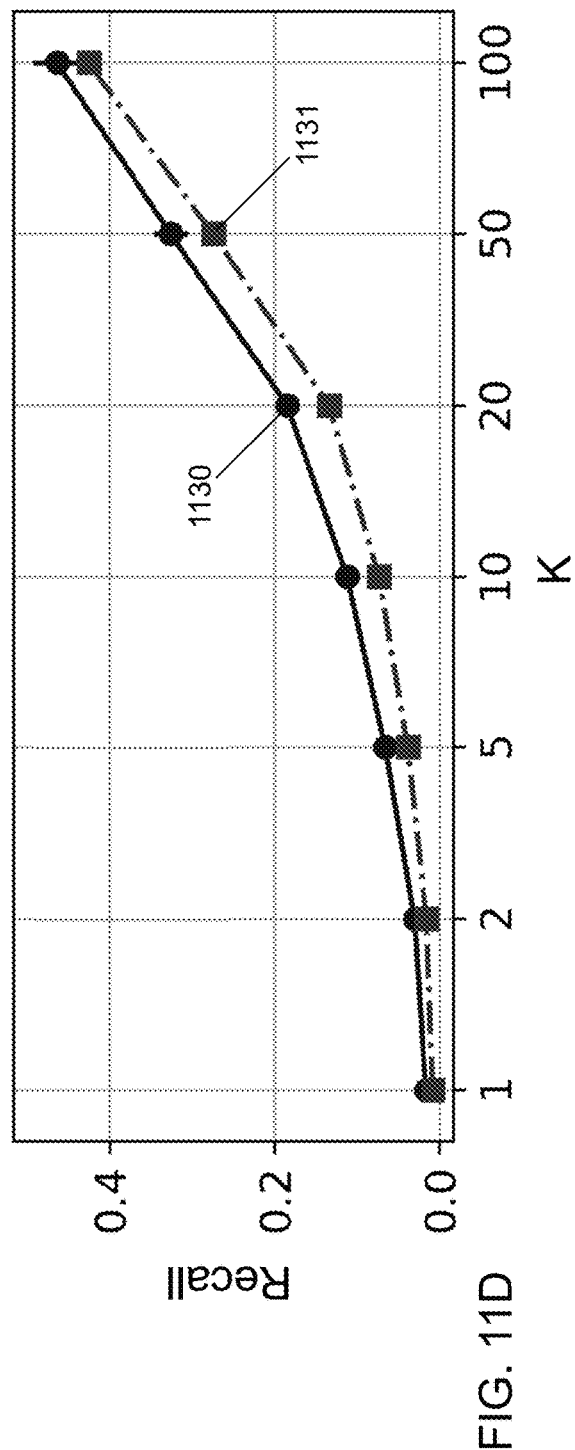
FIG. 11D shows a recall value comparison with the dataset, $|F_2|=10$, and $\lambda=1$ in accordance with an illustrative embodiment.

Referring to FIG. 11A, a comparison of a training objective function as a function of time is shown for $|F_2|=10$, and $\lambda=1$. A first curve 1100 was generated using recommendation application 122, and a second curve 1101 was generated using AWLS. Referring to FIG. 11B, an AUC value as a function of time is shown for $|F_2|=10$, and $\lambda=1$. A third curve 1110 was generated using recommendation application 122, and a fourth curve 1111 was generated using AWLS. Referring to FIG. 11C, a precision value as a function of time is shown for $|F_2|=10$, and $\lambda=1$. A fifth curve 1120 was generated using recommendation application 122, and a sixth curve 1121 was generated using AWLS. Referring to FIG. 11D, a recall value as a function of time is shown for $|F_2|=10$, and $\lambda=1$. A seventh curve 1130 was generated using recommendation application 122, and an eighth curve 1131 was generated using AWLS.

Figure 12A:
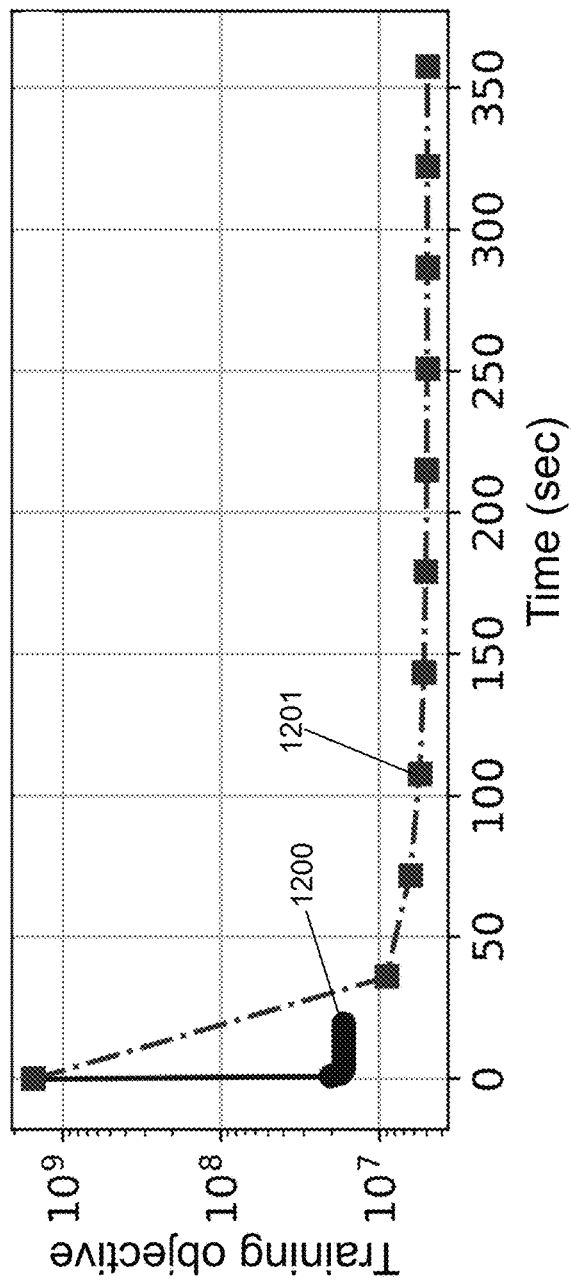
FIG. 12A shows a training objective function value comparison with a dataset, $|F_2|=10$, and $\lambda=10$ in accordance with an illustrative embodiment.
Figure 12B:
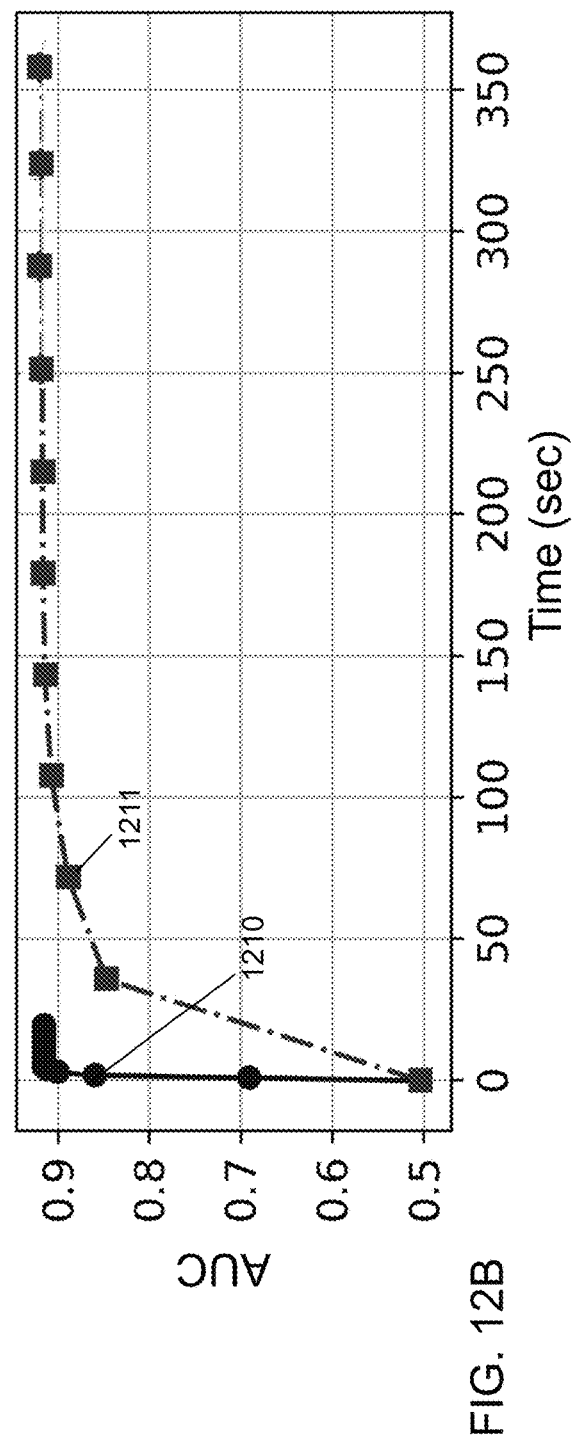
FIG. 12B shows an AUC value comparison with the dataset, $|F_2|=10$, and $\lambda=10$ in accordance with an illustrative embodiment.
Figure 12C:
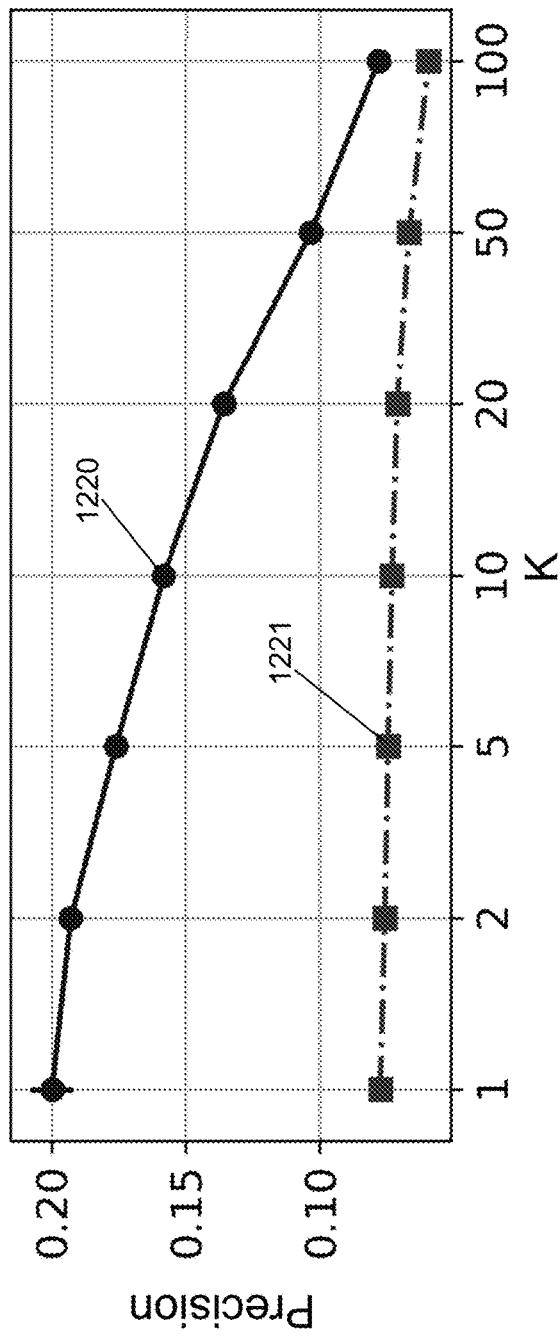
FIG. 12C shows a precision value comparison with the dataset, $|F_2|=10$, and $\lambda=10$ in accordance with an illustrative embodiment.
Figure 12D:
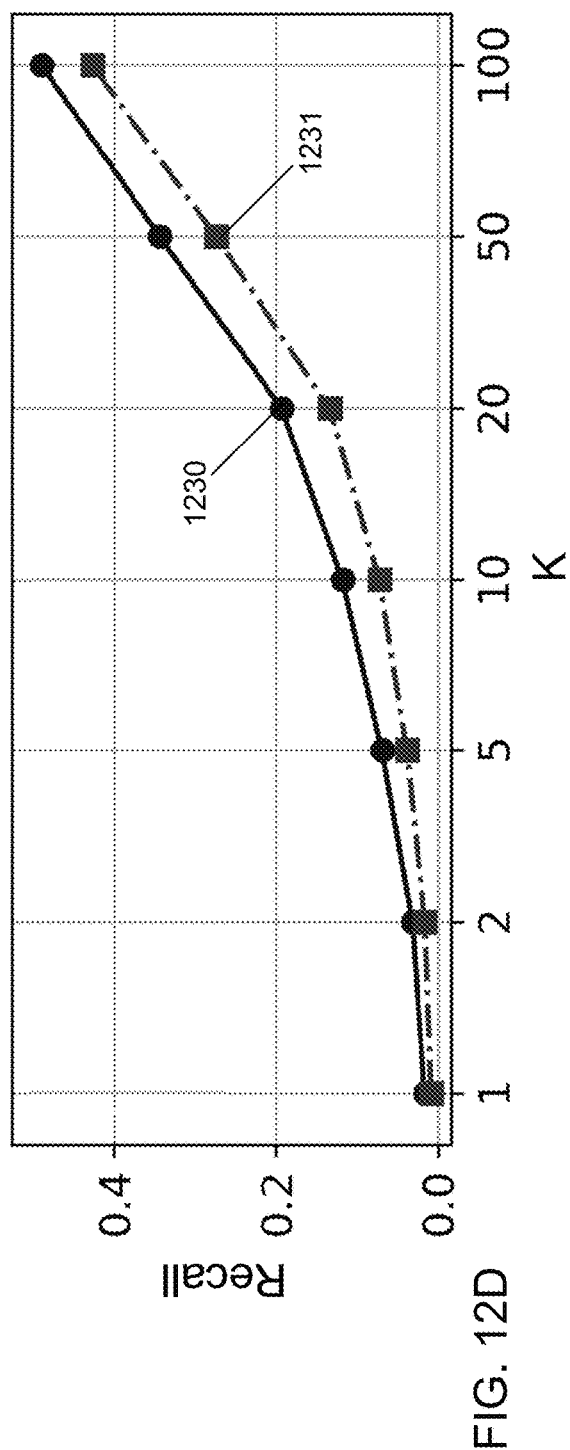
FIG. 12D shows a recall value comparison with the dataset, $|F_2|=10$, and $\lambda=10$ in accordance with an illustrative embodiment.

Referring to FIG. 12A, a comparison of a training objective function as a function of time is shown for $|F_2|=10$, and $\lambda=10$. A first curve 1200 was generated using recommendation application 122, and a second curve 1201 was generated using AWLS. Referring to FIG. 12B, an AUC value as a function of time is shown for $|F_2|=10$, and $\lambda=10$. A third curve 1210 was generated using recommendation application 122, and a fourth curve 1211 was generated using AWLS. Referring to FIG. 12C, a precision value as a function of time is shown for $|F_2|=10$, and $\lambda=10$. A fifth curve 1220 was generated using recommendation application 122, and a sixth curve 1221 was generated using AWLS. Referring to FIG. 12D, a recall value as a function of time is shown for $|F_2|=10$, and $\lambda=10$. A seventh curve 1230 was generated using recommendation application 122, and an eighth curve 1231 was generated using AWLS.

Figure 13A:
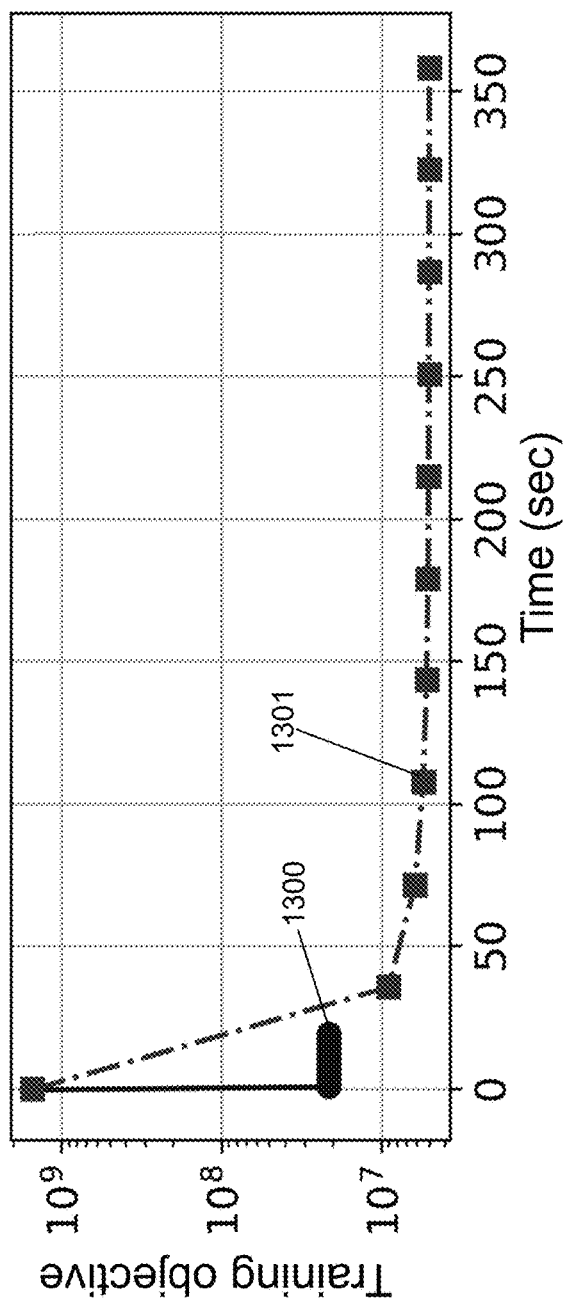
FIG. 13A shows a training objective function value comparison with a dataset, $|F_2|=10$, and $\lambda=100$ in accordance with an illustrative embodiment.
Figure 13B:
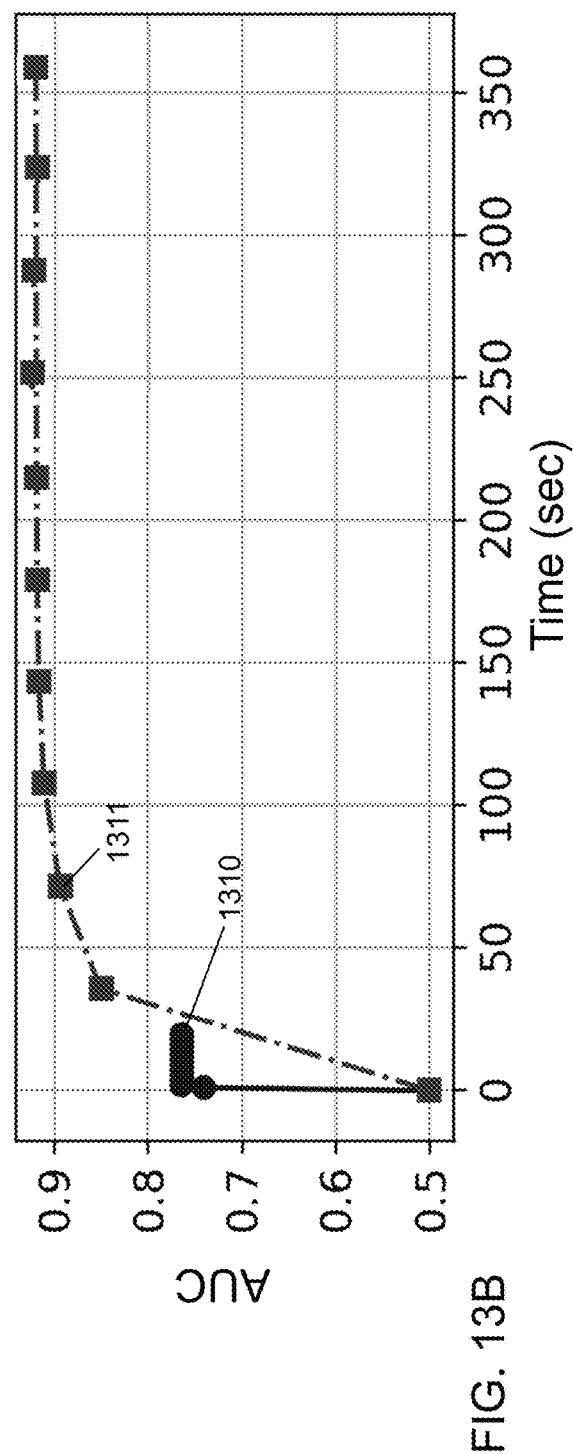
FIG. 13B shows an AUC value comparison with the dataset, $|F_2|=10$, and $\lambda=100$ in accordance with an illustrative embodiment.
Figure 13C:
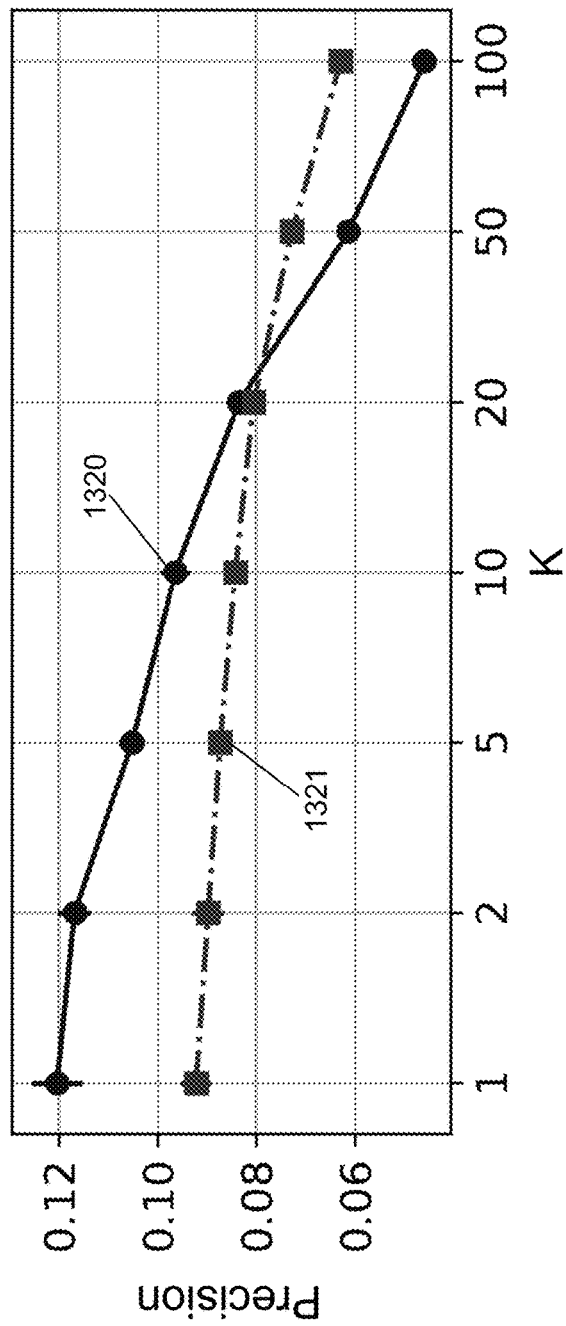
FIG. 13C shows a precision value comparison with the dataset, $|F_2|=10$, and $\lambda=100$ in accordance with an illustrative embodiment.
Figure 13D:
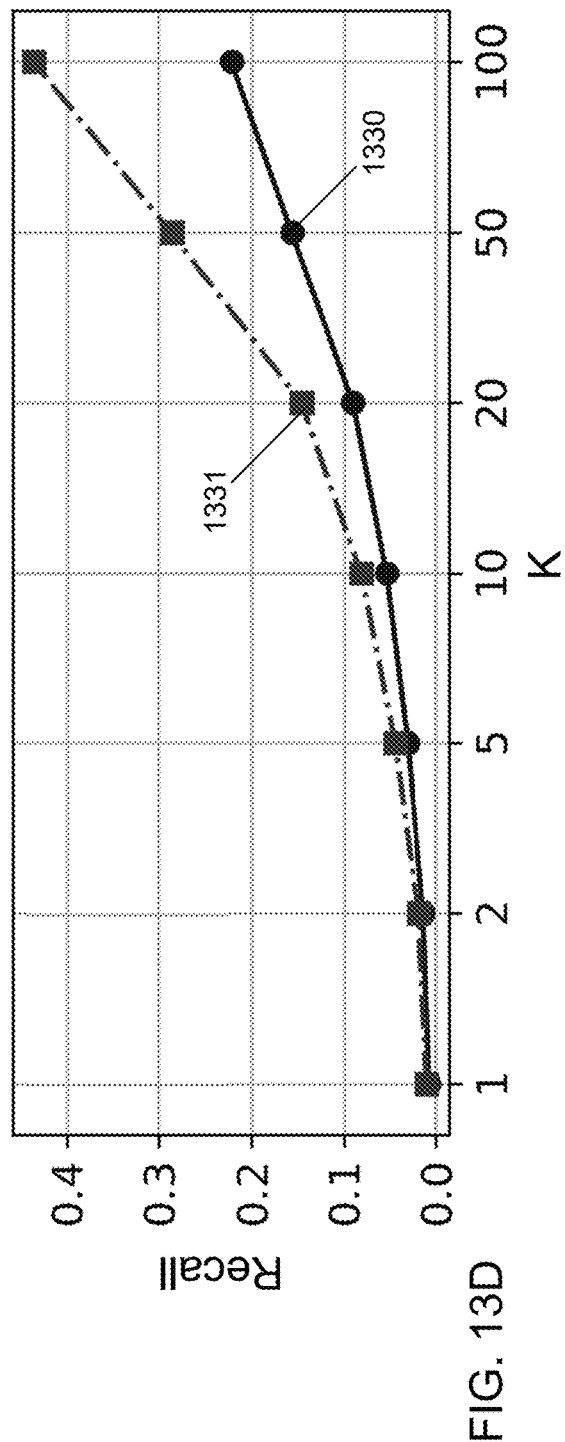
FIG. 13D shows a recall value comparison with the dataset, $|F_2|=10$, and $\lambda=100$ in accordance with an illustrative embodiment.

Referring to FIG. 13A, a comparison of a training objective function as a function of time is shown for $|F_2|=10$, and $\lambda=100$. A first curve 1300 was generated using recommendation application 122, and a second curve 1301 was generated using AWLS. Referring to FIG. 13B, an AUC value as a function of time is shown for $|F_2|=10$, and $\lambda=100$. A third curve 1310 was generated using recommendation application 122, and a fourth curve 1311 was generated using AWLS. Referring to FIG. 13C, a precision value as a function of time is shown for $|F_2|=10$, and $\lambda=100$. A fifth curve 1320 was generated using recommendation application 122, and a sixth curve 1321 was generated using AWLS. Referring to FIG. 13D, a recall value as a function of time is shown for $|F_2|=10$, and $\lambda=100$. A seventh curve 1330 was generated using recommendation application 122, and an eighth curve 1331 was generated using AWLS.

Figure 14A:
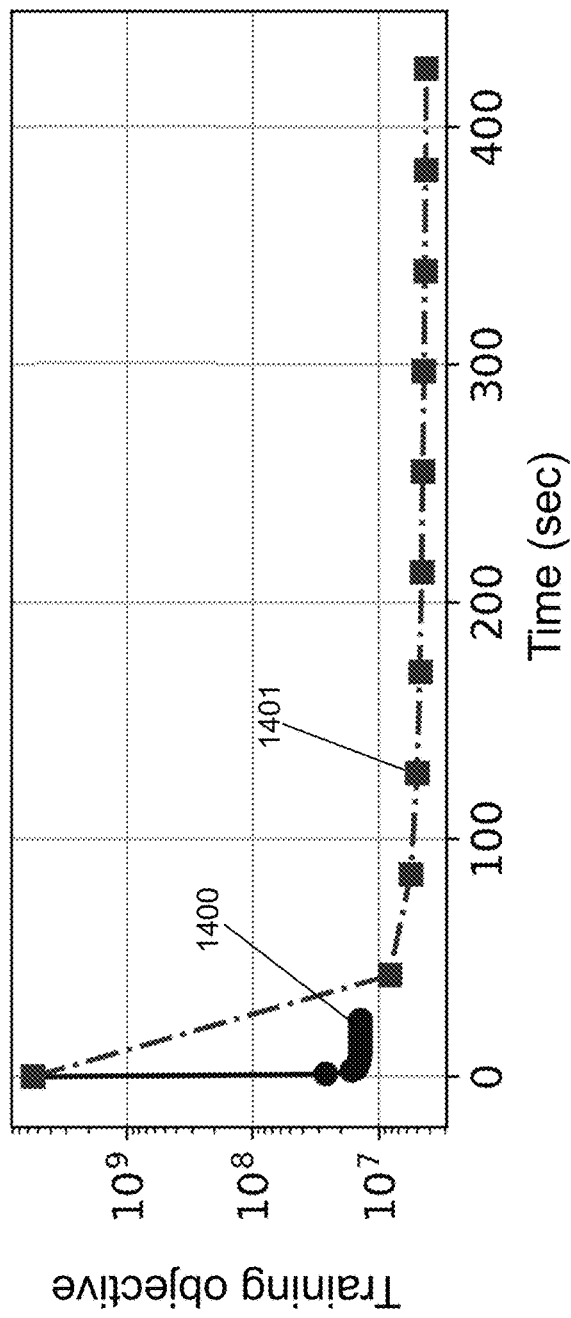
FIG. 14A shows a training objective function value comparison with a dataset, $|F_2|=20$, and $\lambda=0.01$ in accordance with an illustrative embodiment.
Figure 14B:
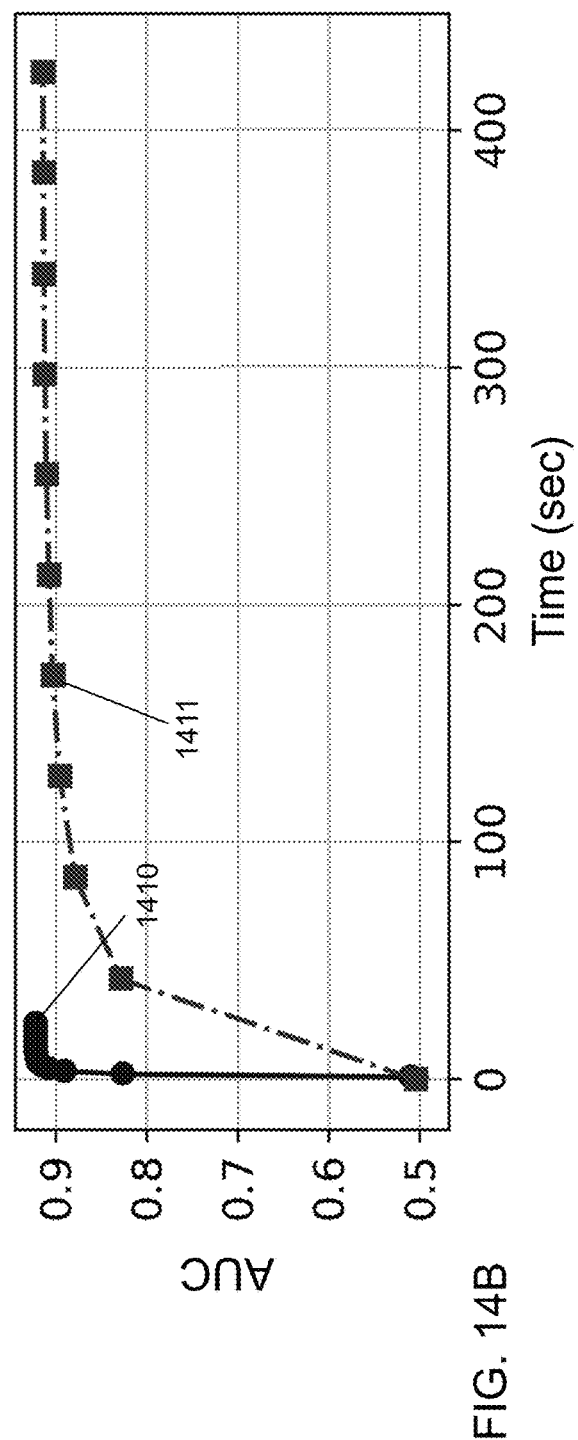
FIG. 14B shows an AUC value comparison with the dataset, $|F_2|=20$, and $\lambda=0.01$ in accordance with an illustrative embodiment.
Figure 14C:
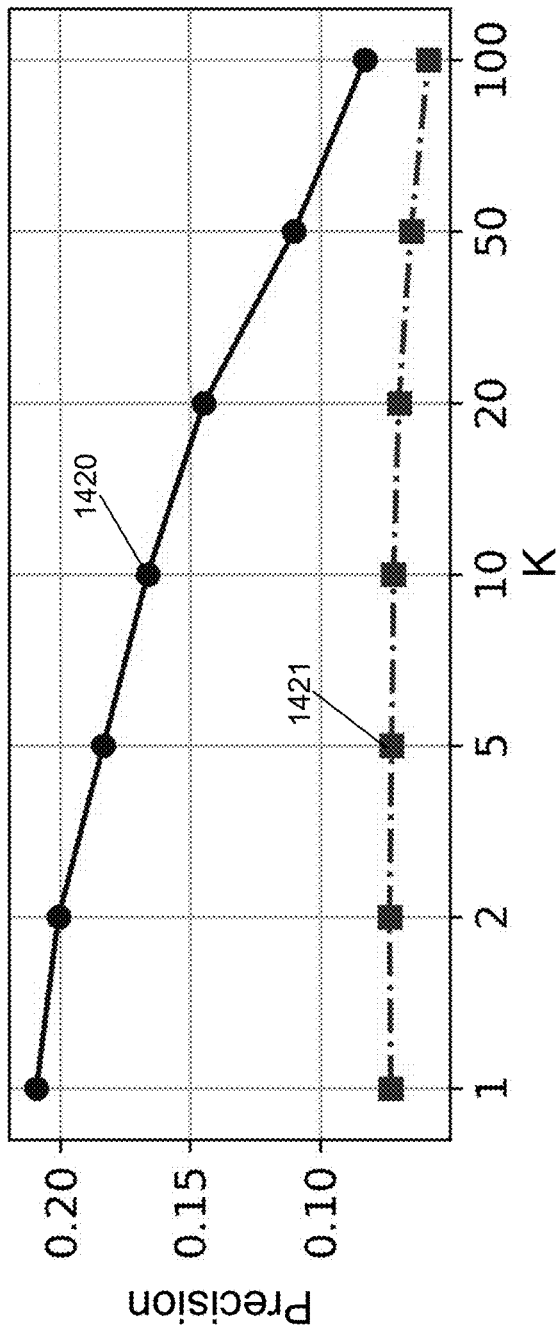
FIG. 14C shows a precision value comparison with the dataset, $|F_2|=20$, and $\lambda=0.01$ in accordance with an illustrative embodiment.
Figure 14D:
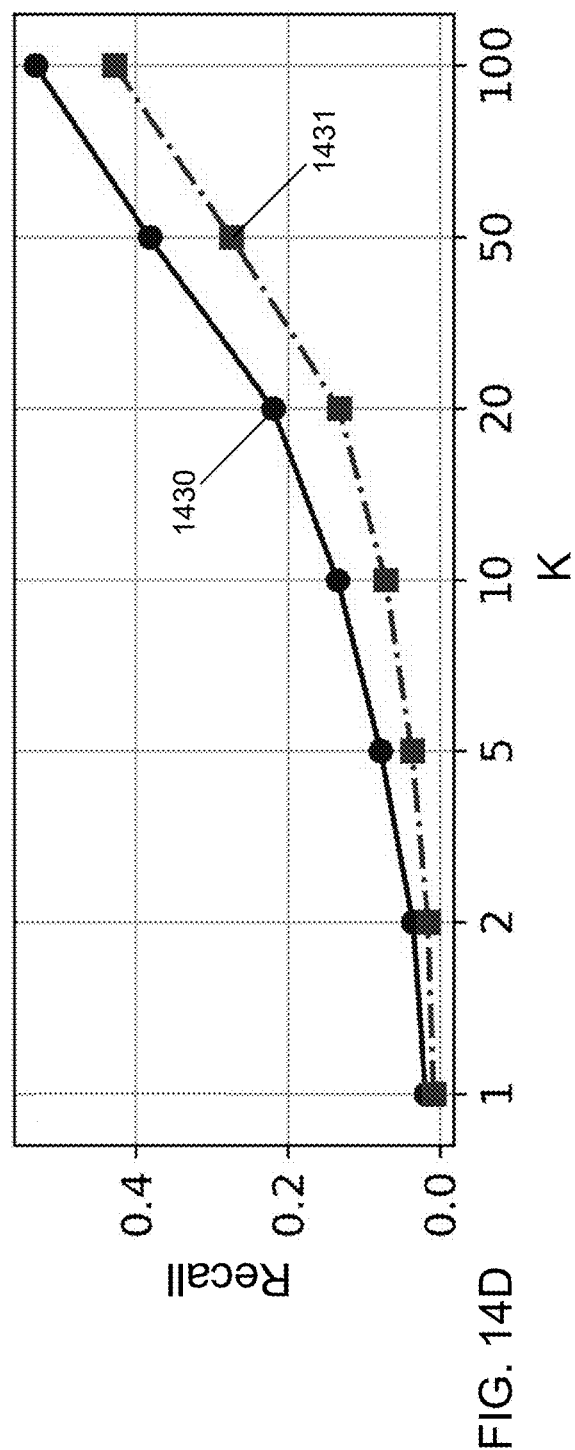
FIG. 14D shows a recall value comparison with the dataset, $|F_2|=20$, and $\lambda=0.01$ in accordance with an illustrative embodiment.

Referring to FIG. 14A, a comparison of a training objective function as a function of time is shown for $|F_2|=20$, and $\lambda=0.01$. A first curve 1400 was generated using recommendation application 122, and a second curve 1401 was generated using AWLS. Referring to FIG. 14B, an AUC value as a function of time is shown for $|F_2|=20$, and $\lambda=0.01$. A third curve 1410 was generated using recommendation application 122, and a fourth curve 1411 was generated using AWLS. Referring to FIG. 14C, a precision value as a function of time is shown for $|F_2|=20$, and $\lambda=0.01$. A fifth curve 1420 was generated using recommendation application 122, and a sixth curve 1421 was generated using AWLS. Referring to FIG. 14D, a recall value as a function of time is shown for $|F_2|=20$, and $\lambda=0.01$. A seventh curve 1430 was generated using recommendation application 122, and an eighth curve 1431 was generated using AWLS.

Figure 15C:
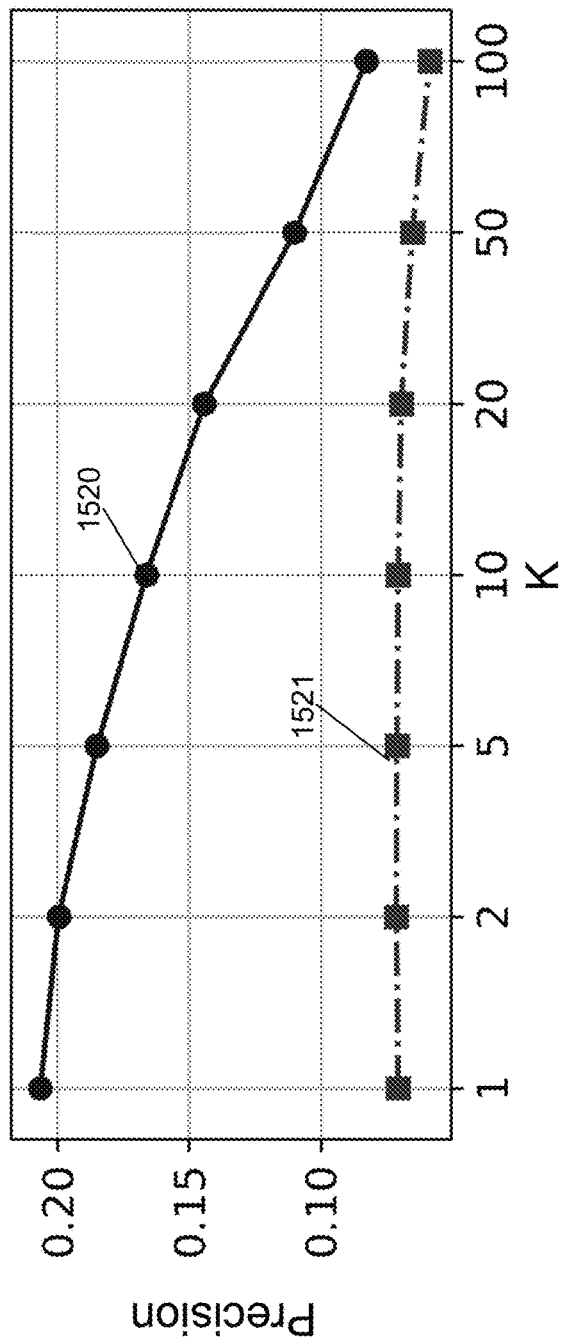
FIG. 15C shows a precision value comparison with the dataset, $|F_2|=20$, and $\lambda=0.1$ in accordance with an illustrative embodiment.
Figure 15D:
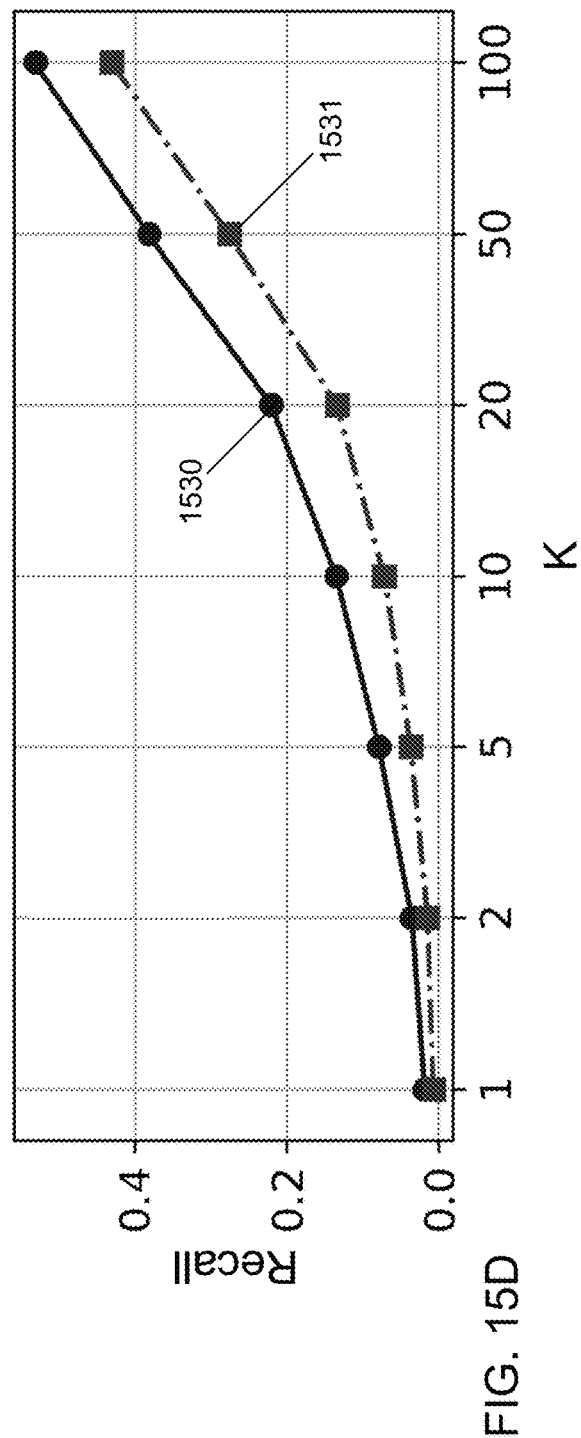
FIG. 15D shows a recall value comparison with the dataset, $|F_2|=20$, and $\lambda=0.1$ in accordance with an illustrative embodiment.

Referring to FIG. 15A, a comparison of a training objective function as a function of time is shown for $|F_2|=20$, and $\lambda=0.1$. A first curve 1500 was generated using recommendation application 122, and a second curve 1501 was generated using AWLS. Referring to FIG. 15B, an AUC value as a function of time is shown for $|F_2|=20$, and $\lambda=0.1$. A third curve 1510 was generated using recommendation application 122, and a fourth curve 1511 was generated using AWLS. Referring to FIG. 15C, a precision value as a function of time is shown for $|F_2|=20$, and $\lambda=0.1$. A fifth curve 1520 was generated using recommendation application 122, and a sixth curve 1521 was generated using AWLS. Referring to FIG. 15D, a recall value as a function of time is shown for $|F_2|=20$, and $\lambda=0.1$. A seventh curve 1530 was generated using recommendation application 122, and an eighth curve 1531 was generated using AWLS.

Figure 16C:
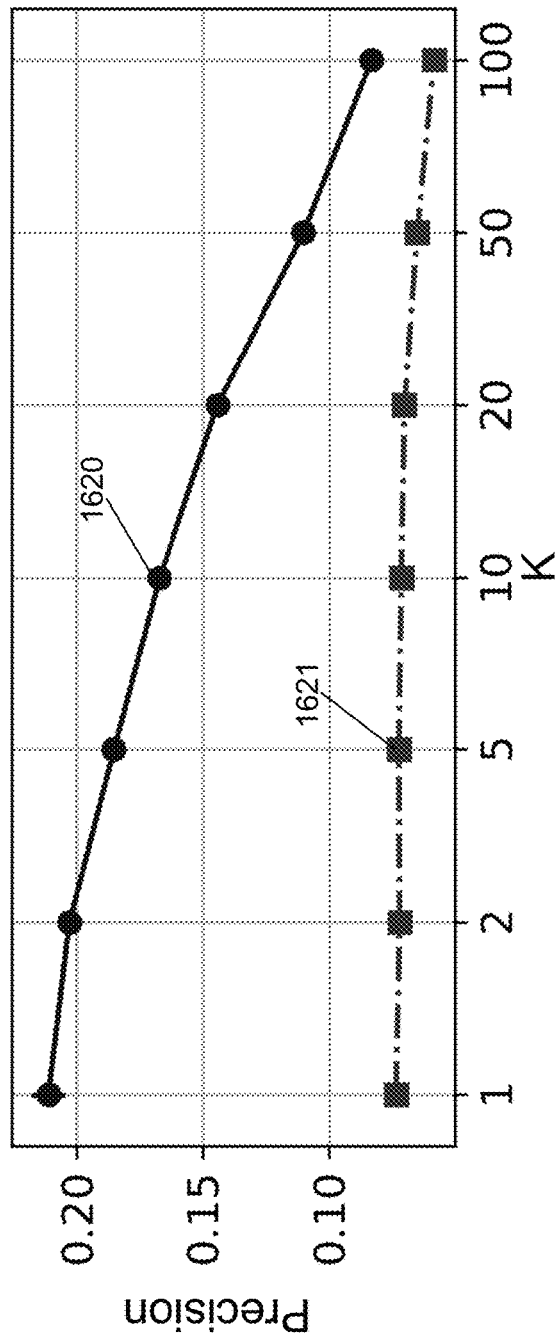
FIG. 16C shows a precision value comparison with the dataset, $|F_2|=20$, and $\lambda=1$ in accordance with an illustrative embodiment.
Figure 16D:
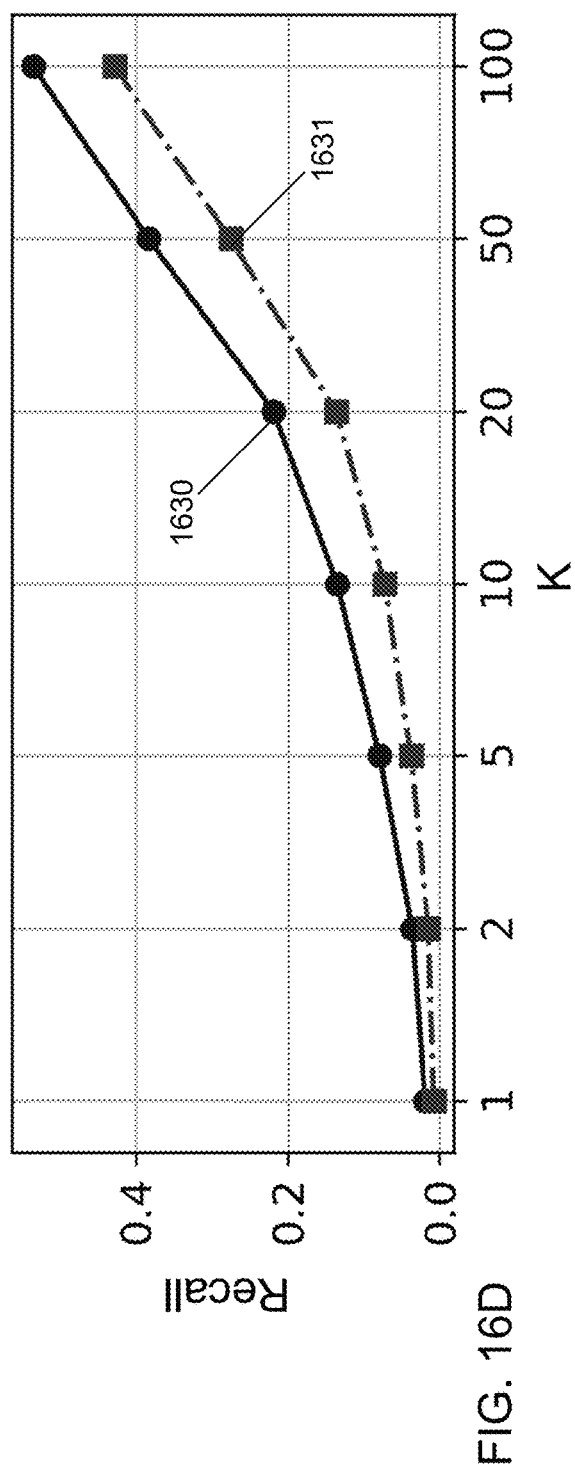
FIG. 16D shows a recall value comparison with the dataset, $|F_2|=20$, and $\lambda=1$ in accordance with an illustrative embodiment.

Referring to FIG. 16A, a comparison of a training objective function as a function of time is shown for $|F_2|=20$, and $\lambda=1$. A first curve 1600 was generated using recommendation application 122, and a second curve 1601 was generated using AWLS. Referring to FIG. 16B, an AUC value as a function of time is shown for $|F_2|=20$, and $\lambda=1$. A third curve 1610 was generated using recommendation application 122, and a fourth curve 1611 was generated using AWLS. Referring to FIG. 16C, a precision value as a function of time is shown for $|F_2|=20$, and $\lambda=1$. A fifth curve 1620 was generated using recommendation application 122, and a sixth curve 1621 was generated using AWLS. Referring to FIG. 16D, a recall value as a function of time is shown for $|F_2|=20$, and $\lambda=1$. A seventh curve 1630 was generated using recommendation application 122, and an eighth curve 1631 was generated using AWLS.

Figure 17A:
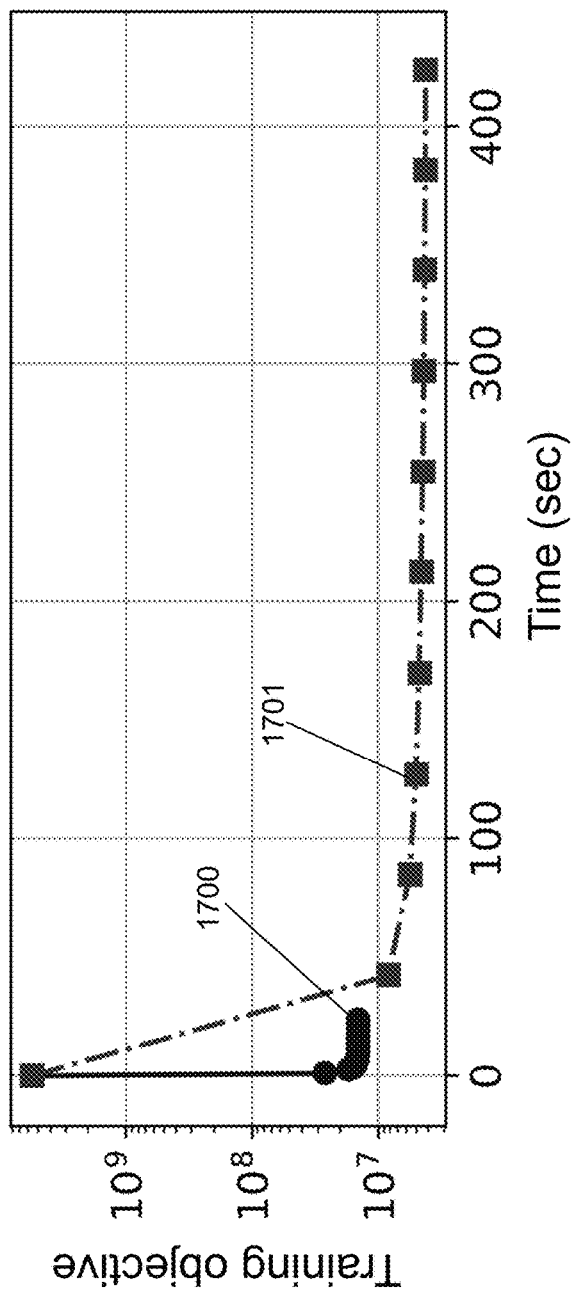
FIG. 17A shows a training objective function value comparison with a dataset, $|F_2|=20$, and $\lambda=10$ in accordance with an illustrative embodiment.
Figure 17B:
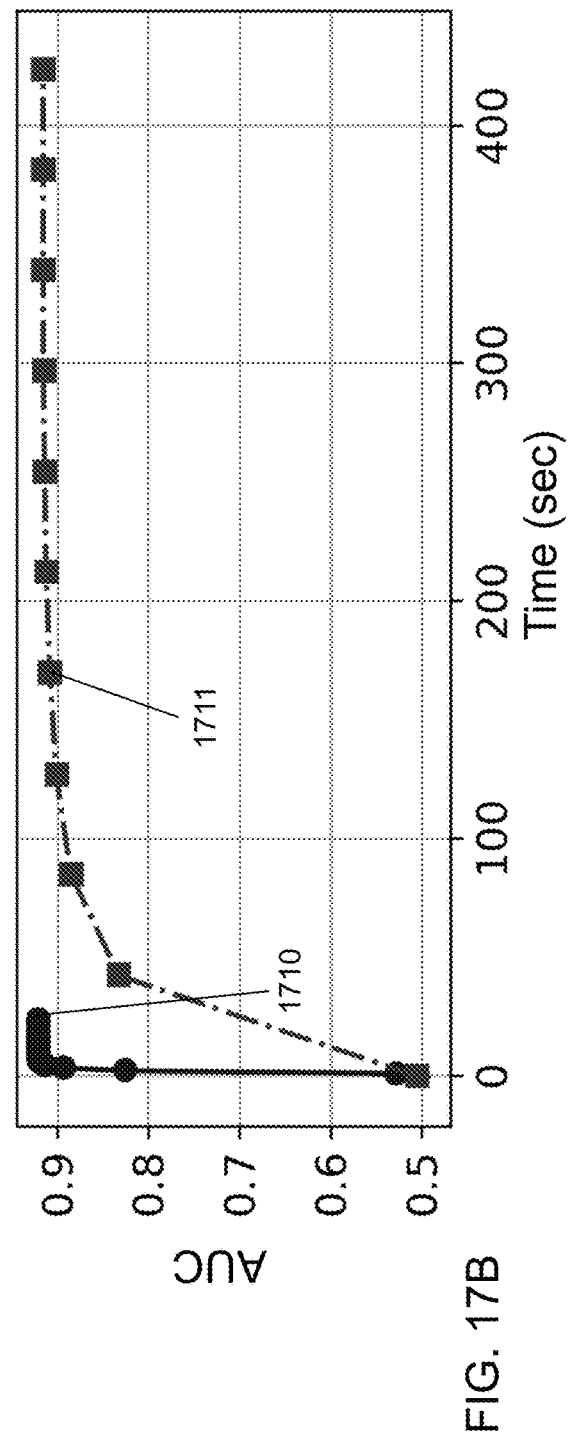
FIG. 17B shows an AUC value comparison with the dataset, $|F_2|=20$, and $\lambda=10$ in accordance with an illustrative embodiment.
Figure 17C:
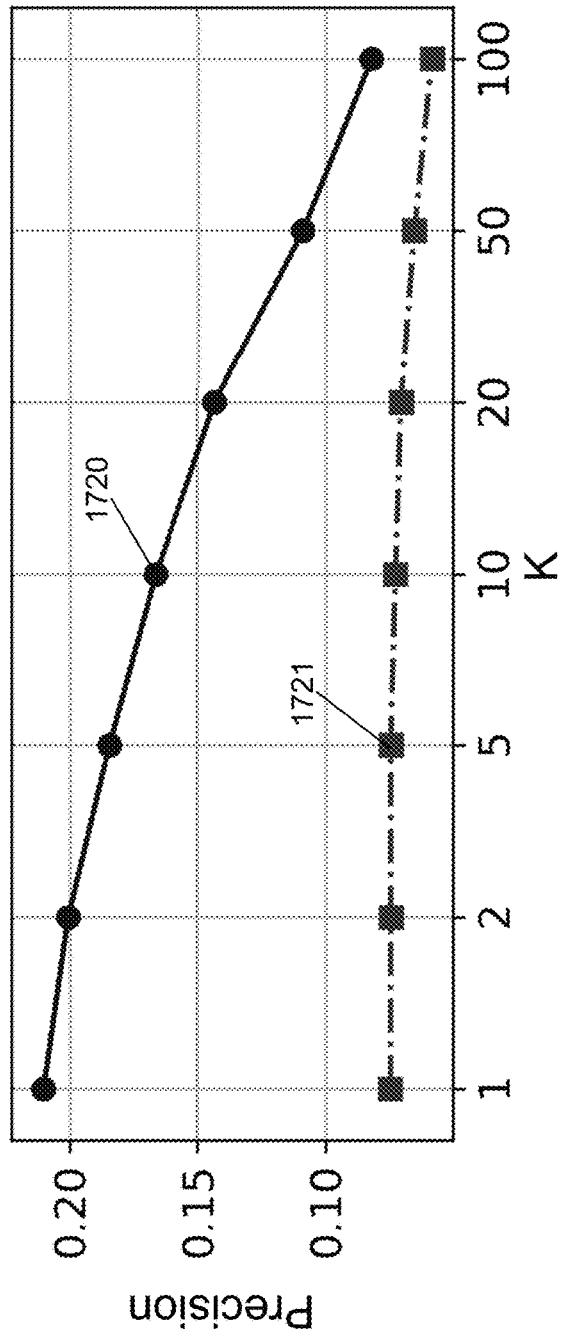
FIG. 17C shows a precision value comparison with the dataset, $|F_2|=20$, and $\lambda=10$ in accordance with an illustrative embodiment.
Figure 17D:
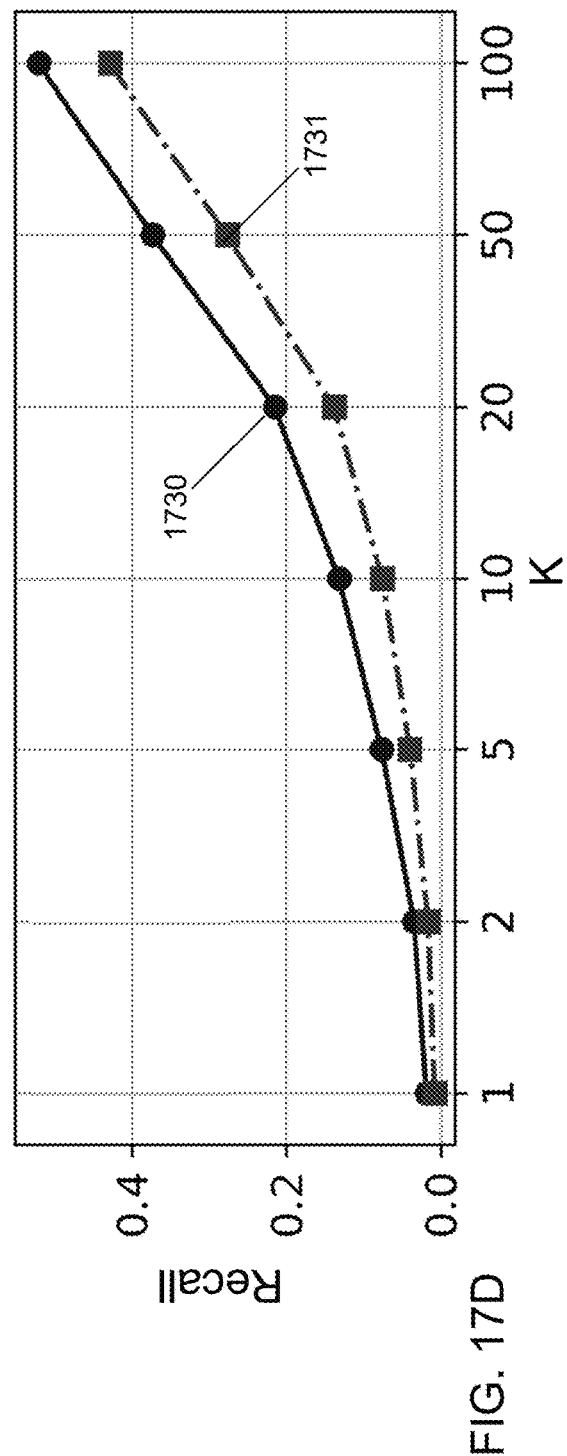
FIG. 17D shows a recall value comparison with the dataset, $|F_2|=20$, and $\lambda=10$ in accordance with an illustrative embodiment.

Referring to FIG. 17A, a comparison of a training objective function as a function of time is shown for $|F_2|=20$, and $\lambda=10$. A first curve 1700 was generated using recommendation application 122, and a second curve 1701 was generated using AWLS. Referring to FIG. 17B, an AUC value as a function of time is shown for $|F_2|=20$, and $\lambda=10$. A third curve 1710 was generated using recommendation application 122, and a fourth curve 1711 was generated using AWLS. Referring to FIG. 17C, a precision value as a function of time is shown for $|F_2|=20$, and $\lambda=10$. A fifth curve 1720 was generated using recommendation application 122, and a sixth curve 1721 was generated using AWLS. Referring to FIG. 17D, a recall value as a function of time is shown for $|F_2|=20$, and $\lambda=10$. A seventh curve 1730 was generated using recommendation application 122, and an eighth curve 1731 was generated using AWLS.

Figure 18A:
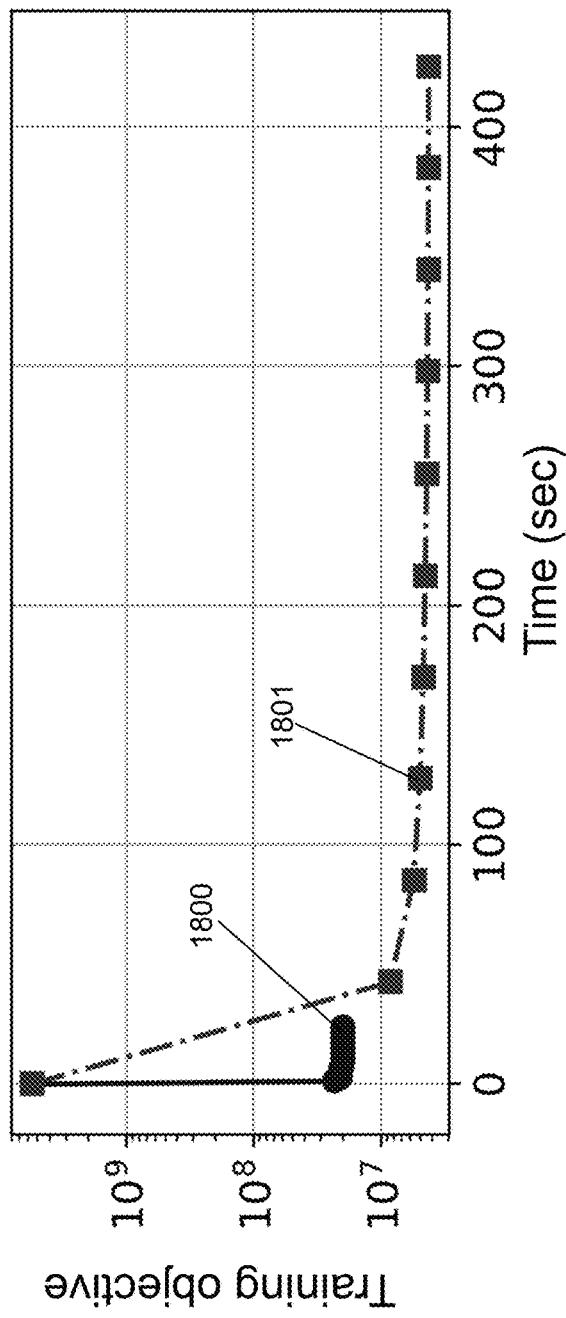
FIG. 18A shows a training objective function value comparison with a dataset, $|F_2|=20$, and $\lambda=100$ in accordance with an illustrative embodiment.
Figure 18B:
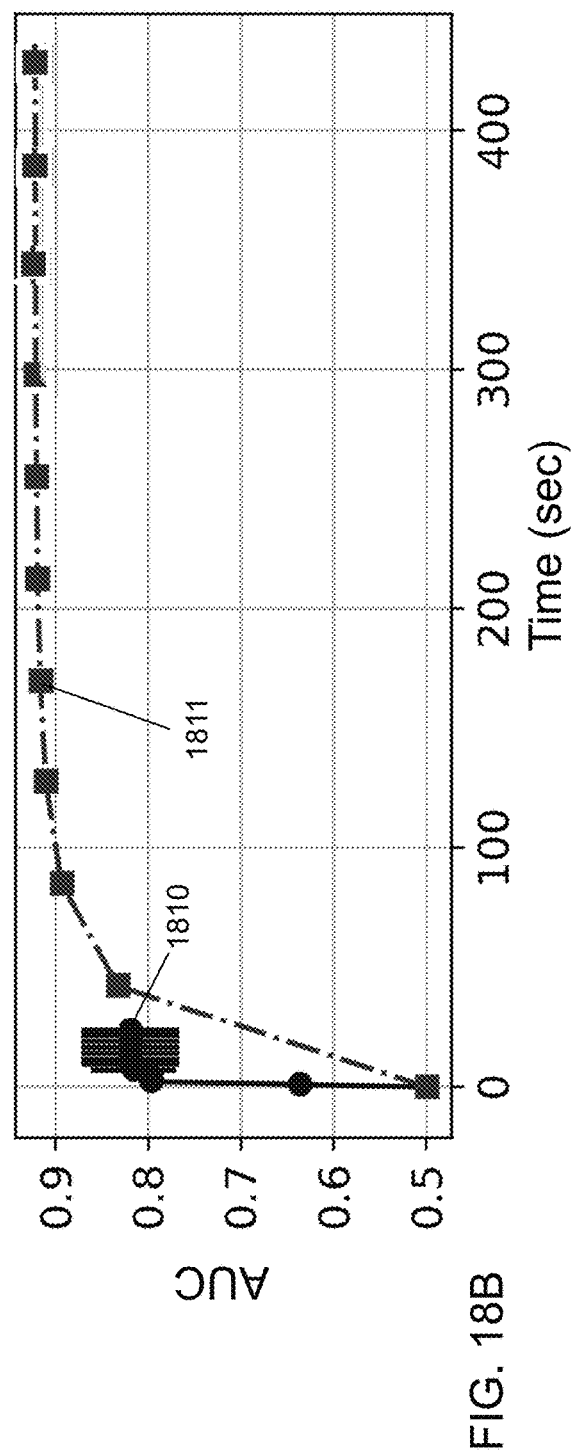
FIG. 18B shows an AUC value comparison with the dataset, $|F_2|=20$, and $\lambda=100$ in accordance with an illustrative embodiment.
Figure 18C:
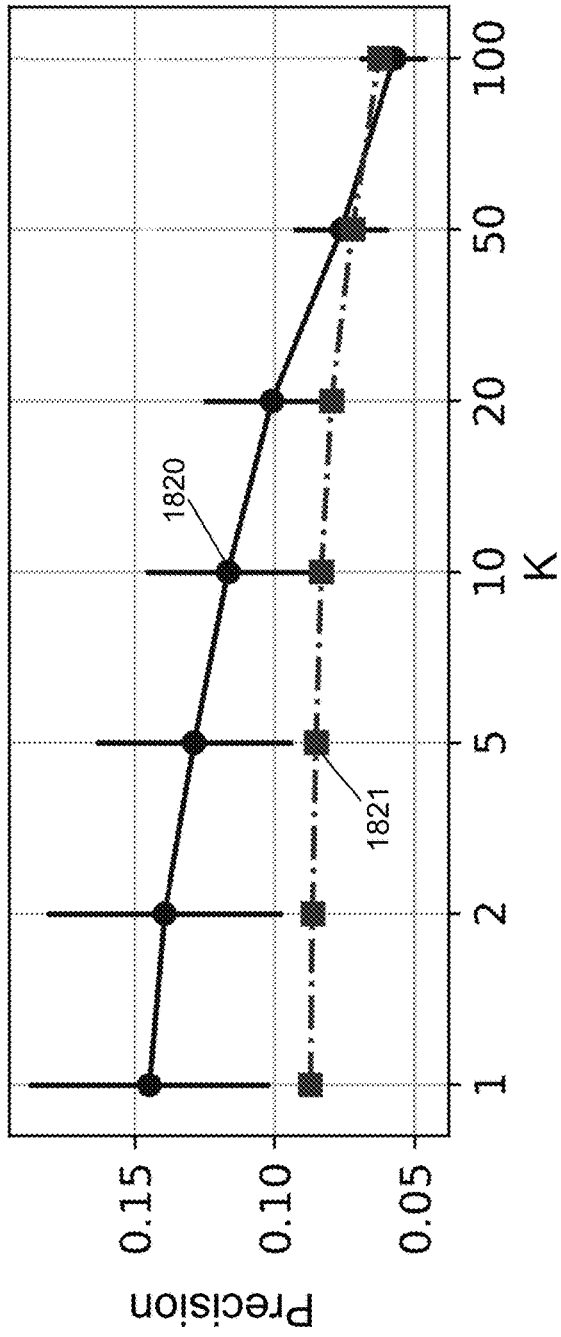
FIG. 18C shows a precision value comparison with the dataset, $|F_2|=20$, and $\lambda=100$ in accordance with an illustrative embodiment.
Figure 18D:
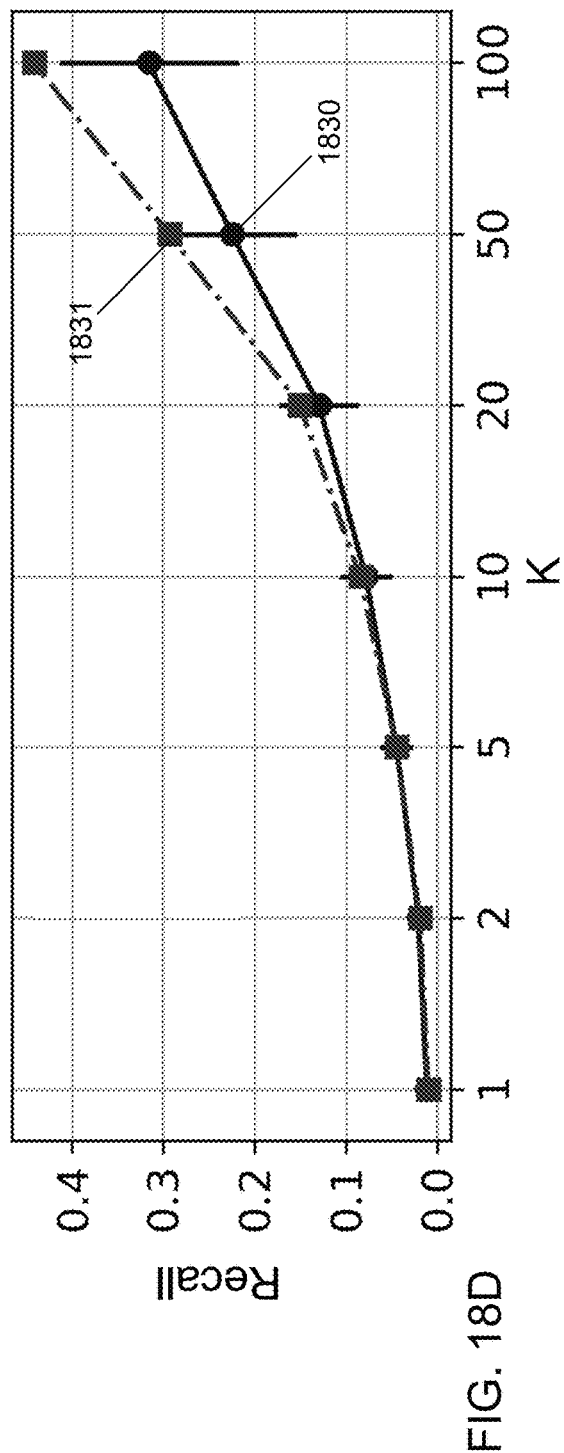
FIG. 18D shows a recall value comparison with the dataset, $|F_2|=20$, and $\lambda=100$ in accordance with an illustrative embodiment.

Referring to FIG. 18A, a comparison of a training objective function as a function of time is shown for $|F_2|=20$, and $\lambda=100$. A first curve 1800 was generated using recommendation application 122, and a second curve 1801 was generated using AWLS. Referring to FIG. 18B, an AUC value as a function of time is shown for $|F_2|=20$, and $\lambda=100$. A third curve 1810 was generated using recommendation application 122, and a fourth curve 1811 was generated using AWLS. Referring to FIG. 18C, a precision value as a function of time is shown for $|F_2|=20$, and $\lambda=100$. A fifth curve 1820 was generated using recommendation application 122, and a sixth curve 1821 was generated using AWLS. Referring to FIG. 18D, a recall value as a function of time is shown for $|F_2|=20$, and $\lambda=100$. A seventh curve 1830 generated using recommendation application 122, and an eighth curve 1831 was generated using AWLS.

Figure 19A:
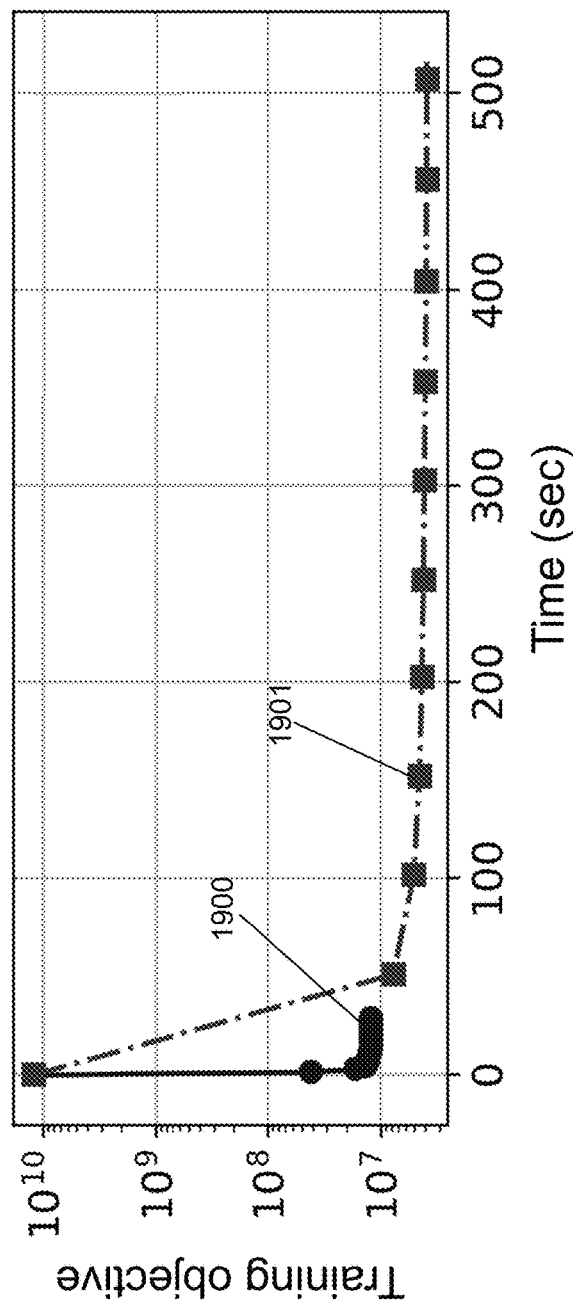
FIG. 19A shows a training objective function value comparison with a dataset, $|F_2|=30$, and $\lambda=0.01$ in accordance with an illustrative embodiment.
Figure 19B:
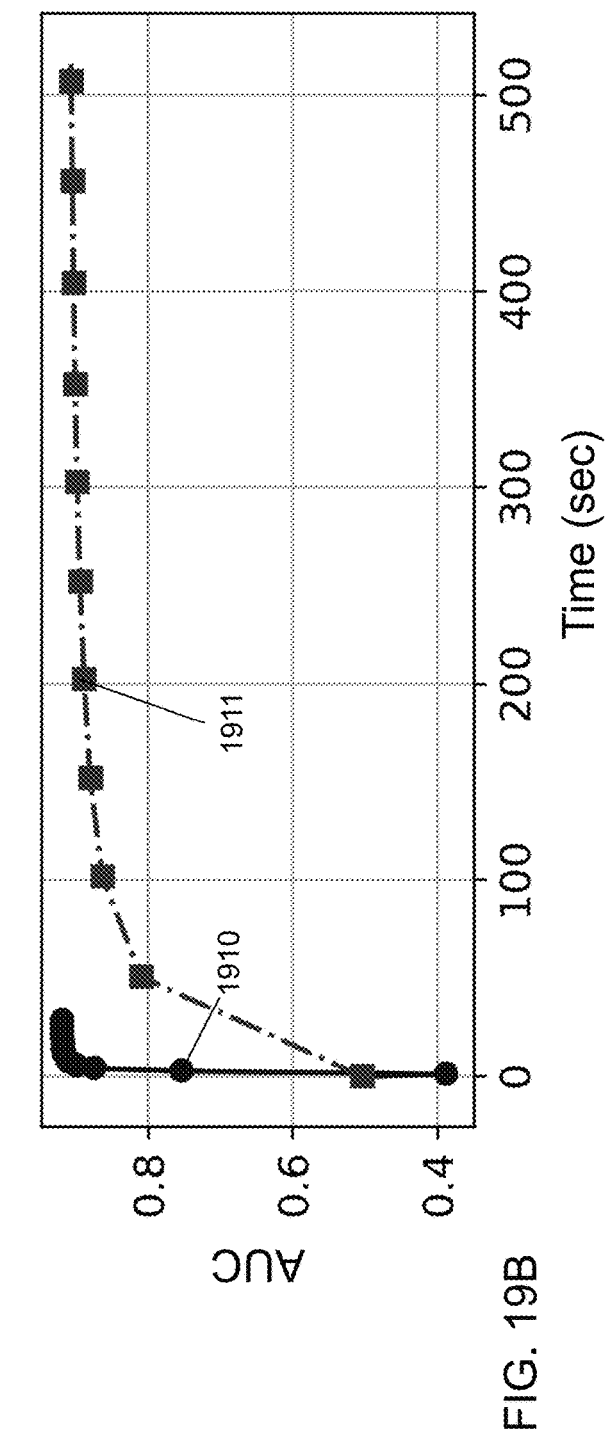
FIG. 19B shows an AUC value comparison with the dataset, $|F_2|=30$, and $\lambda=0.01$ in accordance with an illustrative embodiment.
Figure 19C:
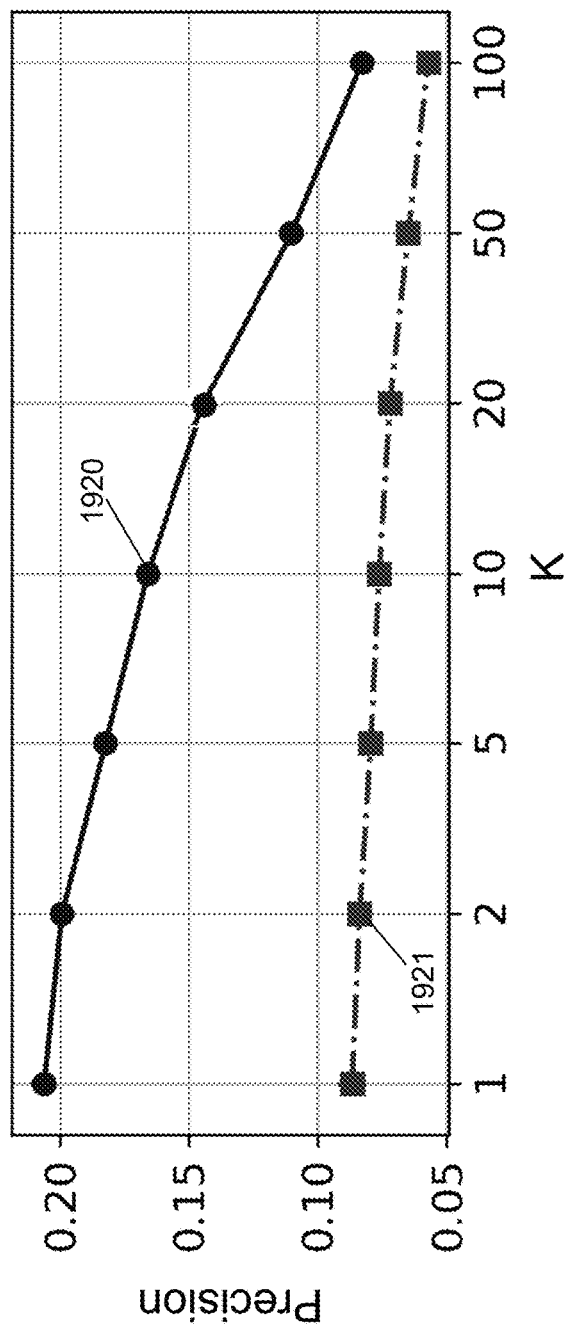
FIG. 19C shows a precision value comparison with the dataset, $|F_2|=30$, and $\lambda=0.01$ in accordance with an illustrative embodiment.
Figure 19D:
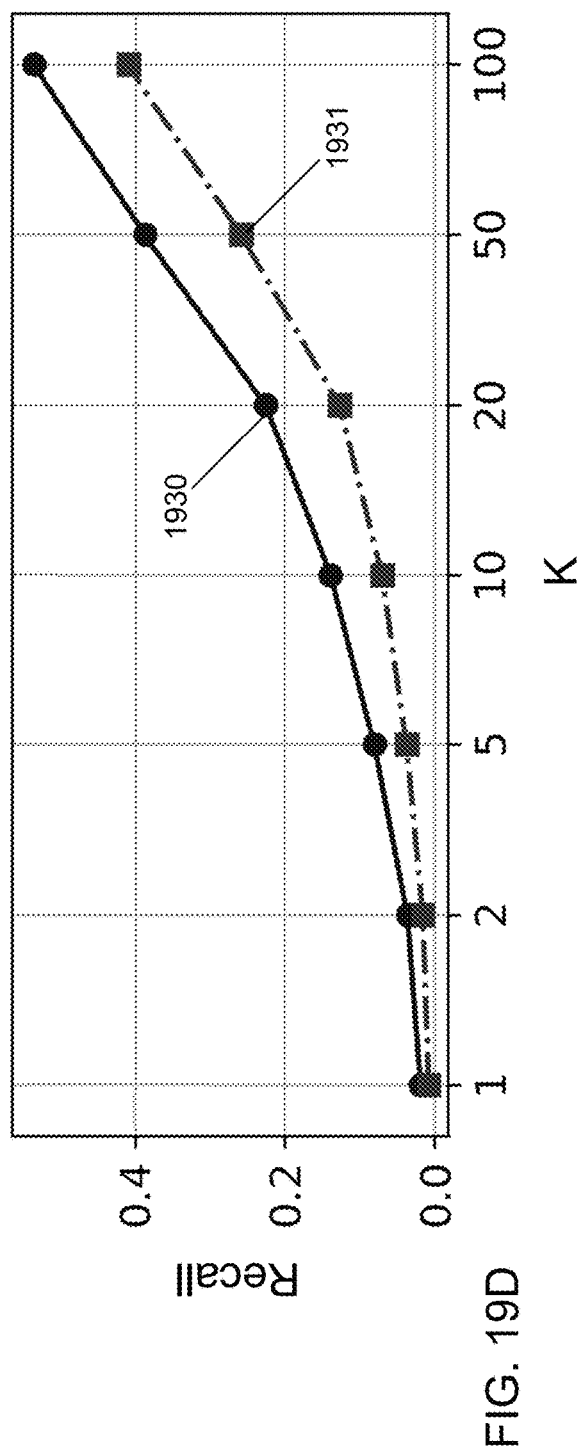
FIG. 19D shows a recall value comparison with the dataset, $|F_2|=30$, and $\lambda=0.01$ in accordance with an illustrative embodiment.

Referring to FIG. 19A, a comparison of a training objective function as a function of time is shown for $|F_2|=30$, and $\lambda=0.01$. A first curve 1900 was generated using recommendation application 122, and a second curve 1901 was generated using AWLS. Referring to FIG. 19B, an AUC value as a function of time is shown for $|F_2|=30$, and $\lambda=0.01$. A third curve 1910 was generated using recommendation application 122, and a fourth curve 1911 was generated using AWLS. Referring to FIG. 19C, a precision value as a function of time is shown for $|F_2|=30$, and $\lambda=0.01$. A fifth curve 1920 was generated using recommendation application 122, and a sixth curve 1921 was generated using AWLS. Referring to FIG. 19D, a recall value as a function of time is shown for $|F_2|=30$, and $\lambda=0.01$. A seventh curve 1930 was generated using recommendation application 122, and an eighth curve 1931 was generated using AWLS.

Figure 20A:
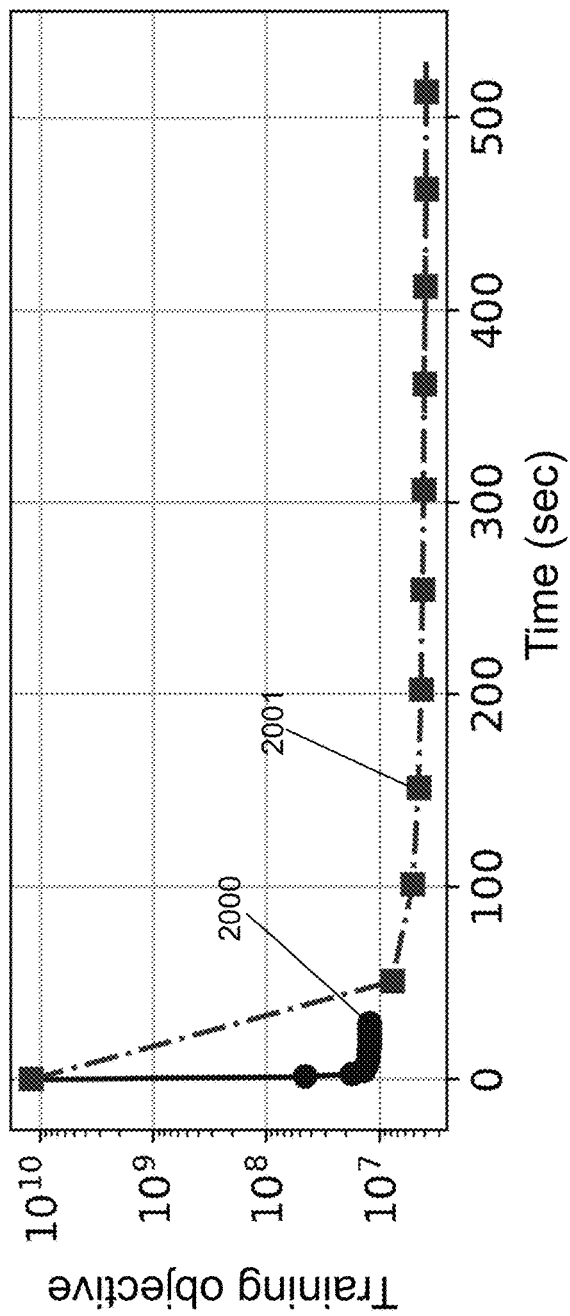
FIG. 20A shows a training objective function value comparison with a dataset, $|F_2|=30$, and $\lambda=0.1$ in accordance with an illustrative embodiment.
Figure 20B:
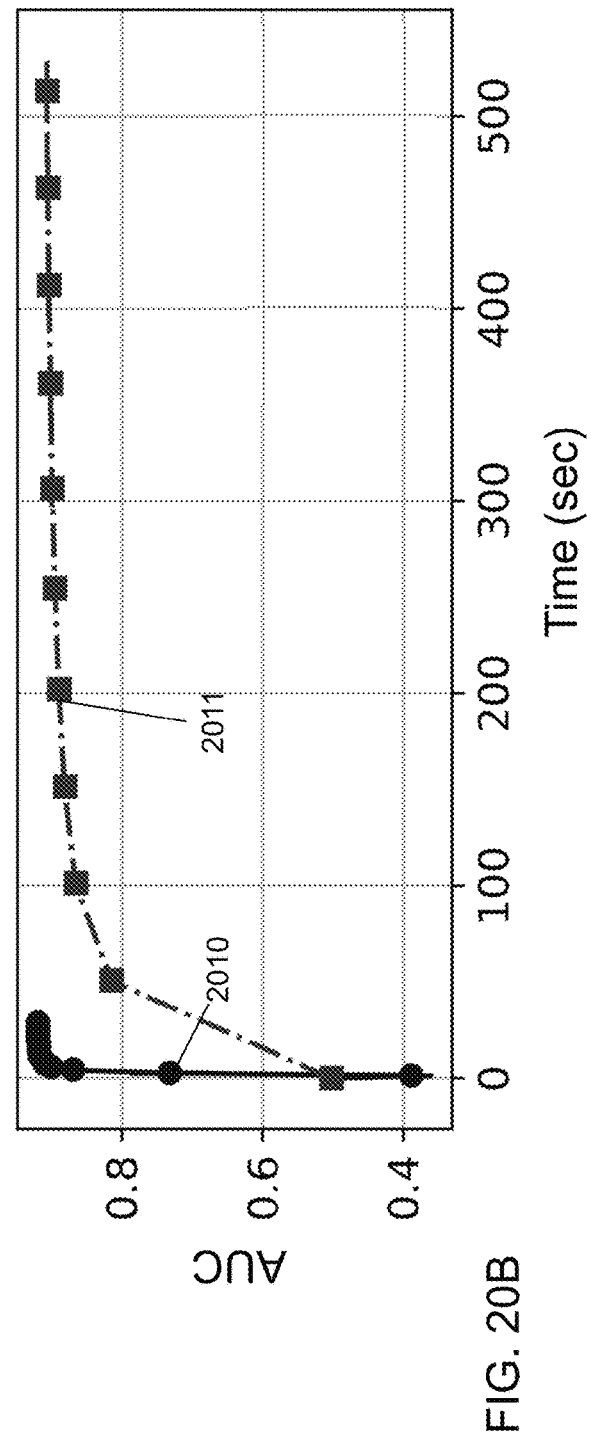
FIG. 20B shows an AUC value comparison with the dataset, $|F_2|=30$, and $\lambda=0.1$ in accordance with an illustrative embodiment.
Figure 20C:
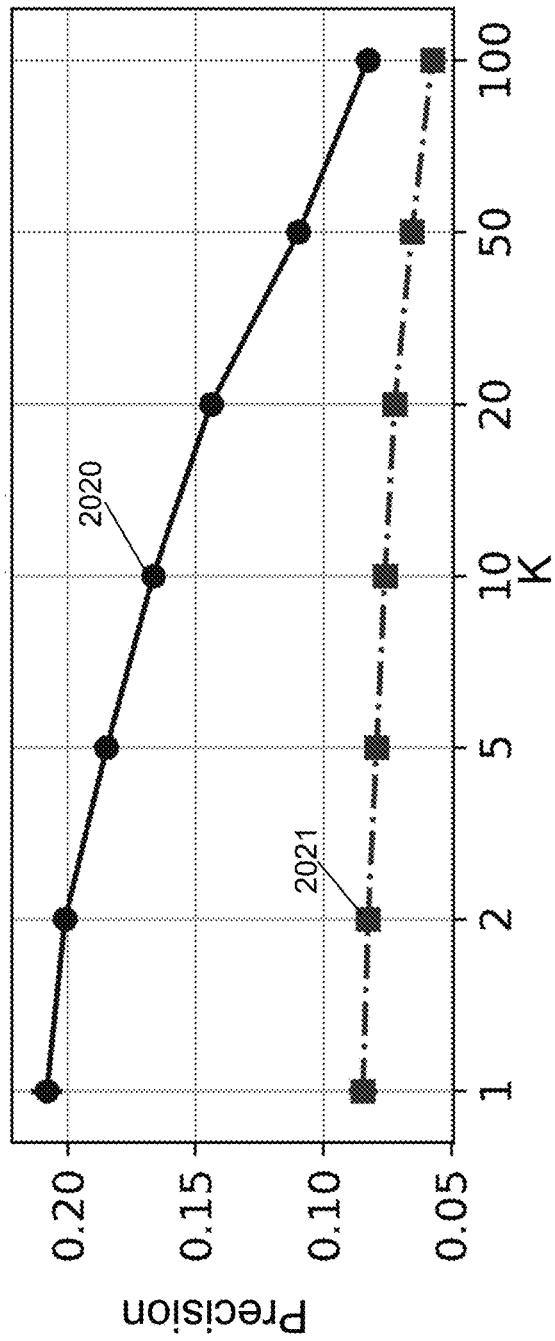
FIG. 20C shows a precision value comparison with the dataset, $|F_2|=30$, and $\lambda=0.1$ in accordance with an illustrative embodiment.
Figure 20D:
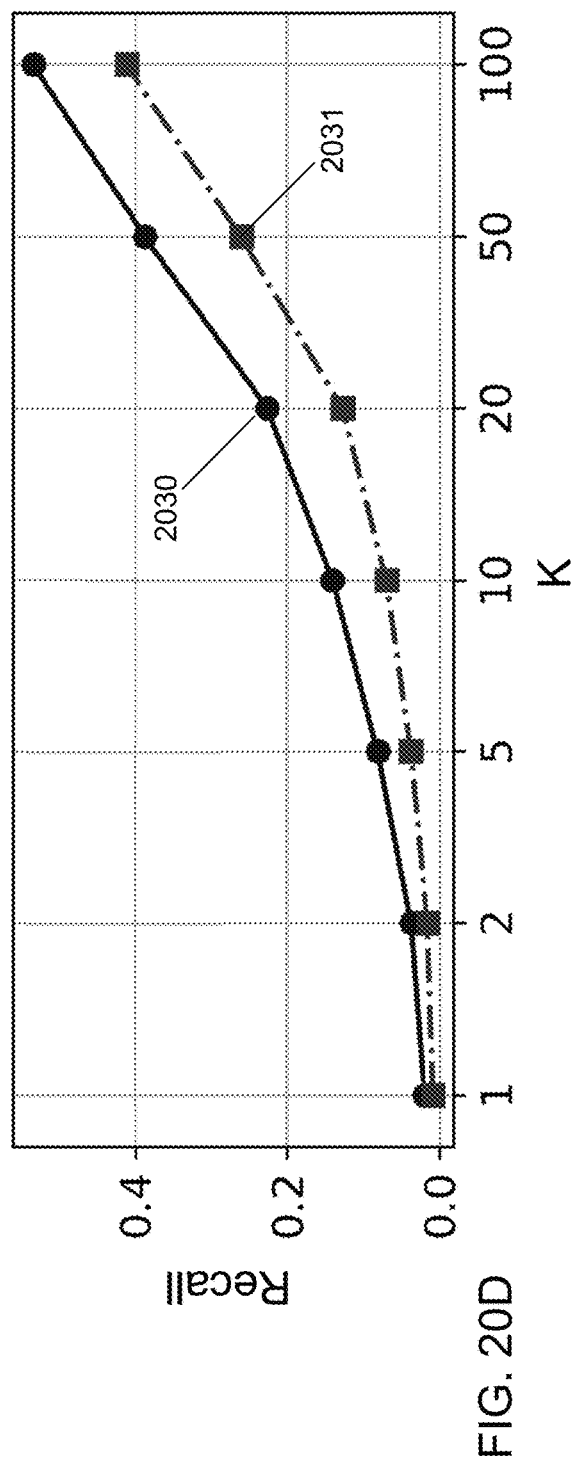
FIG. 20D shows a recall value comparison with the dataset, $|F_2|=30$, and $\lambda=0.1$ in accordance with an illustrative embodiment.

Referring to FIG. 20A, a comparison of a training objective function as a function of time is shown for $|F_2|=30$, and $\lambda=0.1$. A first curve 2000 was generated using recommendation application 122, and a second curve 2001 was generated using AWLS. Referring to FIG. 20B, an AUC value as a function of time is shown for $|F_2|=30$, and $\lambda=0.1$. A third curve 2010 was generated using recommendation application 122, and a fourth curve 2011 was generated using AWLS. Referring to FIG. 20C, a precision value as a function of time is shown for $|F_2|=30$, and $\lambda=0.1$. A fifth curve 2020 was generated using recommendation application 122, and a sixth curve 2021 was generated using AWLS. Referring to FIG. 20D, a recall value as a function of time is shown for $|F_2|=30$, and $\lambda=0.1$. A seventh curve 2030 was generated using recommendation application 122, and an eighth curve 2031 was generated using AWLS.

Figure 21A:
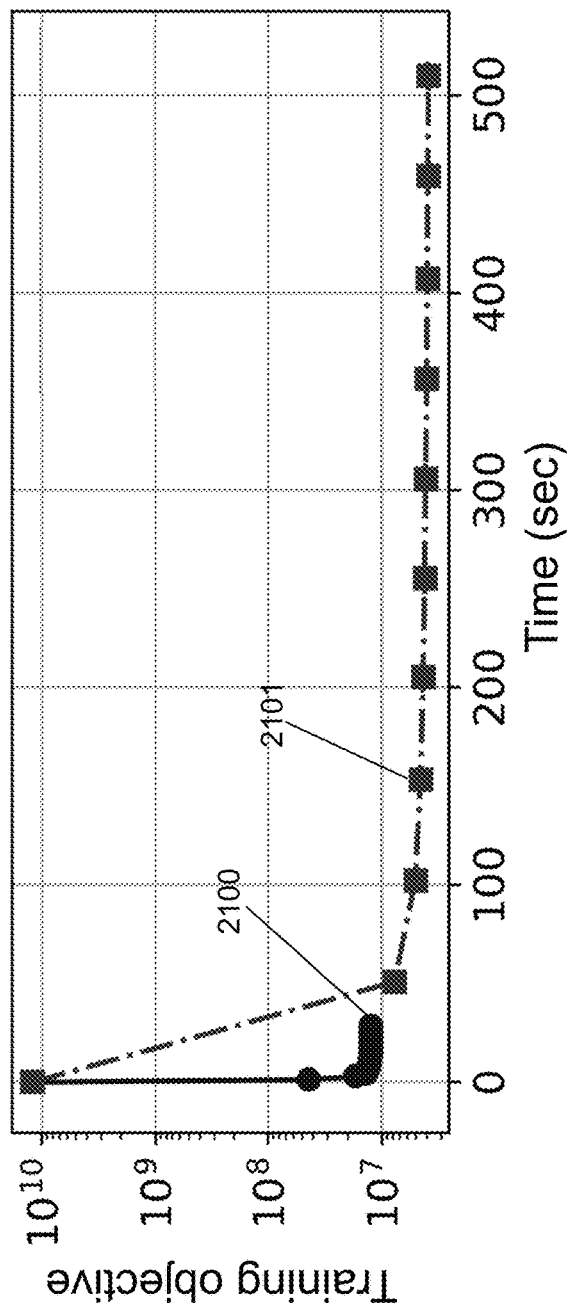
FIG. 21A shows a training objective function value comparison with a dataset, $|F_2|=30$, and $\lambda=1$ in accordance with an illustrative embodiment.
Figure 21B:
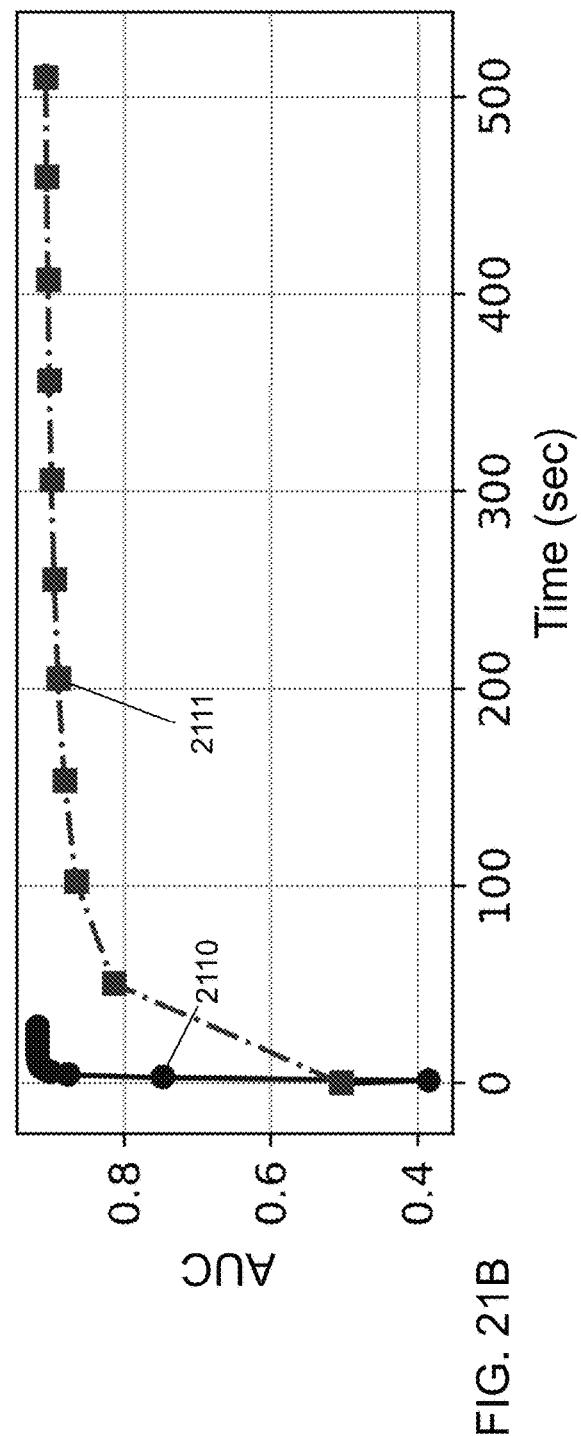
FIG. 21B shows an AUC value comparison with the dataset, $|F_2|=30$, and $\lambda=1$ in accordance with an illustrative embodiment.
Figure 21C:
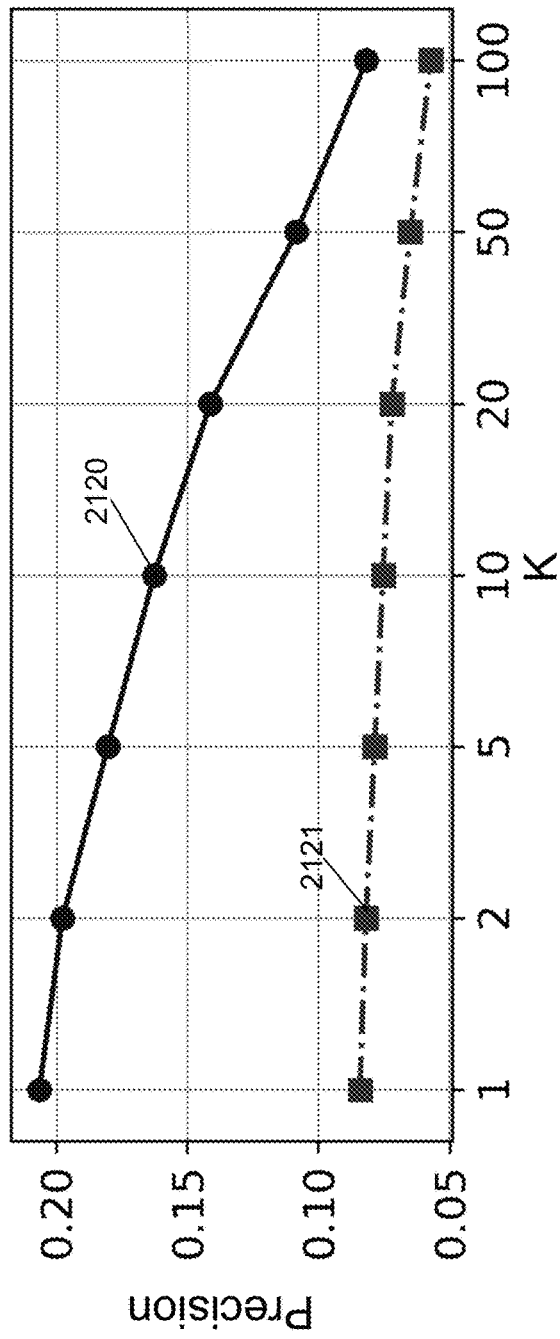
FIG. 21C shows a precision value comparison with the dataset, $|F_2|=30$, and $\lambda=1$ in accordance with an illustrative embodiment.
Figure 21D:
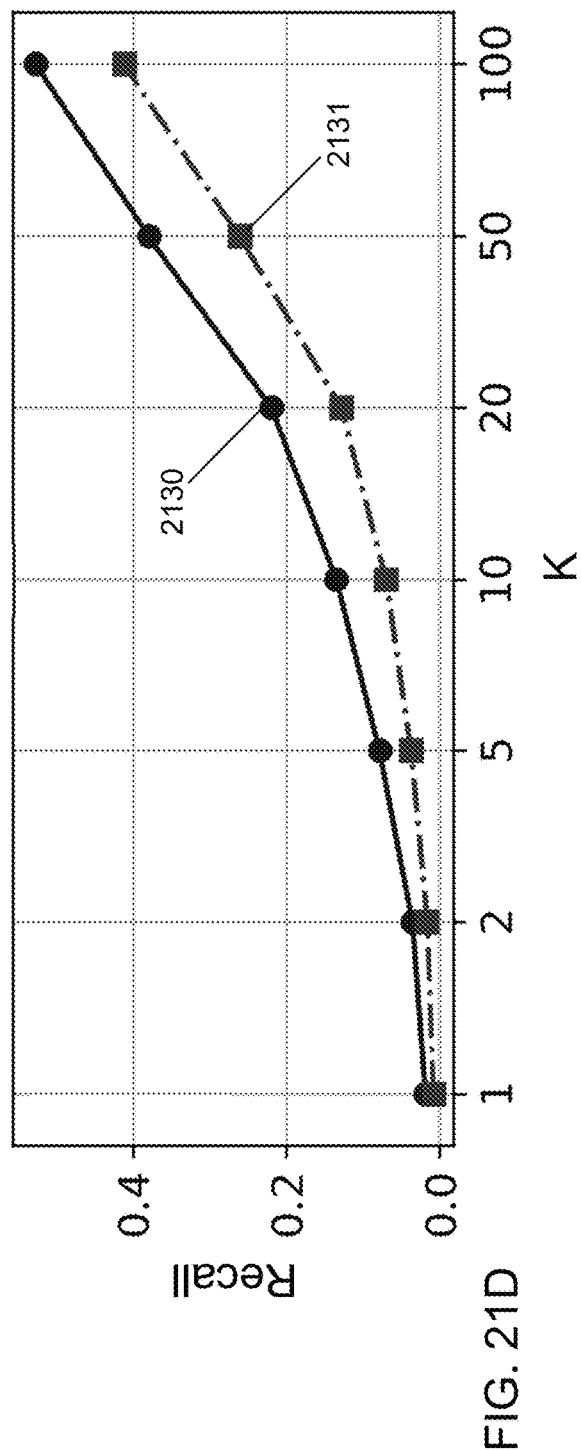
FIG. 21D shows a recall value comparison with the dataset, $|F_2|=30$, and $\lambda=1$ in accordance with an illustrative embodiment.

Referring to FIG. 21A, a comparison of a training objective function as a function of time is shown for $|F_2|=30$, and $\lambda=1$. A first curve 2100 was generated using recommendation application 122, and a second curve 2101 was generated using AWLS. Referring to FIG. 21B, an AUC value as a function of time is shown for $|F_2|=30$, and $\lambda=1$. A third curve 2110 was generated using recommendation application 122, and a fourth curve 2111 was generated using AWLS. Referring to FIG. 21C, a precision value as a function of time is shown for $|F_2|=30$, and $\lambda=1$. A fifth curve 2120 was generated using recommendation application 122, and a sixth curve 2121 was generated using AWLS. Referring to FIG. 21D, a recall value as a function of time is shown for $|F_2|=30$, and $\lambda=1$. A seventh curve 2130 was generated using recommendation application 122, and an eighth curve 2131 was generated using AWLS.

Figure 22A:
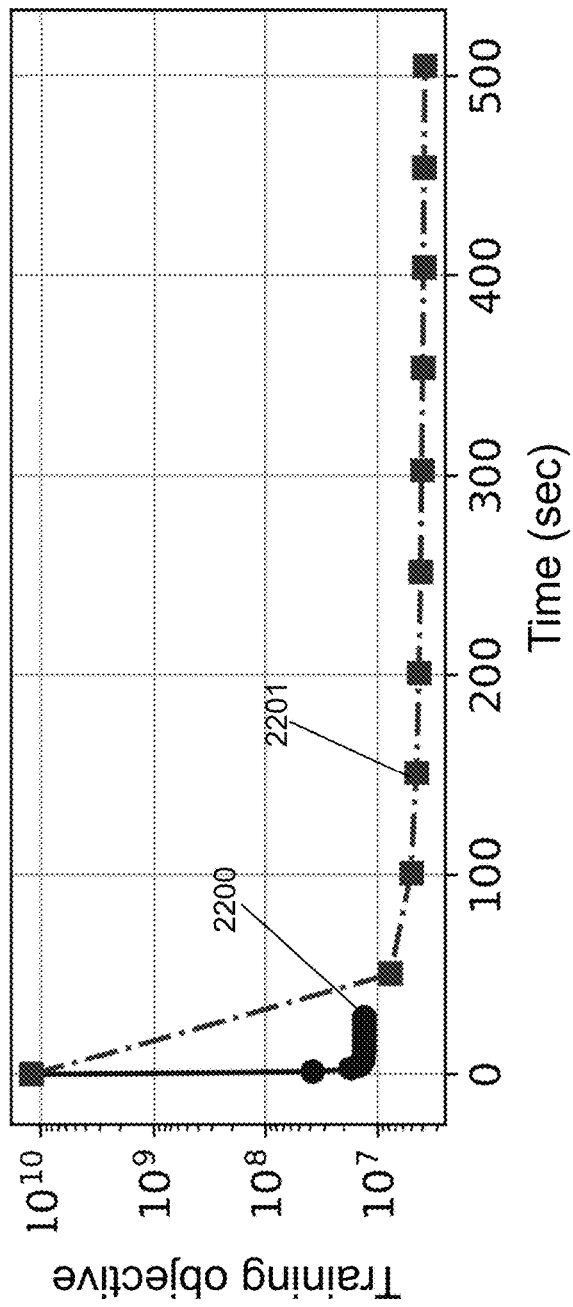
FIG. 22A shows a training objective function value comparison with a dataset, $|F_2|=30$, and $\lambda=10$ in accordance with an illustrative embodiment.
Figure 22B:
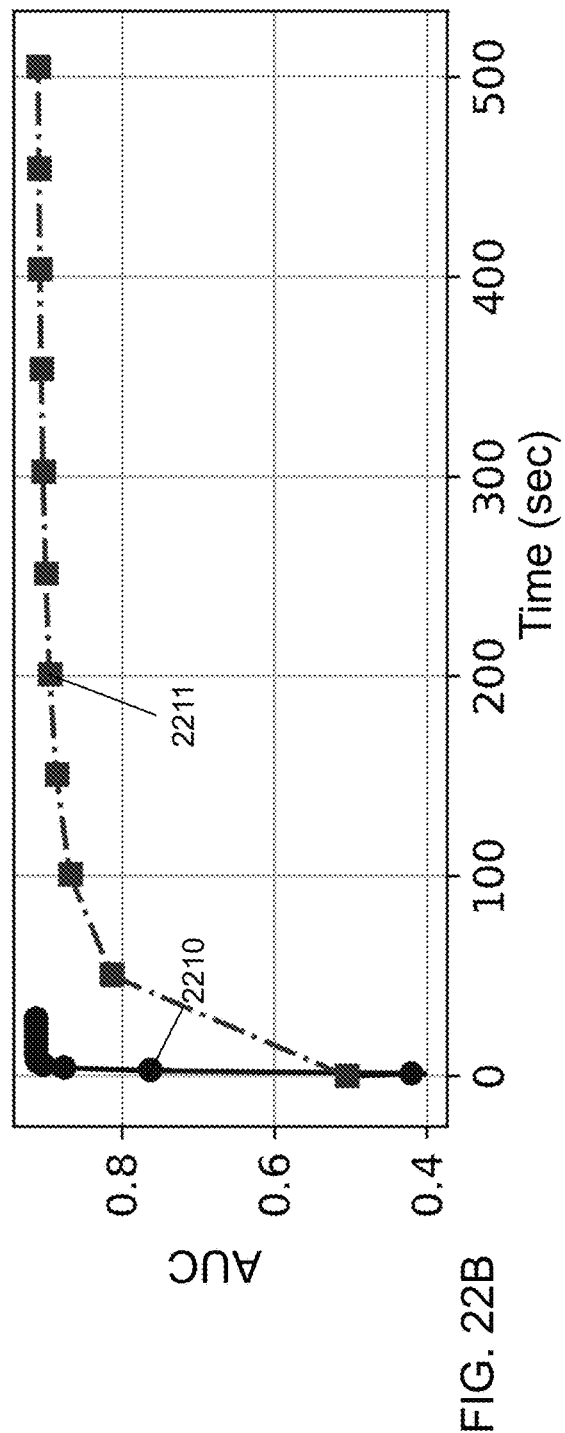
FIG. 22B shows an AUC value comparison with the dataset, $|F_2|=30$, and $\lambda=10$ in accordance with an illustrative embodiment.

Referring to FIG. 22A, a comparison of a training objective function as a function of time is shown for $|F_2|=30$, and $\lambda=10$. A first curve 2200 was generated using recommendation application 122, and a second curve 2201 was generated using AWLS. Referring to FIG. 22B, an AUC value as a function of time is shown for $|F_2|=30$, and $\lambda=10$. A third curve 2210 was generated using recommendation application 122, and a fourth curve 2211 was generated using AWLS. Referring to FIG. 22C, a precision value as a function of time is shown for $|F_2|=30$, and $\lambda=10$. A fifth curve 2220 was generated using recommendation application 122, and a sixth curve 2221 was generated using AWLS. Referring to FIG. 22D, a recall value as a function of time is shown for $|F_2|=30$, and $\lambda=10$. A seventh curve 2230 was generated using recommendation application 122, and an eighth curve 2231 was generated using AWLS.

Figure 23A:
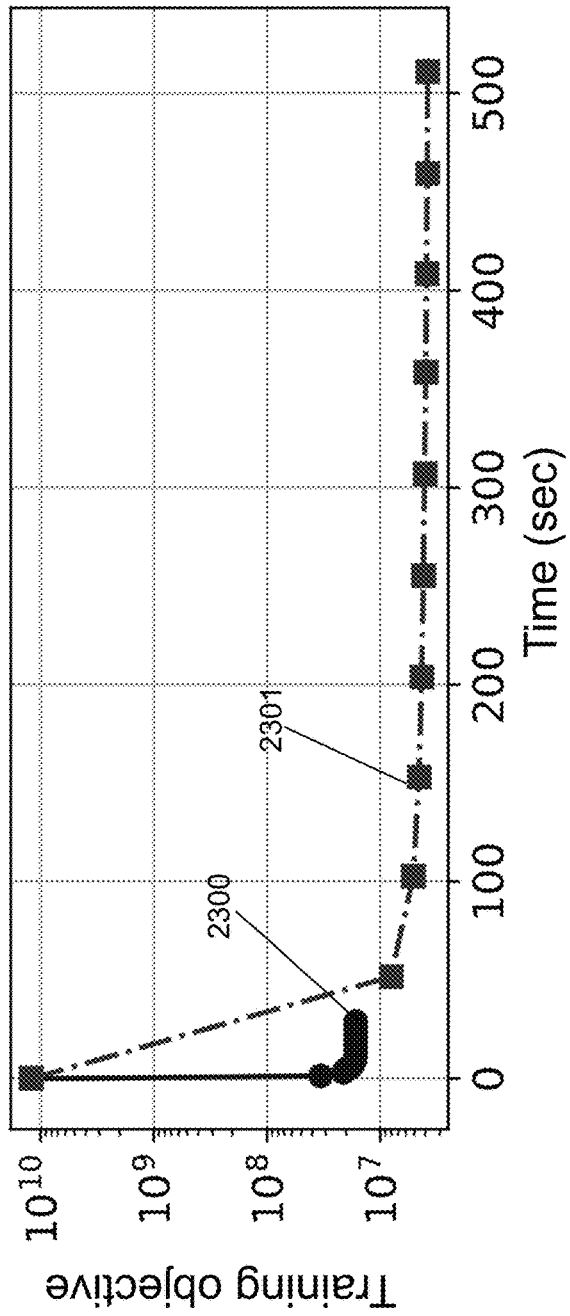
FIG. 23A shows a training objective function value comparison with a dataset, $|F_2|=30$, and $\lambda=100$ in accordance with an illustrative embodiment.
Figure 23B:
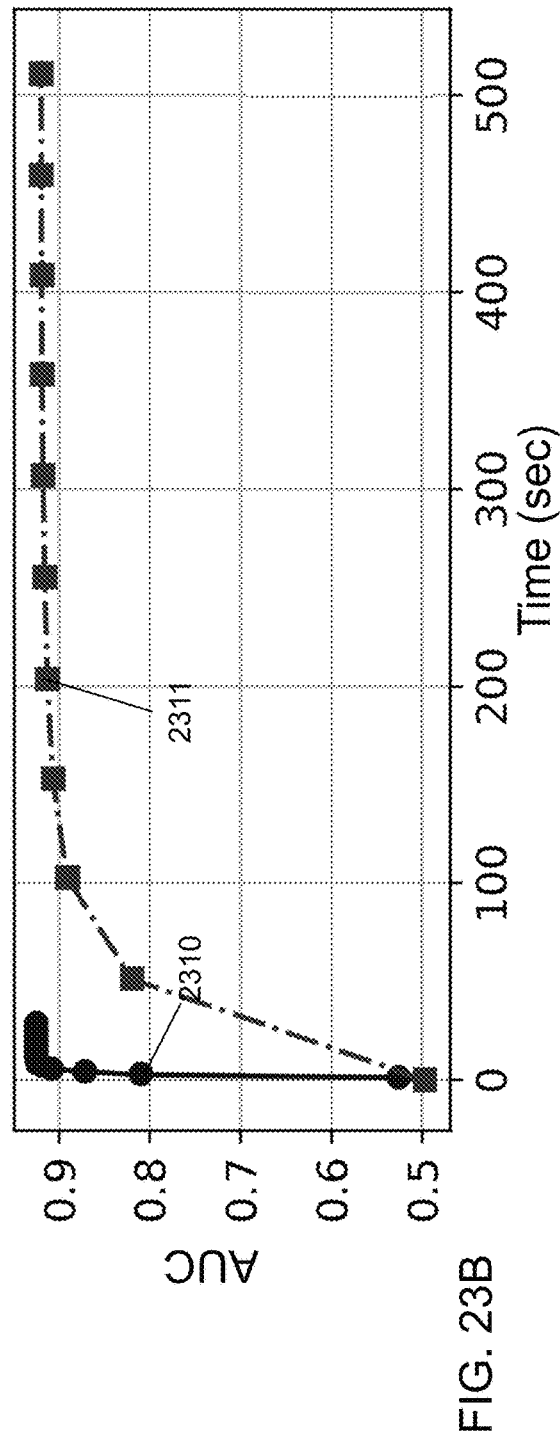
FIG. 23B shows an AUC value comparison with the dataset, $|F_2|=30$, and $\lambda=100$ in accordance with an illustrative embodiment.
Figure 23C:
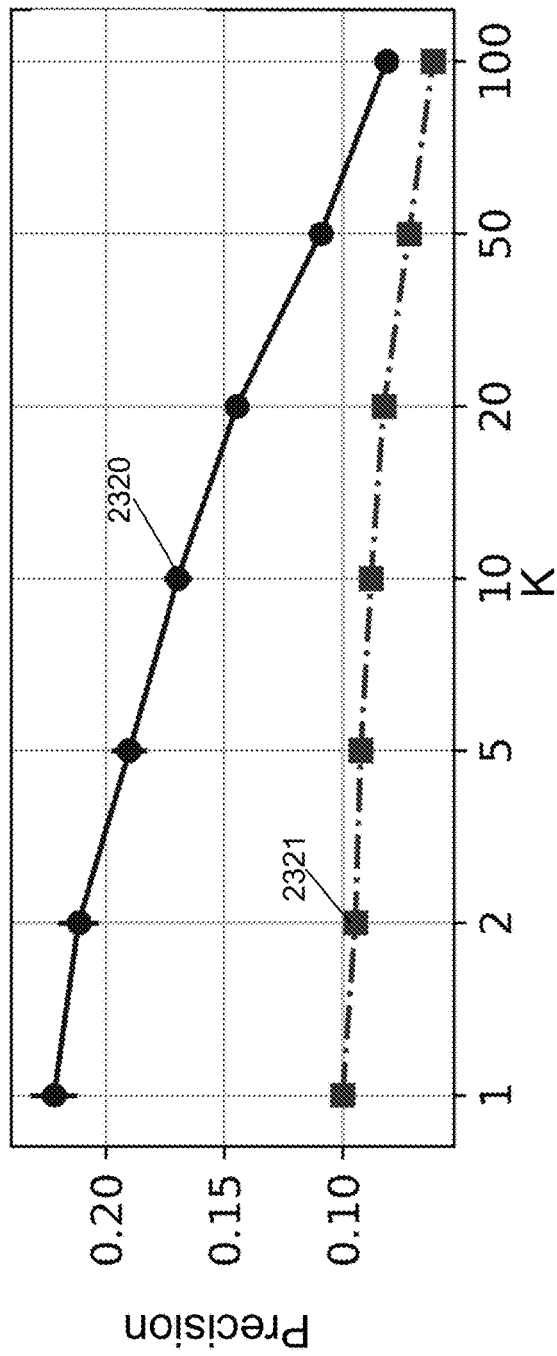
FIG. 23C shows a precision value comparison with the dataset, $|F_2|=30$, and $\lambda=100$ in accordance with an illustrative embodiment.
Figure 23D:
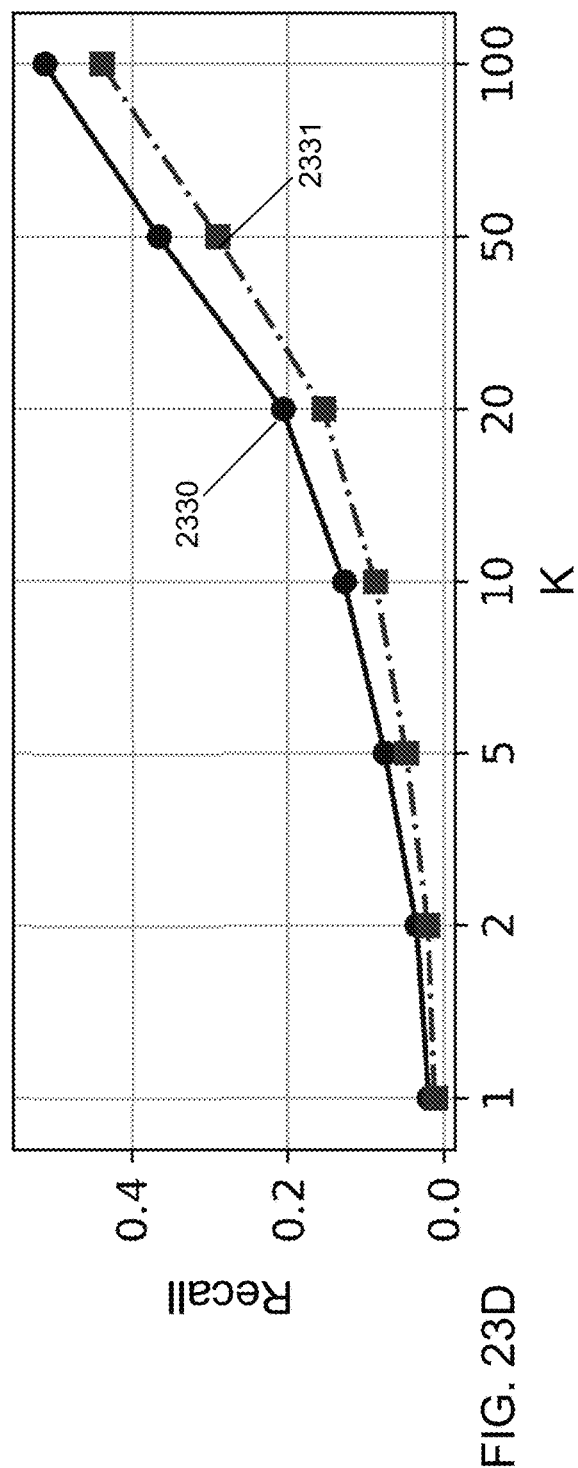
FIG. 23D shows a recall value comparison with the dataset, $|F_2|=30$, and $\lambda=100$ in accordance with an illustrative embodiment.

Referring to FIG. 23A, a comparison of a training objective function as a function of time is shown for $|F_2|=30$, and $\lambda=100$. A first curve 2300 was generated using recommendation application 122, and a second curve 2301 was generated using AWLS. Referring to FIG. 23B, an AUC value as a function of time is shown for $|F_2|=30$, and $\lambda=100$. A third curve 2310 was generated using recommendation application 122, and a fourth curve 2311 was generated using AWLS. Referring to FIG. 23C, a precision value as a function of time is shown for $|F_2|=30$, and $\lambda=100$. A fifth curve 2320 was generated using recommendation application 122, and a sixth curve 2321 was generated using AWLS. Referring to FIG. 23D, a recall value as a function of time is shown for $|F_2|=30$, and $\lambda=100$. A seventh curve 2330 was generated using recommendation application 122, and an eighth curve 2331 was generated using AWLS.

Figure 24A:
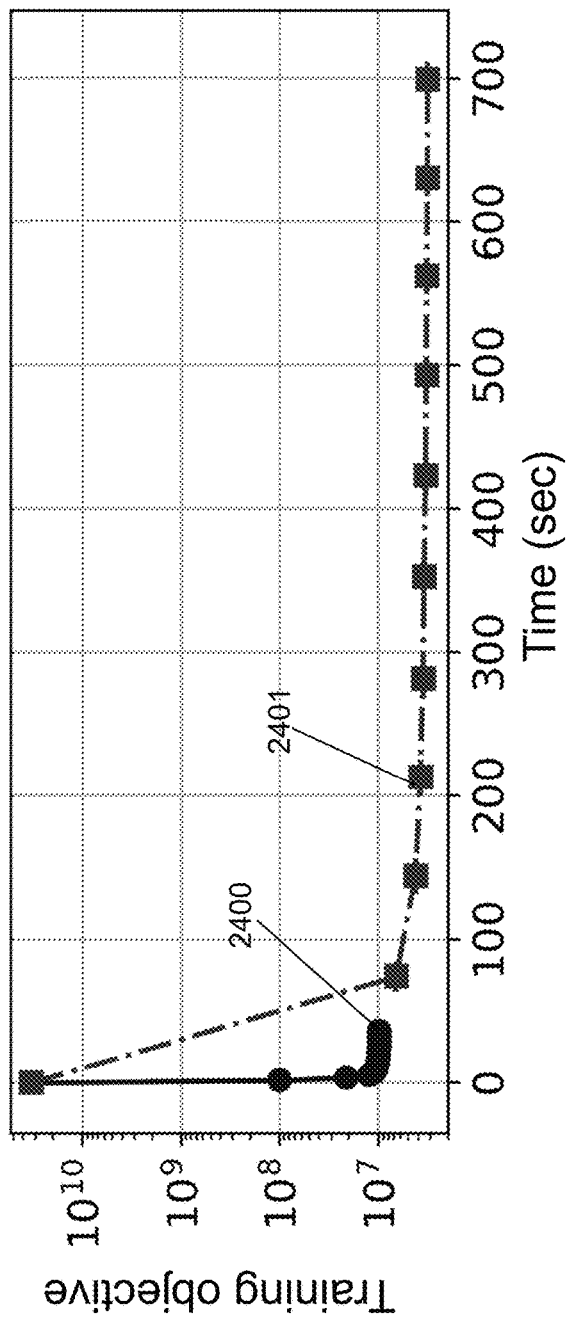
FIG. 24A shows a training objective function value comparison with a dataset, $|F_2|=50$, and $\lambda=0.01$ in accordance with an illustrative embodiment.
Figure 24B:
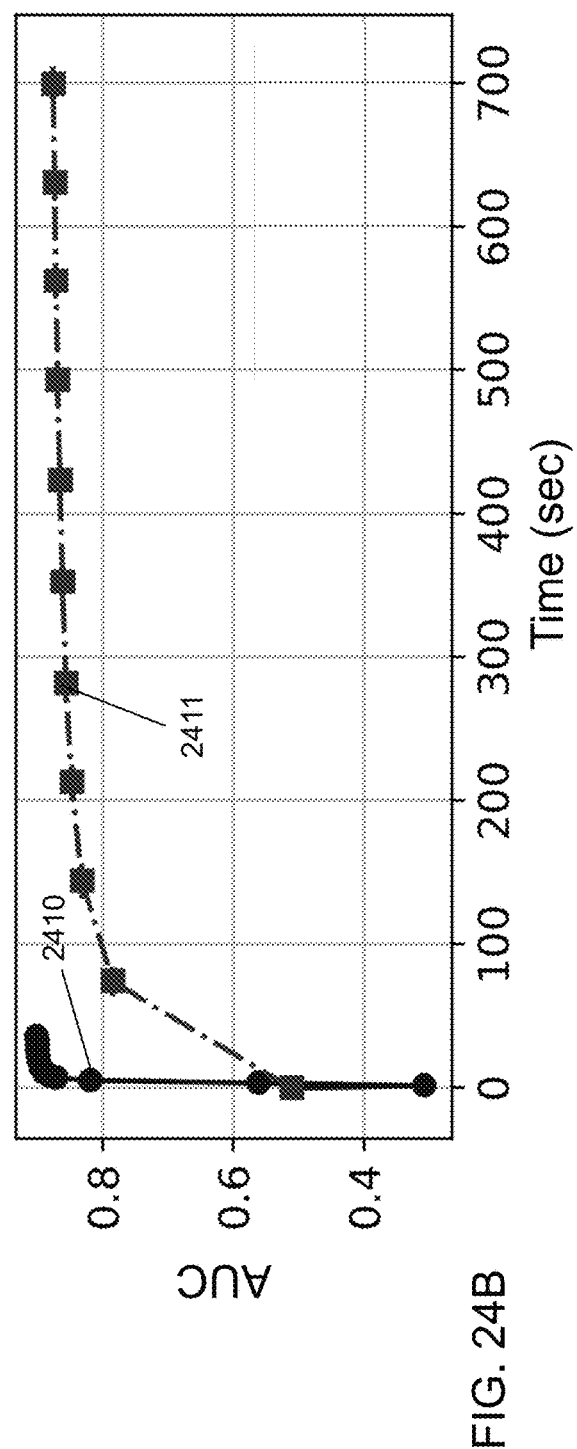
FIG. 24B shows an AUC value comparison with the dataset, $|F_2|=50$, and $\lambda=0.01$ in accordance with an illustrative embodiment.
Figure 24C:
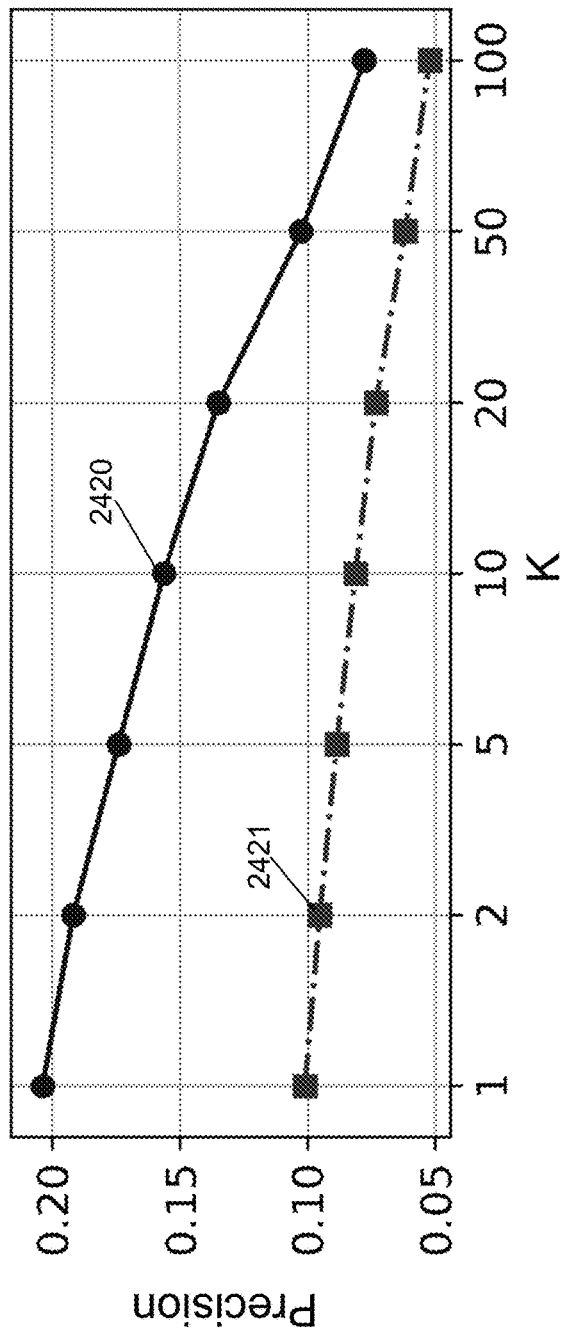
FIG. 24C shows a precision value comparison with the dataset, $|F_2|=50$, and $\lambda=0.01$ in accordance with an illustrative embodiment.
Figure 24D:
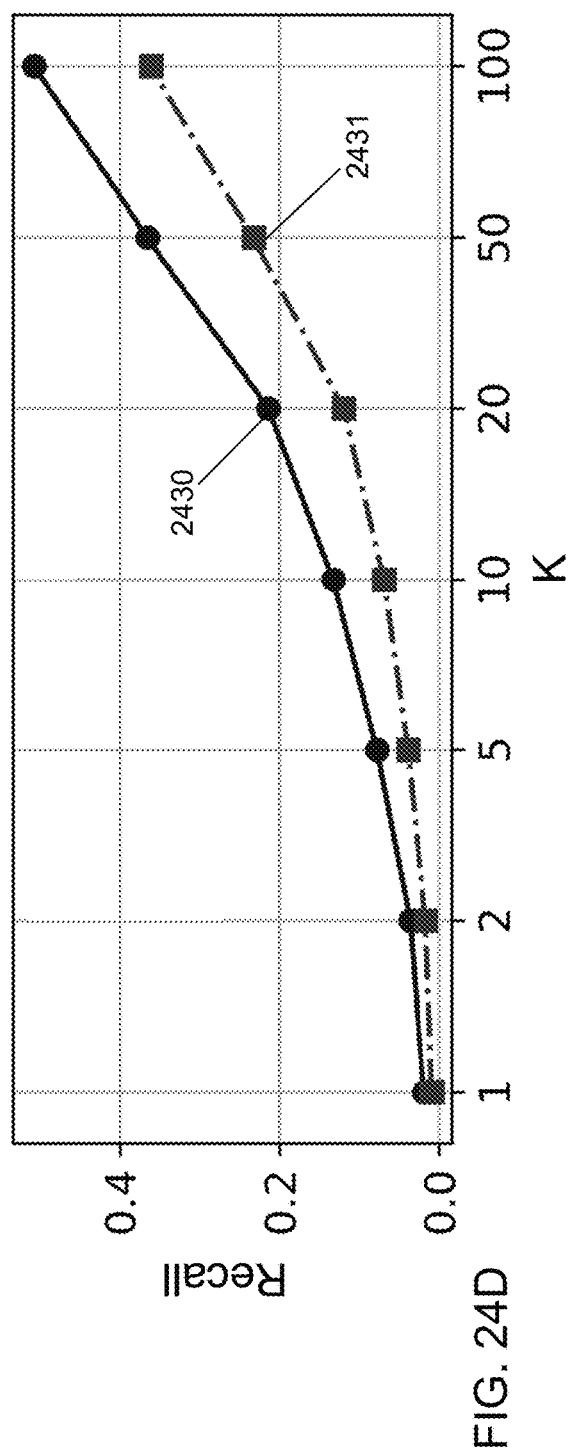
FIG. 24D shows a recall value comparison with the dataset, $|F_2|=50$, and $\lambda=0.01$ in accordance with an illustrative embodiment.

Referring to FIG. 24A, a comparison of a training objective function as a function of time is shown for $|F_2|=50$, and $\lambda=0.01$. A first curve 2400 was generated using recommendation application 122, and a second curve 2401 was generated using AWLS. Referring to FIG. 24B, an AUC value as a function of time is shown for $|F_2|=50$, and $\lambda=0.01$. A third curve 2410 was generated using recommendation application 122, and a fourth curve 2411 was generated using AWLS. Referring to FIG. 24C, a precision value as a function of time is shown for $|F_2|=50$, and $\lambda=0.01$. A fifth curve 2420 was generated using recommendation application 122, and a sixth curve 2421 was generated using AWLS. Referring to FIG. 24D, a recall value as a function of time is shown for $|F_2|=50$, and $\lambda=0.01$. A seventh curve 2430 was generated using recommendation application 122, and an eighth curve 2431 was generated using AWLS.

Figure 25A:
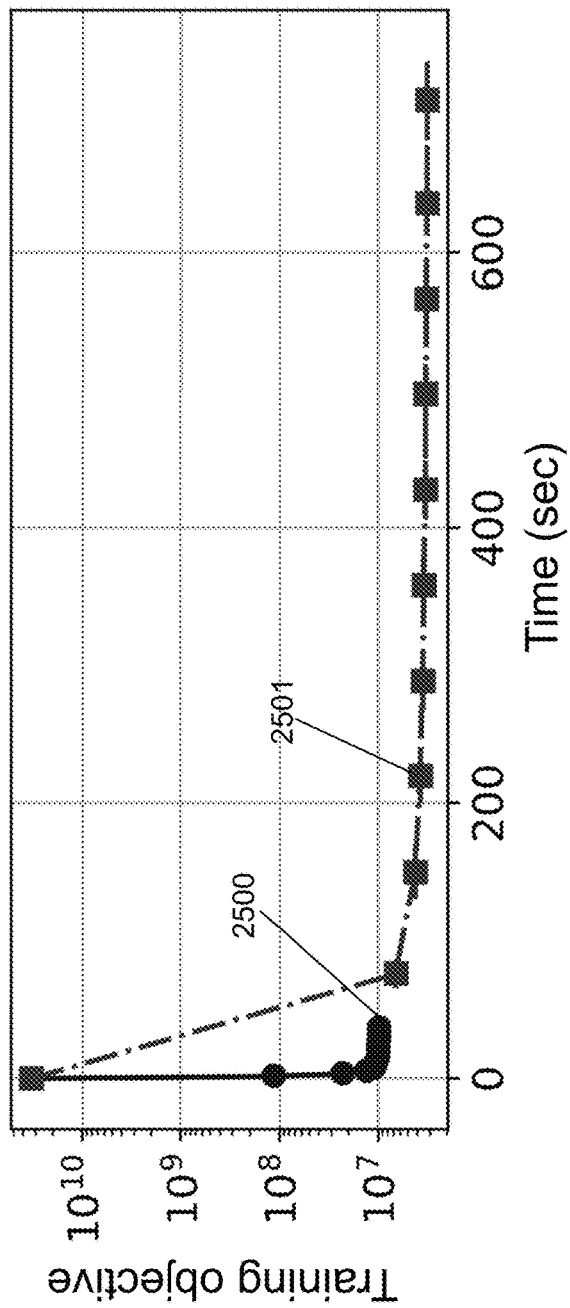
FIG. 25A shows a training objective function value comparison with a dataset, $|F_2|=50$, and $\lambda=0.1$ in accordance with an illustrative embodiment.
Figure 25B:
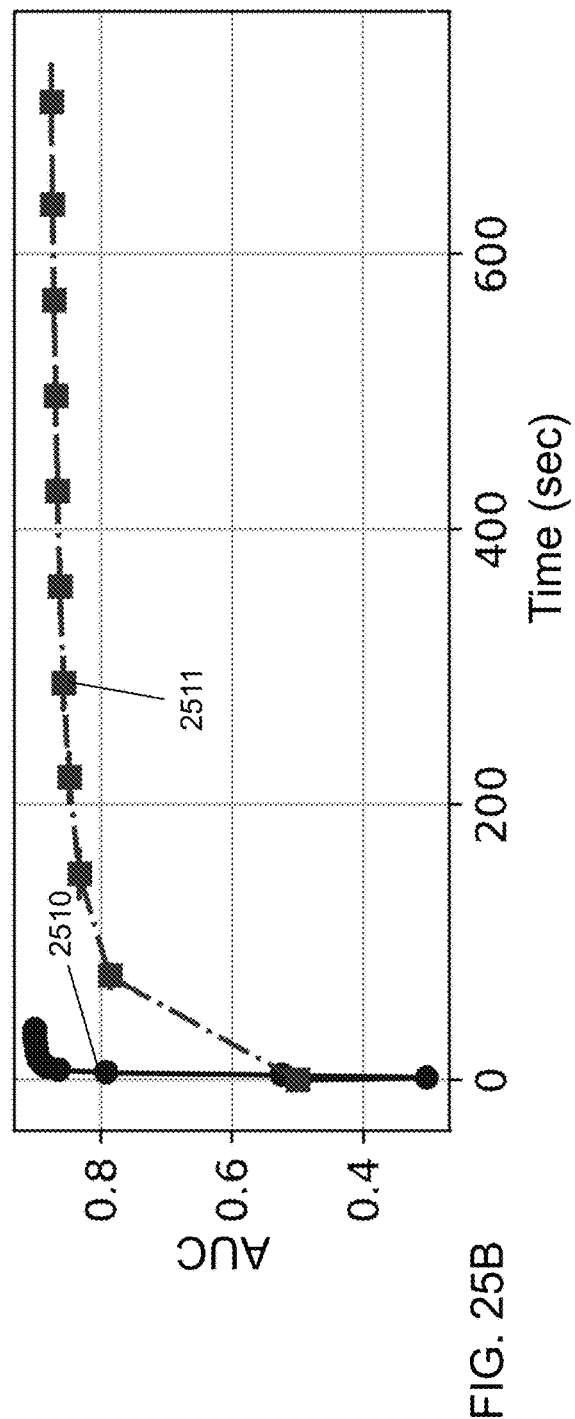
FIG. 25B shows an AUC value comparison with the dataset, $|F_2|=50$, and $\lambda=0.1$ in accordance with an illustrative embodiment.
Figure 25C:
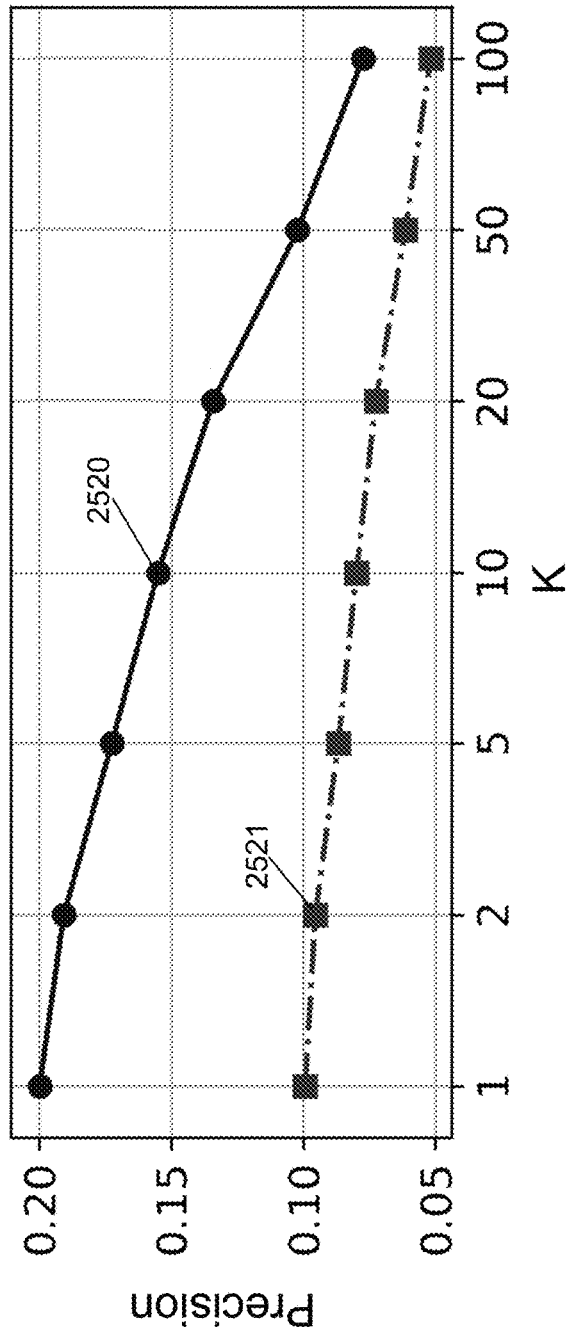
FIG. 25C shows a precision value comparison with the dataset, $|F_2|=50$, and $\lambda=0.1$ in accordance with an illustrative embodiment.
Figure 25D:
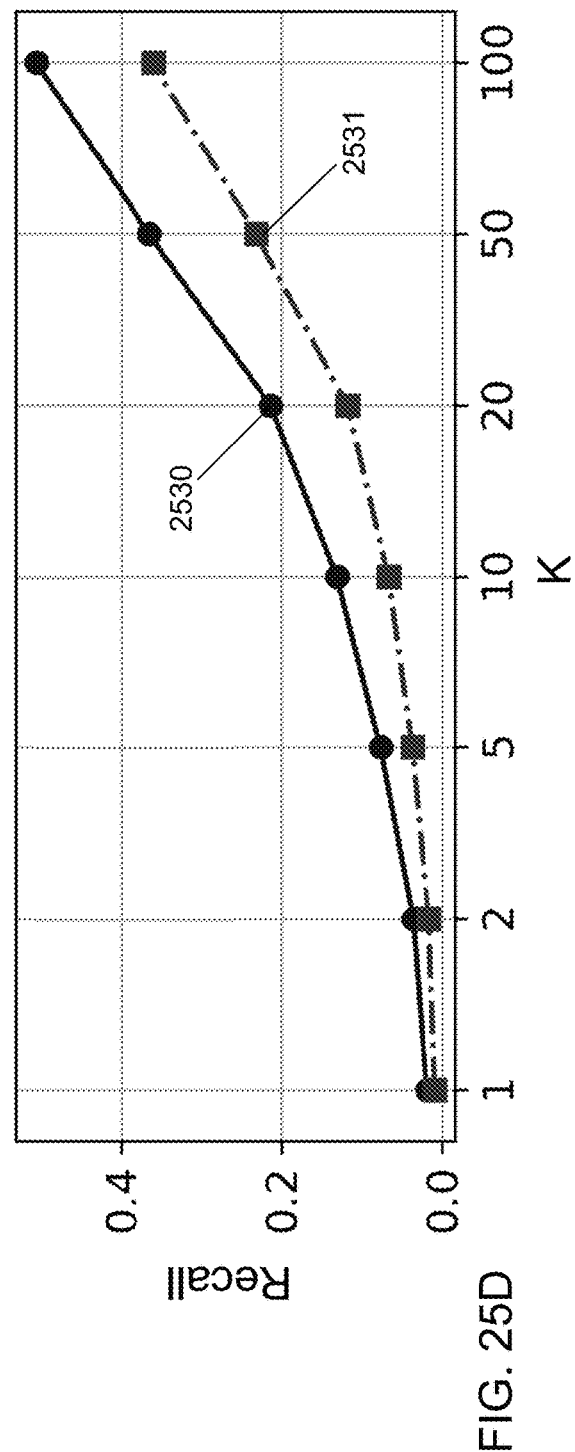
FIG. 25D shows a recall value comparison with the dataset, $|F_2|=50$, and $\lambda=0.1$ in accordance with an illustrative embodiment.

Referring to FIG. 25A, a comparison of a training objective function as a function of time is shown for $|F_2|=50$, and $\lambda=0.1$. A first curve 2500 was generated using recommendation application 122, and a second curve 2501 was generated using AWLS. Referring to FIG. 25B, an AUC value as a function of time is shown for $|F_2|=50$, and $\lambda=0.1$. A third curve 2510 was generated using recommendation application 122, and a fourth curve 2511 was generated using AWLS. Referring to FIG. 25C, a precision value as a function of time is shown for $|F_2|=50$, and $\lambda=0.1$. A fifth curve 2520 was generated using recommendation application 122, and a sixth curve 2521 was generated using AWLS. Referring to FIG. 25D, a recall value as a function of time is shown for $|F_2|=50$, and $\lambda=0.1$. A seventh curve 2530 was generated using recommendation application 122, and an eighth curve 2531 was generated using AWLS.

Figure 26A:
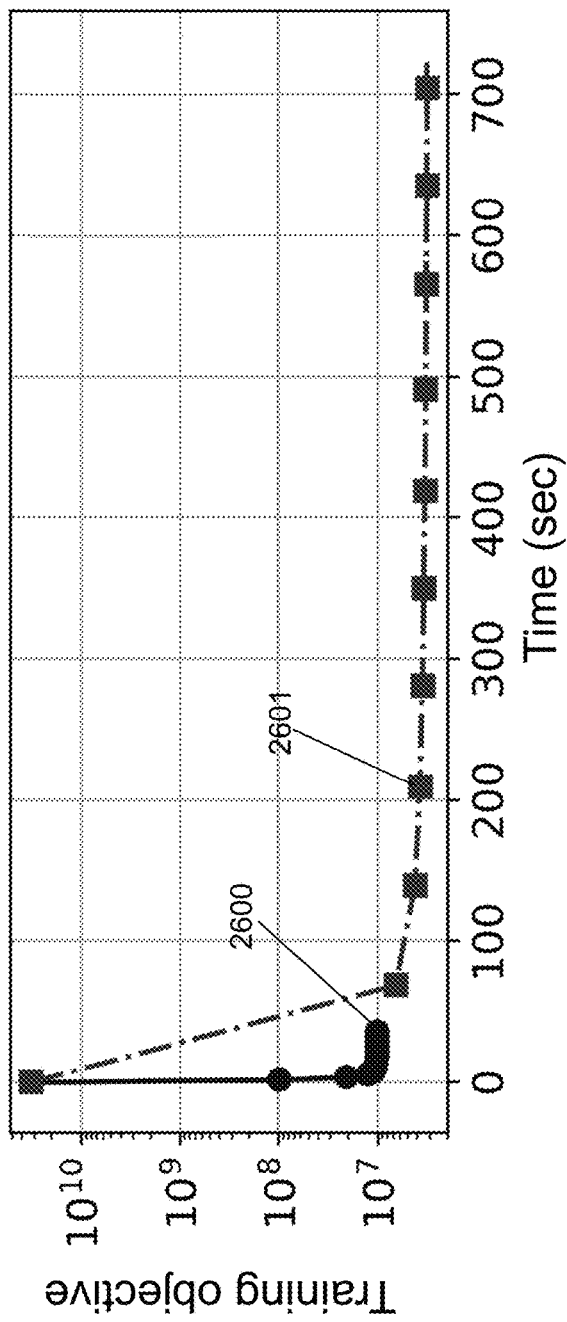
FIG. 26A shows a training objective function value comparison with a dataset, $|F_2|=50$, and $\lambda=1$ in accordance with an illustrative embodiment.
Figure 26B:
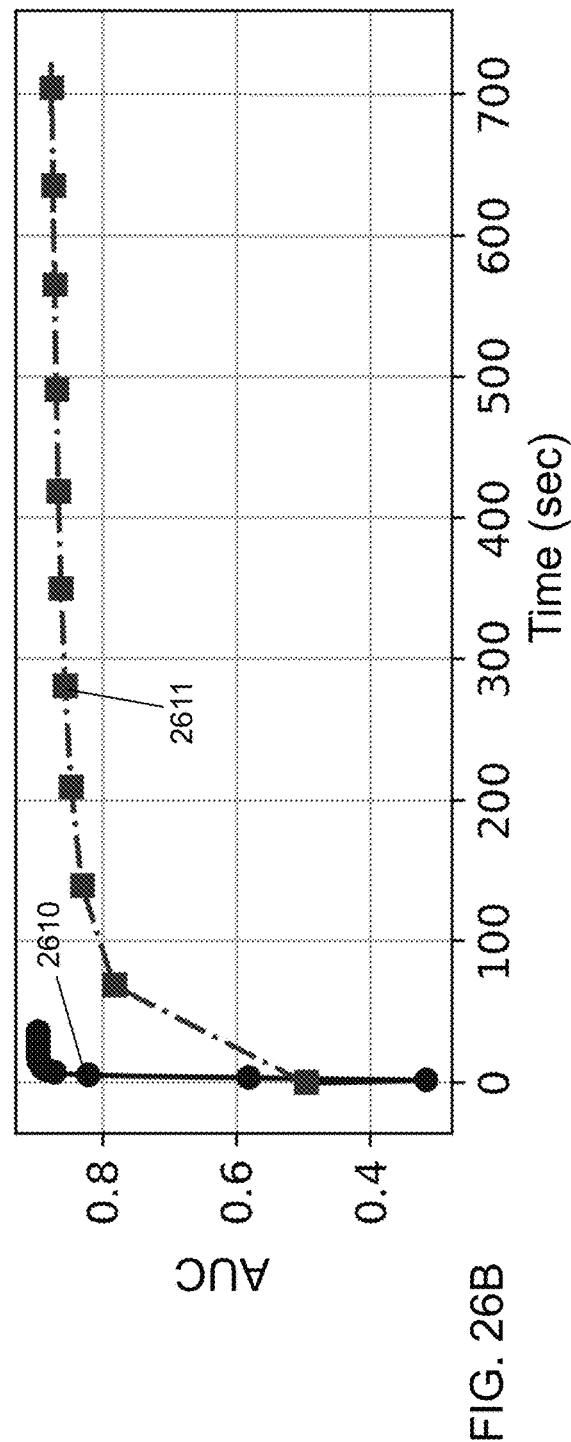
FIG. 26B shows an AUC value comparison with the dataset, $|F_2|=50$, and $\lambda=1$ in accordance with an illustrative embodiment.
Figure 26C:
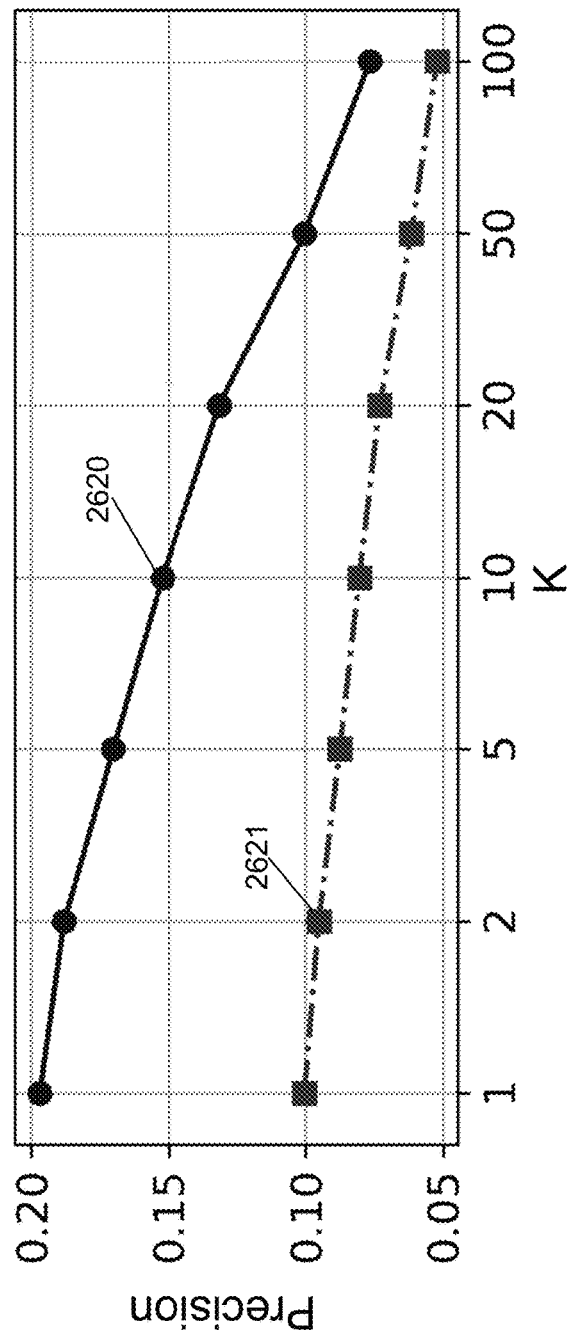
FIG. 26C shows a precision value comparison with the dataset, $|F_2|=50$, and $\lambda=1$ in accordance with an illustrative embodiment.
Figure 26D:
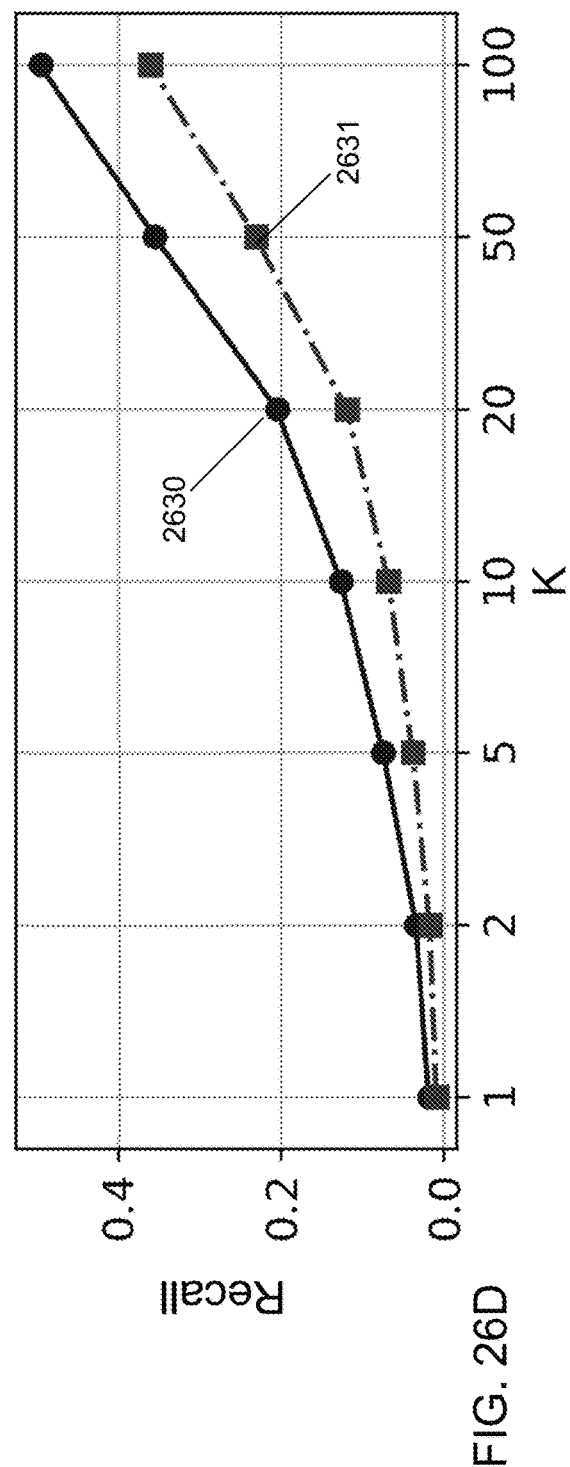
FIG. 26D shows a recall value comparison with the dataset, $|F_2|=50$, and $\lambda=1$ in accordance with an illustrative embodiment.

Referring to FIG. 26A, a comparison of a training objective function as a function of time is shown for $|F_2|=50$, and $\lambda=1$. A first curve 2600 was generated using recommendation application 122, and a second curve 2601 was generated using AWLS. Referring to FIG. 26B, an AUC value as a function of time is shown for $|F_2|=50$, and $\lambda=1$. A third curve 2610 was generated using recommendation application 122, and a fourth curve 2611 was generated using AWLS. Referring to FIG. 26C, a precision value as a function of time is shown for $|F_2|=50$, and $\lambda=1$. A fifth curve 2620 was generated using recommendation application 122, and a sixth curve 2621 was generated using AWLS. Referring to FIG. 26D, a recall value as a function of time is shown for $|F_2|=50$, and $\lambda=1$. A seventh curve 2630 was generated using recommendation application 122, and an eighth curve 2631 was generated using AWLS.

Figure 27A:
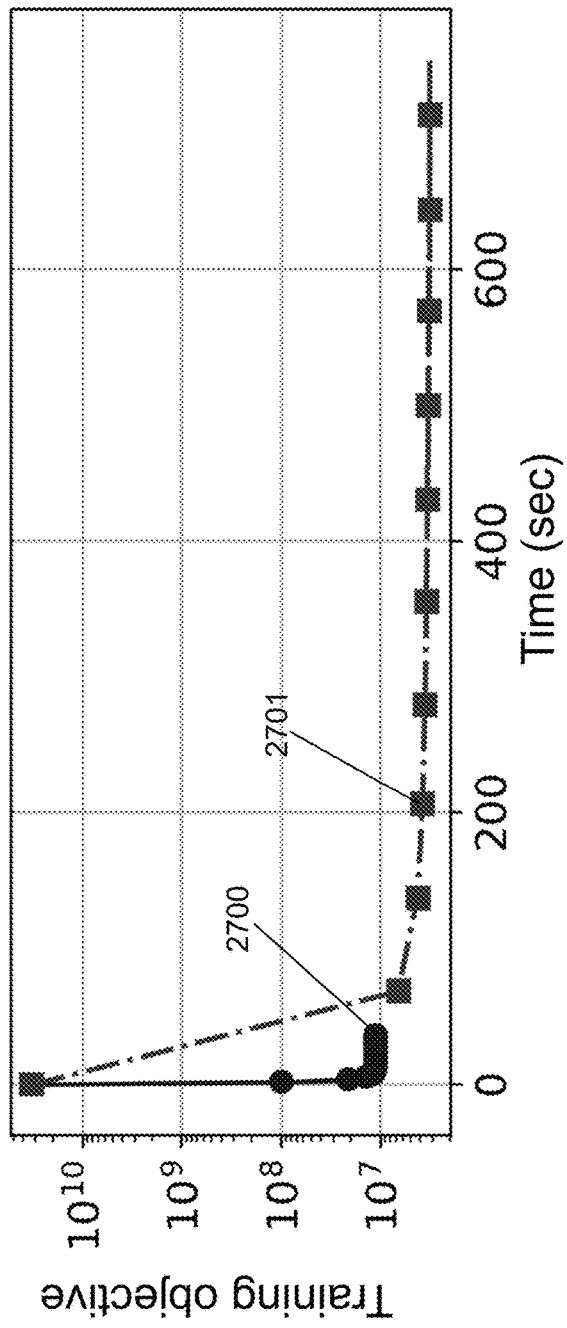
FIG. 27A shows a training objective function value comparison with a dataset, $|F_2|=50$, and $\lambda=10$ in accordance with an illustrative embodiment.
Figure 27B:
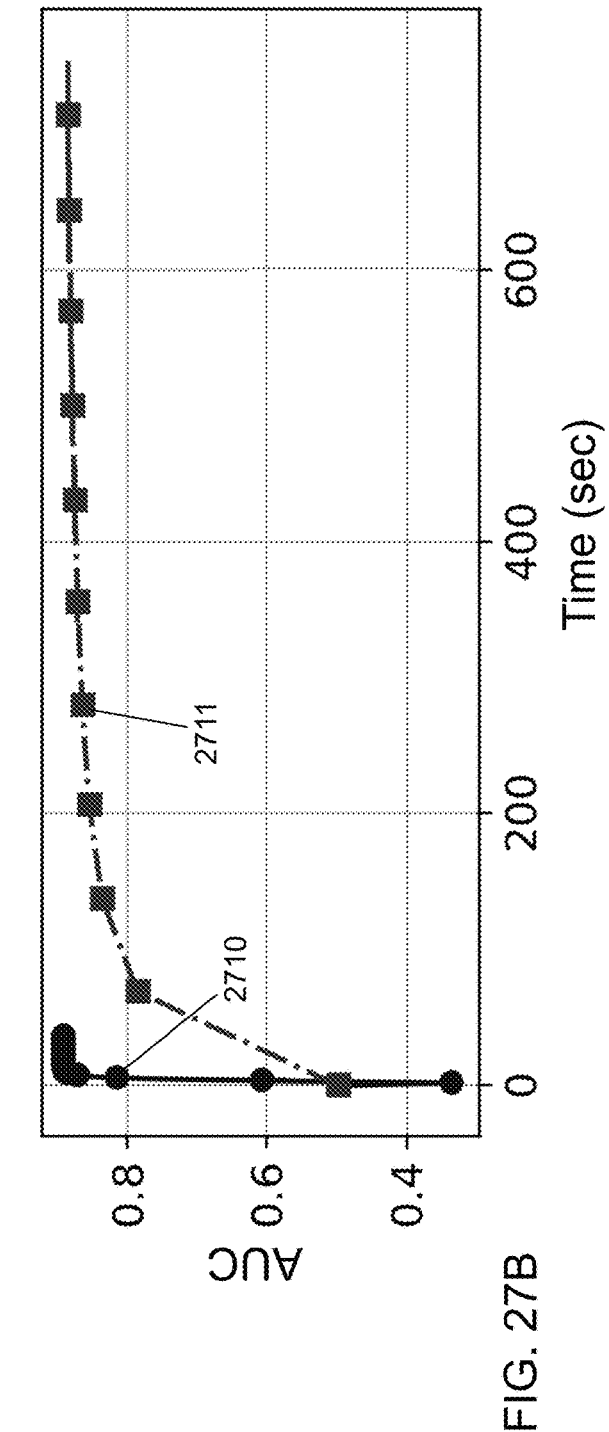
FIG. 27B shows an AUC value comparison with the dataset, $|F_2|=50$, and $\lambda=10$ in accordance with an illustrative embodiment.
Figure 27C:
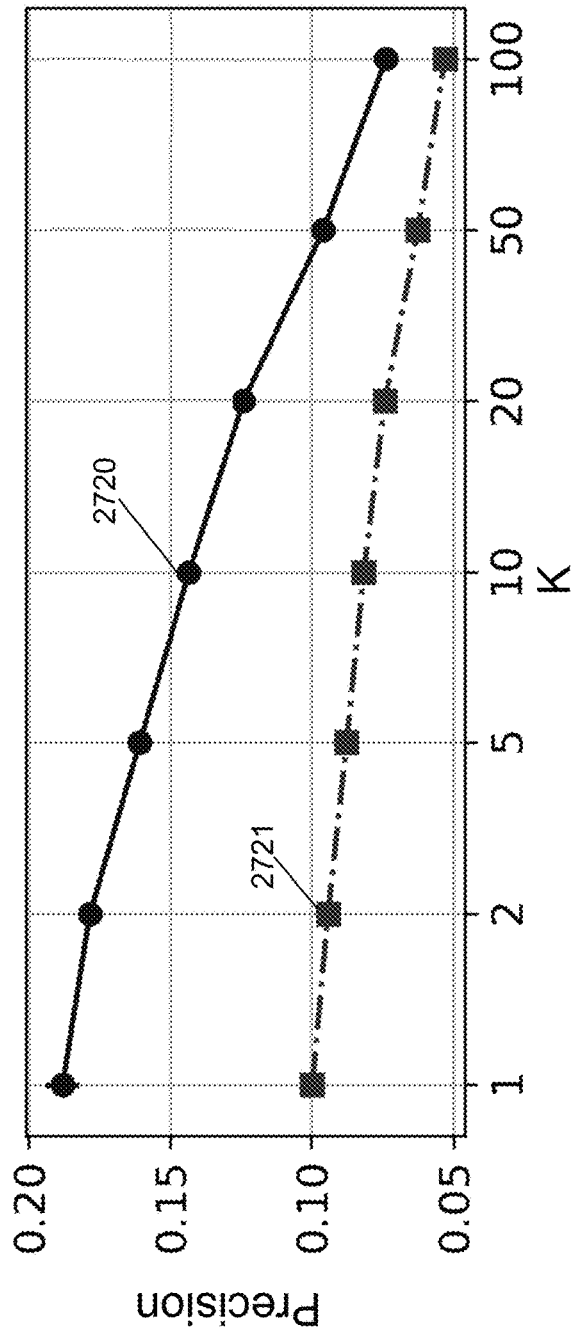
FIG. 27C shows a precision value comparison with the dataset, $|F_2|=50$, and $\lambda=10$ in accordance with an illustrative embodiment.
Figure 27D:
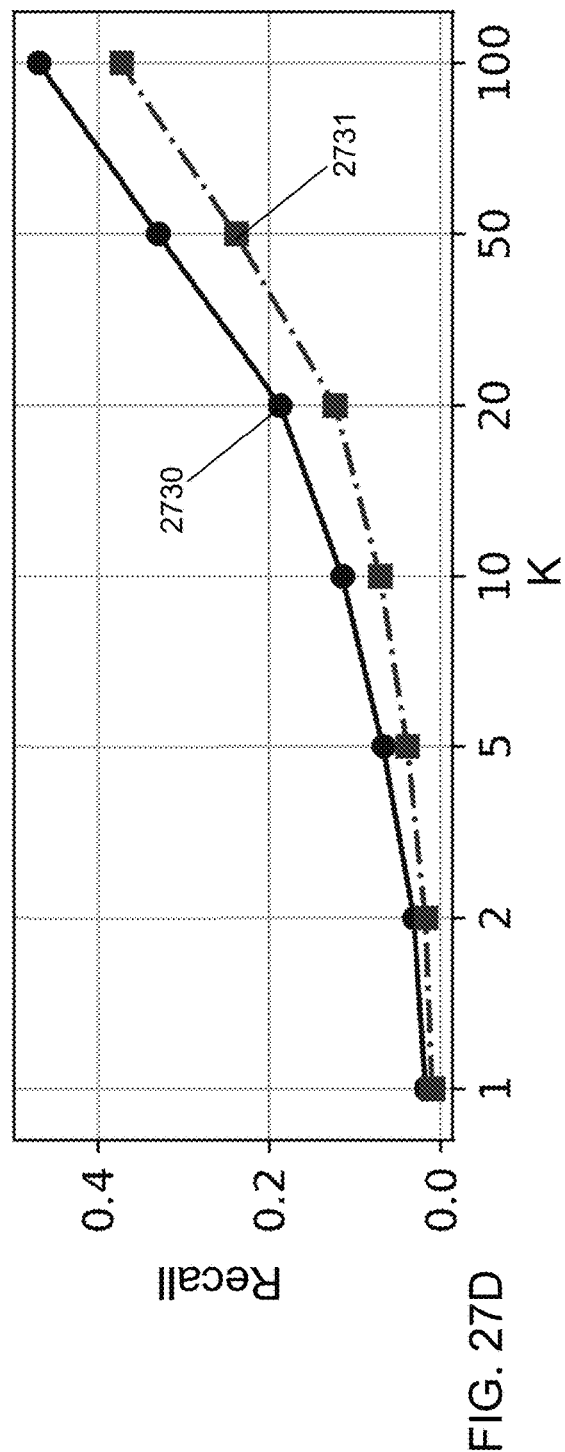
FIG. 27D shows a recall value comparison with the dataset, $|F_2|=50$, and $\lambda=10$ in accordance with an illustrative embodiment.

Referring to FIG. 27A, a comparison of a training objective function as a function of time is shown for $|F_2|=50$, and $\lambda=10$. A first curve 2700 was generated using recommendation application 122, and a second curve 2701 was generated using AWLS. Referring to FIG. 27B, an AUC value as a function of time is shown for $|F_2|=50$, and $\lambda=10$. A third curve 2710 was generated using recommendation application 122, and a fourth curve 2711 was generated using AWLS. Referring to FIG. 27C, a precision value as a function of time is shown for $|F_2|=50$, and $\lambda=10$. A fifth curve 2720 was generated using recommendation application 122, and a sixth curve 2721 was generated using AWLS. Referring to FIG. 27D, a recall value as a function of time is shown for $|F_2|=50$, and $\lambda=10$. A seventh curve 2730 was generated using recommendation application 122, and an eighth curve 2731 was generated using AWLS.

Figure 28A:
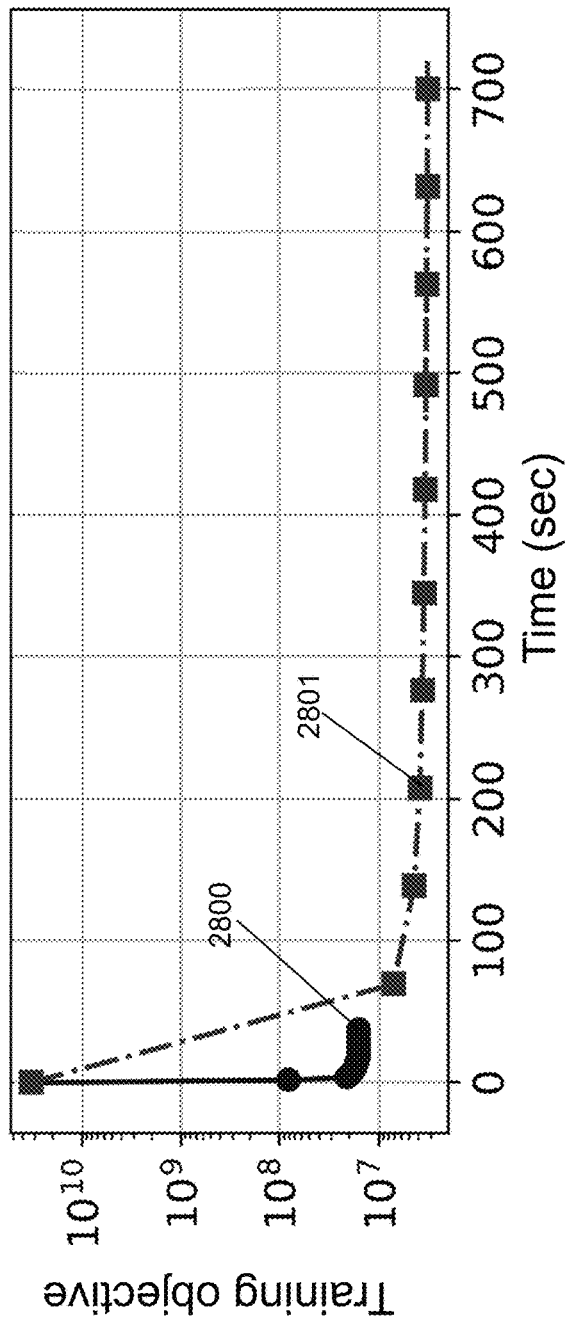
FIG. 28A shows a training objective function value comparison with a dataset, $|F_2|=50$, and $\lambda=100$ in accordance with an illustrative embodiment.
Figure 28B:
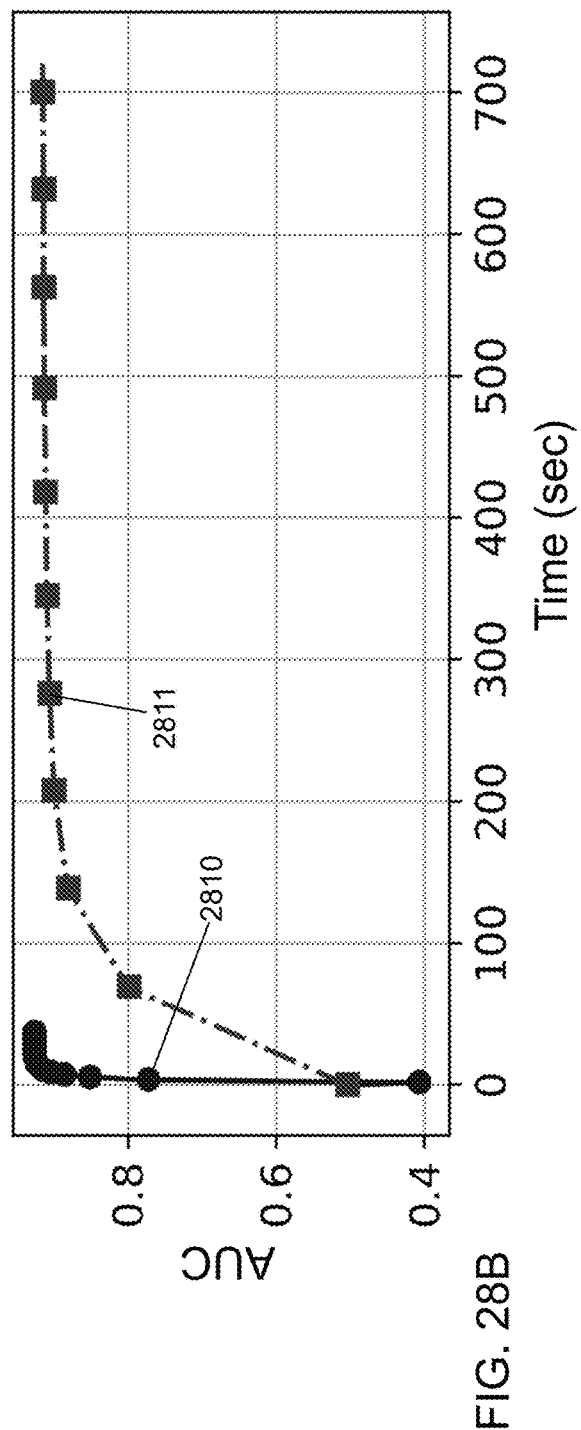
FIG. 28B shows an AUC value comparison with the dataset, $|F_2|=50$, and $\lambda=100$ in accordance with an illustrative embodiment.
Figure 28C:
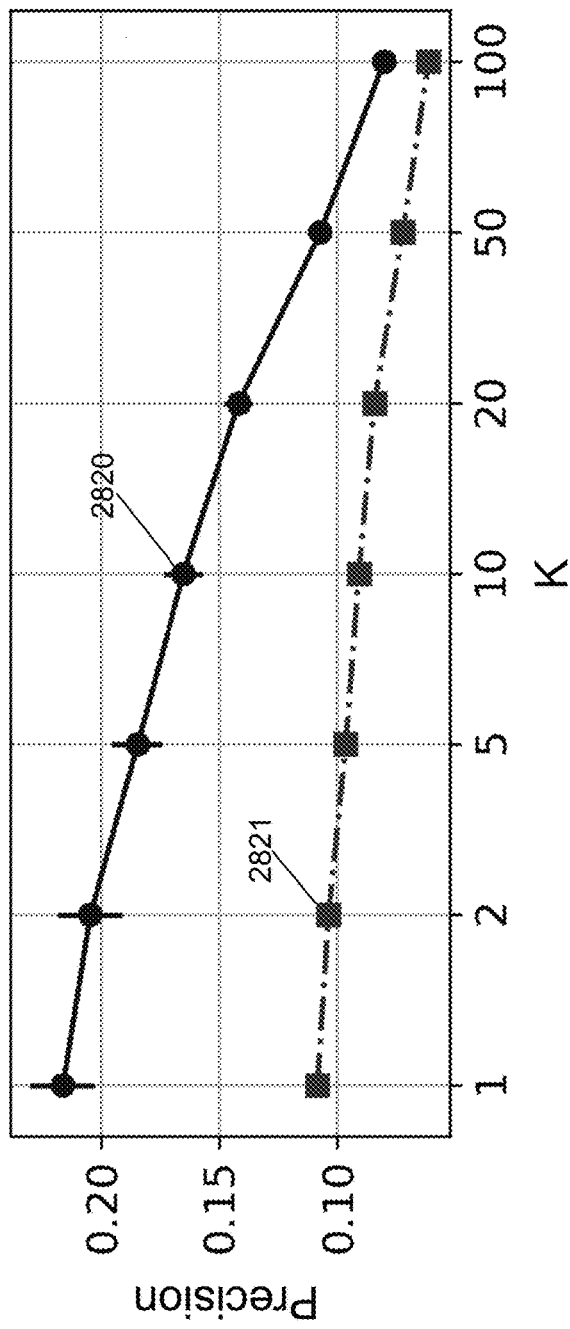
FIG. 28C shows a precision value comparison with the dataset, $|F_2|=50$, and $\lambda=100$ in accordance with an illustrative embodiment.
Figure 28D:
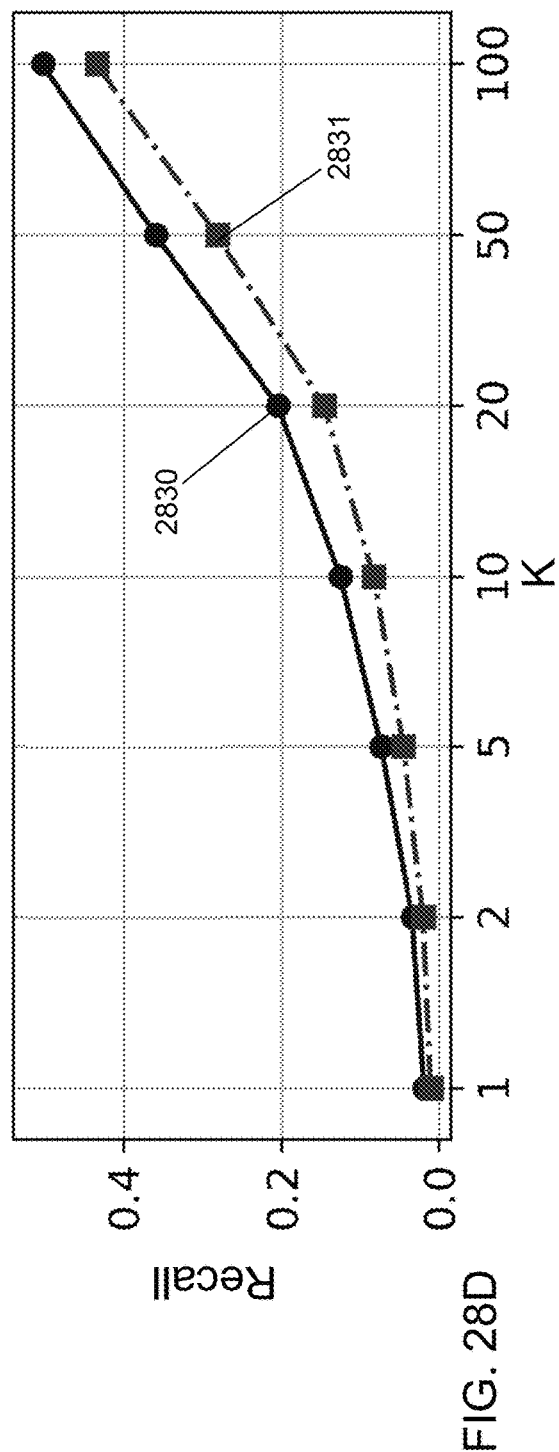
FIG. 28D shows a recall value comparison with the dataset, $|F_2|=50$, and $\lambda=100$ in accordance with an illustrative embodiment.

Referring to FIG. 28A, a comparison of a training objective function as a function of time is shown for $|F_2|=50$, and $\lambda=100$. A first curve 2800 was generated using recommendation application 122, and a second curve 2801 was generated using AWLS. Referring to FIG. 28B, an AUC value as a function of time is shown for $|F_2|=50$, and $\lambda=100$. A third curve 2810 was generated using recommendation application 122, and a fourth curve 2811 was generated using AWLS. Referring to FIG. 28C, a precision value as a function of time is shown for $|F_2|=50$, and $\lambda=100$. A fifth curve 2820 was generated using recommendation application 122, and a sixth curve 2821 was generated using AWLS. Referring to FIG. 28D, a recall value as a function of time is shown for $|F_2|=50$, and $\lambda=100$. A seventh curve 2830 was generated using recommendation application 122, and an eighth curve 2831 was generated using AWLS.

Figure 29A:
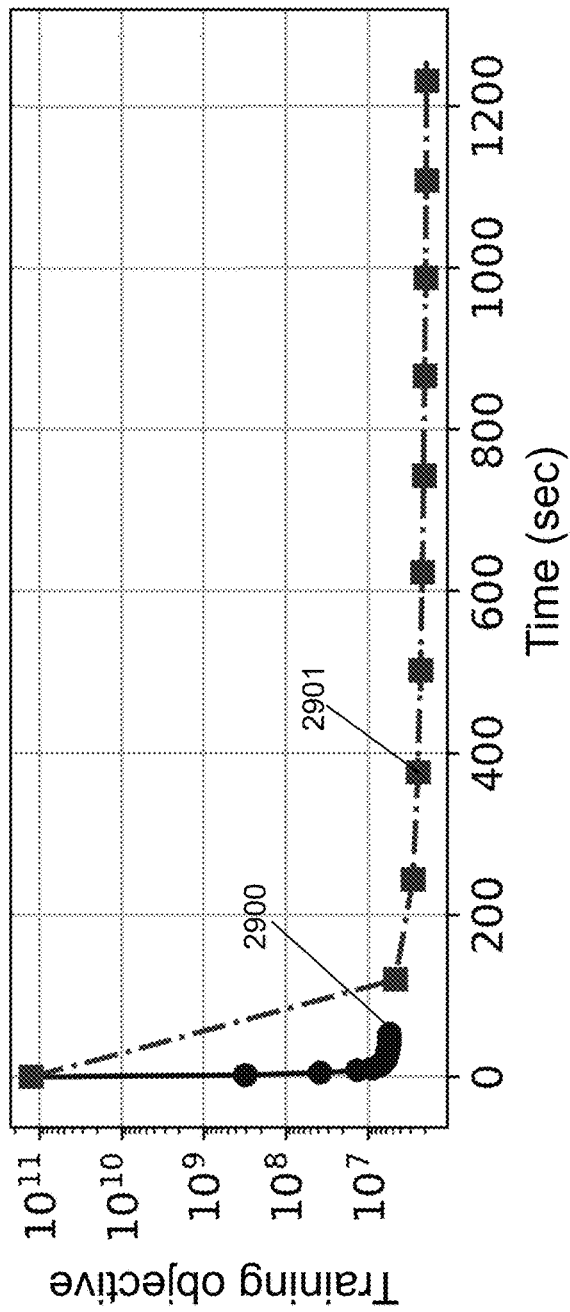
FIG. 29A shows a training objective function value comparison with a dataset, $|F_2|=100$, and $\lambda=0.01$ in accordance with an illustrative embodiment.
Figure 29B:
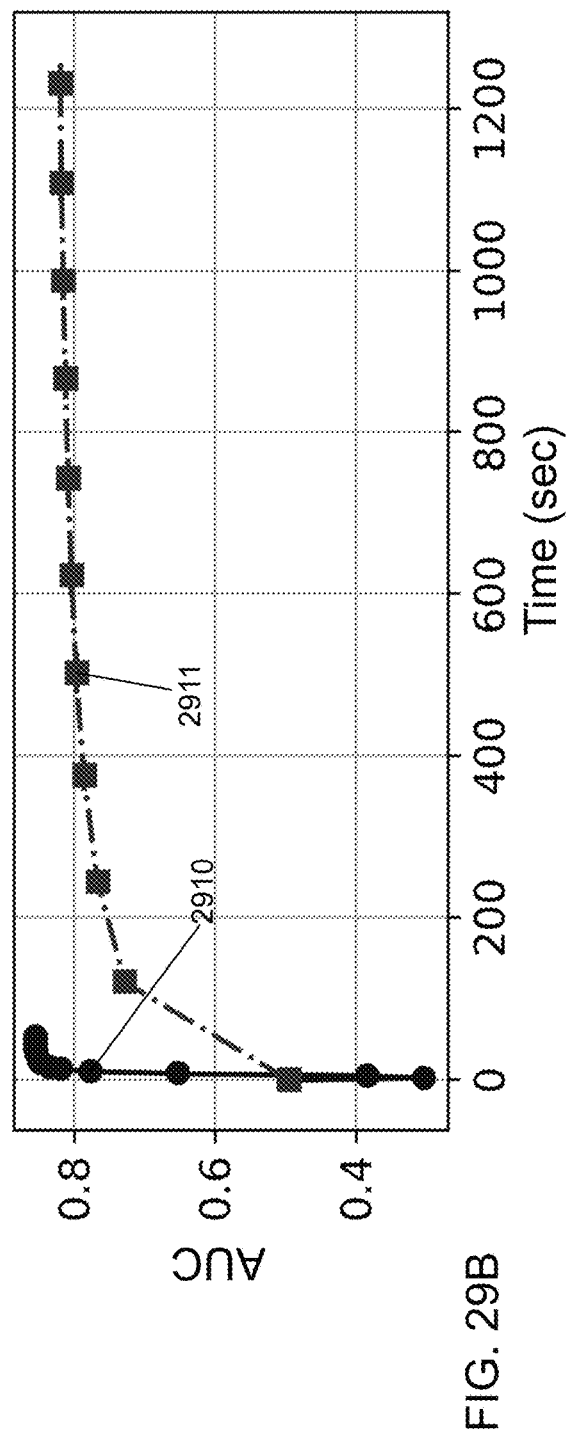
FIG. 29B shows an AUC value comparison with the dataset, $|F_2|=100$, and $\lambda=0.01$ in accordance with an illustrative embodiment.
Figure 29C:
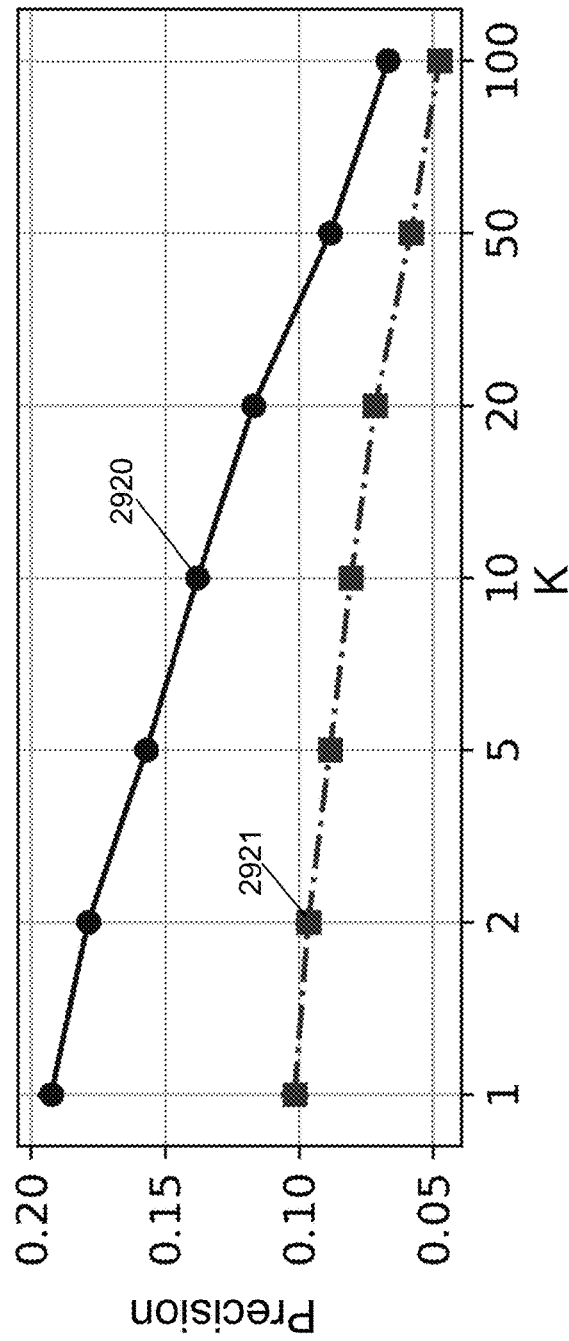
FIG. 29C shows a precision value comparison with the dataset, $|F_2|=100$, and $\lambda=0.01$ in accordance with an illustrative embodiment.
Figure 29D:
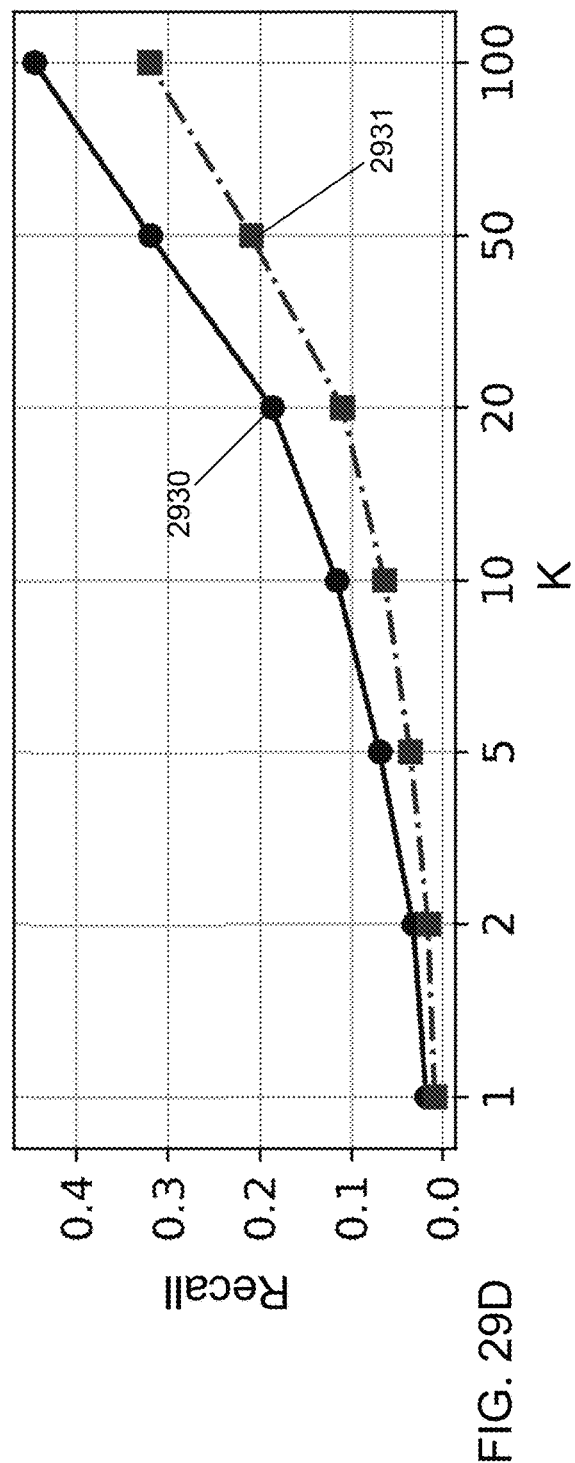
FIG. 29D shows a recall value comparison with the dataset, $|F_2|=100$, and $\lambda=0.01$ in accordance with an illustrative embodiment.

Referring to FIG. 29A, a comparison of a training objective function as a function of time is shown for $|F_2|=100$, and $\lambda=0.01$. A first curve 2900 was generated using recommendation application 122, and a second curve 2901 was generated using AWLS. Referring to FIG. 29B, an AUC value as a function of time is shown for $|F_2|=100$, and $\lambda=0.01$. A third curve 2910 was generated using recommendation application 122, and a fourth curve 2911 was generated using AWLS. Referring to FIG. 29C, a precision value as a function of time is shown for $|F_2|=100$, and $\lambda=0.01$. A fifth curve 2920 was generated using recommendation application 122, and a sixth curve 2921 was generated using AWLS. Referring to FIG. 29D, a recall value as a function of time is shown for $|F_2|=100$, and $\lambda=0.01$. A seventh curve 2930 was generated using recommendation application 122, and an eighth curve 2931 was generated using AWLS.

Figure 30A:
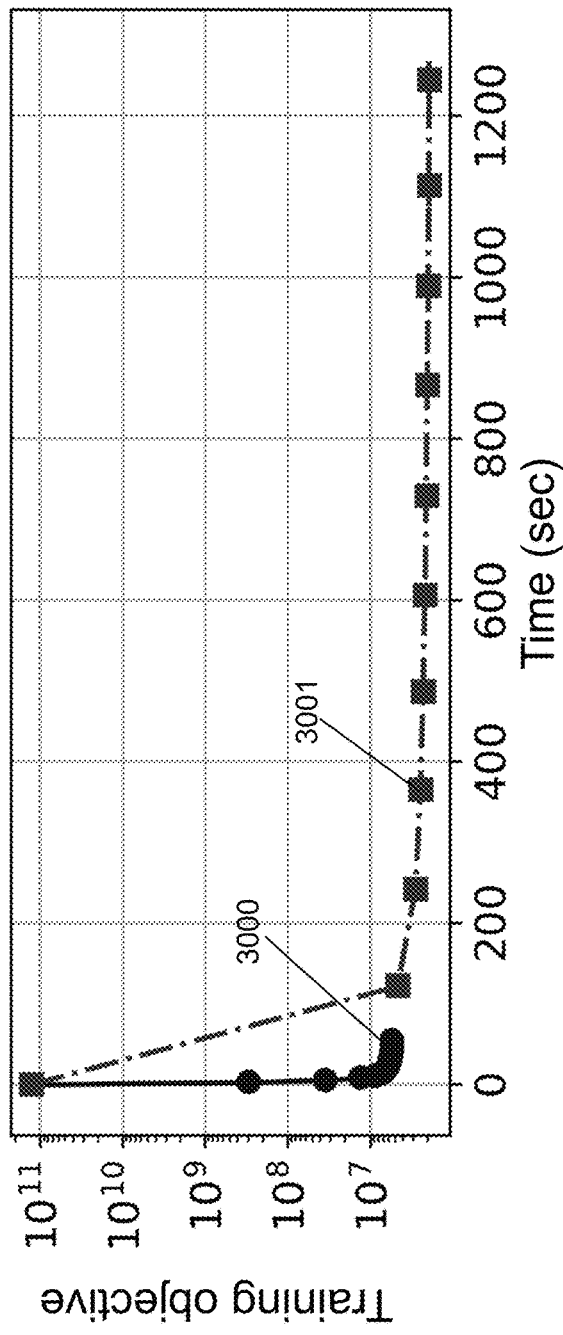
FIG. 30A shows a training objective function value comparison with a dataset, $|F_2|=100$, and $\lambda=0.1$ in accordance with an illustrative embodiment.
Figure 30B:
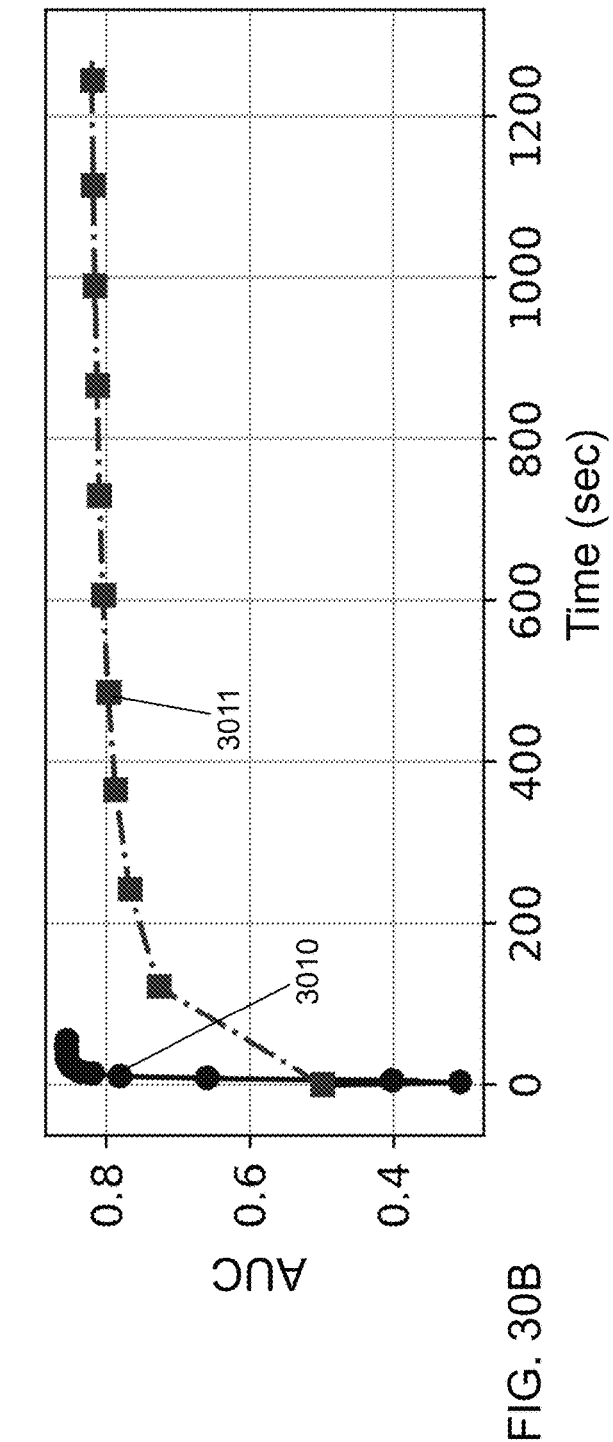
FIG. 30B shows an AUC value comparison with the dataset, $|F_2|=100$, and $\lambda=0.1$ in accordance with an illustrative embodiment.
Figure 30C:
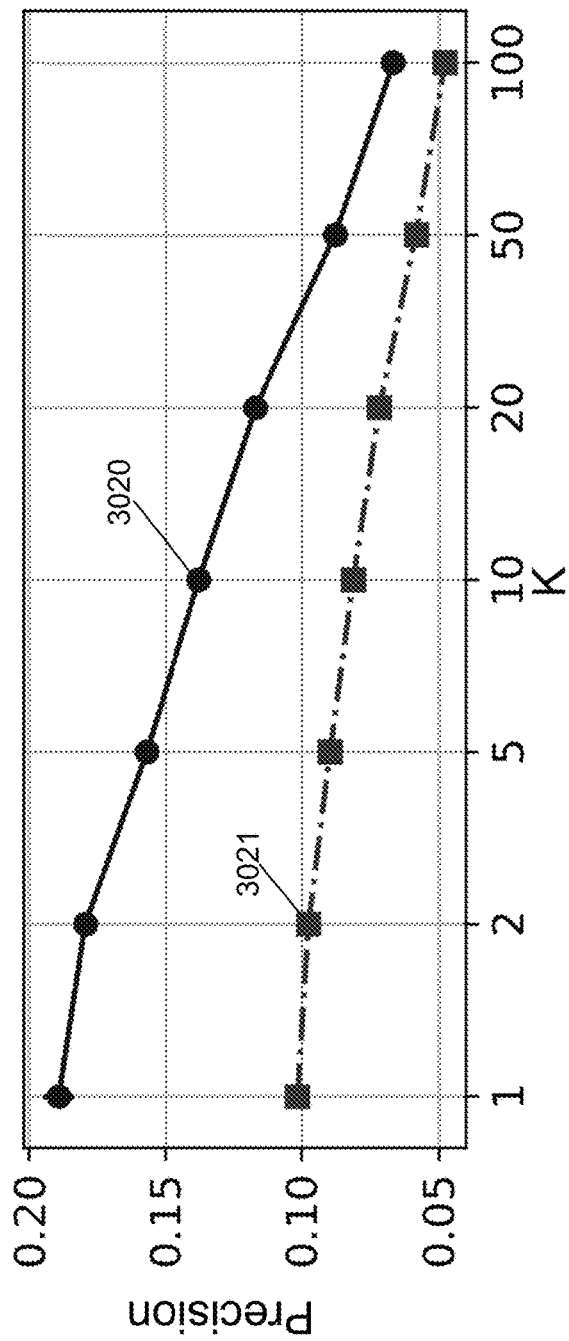
FIG. 30C shows a precision value comparison with the dataset, $|F_2|=100$, and $\lambda=0.1$ in accordance with an illustrative embodiment.
Figure 30D:
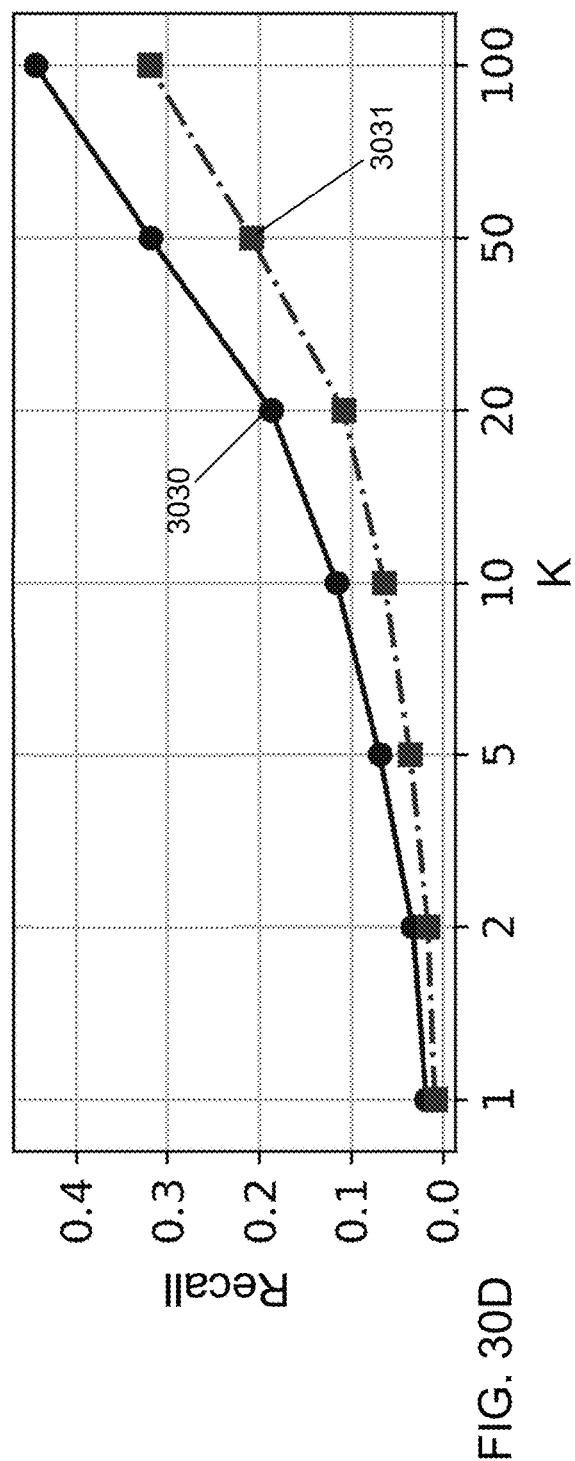
FIG. 30D shows a recall value comparison with the dataset, $|F_2|=100$, and $\lambda=0.1$ in accordance with an illustrative embodiment.

Referring to FIG. 30A, a comparison of a training objective function as a function of time is shown for $|F_2|=100$, and $\lambda=0.1$. A first curve 3000 was generated using recommendation application 122, and a second curve 3001 was generated using AWLS. Referring to FIG. 30B, an AUC value as a function of time is shown for $|F_2|=100$, and $\lambda=0.1$. A third curve 3010 was generated using recommendation application 122, and a fourth curve 3011 was generated using AWLS. Referring to FIG. 30C, a precision value as a function of time is shown for $|F_2|=100$, and $\lambda=0.1$. A fifth curve 3020 was generated using recommendation application 122, and a sixth curve 3021 was generated using AWLS. Referring to FIG. 30D, a recall value as a function of time is shown for $|F_2|=100$, and $\lambda=0.1$. A seventh curve 3030 was generated using recommendation application 122, and an eighth curve 3031 was generated using AWLS.

Figure 31C:
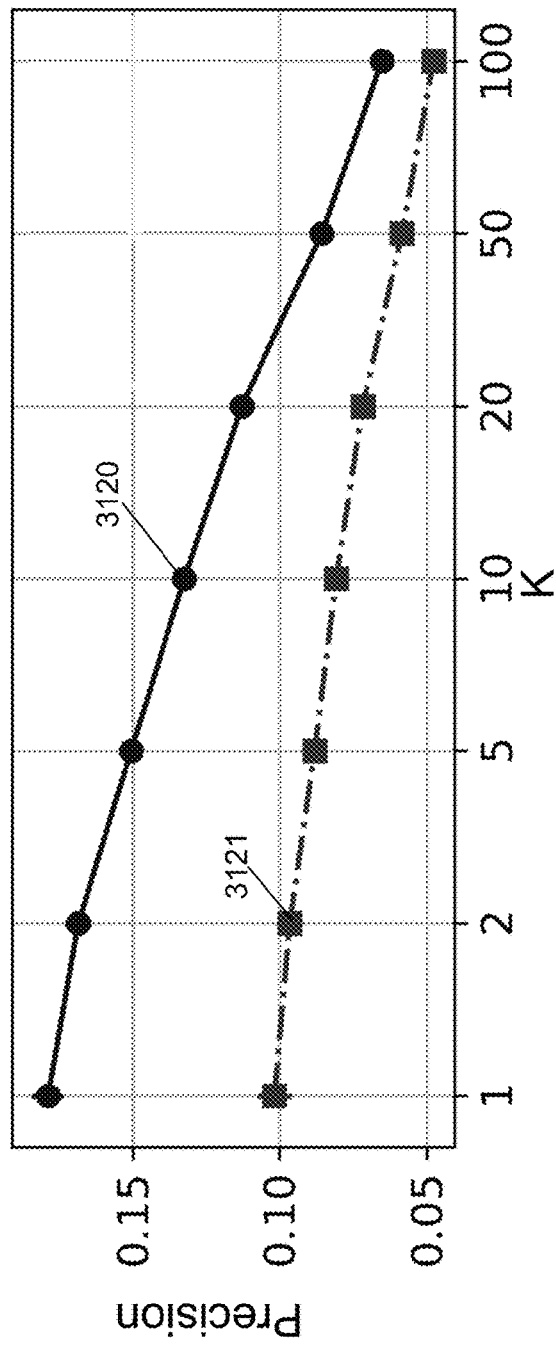
FIG. 31C shows a precision value comparison with the dataset, $|F_2|=100$, and $\lambda=1$ in accordance with an illustrative embodiment.
Figure 31D:
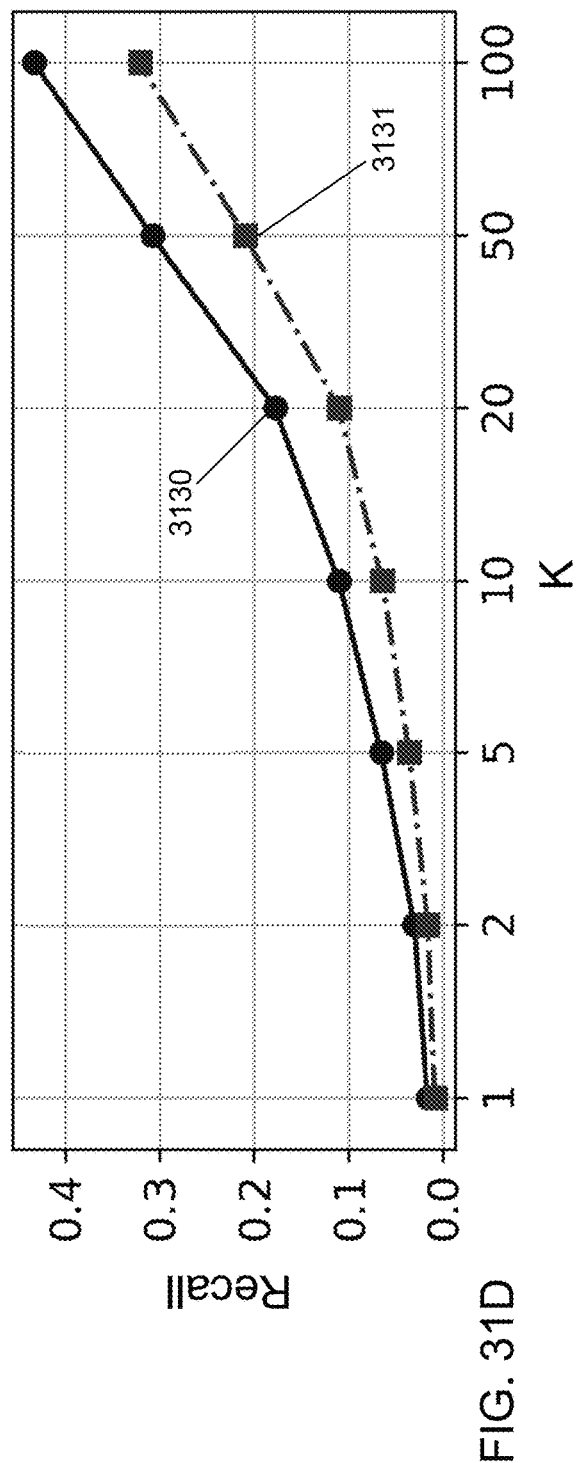
FIG. 31D shows a recall value comparison with the dataset, $|F_2|=100$, and $\lambda=1$ in accordance with an illustrative embodiment.

Referring to FIG. 31A, a comparison of a training objective function as a function of time is shown for $|F_2|=100$, and $\lambda=1$. A first curve 3100 was generated using recommendation application 122, and a second curve 3101 was generated using AWLS. Referring to FIG. 31B, an AUC value as a function of time is shown for $|F_2|=100$, and $\lambda=1$. A third curve 3110 was generated using recommendation application 122, and a fourth curve 3111 was generated using AWLS. Referring to FIG. 31C, a precision value as a function of time is shown for $|F_2|=100$, and $\lambda=1$. A fifth curve 3120 was generated using recommendation application 122, and a sixth curve 3121 was generated using AWLS. Referring to FIG. 31D, a recall value as a function of time is shown for $|F_2|=100$, and $\lambda=1$. A seventh curve 3130 was generated using recommendation application 122, and an eighth curve 3131 was generated using AWLS.

Figure 32A:
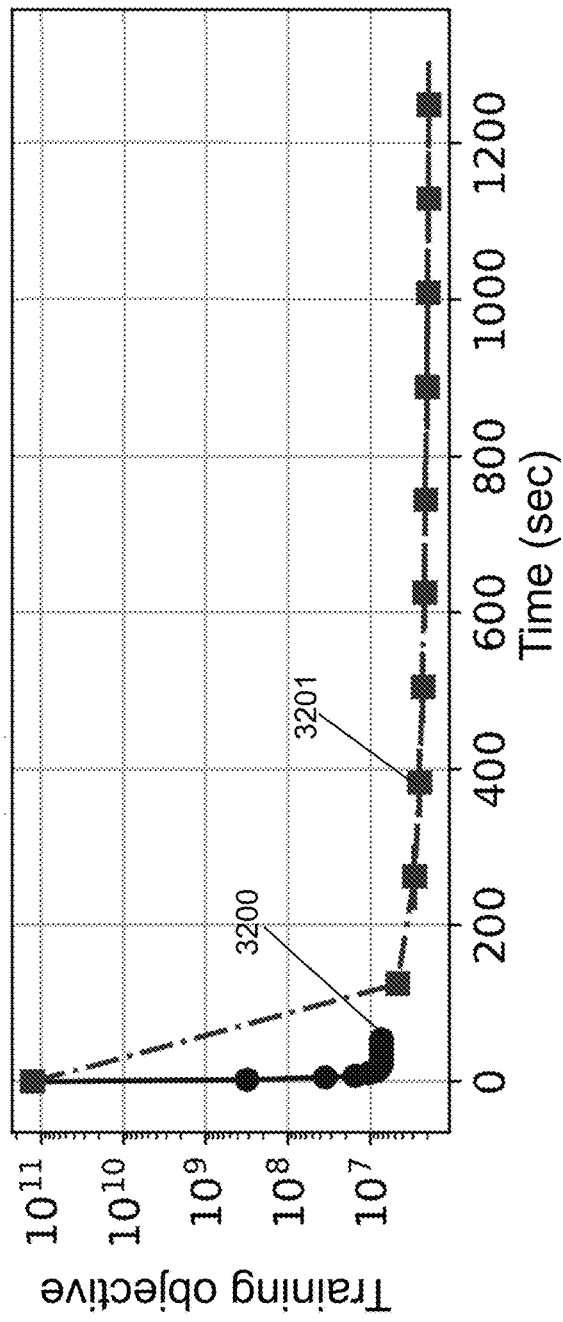
FIG. 32A shows a training objective function value comparison with a dataset, $|F_2|=100$, and $\lambda=10$ in accordance with an illustrative embodiment.
Figure 32B:
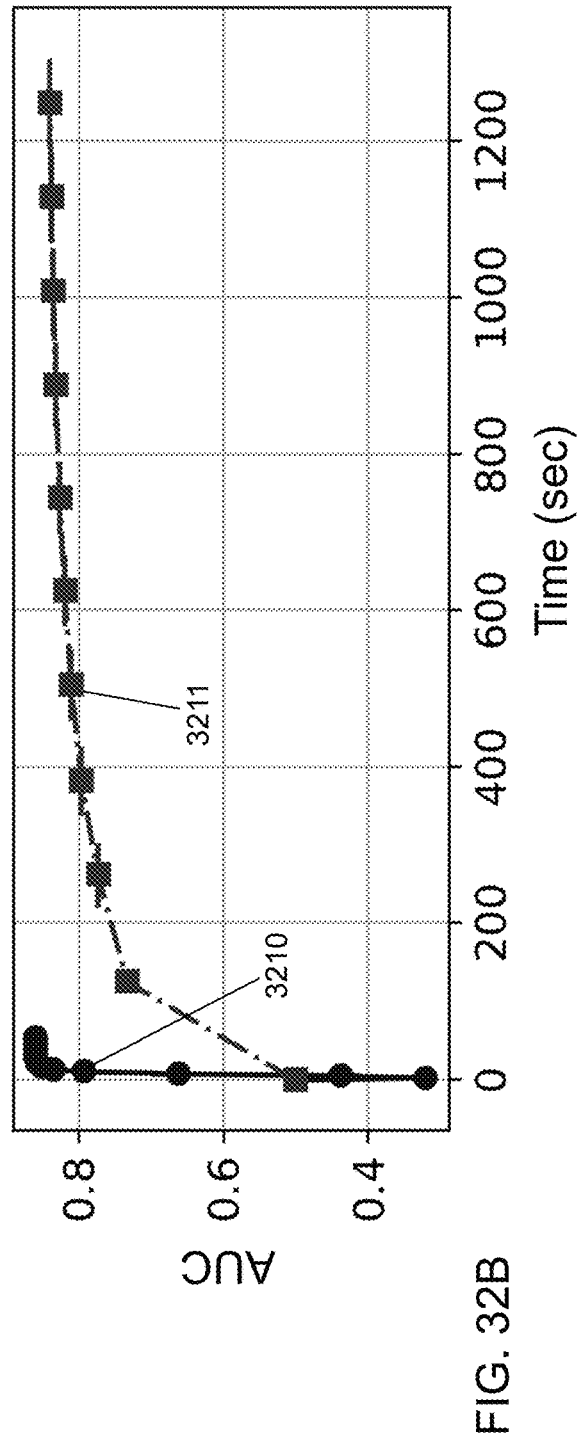
FIG. 32B shows an AUC value comparison with the dataset, $|F_2|=100$, and $\lambda=10$ in accordance with an illustrative embodiment.
Figure 32C:
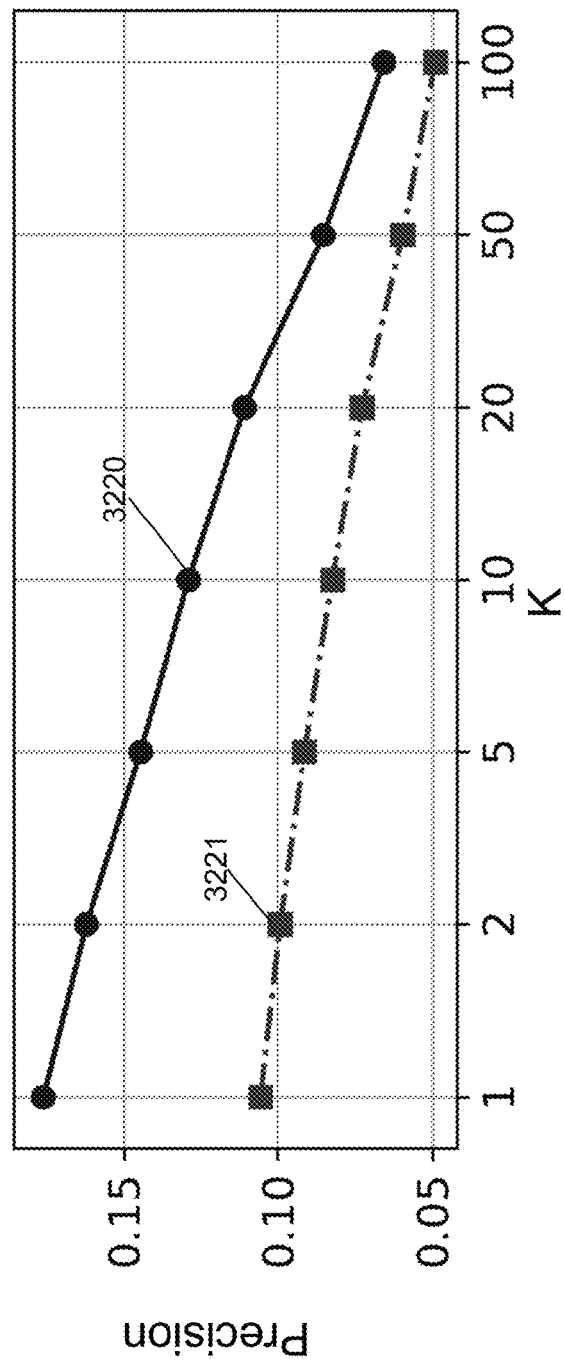
FIG. 32C shows a precision value comparison with the dataset, $|F_2|=100$, and $\lambda=10$ in accordance with an illustrative embodiment.
Figure 32D:
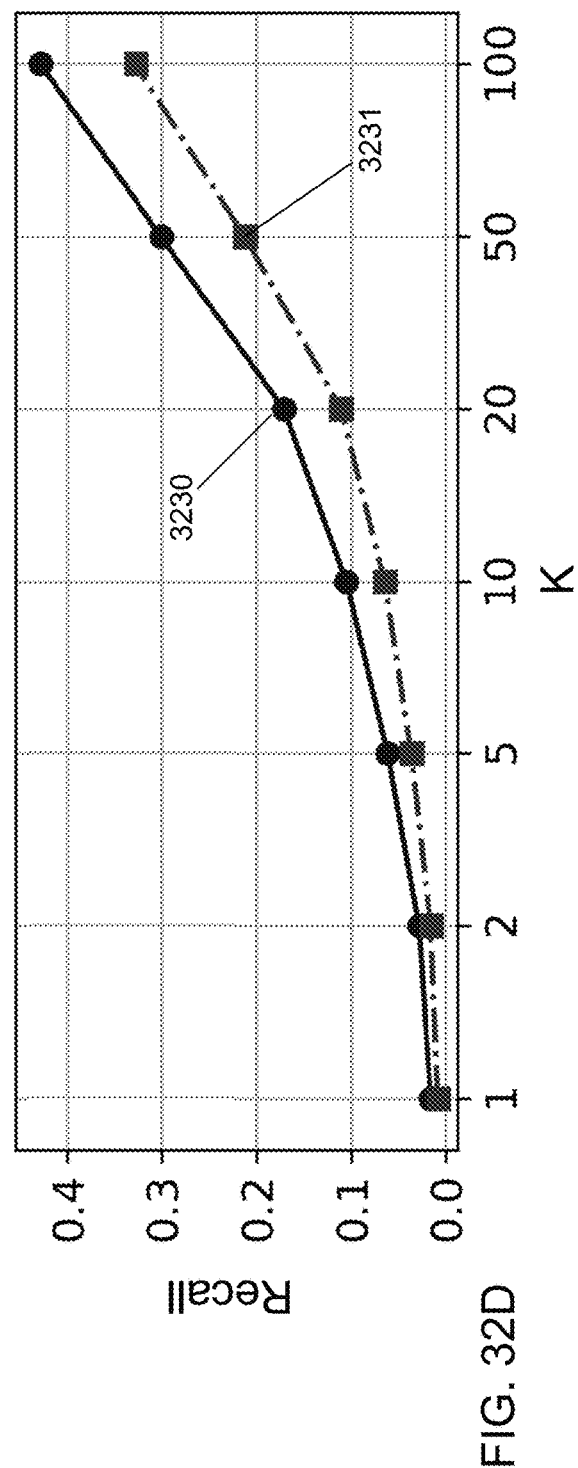

Referring to FIG. 32A, a comparison of a training objective function as a function of time is shown for $|F_2|=100$, and $\lambda=10$. A first curve 3200 was generated using recommendation application 122, and a second curve 3201 was generated using AWLS. Referring to FIG. 32B, an AUC value as a function of time is shown for $|F_2|=100$, and $\lambda=10$. A third curve 3210 was generated using recommendation application 122, and a fourth curve 3211 was generated using AWLS. Referring to FIG. 32C, a precision value as a function of time is shown for $|F_2|=100$, and $\lambda=10$. A fifth curve 3220 was generated using recommendation application 122, and a sixth curve 3221 was generated using AWLS. Referring to FIG. 32D, a recall value as a function of time is shown for $|F_2|=100$, and $\lambda=10$. A seventh curve 3230 was generated using recommendation application 122, and an eighth curve 3231 was generated using AWLS.

Figure 33A:
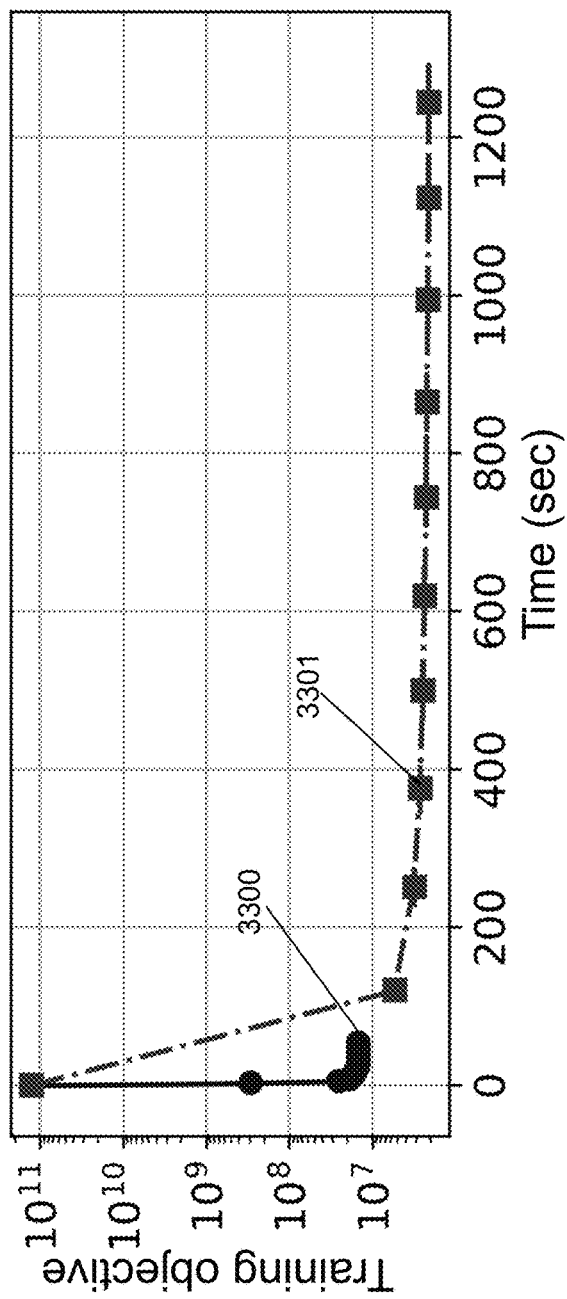
Figure 33B:
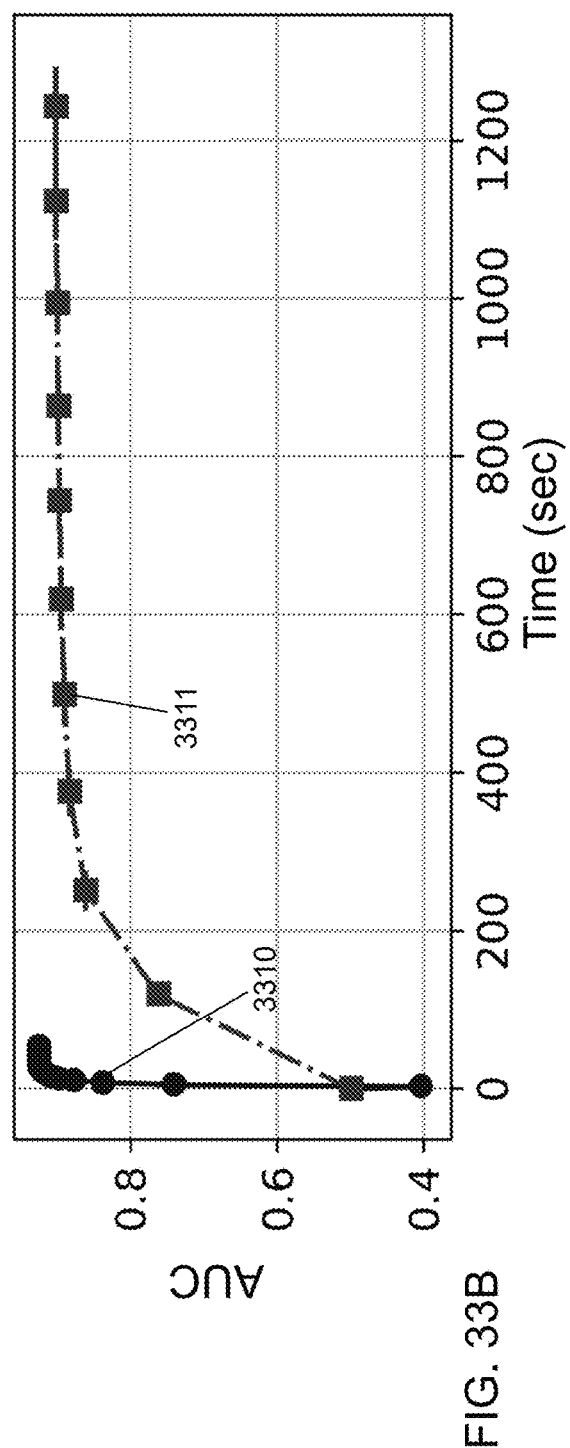
Figure 33C:
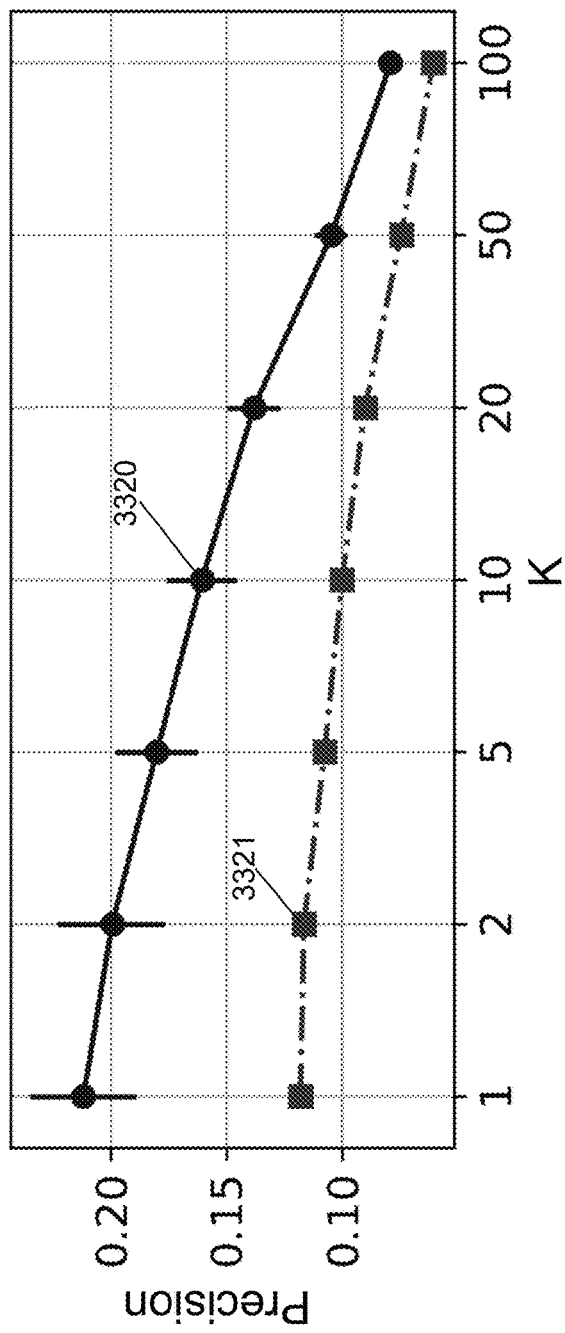
Figure 33D:
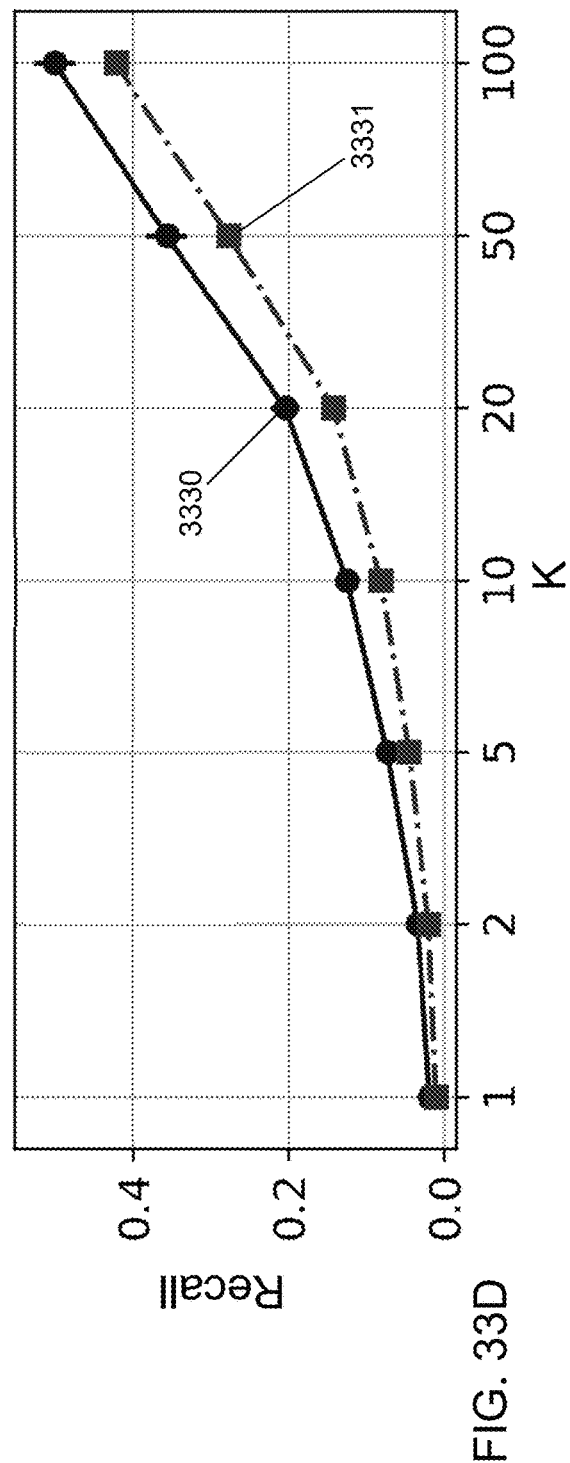

Referring to FIG. 33A, a comparison of a training objective function as a function of time is shown for $|F_2|=100$, and $\lambda=100$. A first curve 3300 was generated using recommendation application 122, and a second curve 3301 was generated using AWLS. Referring to FIG. 33B, an AUC value as a function of time is shown for $|F_2|=100$, and $\lambda=100$. A third curve 3310 was generated using recommendation application 122, and a fourth curve 3311 was generated using AWLS. Referring to FIG. 33C, a precision value as a function of time is shown for $|F_2|=100$, and $\lambda=100$. A fifth curve 3320 was generated using recommendation application 122, and a sixth curve 3321 was generated using AWLS. Referring to FIG. 33D, a recall value as a function of time is shown for $|F_2|=100$, and $\lambda=100$. A seventh curve 3330 was generated using recommendation application 122, and an eighth curve 3331 was generated using AWLS.

Figure 37:
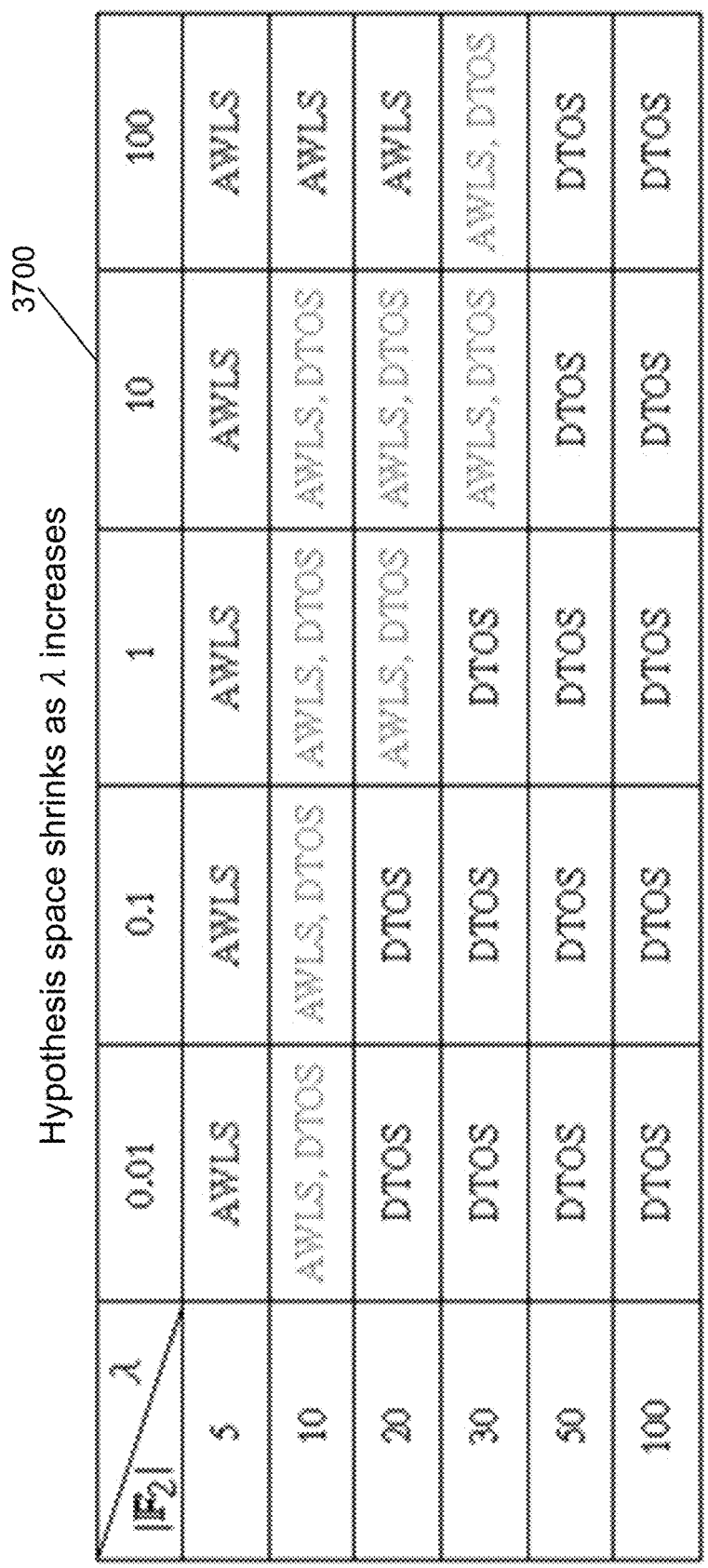

Referring to FIG. 37, a table 3700 shows a pattern of relative performance between DTOS and AWLS. Each cell corresponds to a case in the experimental results presented in FIGS. 4A-33D. Each cell is marked by the algorithm that provides better performance. In the case of a tie, both algorithms are listed. AWLS provides improved performance in the top-right corner where the hypothesis space has shrunk to such an extent that further regularization is harmful. In the bottom-left corner where the hypothesis space is large, further regularization is beneficial, making the inherent regularization offered by DTOS advantageous.

The results also show that AWLS converged faster in terms of number of iterations while DTOS converged substantially faster in terms of computing time. Convergence can be determined based on a relative change in the objective function value over consecutive iterations. When the relative change is less than a predefined threshold value, convergence may be determined to have been achieved. The difference in time increased as $|F_2|$ increased. The faster convergence of AWLS per number of iterations is not surprising because AWLS uses optimal solutions to the local objectives to achieve a maximum improvement of the global objective each iteration. The faster convergence of DTOS indicates that the cost reduction in each iteration is significant enough to counteract the increase in number of iterations, leading to an overall low cost as compared to AWLS. The increased cost reduction with $|F_2|$ is a result of the lower-order complexity of DTOS in $|F_2|$.

The converged models of DTOS achieved less optimality for the training objectives than those of AWLS, and the difference increased with $\lambda$ and decreased with $|F_2|$; however, unless the difference in converged optimality is large, DTOS performed as well as or better than AWLS in terms of the AUC on test data. This indicates that a model that is better in terms of the training objective is not necessarily better in terms of the generalization performance. Model overfitting is one example of such a phenomenon. In the present case, there was an overfitting issue because the PU-learning objective is using virtually all of the entries in R. The optimality difference increases with $\lambda$ and decreases with $|F_2|$ indicating that a less regularized objective is in favor of DTOS possibly indicating that DTOS has an inherent regularization in itself: when the objective does not have enough regularization (either $|F_2|$ is large or $\lambda$ is small), the inherent regularization of DTOS is beneficial; when the objective already has enough regularization (either $|F_2|$ is small or $\lambda$ is large), the inherent regularization of DTOS leads to overly regularized models with degraded performance. Using a common Hessian makes DTOS less prone to any potential inaccuracy in W and makes its solutions more robust. The mechanism of increased robustness plays a similar role to regularization.

DTOS performs consistently better than AWLS in terms of precision and recall, with just a few exceptions when $|F_2|$ is small or $\lambda$ is large. The margin of improvement for precision is particularly significant, demonstrating the value of DTOS in real applications.

Recommendation application 122 solves collaborative filtering problems with implicit feedback and is designed to learn MF-PDF models, a family of hybrid models that combines matrix factorization with linear models. Recommendation application 122 has a low computational complexity and yet achieves reasonable objective improvement in each iteration, leading to an overall faster convergence in time, as compared to AWLS. An interesting property of recommendation application 122 is the inherent regularization, which is particularly beneficial when the training objective is not sufficiently regularized. The experimental results demonstrate that recommendation application 122 can yield significantly better results than AWLS, particularly in terms of precision and recall.

Figure 34:
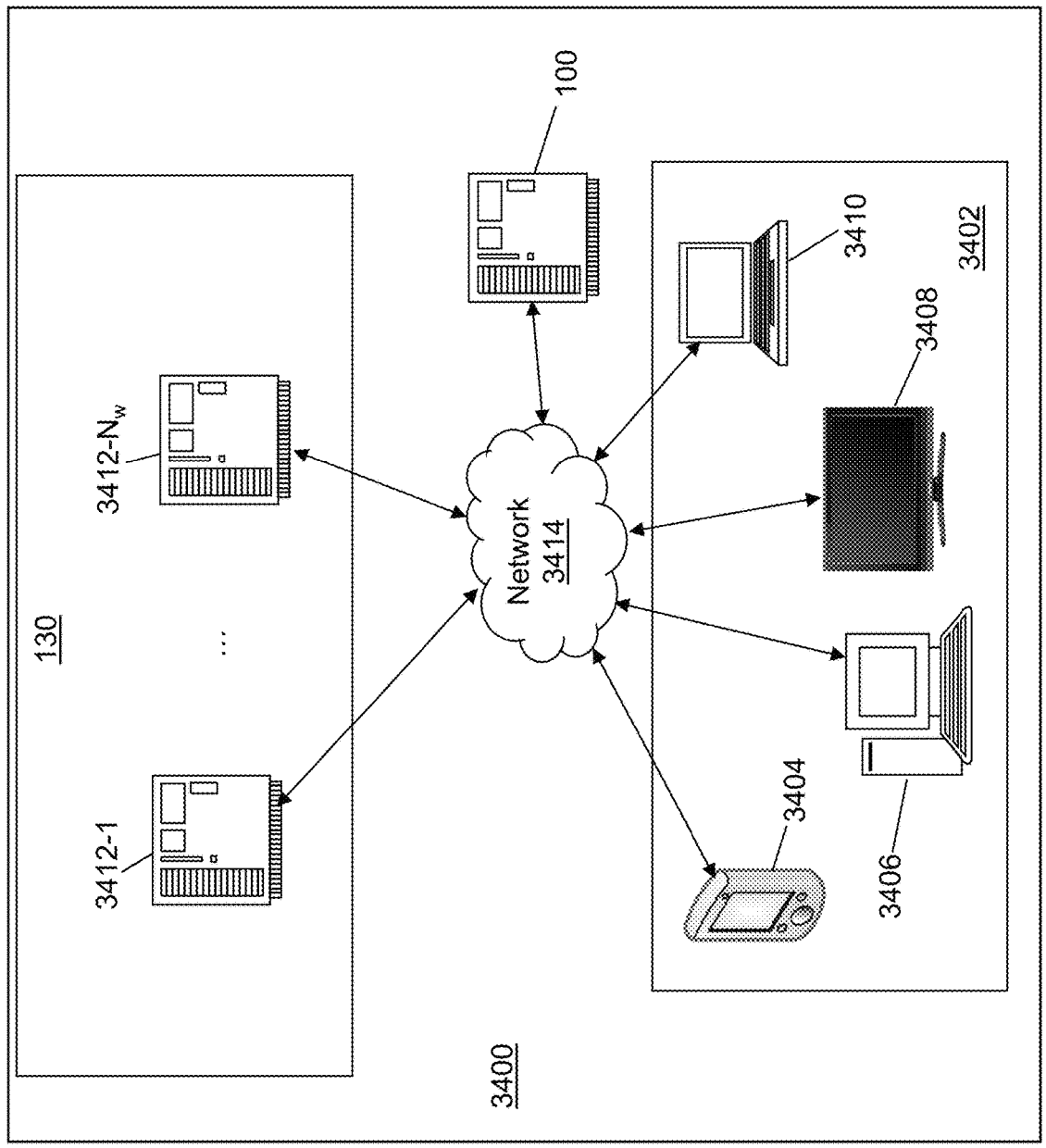

Referring to FIG. 34, a block diagram of a recommendation system 3400 is shown in accordance with an illustrative embodiment. In an illustrative embodiment, recommendation system 3400 may include a user system 3402, recommendation device 100, distributed computing system 130, and a network 3414. Each of user system 3402, recommendation device 100, and distributed computing system 130 may be composed of one or more discrete computing devices in communication through network 3414. Distributed computing system 130 may not be included in an alternative embodiment.

Network 3414 may include one or more networks of the same or different types. Network 3414 can be any type of wired and/or wireless public or private network including a cellular network, a local area network, a wide area network such as the Internet or the World Wide Web, etc. Network 3414 further may comprise sub-networks and consist of any number of communication devices.

The one or more computing devices of user system 3402 may include computing devices of any form factor such as a desktop 3406, a smart phone 3404, a television 3408, a laptop 3410, a personal digital assistant, an integrated messaging device, a tablet computer, etc. User system 3402 can include any number and any combination of form factors of computing devices that may be organized into subnets. The computing devices of user system 3402 may send and receive signals through network 3414 to/from recommendation device 100. The one or more computing devices of user system 3402 may communicate using various transmission media that may be wired and/or wireless as understood by those skilled in the art. The one or more computing devices of user system 3402 may be geographically dispersed from each other and/or co-located.

Figure 35:
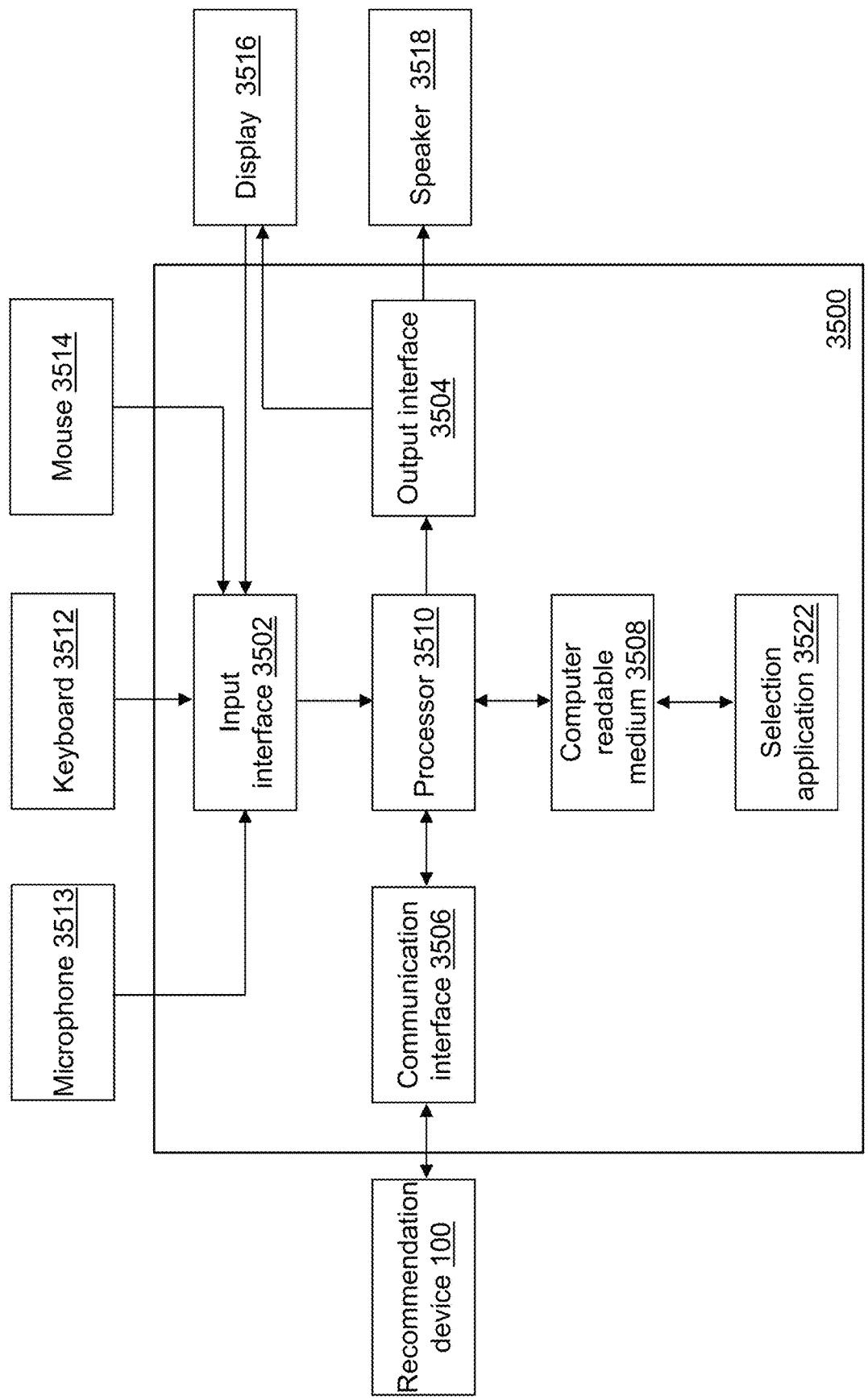

For illustration, referring to FIG. 35, a block diagram of a user device 3500 is shown in accordance with an example embodiment. User device 3500 is an example computing device of user system 3402. For example, each of desktop 3406, smart phone 3404, television 3408, and laptop 3410 may be an instance of user device 3500. User device 3500 may include a second input interface 3502, a second output interface 3504, a second communication interface 3506, a second non-transitory computer-readable medium 3508, a second processor 3510, and a selection application 3522. Each computing device of user system 3402 may be executing selection application 3522 of the same or different type. User device 3500 may execute selection application 3522 that triggers creation of model parameters 126. Each user device 3500 of user system 3402 may include the same or different components and combinations of components. Fewer, different, and additional components may be incorporated into user device 3500.

Second input interface 3502 provides the same or similar functionality as that described with reference to input interface 102 of recommendation device 100 though referring to user device 3500. Second output interface 3504 provides the same or similar functionality as that described with reference to output interface 104 of recommendation device 100 though referring to user device 3500. Second communication interface 3506 provides the same or similar functionality as that described with reference to communication interface 106 of recommendation device 100 though referring to user device 3500. Data and messages may be transferred between recommendation device 100 and user device 3500 using second communication interface 3506. Second computer-readable medium 3508 provides the same or similar functionality as that described with reference to computer-readable medium 108 of recommendation device 100 though referring to user device 3500. Second processor 3510 provides the same or similar functionality as that described with reference to processor 110 of recommendation device 100 though referring to user device 3500.

Selection application 3522 performs operations associated with requesting response data for a user (item) based on inputs provided from user device 3500. The operations may be implemented using hardware, firmware, software, or any combination of these methods. Referring to the example embodiment of FIG. 35, selection application 3522 is implemented in software (comprised of computer-readable and/or computer-executable instructions) stored in second computer-readable medium 3508 and accessible by second processor 3510 for execution of the instructions that embody the operations of selection application 3522. Selection application 3522 may be written using one or more programming languages, assembly languages, scripting languages, etc. Selection application 3522 may be implemented as a Web application.

Figure 36:
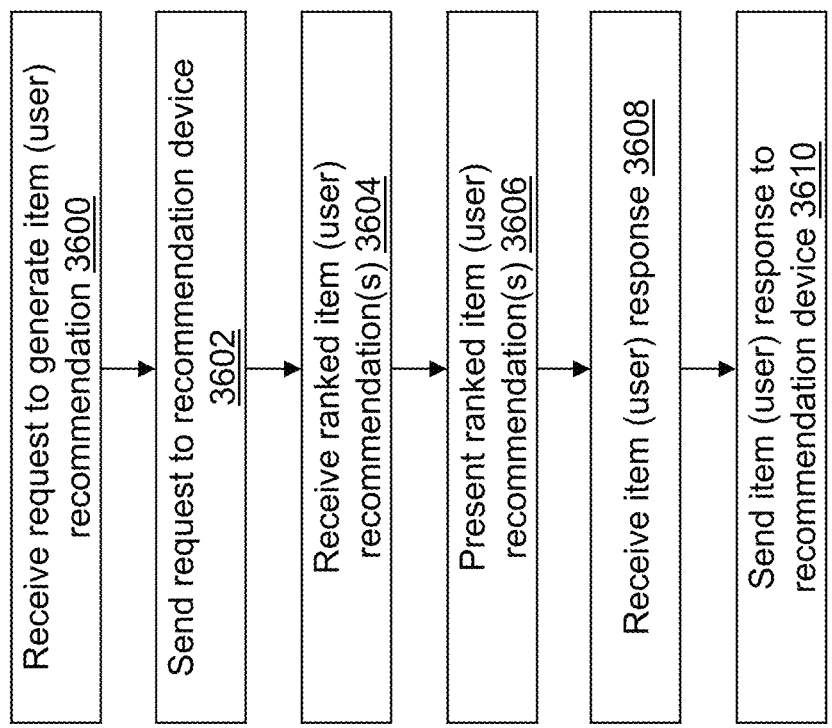

Referring to FIG. 36, example operations associated with selection application 3522 are described. Additional, fewer, or different operations may be performed depending on the embodiment of selection application 3522. The order of presentation of the operations of FIG. 36 is not intended to be limiting. Some of the operations may not be performed in some embodiments. Although some of the operational flows are presented in sequence, the various operations may be performed in various repetitions and/or in other orders than those that are illustrated. For example, a user may execute selection application 3522, which causes presentation of a first user interface window, which may include a plurality of menus and selectors such as drop-down menus, buttons, text boxes, hyperlinks, etc. associated with selection application 3522 as understood by a person of skill in the art. The plurality of menus and selectors may be accessed in various orders. For illustration, the Netflix application is an example selection application 3522.

In an operation 3600, a sixth indicator may be received that indicates a request to generate item recommendations for a user of selection application 3522. Alternatively, the request may be to generate user recommendations related to an item for an entity using selection application 3522. For example, a user may be searching for content such as a movie, book, game, music, etc. using selection application 3522 with, for example, a second keyboard 3512, a second microphone 3513, or a second mouse 3514. The request may include an identifier of the user for which recommendations are desired, or an identifier of the item for which user recommendations are desired. For illustration, the identifier of the user may automatically be associated with a user using selection application 3522, for example, through a login process.

In an operation 3602, the request is sent to recommendation device 100 through second communication interface 3506, network 3414, and communication interface 106. In response to receipt of the request, recommendation device 100 may generate a ranked list of items using the matrices output to model parameters 126 in operation 232 that define a prediction response matrix M, where $M = XY = X_{:F_1} Y_{F_1:} + X_{:P} Y_{P:} - X_{:F_3} Y_{F_3:} + X_{:Q} Y_{Q:}$. For the user associated with the identifier included in the request, a row is selected from M and the responses values for the items are sorted in descending order. One or more top-ranked items may be selected as the recommendation. Alternatively, when an item identifier is included in the request, a column is selected from M and the predicted values for the users are sorted in descending order and used to select top-ranked users. Recommendation device 100 may send a ranked item list or a ranked user list to user device 3500.

In an operation 3604, the ranked item list or the ranked user list is received from recommendation device 100.

In an operation 3606, the ranked item list or the ranked user list is presented, for example, using a second display 3516 or a second speaker 3518.

In an operation 3608, an item response or a user response may be received from the user.

In an operation 3610, the item response or the user response may be sent to recommendation device 100. In response, recommendation device 100 may update the response matrix with the new response information by repeating one or more of operations 200 through 232.

Recommendation application 122 is not limited to recommendation systems. For example, recommendation application 122 can be used on social networks, to predict responses that have not yet occurred but can potentially happen. In this application, the rows and columns are both associated with people, and the entries are associated with responses between people. Thus, R is an m×n matrix with $R_{ui}$ representing a response by a user u to an item i, where the user u represents a first person, the item i represents a second person, and the response matrix R represents responses between the first person and the second person.

In another example, recommendation application 122 can be used for automatic completion of partially-filled surveys. In this application, each person provides answers to a list of questions, leading to a person-versus-question matrix, The person-versus-question matrix typically has heavily-missing entries, as people tend not to answer all of the questions—as a matter of fact, many people may skip a lot of the questions. Using recommendation application 122, one can predict what answers a person would have given to the skipped questions. Thus, R is an m×n matrix with $R_{ui}$ representing a response between a user u and an item i, where the user u represents a survey participant, the item i represents a survey question, and the response matrix R represents answers by the survey participant to a respective survey question.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

compute a confidence matrix using a predefined weight value defined for each user of a plurality of users and each item of a plurality of items;

(A) update a first parameter matrix using the computed confidence matrix, a predefined response matrix, a first step-size parameter value that is greater than zero, and a first direction matrix, wherein the first parameter matrix includes a row dimension equal to a number of users of the plurality of users, wherein the predefined response matrix includes a predefined response value by each user of the plurality of users to each item of the plurality of items, wherein the predefined response matrix includes at least one matrix value for which a user of the plurality of users has not provided a response to an item of the plurality of items, wherein the first parameter matrix is updated using $X_{:P} = X_{:P} + \eta_1 D$, where $X_{:P}$ is the first parameter matrix, is the first step-size parameter value, and D is the first direction matrix;

(B) update a second parameter matrix using the computed confidence matrix, the predefined response matrix, a second step-size parameter value that is greater than zero, and a second direction matrix, wherein the second parameter matrix includes a column dimension equal to a number of items of the plurality of items;

(C) update an objective function value based on the updated first parameter matrix and the updated second parameter matrix;

(D) train the first parameter matrix and the second parameter matrix by repeating (A) through (C) until the updated first parameter matrix and the updated second parameter matrix satisfy a convergence test;

predict a recommended item of the plurality of items for a requesting user of the plurality of users using the trained first parameter matrix and the trained second parameter matrix; and output the predicted recommended item.

2. The non-transitory computer-readable medium of claim 1, wherein the convergence test is based on a number of iterations of (C) exceeding a predefined maximum number of iterations.

3. The non-transitory computer-readable medium of claim 1, wherein the convergence test is based on the updated objective function value being less than or equal to a predefined convergence value.

4. The non-transitory computer-readable medium of claim 1, wherein the convergence test is based on a difference between the objective function value updated in (C) and the objective function value updated in a previous iteration of (C) being less than or equal to a predefined convergence value.

5. The non-transitory computer-readable medium of claim 1, wherein predicting the recommended item of the plurality of items for the requesting user comprises:

receiving a request to provide the recommended item to the requesting user, wherein the request includes a user identifier of the requesting user; and in response to receipt of the request,
identifying a row of a prediction matrix associated with the user identifier, wherein the prediction matrix is computed using the trained first parameter matrix and the trained second parameter matrix;
ranking predicted values included in the identified row from highest value to lowest value to predict the response by the user to each item; and
selecting the recommended item based on the ranked predicted values.

6. The non-transitory computer-readable medium of claim 5, wherein the prediction matrix is computed using $M = X_{:F_1} Y_{F_1:} + X_{:P} Y_{P:} = X_{:F_3} Y_{F_3:} + X_{:Q} Y_{Q:}$, where M is the prediction matrix, $Y_{Q:}$ is the trained second parameter matrix, $X_{:F_1}$ is a predefined user factors matrix, $Y_{F_3:}$ is a predefined item factors matrix, $X_{:F_3}$ is a predefined user regression matrix for $Y_{F_3:}$, $Y_{F_1:}$ is a predefined item regression matrix for $X_{:F_1}$, $Y_{:}$ is a sub-matrix of Y obtained by extracting rows indexed by elements of a P matrix, Y is an item matrix, $P = F_2 \cup F_3$, $F_2$ is a latent matrix that stores latent indices for latent factors in X and Y, $F_3$ is an item index matrix that stores model indices for a linear model on Y, X is a user matrix, $X_{:Q}$ is a sub-matrix of X obtained by extracting rows indexed by elements of a Q matrix, $Q = F_1 \cup F_2$, $F_1$ is a user index matrix that stores model indices for a linear model on X, and $\cup$ indicates a union of indicated matrices.

7. The non-transitory computer-readable medium of claim 1, wherein before (A), the first parameter matrix is initialized with a predefined initial first parameter matrix, and the second parameter matrix is initialized with a predefined initial second parameter matrix.

8. The non-transitory computer-readable medium of claim 7, wherein the predefined initial first parameter matrix is a column matrix of m ones, and the predefined initial second parameter matrix is a row matrix of n ones, wherein m indicates the number of users of the plurality of users, and n indicates the number of items of the plurality of items.

9. The non-transitory computer-readable medium of claim 1, wherein the second parameter matrix is updated using $Y_{Q:} = Y_{Q:} + \eta_2 Z$, where $Y_{Q:}$ is the second parameter matrix, $\eta_2$ is the second step-size parameter value, and Z is the second direction matrix.

10. The non-transitory computer-readable medium of claim 1, wherein the first step-size parameter value is updated using $$\eta_1 = \frac{\alpha_1}{\beta_1},$$

where $\alpha_1$ is a first $\alpha$ parameter value, and $\beta_1$ is a first $\beta$ parameter value.

11. The non-transitory computer-readable medium of claim 10, wherein the first $\alpha$ parameter value is updated using $\alpha_0 = \|DY_{P:}\|^2 + \lambda \|D\|^2$ and $\alpha_1 = \alpha_0 + \Sigma_{\Delta_{ui} \neq 0}(\Delta_{ui} D_{u:} Y_{Pi})(\Delta_{ui} + 1)(R_{ui} - X_{u:} Y_{:i})$, where $\| \|$ indicates a Frobenius norm computation of a specified matrix, $\lambda$ is a predefined regularization parameter value, u is an index to a respective user, i is an index to a respective item, $\Delta_{ui}$ is a u, $i^{th}$ entry of the computed confidence matrix, $R_{ui}$ is a u, $i^{th}$ entry of the predefined response matrix, $X_{u:}$ is a $u^{th}$ row of X, X is a user matrix, $Y_{:i}$ is an $i^{th}$ column of Y, Y is an item matrix, $D_{u:}$ is a $u^{th}$ row of D, $Y_{Pi}$ is an $i^{th}$ column of $Y_{P:}$, $Y_{P:}$ is a sub-matrix of Y obtained by extracting rows indexed by elements of a P matrix, $P = F_2 \cup F_3$, $F_2$ is a latent matrix that stores latent indices for latent factors in X and Y, $F_3$ is an item index matrix that stores model indices for a linear model on Y, and $\cup$ indicates a union of indicated matrices.

12. The non-transitory computer-readable medium of claim 11, wherein the first $\beta$ parameter value is updated using $\beta_1 = \alpha_0 + \Sigma_{\Delta_{ui} \neq 0}(\Delta_{ui}^2 + 2\Delta_{ui})(D_{u:} Y_{Pi})^2$.

13. The non-transitory computer-readable medium of claim 1, wherein the first direction matrix is updated using $D = ([\Delta_{ui}^\circ (R - XY) + R] Y_{P:}^T - XYY_{P:}^T - \lambda X_{:P})(\lambda I + Y_{P:} Y_{P:}^T)^{-1}$, where $\Delta_{ui}$ is a u, $i^{th}$ entry of the computed confidence matrix, u is an index to a respective user, i is an index to a respective item, R is the predefined response matrix, X is a user matrix, Y is an item matrix, $\lambda$ is a predefined regularization parameter value, $Y_{P:}$ is a sub-matrix of Y obtained by extracting rows indexed by elements of a P matrix, $P = F_2 \cup F_3$, $F_2$ is a latent matrix that stores latent indices for latent factors in X and Y, $F_3$ is an item index matrix that stores model indices for a linear model on Y, I is an identity matrix, $\circ$ indicates a Hadamard product, T indicates a transpose, and $\cup$ indicates a union of indicated matrices.

14. The non-transitory computer-readable medium of claim 13, wherein $X = [X_{:\overline{P}}, X_{:P}]$ and $Y = [Y_{Q:}, Y_{\overline{Q}:}]$, where $Y_{Q:}$ is the second parameter matrix, and — indicates a complement of an indicated matrix.

15. The non-transitory computer-readable medium of claim 13, wherein the first direction matrix D has dimension m by $(|F_2| + |F_3|)$, where m indicates the number of users of the plurality of users, and | | indicates a cardinality of an indicated matrix.

16. A non-transitory computer-readable medium having stored thereon computer-readable instructions that when executed by a computing device cause the computing device to:

compute a confidence matrix using a predefined weight value defined for each user of a plurality of users and each item of a plurality of items;

(A) update a first parameter matrix using the computed confidence matrix, a predefined response matrix, a first step-size parameter value that is greater than zero, and a first direction matrix, wherein the first parameter matrix includes a row dimension equal to a number of users of the plurality of users, wherein the predefined response matrix includes a predefined response value by each user of the plurality of users to each item of the plurality of items, wherein the predefined response matrix includes at least one matrix value for which a user of the plurality of users has not provided a response to an item of the plurality of items;

(B) update a second parameter matrix using the computed confidence matrix, the predefined response matrix, a second step-size parameter value that is greater than zero, and a second direction matrix, wherein the second parameter matrix includes a column dimension equal to a number of items of the plurality of items, wherein the second parameter matrix is updated using $Y_{Q:}=Y_{Q:}+\eta_2 Z$, where $Y_{Q:}$ is the second parameter matrix, $\eta_2$ is the second step-size parameter value, and Z is the second direction matrix;

(C) update an objective function value based on the updated first parameter matrix and the updated second parameter matrix;

(D) train the first parameter matrix and the second parameter matrix by repeating (A) through (C) until the updated first parameter matrix and the updated second parameter matrix satisfy a convergence test;

predict a recommended item of the plurality of items for a requesting user of the plurality of users using the trained first parameter matrix and the trained second parameter matrix; and output the predicted recommended item.

17. The non-transitory computer-readable medium of claim 16, wherein the second step-size parameter value is updated using $$\eta_2 = \frac{\alpha_2}{\beta_2},$$

where $\alpha_2$ is a second $\alpha$ parameter value, and $\beta_2$ is a second $\beta$ parameter value.

18. The non-transitory computer-readable medium of claim 17, wherein the second $\alpha$ parameter value is updated using $\alpha_0 = \|X_{:Q}Z\|^2 + \lambda\|Z\|^2$ and $\alpha_2 = \alpha_0 + \Sigma_{\Delta_{ui} \neq 0}(\Delta_{ui} X_{uQ} Z_{:i})(\Delta_{ui}+1)(R_{ui}-X_{u:}Y_{:i})$, where $\| \|$ indicates a Frobenius norm computation of a specified matrix, $\lambda$ is a predefined regularization parameter value, u is an index to a respective user, i is an index to a respective item, $\Delta_{ui}$ is a u, $i^{th}$ entry of the computed confidence matrix, $R_{ui}$ is a u, $i^{th}$ entry of the predefined response matrix, $X_{u:}$ is a $u^{th}$ row of X, X is a user matrix, $Y_{:i}$ is an $i^{th}$ column of Y, Y is an item matrix, $Z_{:i}$ is an $i^{th}$ column of Z, $X_{uQ}$ is a $u^{th}$ row of $X_{:Q}$, $X_{:Q}$ is a sub-matrix of X obtained by extracting rows indexed by elements of a Q matrix, $Q=F_1 \cup F_2$, $F_2$ is a latent matrix that stores latent indices for latent factors in X and Y, $F_1$ is a user index matrix that stores model indices for a linear model on X, and $\cup$ indicates a union of indicated matrices.

19. The non-transitory computer-readable medium of claim 18, wherein the second $\beta$ parameter value is updated using $\beta_2 = \alpha_0 + \Sigma_{\Delta_{ui} \neq 0}(\Delta_{ui}^2 + 2\Delta_{ui})(X_{uQ} Z_{:i})^2$.

20. The non-transitory computer-readable medium of claim 16, wherein the second direction matrix is updated using $Z = (\lambda I + X_{:Q}^T X_{:Q})^{-1}[X_{:Q}^T[\Delta_{ui} \circ (R-XY)+R]-X_{:Q}^T XY - \lambda Y_{Q:}]$, where u is an index to a respective user, i is an index to a respective item, $\Delta_{ui}$ is a u, $i^{th}$ entry of the computed confidence matrix, R is the predefined response matrix, X is a user matrix, Y is an item matrix, $\lambda$ is a predefined regularization parameter value, $X_{:Q}$ is a sub-matrix of X obtained by extracting rows indexed by elements of a Q matrix, $Q=F_1 \cup F_2$, $F_2$ is a latent matrix that stores latent indices for latent factors in X and Y, $F_1$ is a user index matrix that stores model indices for a linear model on X, $Y_{Q:}$ is the second parameter matrix, I is an identity matrix, $\circ$ indicates a Hadamard product, T indicates a transpose, and $\cup$ indicates a union of indicated matrices.

21. The non-transitory computer-readable medium of claim 20, wherein $X=[X_{:\bar{P}}, X_{:P}]$ and $Y=[Y_{Q:}, Y_{\bar{Q}:}]$, where $\bar{\phantom{x}}$ indicates a complement of an indicated matrix.

22. The non-transitory computer-readable medium of claim 20, wherein the second direction matrix Z has dimension $(|F_1|+|F_2|)$ by n, where n indicates the number of items of the plurality of items, and $|\ |$ indicates a cardinality of an indicated matrix.

23. The non-transitory computer-readable medium of claim 1, wherein the objective function value is updated using $g=\|(\Delta_{ui}+J) \circ (R-XY)\|^2 + \lambda(\lambda\|X_{:P}\|^2 + \|Y_{Q:}\|^2)$, where g is the objective function value, $\Delta_{ui}$ is a u, $i^{th}$ entry of the computed confidence matrix, u is an index to a respective user, i is an index to a respective item, J indicates an m×n matrix of all ones, m indicates the number of users of the plurality of users, n indicates the number of items of the plurality of items, R is the predefined response matrix, X is a user matrix, Y is an item matrix, $\lambda$ is a predefined regularization parameter value, $Y_{Q:}$ is the second parameter matrix, $\circ$ indicates a Hadamard product, and $\| \|$ indicates a Frobenius norm computation.

24. The non-transitory computer-readable medium of claim 23, wherein $X=[X_{:\bar{P}}, X_{:P}]$ and $Y=[Y_{Q:}, Y_{\bar{Q}:}]$, where $\bar{\phantom{x}}$ indicates a complement of an indicated matrix.

25. The non-transitory computer-readable medium of claim 1, wherein each item of the plurality of items is selected from the group consisting of a content item, a survey question, and a person.

26. The non-transitory computer-readable medium of claim 1, wherein each user of the plurality of users is selected from the group consisting of a person and an entity.

27. The non-transitory computer-readable medium of claim 1, wherein the confidence matrix is computed using $\Delta_{ui} = \sqrt{W_{ui}} - 1$, where u is an index to a respective user, i is an index to a respective item, $\Delta_{ui}$ is a u, $i^{th}$ entry of the confidence matrix, and $W_{ui}$ is a u, $i^{th}$ predefined weight value.

28. The non-transitory computer-readable medium of claim 27, wherein $W_{ui}=1+\xi_u+\zeta_i$, where $\xi_u$ is a number of items with $R_{ui}=1$, $\zeta_i$ is a number of users with $R_{ui}=1$, and $R_{ui}$ is a u, $i^{th}$ entry of the predefined response matrix.

29. A computing device comprising:

a processor; and a non-transitory computer-readable medium operably coupled to the processor, the computer-readable medium having computer-readable instructions stored thereon that, when executed by the processor, cause the computing device to compute a confidence matrix using a predefined weight value defined for each user of a plurality of users and each item of a plurality of items;

(A) update a first parameter matrix using the computed confidence matrix, a predefined response matrix, a first step-size parameter value that is greater than zero, and a first direction matrix, wherein the first parameter matrix includes a row dimension equal to a number of users of the plurality of users, wherein the predefined response matrix includes a predefined response value by each user of the plurality of users to each item of the plurality of items, wherein the predefined response matrix includes at least one matrix value for which a user of the plurality of users has not provided a response to an item of the plurality of items, wherein the first parameter matrix is updated using $X_{.P}=X_{.P}+\eta_1 D$, where $X_{.P}$ is the first parameter matrix, $\eta_1$ is the first step-size parameter value, and D is the first direction matrix;

(B) update a second parameter matrix using the computed confidence matrix, the predefined response matrix, a second step-size parameter value that is greater than zero, and a second direction matrix, wherein the second parameter matrix includes a column dimension equal to a number of items of the plurality of items;

(C) update an objective function value based on the updated first parameter matrix and the updated second parameter matrix;

(D) train the first parameter matrix and the second parameter matrix by repeating (A) through (C) until the updated first parameter matrix and the updated second parameter matrix satisfy a convergence test; and predict a recommended item of the plurality of items for a requesting user of the plurality of users using the trained first parameter matrix and the trained second parameter matrix; and output the predicted recommended item.

30. A method of determining a recommendation, the method comprising:

computing, by a computing device, a confidence matrix using a predefined weight value defined for each user of a plurality of users and each item of a plurality of items;

(A) updating, by the computing device, a first parameter matrix using the computed confidence matrix, a predefined response matrix, a first step-size parameter value that is greater than zero, and a first direction matrix, wherein the first parameter matrix includes a row dimension equal to a number of users of the plurality of users, wherein the predefined response matrix includes a predefined response value by each user of the plurality of users to each item of the plurality of items, wherein the predefined response matrix includes at least one matrix value for which a user of the plurality of users has not provided a response to an item of the plurality of items, wherein the first parameter matrix is updated using $X_{.P}=X_{.P}+\eta_1 D$, where $X_{.P}$ is the first parameter matrix, $\eta_1$ is the first step-size parameter value, and D is the first direction matrix;

(B) updating, by the computing device, a second parameter matrix using the computed confidence matrix, the predefined response matrix, a second step-size parameter value that is greater than zero, and a second direction matrix, wherein the second parameter matrix includes a column dimension equal to a number of items of the plurality of items;

(C) updating, by the computing device, an objective function value based on the updated first parameter matrix and the updated second parameter matrix;

(D) training, by the computing device, the first parameter matrix and the second parameter matrix by repeating (A) through (C) until the updated first parameter matrix and the updated second parameter matrix satisfy a convergence test;

predicting, by the computing device, a recommended item of the plurality of items for a requesting user of the plurality of users using the trained first parameter matrix and the trained second parameter matrix; and outputting, by the computing device, the predicted recommended item.

* * * * *